US011870144B2

(12) United States Patent
Uchimura

(10) Patent No.: US 11,870,144 B2
(45) Date of Patent: Jan. 9, 2024

(54) ANTENNA, WIRELESS COMMUNICATION MODULE, AND WIRELESS COMMUNICATION DEVICE

(71) Applicant: KYOCERA Corporation, Kyoto (JP)

(72) Inventor: Hiroshi Uchimura, Kagoshima (JP)

(73) Assignee: KYOCERA CORPORATION, Kyoto (JP)

( * ) Notice: Subject to any disclaimer, the term of this patent is extended or adjusted under 35 U.S.C. 154(b) by 425 days.

(21) Appl. No.: 17/306,844

(22) Filed: May 3, 2021

(65) Prior Publication Data

US 2021/0257727 A1 Aug. 19, 2021

Related U.S. Application Data

(63) Continuation of application No. 16/795,574, filed on Feb. 20, 2020, now Pat. No. 11,031,687, which is a (Continued)

(30) Foreign Application Priority Data

Aug. 27, 2018 (JP) ................................ 2018-158793

(51) Int. Cl.
*H01Q 1/24* (2006.01)
*H01Q 1/52* (2006.01)
(Continued)

(52) U.S. Cl.
CPC ............... *H01Q 1/528* (2013.01); *H01Q 1/24* (2013.01); *H01Q 5/307* (2015.01); *H01Q 9/0421* (2013.01); *H01Q 9/0457* (2013.01)

(58) Field of Classification Search
CPC .......... H01Q 1/528; H01Q 5/307; H01Q 1/24; H01Q 9/0421; H01Q 9/0457
See application file for complete search history.

(56) References Cited

U.S. PATENT DOCUMENTS 5,173,711 A 12/1992 Takeuchi et al.
6,483,481 B1 11/2002 Sivenpiper et al.
(Continued)

FOREIGN PATENT DOCUMENTS

EP 1804335 A1 7/2007
EP 2963736 A1 1/2016
(Continued)

OTHER PUBLICATIONS

Liang Jiang et al., "A CMOS UWB On-Chip Antenna With a MIM Capacitor Loading AMC", IEEE Transactions on Electron Devices, Jun. 2012, pp. 1757-1764, vol. 59, No. 6, 9pp.
(Continued)

*Primary Examiner* — Graham P Smith
(74) *Attorney, Agent, or Firm* — HAUPTMAN HAM, LLP

(57) ABSTRACT

A resonant structure includes a conducting portion extending along a first plane and including first conductors, a ground conductor located away from the conducting portion and extending along the first plane, and a first predetermined number of connecting conductors extending from the ground conductor towards the conducting portion. At least two first conductors are connected to different connecting conductors. A first connecting pair of two of the connecting conductors is aligned along a first direction in the first plane and a second connecting pair of two of the connecting conductors is aligned along a second direction, in the first plane, intersecting the first direction. The resonant structure resonates at a first frequency along a first current path including the ground conductor, conducting portion, and first connecting pair and at a second frequency along a second current path including the ground conductor, conducting portion, and second connecting pair.

20 Claims, 77 Drawing Sheets

Related U.S. Application Data continuation of application No. PCT/JP2019/032876, filed on Aug. 22, 2019.

(51) Int. Cl.

| | |
|---|---|
| ***H01Q 9/04*** | (2006.01) |
| ***H01Q 5/307*** | (2015.01) |

(56) References Cited

U.S. PATENT DOCUMENTS

| | | | |
|---|---|---|---|
| 2007/0075903 | A1 | 4/2007 | Matsugatani et al. |
| 2008/0150825 | A1 | 6/2008 | Higaki et al. |
| 2012/0056787 | A1 | 3/2012 | Tatarnikov et al. |

FOREIGN PATENT DOCUMENTS

| | | | |
|---|---|---|---|
| JP | 2004514364 | A | 5/2004 |
| JP | 200594360 | A | 4/2005 |
| JP | 2008160589 | A | 7/2008 |
| JP | 2018029249 | A | 2/2018 |
| WO | 2020045237 | A1 | 3/2020 |

OTHER PUBLICATIONS

Yasutaka Murakami et al., "Low-Profile Design and Bandwidth Characteristics of Artificial Magnetic Conductor with Dielectric Substrate", IEICE Transactions on Communications (B), 2015, pp. 172-179, vol. J98-B No. 2, 9pp.

Yasutaka Murakami et al., "Optimum Configuration of Reflector for Dipole Antenna with AMC Reflector", IEICE Transactions on Communications (B), 2015, pp. 1212-1220, vol. J98-B No. 11, 10pp.

ANTENNA, WIRELESS COMMUNICATION MODULE, AND WIRELESS COMMUNICATION DEVICE

CROSS-REFERENCE TO RELATED APPLICATION

The present application is a continuation of U.S. patent application Ser. No. 16/795,574, filed Feb. 20, 2020, which is a continuation of International Application No. PCT/JP2019/032876, filed Aug. 22, 2019, which claims priority based on Japanese Patent Application No. 2018-158793, filed Aug. 27, 2018, the entire contents of which are incorporated herein by reference.

TECHNICAL FIELD

The present disclosure relates to a resonant structure, an antenna, a wireless communication module, and a wireless communication device.

BACKGROUND

Electromagnetic waves emitted from an antenna are reflected by a metal conductor. A 180 degree phase shift occurs in the electromagnetic waves reflected by the metal conductor. The reflected electromagnetic waves combine with the electromagnetic waves emitted from the antenna. The amplitude may decrease as a result of the electromagnetic waves emitted from the antenna combining with the phase-shifted electromagnetic waves. Consequently, the amplitude of the electromagnetic waves emitted from the antenna reduces. The effect of the reflected waves is reduced by the distance between the antenna and the metal conductor being set to ¼ of the wavelength λ of the emitted electromagnetic waves.

To address this, a technique for reducing the effect of reflected waves with an artificial magnetic wall has been proposed. This technique is disclosed in non-patent literature (NPL) 1 and 2, for example.

CITATION LIST

Non-Patent Literature

NPL 1: Murakami et al., "Low-Profile Design and Bandwidth Characteristics of Artificial Magnetic Conductor with Dielectric Substrate", IEICE Transactions on Communications (B), Vol. J98-B No. 2, pp. 172-179

NPL 2: Murakami et al., "Optimum Configuration of Reflector for Dipole Antenna with AMC Reflector", IEICE Transactions on Communications (B), Vol. J98-B No. 11, pp. 1212-1220

SUMMARY

A resonant structure according to an embodiment of the present disclosure includes a conducting portion, a ground conductor, and a first predetermined number of connecting conductors. The conducting portion extends along a first plane and includes a plurality of first conductors. The ground conductor is located away from the conducting portion and extends along the first plane. The connecting conductors extend from the ground conductor towards the conducting portion. At least two first conductors among the plurality of first conductors are connected to different connecting conductors. Among the first predetermined number of connecting conductors, two connecting conductors form a first connecting pair aligned along a first direction included in the first plane, and two connecting conductors form a second connecting pair aligned along a second direction that is included in the first plane and intersects the first direction. The resonant structure is configured to resonate at a first frequency along a first current path and to resonate at a second frequency along a second current path. The first current path includes the ground conductor, the conducting portion, and the first connecting pair. The second current path includes the ground conductor, the conducting portion, and the second connecting pair.

An antenna according to an embodiment of the present disclosure includes the above-described resonant structure and a first feeder configured to connect electromagnetically to the conducting portion.

A wireless communication module according to an embodiment of the present disclosure includes the above-described antenna and a radio frequency (RF) module configured to be connected electrically to the first feeder.

A wireless communication device according to an embodiment of the present disclosure includes the above-described wireless communication module and a battery configured to supply power to the wireless communication module.

DETAILED DESCRIPTION

With a known technique, it is necessary to line up multiple resonator structures.

The present disclosure relates to providing a new resonant structure, antenna, wireless communication module, and wireless communication device.

The present disclosure can provide a new resonant structure, antenna, wireless communication module, and wireless communication device.

The "resonant structure" in the present disclosure enters a resonant state at a predetermined frequency. The frequency at which the resonant structure enters the resonant state is the "resonance frequency". Example uses of the "resonant structure" of the present disclosure include an antenna and a filter. The "resonant structure" of the present disclosure may include a member that includes a dielectric material and a member that includes a conductive material.

The "dielectric material" in the present disclosure may include a composition of either a ceramic material or a resin material. Examples of the ceramic material include an aluminum oxide sintered body, an aluminum nitride sintered body, a mullite sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured liquid crystal polymer or the like.

The "conductive material" in the present disclosure may include a composition of any of a metal material, an alloy of metal materials, a cured metal paste, and a conductive polymer. Examples of the metal material include copper, silver, palladium, gold, platinum, aluminum, chrome, nickel, cadmium lead, selenium, manganese, tin, vanadium, lithium, cobalt, and titanium. The alloy includes a plurality of metal materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the conductive polymer include a polythiophene polymer, a polyacetylene polymer, a polyaniline polymer, and a polypyrrole polymer.

Figure 79:
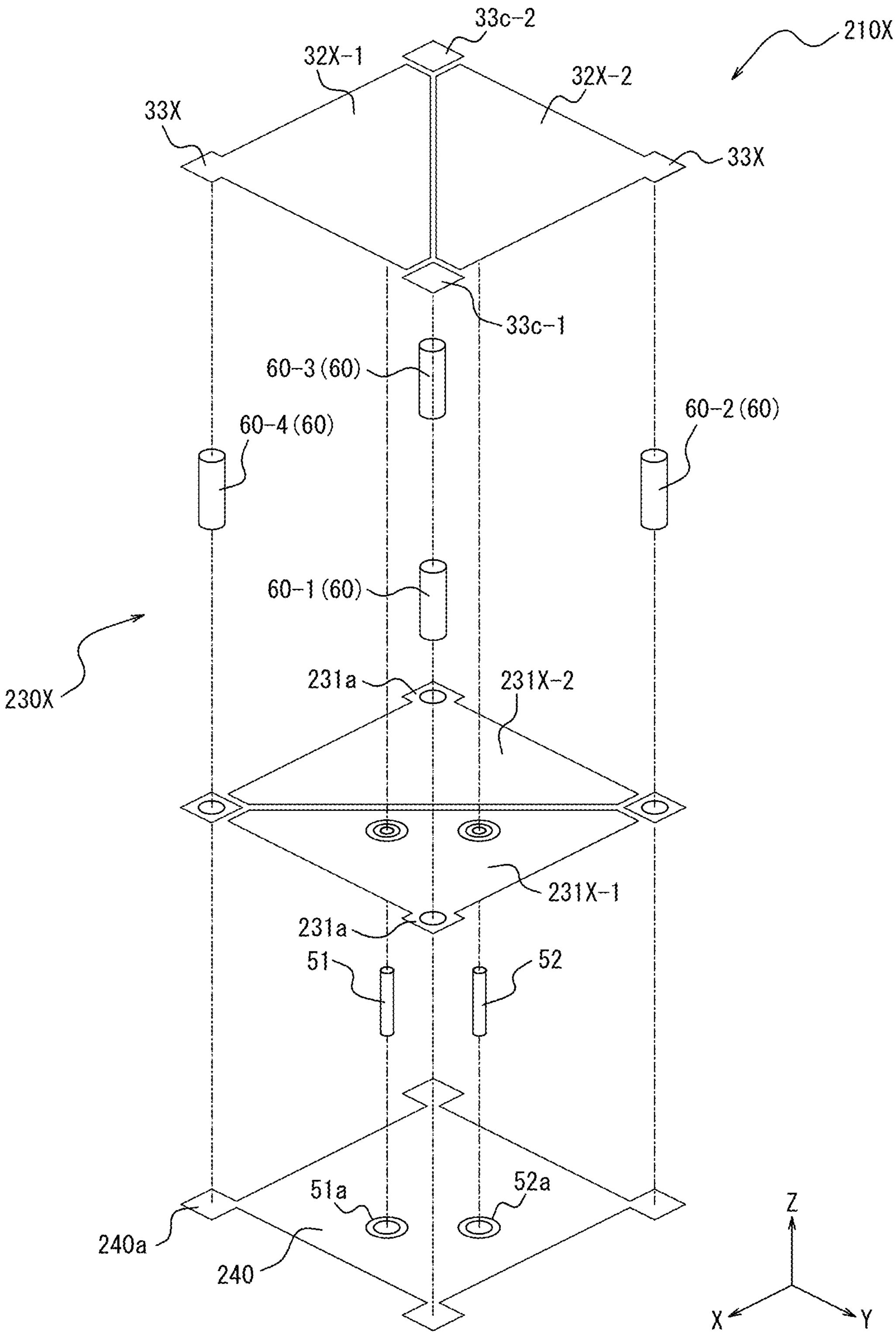
FIG. 79 is an exploded perspective view of a portion of a resonant structure according to an embodiment.

Embodiments of the present disclosure are described below with reference to the drawings. Constituent elements that are the same from FIG. 1 to FIG. 79 are labeled with the same reference signs.

Figure 1:
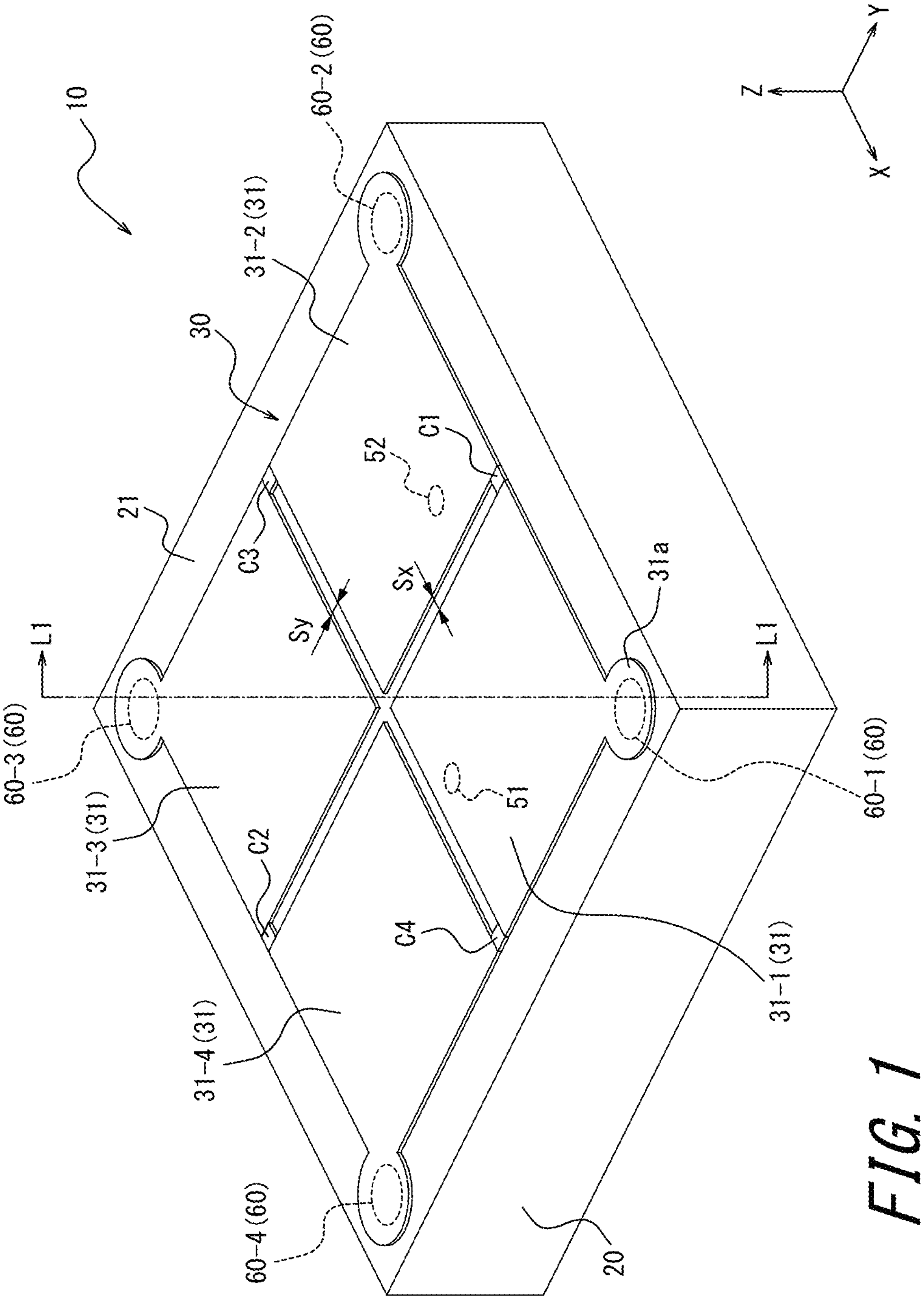
FIG. 1 is a perspective view of a resonant structure according to an embodiment.

In an embodiment of the present disclosure, a conducting portion 30 illustrated in FIG. 1 and the like extends along a first plane, which is the XY plane in the XYZ coordinate system illustrated in FIG. 1 and the like. In an embodiment of the present disclosure, the direction extending from a ground conductor 40 illustrated in FIG. 1, FIG. 2, and the like towards the conducting portion 30 is illustrated as the positive direction of the Z-axis, and the opposite direction is illustrated as the negative direction of the Z-axis. In an embodiment of the present disclosure, the positive direction and the negative direction of the X-axis are collectively indicated as the "X-direction" when no particular distinction is made therebetween. The positive direction and the negative direction of the Y-axis are collectively indicated as the "Y-direction" when no particular distinction is made therebetween. The positive direction and the negative direction of the Z-axis are collectively indicated as the "Z-direction" when no particular distinction is made therebetween.

Example of Resonant Structure

Figure 2:
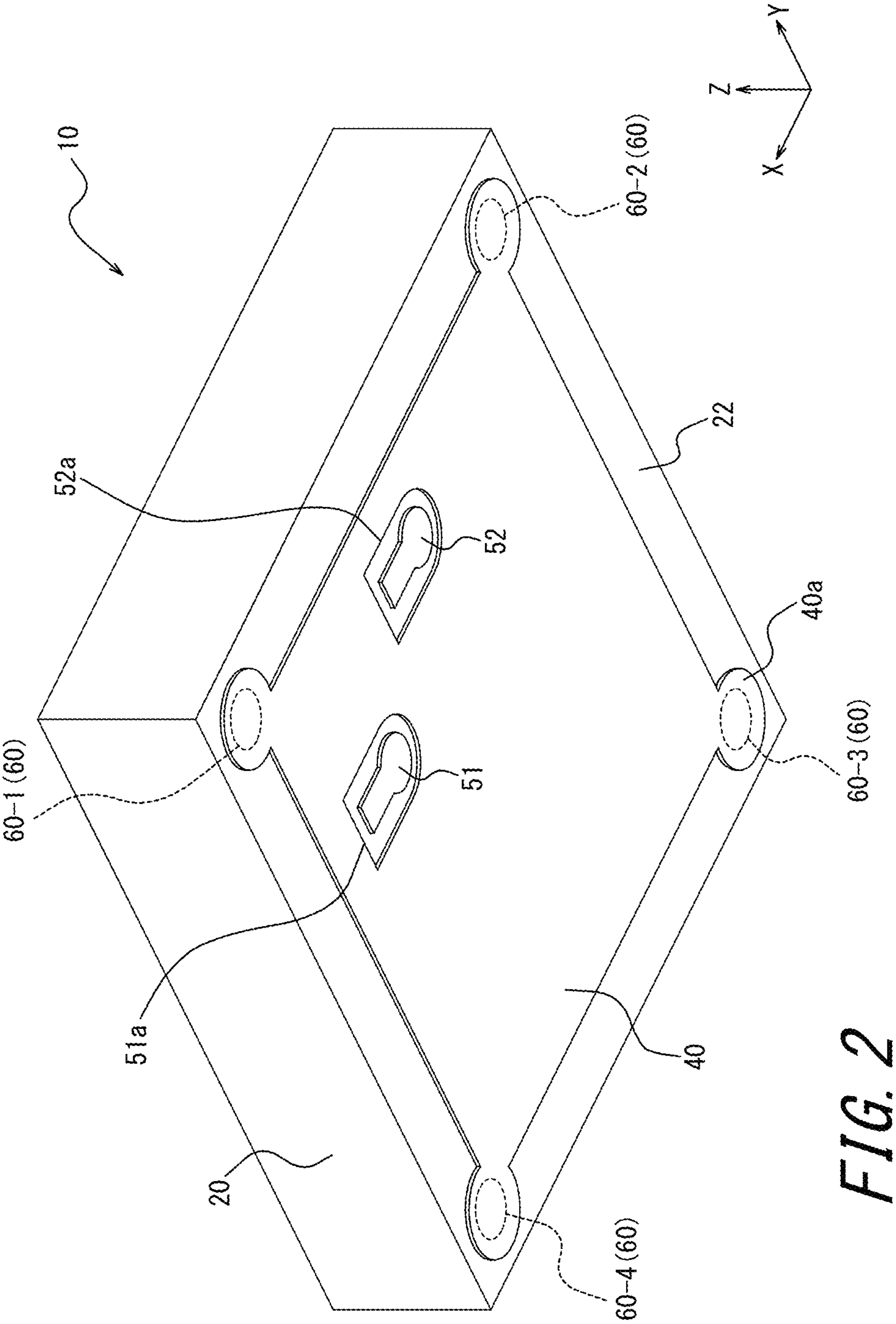
FIG. 2 is a perspective view of the resonant structure illustrated in FIG. 1 viewed from the negative direction of the Z-axis.
Figure 3:
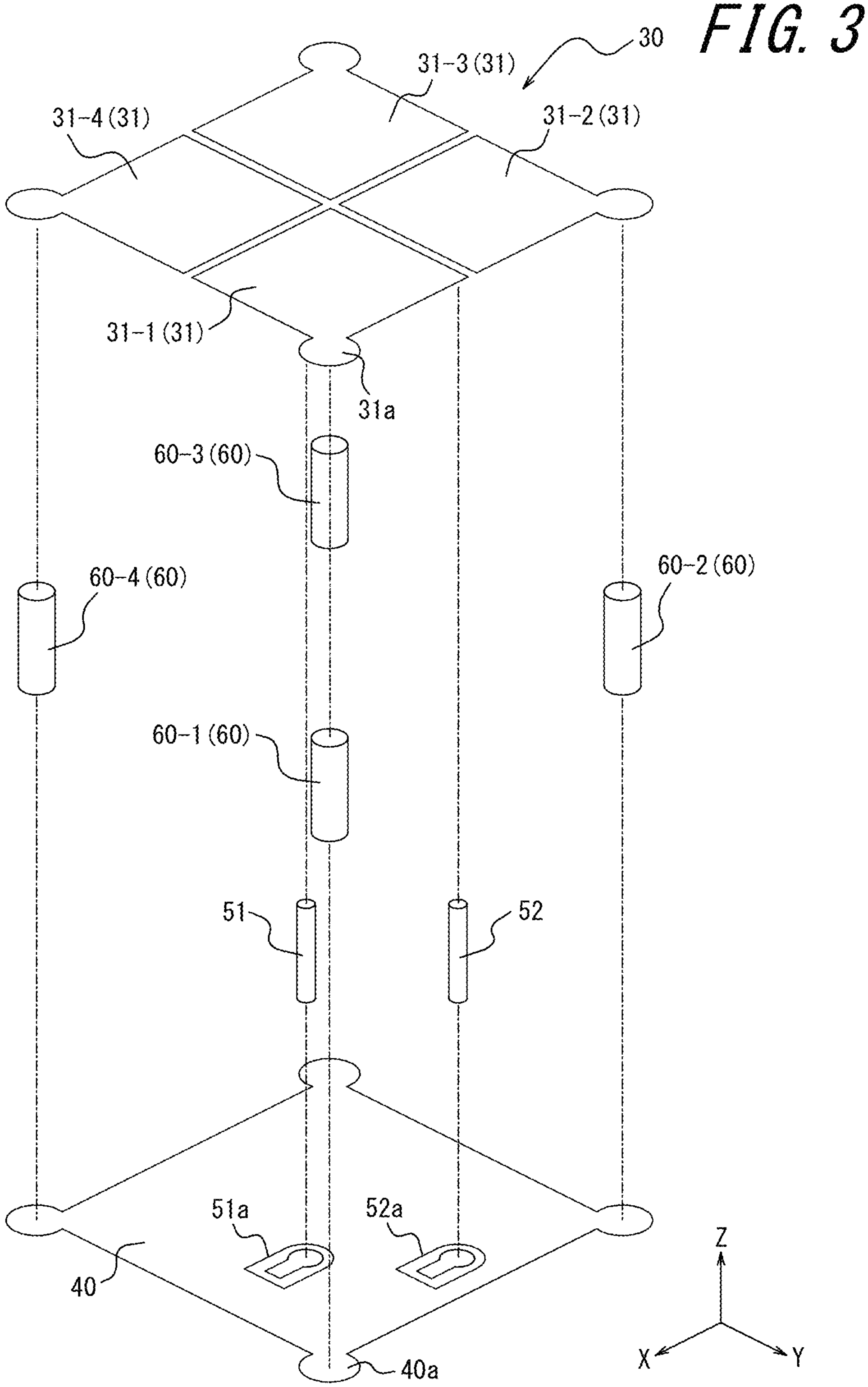
FIG. 3 is an exploded perspective view of a portion of the resonant structure illustrated in FIG. 1.
Figure 4:
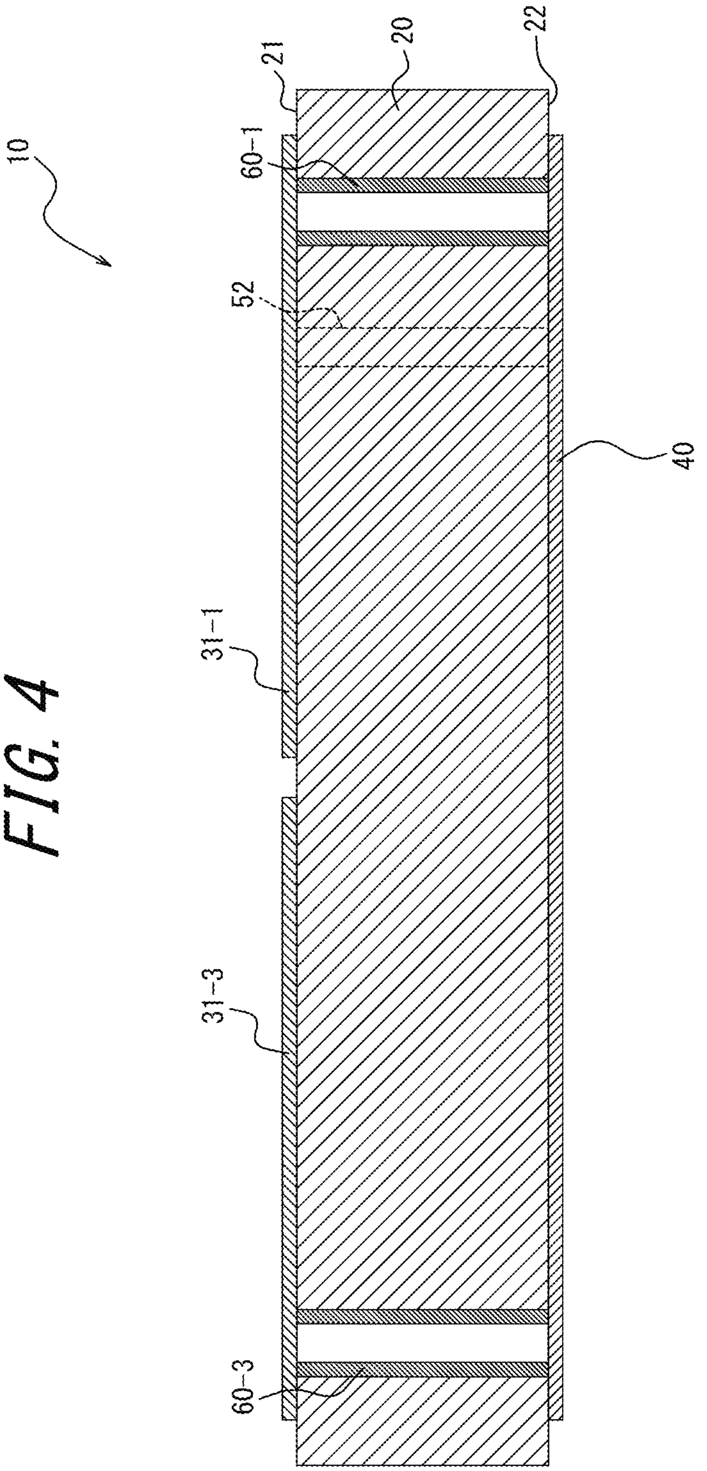
FIG. 4 is a cross-section of the resonant structure along the L1-L1 line illustrated in FIG. 1.

FIG. 1 is a perspective view of a resonant structure 10 according to an embodiment. FIG. 1 is a perspective view of the resonant structure 10 as viewed from the positive direction of the Z-axis. FIG. 2 is a perspective view of the resonant structure 10 illustrated in FIG. 1 as viewed from the negative direction of the Z-axis. FIG. 3 is an exploded perspective view of a portion of the resonant structure 10 illustrated in FIG. 1. FIG. 4 is a cross-section of the resonant structure 10 along the L1-L1 line illustrated in FIG. 1.

The resonant structure 10 resonates at one or a plurality of resonance frequencies. As illustrated in FIG. 1 and FIG. 2, the resonant structure 10 includes a substrate 20, a conducting portion 30, and a ground conductor 40. The resonant structure 10 includes connecting conductors 60-1, 60-2, 60-3, 60-4. The connecting conductors 60-1 to 60-4 are collectively indicated as the "connecting conductors 60" when no particular distinction is made therebetween. The number of connecting conductors 60 in the resonant structure 10 is not limited to four. It suffices for the resonant structure 10 to include a first predetermined number of connecting conductors 60. The first predetermined number is three or more. The resonant structure 10 may include at least one of the first feeder 51 (first feeding line) and the second feeder 52 (second feeding line) illustrated in FIG. 1.

The substrate 20 may be configured to include a dielectric material. The relative permittivity of the substrate 20 may be appropriately adjusted in accordance with the desired resonance frequency of the resonant structure 10.

The substrate 20 supports the conducting portion 30 and the ground conductor 40. As illustrated in FIG. 1 and FIG. 2, the substrate 20 is a quadrangular prism. The substrate 20 may, however, have any shape within a range capable of supporting the conducting portion 30 and the ground conductor 40. As illustrated in FIG. 4, the substrate 20 includes an upper surface 21 and a lower surface 22. The substrate 20 includes two surfaces substantially parallel to the XY plane. Of these two surfaces, the upper surface 21 is the surface on the positive side of the Z-axis, and the lower surface 22 is the surface on the negative side of the Z-axis.

The conducting portion 30 illustrated in FIG. 1 may be configured to include a conductive material. The conducting portion 30, ground conductor 40, and connecting conductors 60 may be configured to include the same conductive material or different conductive materials.

The conducting portion 30 illustrated in FIG. 1 is configured to function as a portion of a resonator. The conducting portion 30 extends along the XY plane. The conducting portion 30 has a substantially square shape that includes two sides substantially parallel to the X-direction and two sides substantially parallel to the Y-direction. The conducting portion 30 may, however, have any shape. The conducting portion 30 is located on the upper surface 21 of the substrate 20. The resonant structure 10 can exhibit an artificial magnetic conductor character with respect to a predetermined frequency of electromagnetic waves incident from the outside onto the upper surface of the substrate 20 where the conducting portion 30 is located.

As used in the present disclosure, the "artificial magnetic conductor character" refers to characteristics of a surface such that the phase difference between incident waves and reflected waves at one resonance frequency becomes 0 degrees. The resonant structure 10 may have at least one region near at least one resonance frequency as an operating frequency. On the surface having the artificial magnetic conductor character, the phase difference between the incident waves and reflected waves in the operating frequency band is smaller than a range from −90 degrees to +90 degrees.

The conducting portion 30 includes a gap Sx and a gap Sy, as illustrated in FIG. 1. The gap Sx extends in the Y-direction. The gap Sx is located near the center of the sides of the conducting portion 30 substantially parallel to the X-direction. The gap Sy extends in the X-direction. The gap Sy is located near the center of the sides of the conducting portion 30 substantially parallel to the Y-direction. The width of the gap Sx and the width of the gap Sy may be appropriately adjusted in accordance with the desired resonance frequency of the resonant structure 10.

The conducting portion 30 includes first conductors 31-1, 31-2, 31-3, 31-4, as illustrated in FIG. 1. The first conductors 31-1 to 31-4 are collectively indicated as the "first conductors 31" when no particular distinction is made therebetween. The number of first conductors 31 included in the conducting portion 30 is not limited to four. The conducting portion 30 simply needs to include a second predetermined number, greater than the first predetermined number, of the first conductors 31.

The first conductors 31 illustrated in FIG. 1 may be flat conductors. The first conductors 31 have the same substantially square shape that includes two sides substantially parallel to the X-direction and two sides substantially parallel to the Y-direction. Each of the first conductors 31-1 to 31-4 may, however, have any shape. Each of the first conductors 31-1 to 31-4 is connected to a different one of the connecting conductors 60-1 to 60-4, as illustrated in FIG. 1 and FIG. 3. Each square first conductor 31 may include a connector 31*a* at one of the four corners, as illustrated in FIG. 1. The connecting conductors 60 are connected to the connectors 31*a*. However, the first conductors 31 need not include the connectors 31*a*. A portion of the plurality of first conductors 31 may include the connector 31*a*, and another portion may be configured without the connector 31*a*. The connectors 31*a* illustrated in FIG. 1 are circular. The connectors 31*a* are not limited to being circular, however, and may have any shape.

As illustrated in FIG. 1, each of the first conductors 31-1 to 31-4 extends along the XY plane. The first conductors 31-1 to 31-4 illustrated in FIG. 1 are aligned in a square grid extending in the X-direction and Y-direction.

For example, the first conductor 31-1 and the first conductor 31-2 are aligned in the X-direction of the square grid extending in the X-direction and Y-direction. The first conductor 31-3 and the first conductor 31-4 are aligned in the X-direction of the square grid extending in the X-direction and Y-direction. The first conductor 31-1 and the first conductor 31-4 are aligned in the Y-direction of the square grid extending in the X-direction and Y-direction. The first conductor 31-2 and the first conductor 31-3 are aligned in the Y-direction of the square grid extending in the X-direction and Y-direction. The first conductor 31-1 and the first conductor 31-3 are aligned in a first diagonal direction of the square grid extending in the X-direction and Y-direction. The first diagonal direction is a direction inclined 45 degrees in the positive direction of the Y-axis from the positive direction of the X-axis. The first conductor 31-2 and the first conductor 31-4 are aligned in a second diagonal line of the square grid extending in the X-direction and Y-direction. The second diagonal direction is a direction inclined 135 degrees in the positive direction of the Y-axis from the positive direction of the X-axis.

The grid in which the first conductors 31-1 to 31-4 are aligned, however, is not limited to a square grid. The first conductors 31-1 to 31-4 may be aligned in any grid shape. Examples of the grid in which the first conductors 31 are aligned include an oblique grid, a rectangular grid, and a hexagonal grid.

By inclusion of a gap between one first conductor 31 and another first conductor 31, the one first conductor 31 includes a portion configured to connect capacitively to the other first conductor 31. The first conductor 31-1 and the first conductor 31-2, for example, have the gap Sx therebetween and can therefore be configured to connect capacitively. The first conductor 31-3 and the first conductor 31-4, for example, have the gap Sx therebetween and can therefore be configured to connect capacitively. The first conductor 31-1 and the first conductor 31-4, for example, have the gap Sy therebetween and can therefore be configured to connect capacitively. The first conductor 31-2 and the first conductor 31-3, for example, have the gap Sy therebetween and can therefore be configured to connect capacitively. The first conductor 31-1 and the first conductor 31-3, for example, have the gap Sx and the gap Sy therebetween and can therefore be configured to connect capacitively. The first conductor 31-2 and the first conductor 31-4, for example, have the gap Sx and the gap Sy therebetween and can therefore be configured to connect capacitively. The first conductor 31-1 and the first conductor 31-3 can be configured to connect capacitively via the first conductor 31-2 and the first conductor 31-4. The first conductor 31-2 and the first conductor 31-4 can be configured to connect capacitively via the first conductor 31-1 and the first conductor 31-3.

As illustrated in FIG. 1, the resonant structure 10 may include capacitance elements C1, C2 in the gap Sx. The resonant structure 10 may include capacitance elements C3, C4 in the gap Sy. The capacitance elements C1 to C4 may be chip capacitors or the like. The capacitance element C1 located in the gap Sx is configured to capacitively connect the first conductor 31-1 and the first conductor 31-2. The capacitance element C2 located in the gap Sx is configured to capacitively connect the first conductor 31-3 and the first conductor 31-4. The capacitance element C3 located in the gap Sy is configured to capacitively connect the first conductor 31-2 and the first conductor 31-3. The capacitance element C4 located in the gap Sy is configured to capacitively connect the first conductor 31-1 and the first conductor 31-4. The position in the gap Sx of the capacitance elements C1, C2 and the position in the gap Sy of the capacitance elements C3, C4 may be appropriately adjusted in accordance with the desired resonance frequency of the resonant structure 10. The capacitance of the capacitance elements C1 to C4 may be appropriately adjusted in accordance with the desired resonance frequency of the resonant structure 10. An increase in the capacitance of the capacitance elements C1 to C4 allows a decrease in the resonance frequency of the resonant structure 10. A decrease in the capacitance of the capacitance elements C1 to C4 allows an increase in the resonance frequency of the resonant structure 10.

The ground conductor 40 illustrated in FIG. 2 may be configured to include a conductive material. The ground conductor 40 provides a potential that becomes a reference in the resonant structure 10. The ground conductor 40 may be configured to be connected electrically to the ground of a device that includes the resonant structure 10. The ground conductor 40 may be a flat conductor. As illustrated in FIG. 4, the ground conductor 40 is located on the lower surface 22 of the substrate 20. Various components of the device that includes the resonant structure 10 may be located on the side of the ground conductor 40 in the negative direction of the Z-axis. For example, a metal plate may be located on the side of the ground conductor 40 in the negative direction of the Z-axis, as illustrated in FIG. 4. Even if a metal plate is located on the side of the ground conductor 40 in the negative direction of the Z-axis, the resonant structure 10 configured as an antenna can maintain emission efficiency at a predetermined frequency.

As illustrated in FIG. 2 and FIG. 3, the ground conductor 40 extends along the XY plane. The ground conductor 40 is located away from the conducting portion 30. As illustrated in FIG. 4, the substrate 20 is located between the ground conductor 40 and the conducting portion 30. The ground conductor 40 is located opposite the conducting portion 30 in the Z-direction, as illustrated in FIG. 3. The ground conductor 40 may have a shape corresponding to the shape of the conducting portion 30. The ground conductor 40 illustrated in FIG. 2 has a substantially square shape corresponding to the substantially square conducting portion 30. The ground conductor 40 may, however, have any shape in accordance with the shape of the conducting portion 30. The square ground conductor 40 includes a connector 40*a* at each of the four corners. The connecting conductors 60 are connected to the connectors 40*a*. The ground conductor 40 need not include a portion of the connectors 40*a*. The connectors 40*a* illustrated in FIG. 2 are circular. The connectors 40*a* are not limited to being circular, however, and may have any shape.

The first feeder 51 and the second feeder 52 illustrated in FIG. 1 may be configured to include a conductive material. Each of the first feeder 51 and the second feeder 52 can be a through-hole conductor, a via conductor, or the like. The first feeder 51 and the second feeder 52 can be located inside the substrate 20, as illustrated in FIG. 4. In the resonant structure 10, a direct power supply method in which the first feeder 51 and the second feeder 52 are connected directly to the conducting portion 30 may be adopted, or an electromagnetic coupling power supply method in which the first feeder 51 and the second feeder 52 are electromagnetically coupled to the conducting portion 30 may be adopted.

The first feeder 51 illustrated in FIG. 3 is configured to connect electromagnetically to the first conductor 31-1 included in the conducting portion 30 illustrated in FIG. 1. In the present disclosure, an "electromagnetic connection" may refer to an electrical connection or a magnetic connection. The first feeder 51 can extend from an opening 51*a* of the ground conductor 40 illustrated in FIG. 2 to an external device or the like.

When the resonant structure 10 is used as an antenna, the first feeder 51 is configured to supply power to the conducting portion 30 through the first conductor 31-1. When the resonant structure 10 is used as an antenna or a filter, the first feeder 51 is configured to supply power from the conducting portion 30 through the first conductor 31-1 to an external device or the like.

The second feeder 52 illustrated in FIG. 3 is configured to connect electromagnetically to the first conductor 31-2 included in the conducting portion 30 illustrated in FIG. 1. The second feeder 52 is configured to connect electromagnetically to the conducting portion 30 at a different position than the first feeder 51. As illustrated in FIG. 2, the second feeder 52 can extend from an opening 52*a* of the ground conductor 40 to an external device or the like.

When the resonant structure 10 is used as an antenna, the second feeder 52 is configured to supply power to the conducting portion 30 through the first conductor 31-2. When the resonant structure 10 is used as an antenna or a filter, the second feeder 52 is configured to supply power from the conducting portion 30 through the first conductor 31-2 to an external device or the like.

The connecting conductors 60 illustrated in FIG. 3 may be configured to include a conductive material. The connecting conductors 60 extend from the ground conductor 40 towards the conducting portion 30. The connecting conductors 60 can be through-hole conductors. The connecting conductors 60 may be via conductors. The connecting conductors 60-1 to 60-4 are each connected to the ground conductor 40 and one of the first conductors 31-1 to 31-4.

First Example of Resonant State

Figure 5:
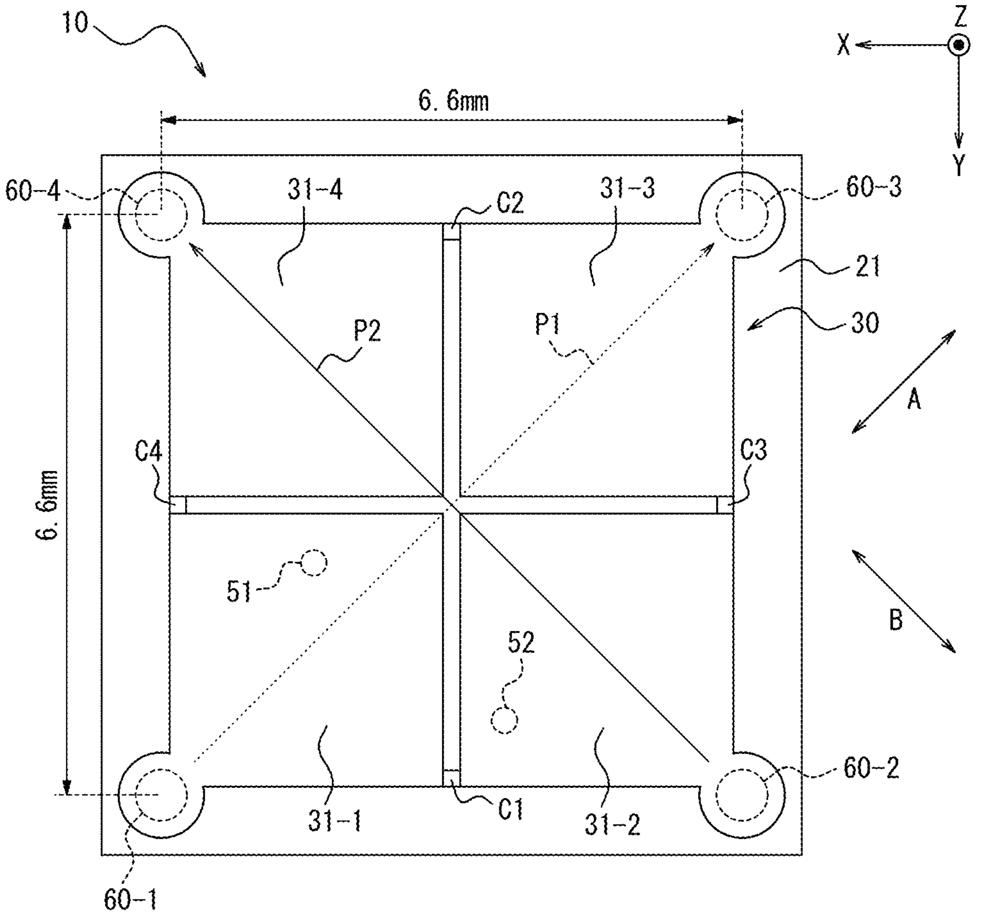
FIG. 5 illustrates a first example of a resonant state in the resonant structure illustrated in FIG. 1.

FIG. 5 illustrates a first example of a resonant state in the resonant structure 10 illustrated in FIG. 1. The A direction and the B direction illustrated in FIG. 5 are directions included in the XY plane.

The resonant structure 10 illustrated in FIG. 5 includes capacitance elements C1 to C4. The capacitance of each capacitance element C1 to C4 is the same.

The A direction is a direction inclined 45 degrees in the positive direction of the Y-axis from the positive direction of the X-axis. The A direction is a first diagonal direction in which the first conductor 31-1 and the first conductor 31-3 are aligned among the first conductors 31-1 to 31-4 aligned in a square grid extending in the X-direction and the Y-direction.

The B direction is a direction inclined 135 degrees in the positive direction of the Y-axis from the positive direction of the X-axis. The B direction is a second diagonal direction in which the first conductor 31-2 and the first conductor 31-4 are aligned among the first conductors 31-1 to 31-4 aligned in a square grid extending in the X-direction and the Y-direction.

The connecting conductor 60-1 and the connecting conductor 60-2 become a first connecting pair aligned along the X-direction as the first direction. The connecting conductor 60-1 and the connecting conductor 60-2 become the first connecting pair aligned along the X-direction of the square grid (extending in the X-direction and the Y-direction) in which the first conductors 31 are aligned.

The connecting conductor 60-3 and the connecting conductor 60-4 become a first connecting pair aligned along the X-direction as the first direction. The connecting conductor 60-3 and the connecting conductor 60-4 become a different first connecting pair from the first connecting pair constituted by the connecting conductor 60-1 and the connecting conductor 60-2.

The connecting conductor 60-1 and the connecting conductor 60-4 become a second connecting pair aligned along the Y-direction as the second direction. The connecting conductor 60-1 and the connecting conductor 60-4 become the second connecting pair aligned along the Y-direction of the square grid (extending in the X-direction and the Y-direction) in which the first conductors 31 are aligned.

The connecting conductor 60-2 and the connecting conductor 60-3 become a second connecting pair aligned along the Y-direction as the second direction. The connecting conductor 60-2 and the connecting conductor 60-3 become a different second connecting pair from the second connecting pair constituted by the connecting conductor 60-1 and the connecting conductor 60-4.

The resonant structure 10 is configured to resonate at a first frequency f1 along a first path P1. The first path P1 is an apparent current path. The first path P1 that is an apparent current path appears as the result of a current path traversing the connecting conductors 60-1, 60-2 of the first connecting pair and a current path traversing the connecting conductors 60-1, 60-4 of the second connecting pair, for example. The current path traversing the connecting conductors 60-1, 60-2 of the first connecting pair includes the ground conductor 40, the first conductors 31-1, 31-2, and the connecting conductors 60-1, 60-2 of the first connecting pair. The current path traversing the connecting conductors 60-1, 60-4 of the second connecting pair includes the ground conductor 40, the first conductors 31-1, 31-4, and the connecting conductors 60-1, 60-4 of the first connecting pair. When the resonant structure 10 resonates at the first frequency f1, current can flow in the XY plane, for example, from the connecting conductor 60-1 towards the connecting conductor 60-2 and from the connecting conductor 60-1 towards the connecting conductor 60-4 over these current paths. Each of the currents flowing between the connecting conductors 60 induces electromagnetic waves. The electromagnetic waves induced by these currents combine and are emitted. Consequently, the combined electromagnetic waves appear to be induced by high-frequency current flowing along the first path P1.

The first path P1 that is an apparent current path appears as the result of a current path traversing the connecting conductors 60-2, 60-3 of the first connecting pair and a current path traversing the connecting conductors 60-3, 60-4 of the second connecting pair, for example. The current path traversing the connecting conductors 60-2, 60-3 of the first connecting pair includes the ground conductor 40, the first conductors 31-2, 31-3, and the connecting conductors 60-2, 60-3 of the first connecting pair. The current path traversing the connecting conductors 60-3, 60-4 of the second connecting pair includes the ground conductor 40, the first conductors 31-3, 31-4, and the connecting conductors 60-3, 60-4 of the first connecting pair. When the resonant structure 10 resonates at the first frequency f1, current can flow in the XY plane, for example, from the connecting conductor 60-3 towards the connecting conductor 60-2 and from the connecting conductor 60-3 towards the connecting conductor 60-4 over these current paths. Each of the currents flowing between the connecting conductors 60 induces electromagnetic waves. The electromagnetic waves induced by these currents combine and are emitted. Consequently, the combined electromagnetic waves appear to be induced by high-frequency current flowing along the first path P1.

The resonant structure 10 can exhibit an artificial magnetic conductor character relative to electromagnetic waves, at the first frequency f1 and polarized along the first path P1, incident from the outside onto the upper surface 21 of the substrate 20 on which the conducting portion 30 is located.

The resonant structure 10 is configured to resonate at a second frequency f2 along a second path P2. The second path P2 is an apparent current path. The second path P2 that is an apparent current path appears as the result of a current path traversing the connecting conductors 60-1, 60-2 of the first connecting pair and a current path traversing the connecting conductors 60-2, 60-3 of the second connecting pair, for example. The current path traversing the connecting conductors 60-1, 60-2 of the first connecting pair includes the ground conductor 40, the first conductors 31-1, 31-2, and the connecting conductors 60-1, 60-2 of the first connecting pair. The current path traversing the connecting conductors 60-2, 60-3 of the second connecting pair includes the ground conductor 40, the first conductors 31-2, 31-3, and the connecting conductors 60-2, 60-3 of the second connecting pair. When the resonant structure 10 resonates at the second frequency f2, current can flow in the XY plane, for example, from the connecting conductor 60-2 towards the connecting conductor 60-1 and from the connecting conductor 60-2 towards the connecting conductor 60-3 over these current paths. Each of the currents flowing between the connecting conductors 60 induces electromagnetic waves. The electromagnetic waves induced by these currents combine and are emitted. Consequently, the combined electromagnetic waves appear to be induced by high-frequency current flowing along the second path P2 as an apparent current path.

The second path P2 that is an apparent current path appears as the result of a current path traversing the connecting conductors 60-1, 60-4 of the first connecting pair and a current path traversing the connecting conductors 60-3, 60-4 of the second connecting pair, for example. The current path traversing the connecting conductors 60-1, 60-4 of the first connecting pair includes the ground conductor 40, the first conductors 31-1, 31-4, and the connecting conductors 60-1, 60-4 of the first connecting pair. The current path traversing the connecting conductors 60-3, 60-4 of the second connecting pair includes the ground conductor 40, the first conductors 31-3, 31-4, and the connecting conductors 60-3, 60-4 of the second connecting pair. When the resonant structure 10 resonates at the second frequency f2, current can flow in the XY plane, for example, from the connecting conductor 60-4 towards the connecting conductor 60-1 and from the connecting conductor 60-4 towards the connecting conductor 60-3 over these current paths. Each of the currents flowing between the connecting conductors 60 induces electromagnetic waves. The electromagnetic waves induced by these currents combine and are emitted. Consequently, the combined electromagnetic waves appear to be induced by high-frequency current flowing along the second path P2 as an apparent current path.

The resonant structure 10 can exhibit an artificial magnetic conductor character relative to electromagnetic waves, at the second frequency f2 and polarized along the second path P2, incident from the outside onto the upper surface 21 of the substrate 20 on which the conducting portion 30 is located.

As illustrated in FIG. 5, the resonant structure 10 is symmetrical in the XY plane about a line connecting the center points of two sides, substantially parallel to the X-direction, of the substantially square conducting portion 30. The resonant structure 10 is symmetrical in the XY plane about a line connecting the center points of two sides, substantially parallel to the Y-direction, of the substantially square conducting portion 30. In the resonant structure 10 with this symmetrical configuration, the length of the first path P1 and the length of the second path P2 can be equivalent. The first frequency f1 and the second frequency f2 can be equivalent when the length of the first path P1 and the length of the second path P2 are equivalent.

The resonant structure 10 can be a filter that removes frequencies other than the first frequency f1. When the resonant structure 10 as a filter includes the first feeder 51 and the second feeder 52, then the resonant structure 10 is configured to supply power corresponding to electromagnetic waves of the first frequency f1 to an external device or the like over the first path P1 and the second path P2 via the first feeder 51 and the second feeder 52.

The first path P1 in the resonant structure 10 extends in the first diagonal direction. The second path P2 extends in the second diagonal direction. The first diagonal direction corresponds to the A direction, and the second diagonal direction corresponds to the B direction. The first path P1 and the second path P2 are therefore orthogonal to each other in the XY plane in the resonant structure 10. By the first path P1 and the second path P2 being orthogonal in the XY plane, the electric field of electromagnetic waves of the first frequency f1 emitted along the first path P1 and the electric field of electromagnetic waves of the second frequency f2 emitted along the second path P2 are orthogonal.

When the first frequency f1 and the second frequency f2 are equivalent, and the phase difference between alternating current apparently flowing along the first path P1 and alternating current apparently flowing along the second path P2 becomes 90 degrees, then the resonant structure 10 can emit circularly polarized waves of the first frequency f1. The resonant structure 10 can be an antenna that emits circularly polarized waves of the first frequency f1.

The resonant structure 10 as an antenna is configured to emit circularly polarized waves of the first frequency f1 by (1) to (3) below.

(1) AC power of a first frequency is supplied to the conducting portion 30 from each of the first feeder 51 and the second feeder 52.

(2) The magnitude of power supplied from the first feeder 51 to the conducting portion 30 and the magnitude of power supplied from the second feeder 52 to the conducting portion 30 are set to be equivalent.

(3) The phase difference between the AC power supplied from the first feeder 51 to the conducting portion 30 and the AC power supplied from the second feeder 52 to the conducting portion 30 is set to 90 degrees. By the phase of the AC power from the first feeder 51 to the conducting portion 30 being appropriately selected to be +90 degrees or −90 degrees relative to the phase from the second feeder 52 to the conducting portion 30, right-handed or left-handed circularly polarized waves can be selectively emitted from the resonant structure 10.

The resonant structure 10 can be configured to resonate along the first path P1 also at a first frequency f01 that is smaller than the first frequency f1. At the first frequency f01, however, the electromagnetic waves induced by current flowing between the connecting conductor 60-1 and the connecting conductor 60-2 of the first connecting pair and the electromagnetic waves induced by current flowing between the connecting conductor 60-1 and the connecting conductor 60-4 of the second connecting pair cancel each other out. Since the electromagnetic waves induced by current flowing between these connecting conductors 60 cancel each other out, the resonant structure 10 resonates, but the emission intensity of electromagnetic waves from the resonant structure 10 may be reduced. The resonant structure 10 is configured to resonate along the second path P2 also at a second frequency f02 that is smaller than the second frequency f2. Although the resonant structure 10 resonates at the second frequency f02, the emission intensity of electromagnetic waves from the resonant structure 10 may be reduced.

Second Example of Resonant State

Figure 6:
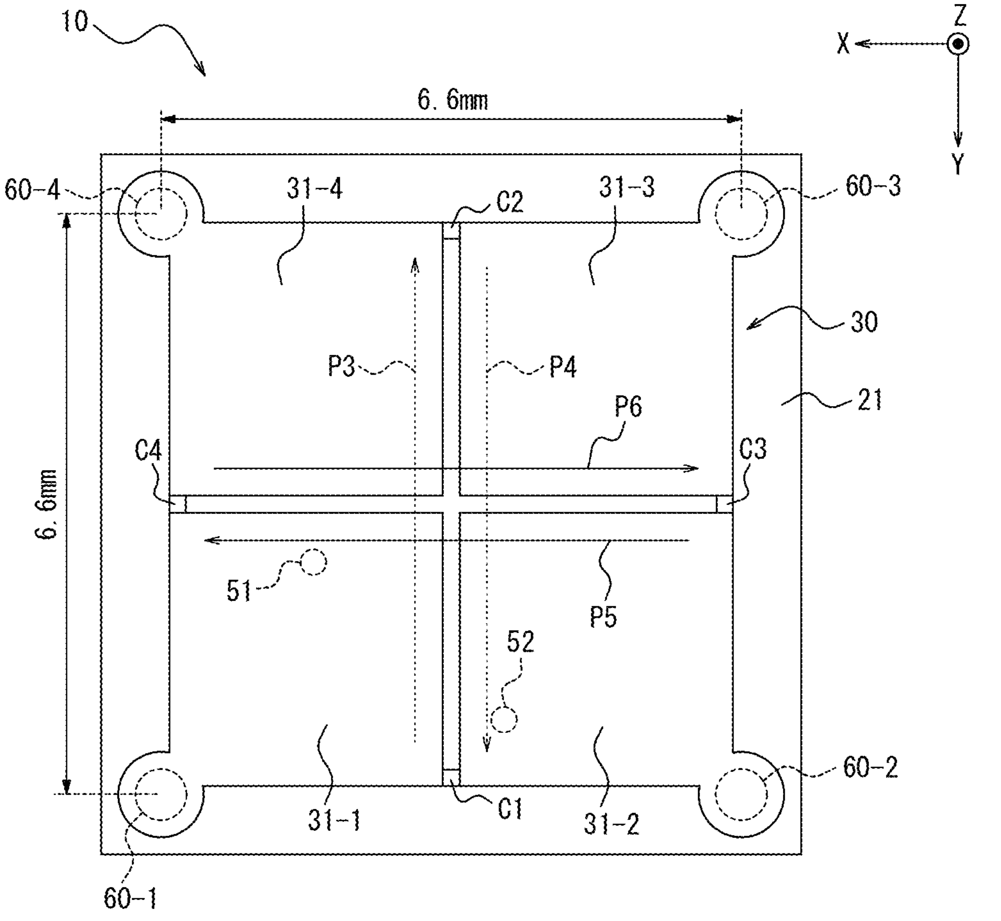
FIG. 6 illustrates a second example of a resonant state in the resonant structure illustrated in FIG. 1.

FIG. 6 illustrates a second example of a resonant state in the resonant structure 10 illustrated in FIG. 1.

The resonant structure 10 illustrated in FIG. 6 includes capacitance elements C1 to C4. The capacitance of each capacitance element C1 to C4 may be the same or different.

The connecting conductor 60-1 and the connecting conductor 60-4 become a first connecting pair aligned along the Y-direction as the first direction. The connecting conductor 60-1 and the connecting conductor 60-4 become the first connecting pair aligned along the Y-direction of the square grid (extending in the X-direction and the Y-direction) in which the first conductors 31 are aligned.

The resonant structure 10 resonates at a first frequency f3 along a first path P3. The first path P3 is a portion of the current path traversing the connecting conductors 60-1, 60-4 of the first connecting pair. The current path traversing the connecting conductors 60-1, 60-4 of the first connecting pair includes the ground conductor 40, the first conductors 31-1, 31-4, and the connecting conductors 60-1, 60-4 of the first connecting pair. When the resonant structure 10 resonates at the first frequency f3, current can flow in the XY plane, for example, from the connecting conductor 60-1 towards the connecting conductor 60-4 of the first connecting pair. The current flowing between the connecting conductor 60-1 and the connecting conductor 60-4 induces electromagnetic waves. In other words, electromagnetic waves are induced by high-frequency current flowing along the first path P3. The resonant structure 10 exhibits an artificial magnetic conductor character relative to electromagnetic waves, at the first frequency f3 and polarized along the first path P3, incident from the outside onto the upper surface 21 of the substrate 20 on which the conducting portion 30 is located.

The connecting conductor 60-2 and the connecting conductor 60-3 become a first connecting pair aligned along the Y-direction as the first direction. The connecting conductor 60-2 and the connecting conductor 60-3 become the first connecting pair aligned along the Y-direction of the square grid (extending in the X-direction and the Y-direction) in which the first conductors 31 are aligned.

The resonant structure 10 resonates at a first frequency f3 along a first path P4. The first path P4 is a portion of the current path traversing the connecting conductors 60-2, 60-3 of the first connecting pair. The current path traversing the connecting conductors 60-2, 60-3 of the first connecting pair includes the ground conductor 40, the first conductors 31-2, 31-3, and the connecting conductors 60-2, 60-3 of the first connecting pair. When the resonant structure 10 resonates at the first frequency f3, current can flow in the XY plane, for example, from the connecting conductor 60-3 towards the connecting conductor 60-2 of the first connecting pair. The current flowing between the connecting conductor 60-2 and the connecting conductor 60-3 induces electromagnetic waves. In other words, electromagnetic waves are induced by high-frequency current flowing along the first path P4. The resonant structure 10 exhibits an artificial magnetic conductor character relative to electromagnetic waves, at the first frequency f4 and polarized along the first path P4, incident from the outside onto the upper surface 21 of the substrate 20 on which the conducting portion 30 is located.

The connecting conductor 60-1 and the connecting conductor 60-2 become a second connecting pair aligned along the X-direction as the second direction. The connecting conductor 60-1 and the connecting conductor 60-2 become the first connecting pair aligned along the X-direction of the square grid (extending in the X-direction and the Y-direction) in which the first conductors 31 are aligned.

The resonant structure 10 resonates at a second frequency f4 along a second path P5. The second path P5 is a portion of the current path traversing the connecting conductors 60-1, 60-2 of the second connecting pair. The current path traversing the connecting conductors 60-1, 60-2 of the second connecting pair includes the ground conductor 40, the first conductors 31-1, 31-2, and the connecting conductors 60-1, 60-2 of the second connecting pair. When the resonant structure 10 resonates at the first frequency f3, current can flow in the XY plane, for example, from the connecting conductor 60-2 towards the connecting conductor 60-1 of the second connecting pair. The current flowing between the connecting conductor 60-2 and the connecting conductor 60-1 induces electromagnetic waves. In other words, electromagnetic waves are induced by high-frequency current flowing along the second path P5. The resonant structure 10 exhibits an artificial magnetic conductor character relative to electromagnetic waves, at the second frequency f4 and polarized along the second path P5, incident from the outside onto the upper surface 21 of the substrate 20 on which the conducting portion 30 is located.

The connecting conductor 60-3 and the connecting conductor 60-4 become a second connecting pair aligned along the X-direction as the second direction. The connecting conductor 60-3 and the connecting conductor 60-4 become the second connecting pair aligned along the X-direction of the square grid (extending in the X-direction and the Y-direction) in which the first conductors 31 are aligned.

The resonant structure 10 resonates at a second frequency f4 along a second path P6. The second path P6 is a portion of the current path traversing the connecting conductors 60-3, 60-4 of the second connecting pair. The current path traversing the connecting conductors 60-3, 60-4 of the second connecting pair includes the ground conductor 40, the first conductors 31-3, 31-4, and the connecting conductors 60-3, 60-4 of the second connecting pair. When the resonant structure 10 resonates at the second frequency f4, current can flow in the XY plane, for example, from the connecting conductor 60-4 towards the connecting conductor 60-3 of the second connecting pair. The current flowing between the connecting conductor 60-4 and the connecting conductor 60-3 induces electromagnetic waves. In other words, electromagnetic waves are induced by high-frequency current flowing along the second path P6. The resonant structure 10 exhibits an artificial magnetic conductor character relative to electromagnetic waves, at the second frequency f4 and polarized along the second path P6, incident from the outside onto the upper surface 21 of the substrate 20 on which the conducting portion 30 is located.

As described above, the resonant structure 10 is symmetrical in the XY plane about a line connecting the center points of two sides, substantially parallel to the X-direction, of the substantially square conducting portion 30. As described above, the resonant structure 10 is also symmetrical in the XY plane about a line connecting the center points of two sides, substantially parallel to the Y-direction, of the substantially square conducting portion 30. In the resonant structure 10 with this symmetrical configuration, the length of the first paths P3, P4 and the length of the second paths P5, P6 can be equivalent. The first frequency f3 and the second frequency f4 can be equivalent when the length of the first paths P3, P4 and the length of the second paths P5, P6 are equivalent.

The resonant structure 10 can be a filter that removes frequencies other than the first frequency f3. When the resonant structure 10 includes the second feeder 52, then the resonant structure 10 can be configured to supply power corresponding to electromagnetic waves of the first frequency f3 to an external device or the like over the first paths P3, P4 via the second feeder 52. The resonant structure 10 can be a filter that removes frequencies other than the first frequency f4. When the resonant structure 10 includes the first feeder 51, then the resonant structure 10 can be configured to supply power corresponding to electromagnetic waves of the second frequency f4 to an external device or the like over the second paths P5, P6 via the first feeder 51.

In the resonant structure 10, the direction of current along the first path P3 and the direction of current along the first path P4 can be opposite. When the direction of current along the first path P3 and the direction of current along the first path P4 are opposite, the emission intensity of electromagnetic waves from the resonant structure 10 can reduce at the first frequency f3.

In the resonant structure 10, the direction of current along the second path P5 and the direction of current along the second path P6 can be opposite. When the direction of current along the first path P5 and the direction of current along the first path P6 are opposite, the emission intensity of electromagnetic waves from the resonant structure 10 can reduce at the second frequency f4.

<Simulation Results>

Figure 7:
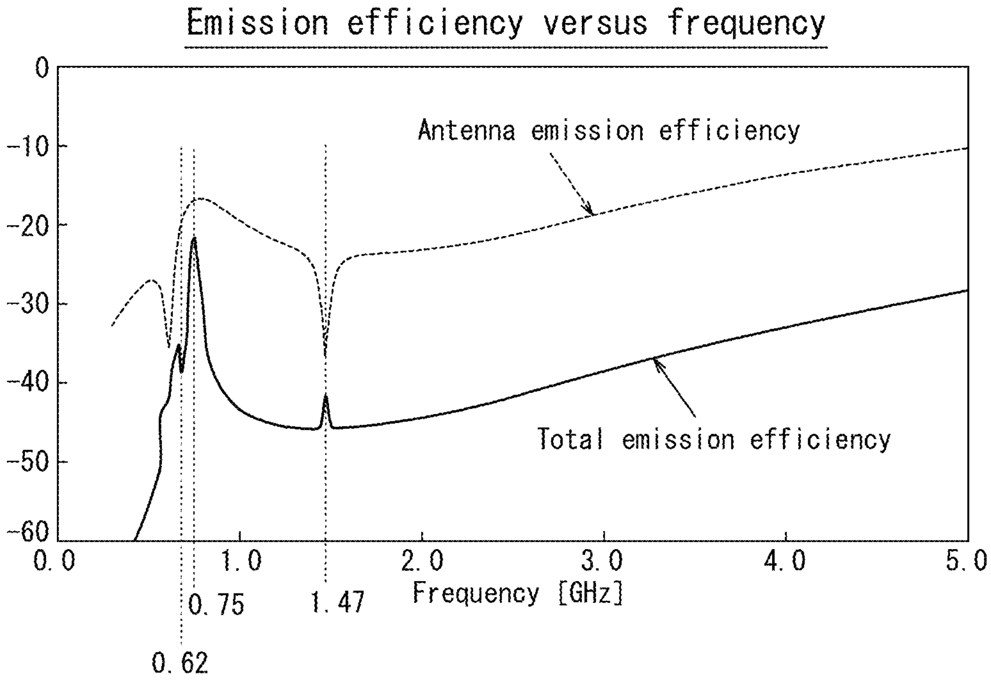
FIG. 7 is a graph illustrating emission efficiency versus frequency of the resonant structure illustrated in FIG. 1.

FIG. 7 is a graph illustrating emission efficiency versus frequency of the resonant structure 10 illustrated in FIG. 1. The data in FIG. 7 were obtained by simulation. The resonant structure 10 having the conducting portion 30 with a size of 6.6 mm×6.6 mm illustrated in FIG. 5 was used in the simulation. The resonant structure 10 was placed on a metal plate in the simulation. The ground conductor 40 of the resonant structure 10 was placed facing the metal plate in the simulation. The metal plate measured 100 mm×100 mm in the XY plane. The resonant structure 10 was placed in the central region of the metal plate. In the simulation, the gap Sx was 0.2 mm, and the gap Sy was 0.2 mm. The capacitance of each of the capacitance elements C1 to C4 illustrated in FIG. 1 was 10 pF.

The solid line in FIG. 7 indicates the total emission efficiency relative to the frequency. The dashed line in FIG. 7 indicates the antenna emission efficiency. The total emission efficiency is the ratio of the power of electromagnetic waves emitted from the resonant structure 10 in all emission directions to the power, including reflection loss, supplied to the resonant structure 10 as an antenna. The antenna emission efficiency is the ratio of the power of electromagnetic waves emitted from the resonant structure 10 in all emission directions to the power, not including reflection loss, supplied to the resonant structure 10 as an antenna.

The resonant structure 10 enters a resonant state at the frequencies where the total emission efficiency in FIG. 7 exhibits peaks. Since the reflection loss is small, the frequencies where the total emission efficiency exhibits peaks indicate the resonance frequencies of the resonant structure 10. The resonance frequencies in the simulation are 0.62 GHz, 0.75 GHz, and 1.47 GHz.

As illustrated in FIG. 7, the antenna emission efficiency is lower when the frequency is 0.62 GHz and 1.47 GHz. A low antenna emission efficiency means high loss inside the antenna and reduced emission intensity of electromagnetic waves from the resonant structure 10. The resonant structure 10 resonates when the frequency is 0.62 GHz and 1.47 GHz, but the emission intensity of electromagnetic waves from the resonant structure 10 is reduced. The frequency 0.62 GHz corresponds to the above-described first frequency f01 and second frequency f02. The frequency 1.47 GHz corresponds to the above-described first frequency f3 and second frequency f4.

As illustrated in FIG. 7, the antenna emission efficiency is higher when the frequency is 0.75 GHz. A high antenna emission efficiency means a high emission intensity of electromagnetic waves from the resonant structure 10. When the frequency is 0.75 GHz, the resonant structure 10 can emit electromagnetic waves as an antenna. The frequency 0.75 GHz corresponds to the above-described first frequency f1 and second frequency f2.

Other Example of Resonant Structure

Figure 8:
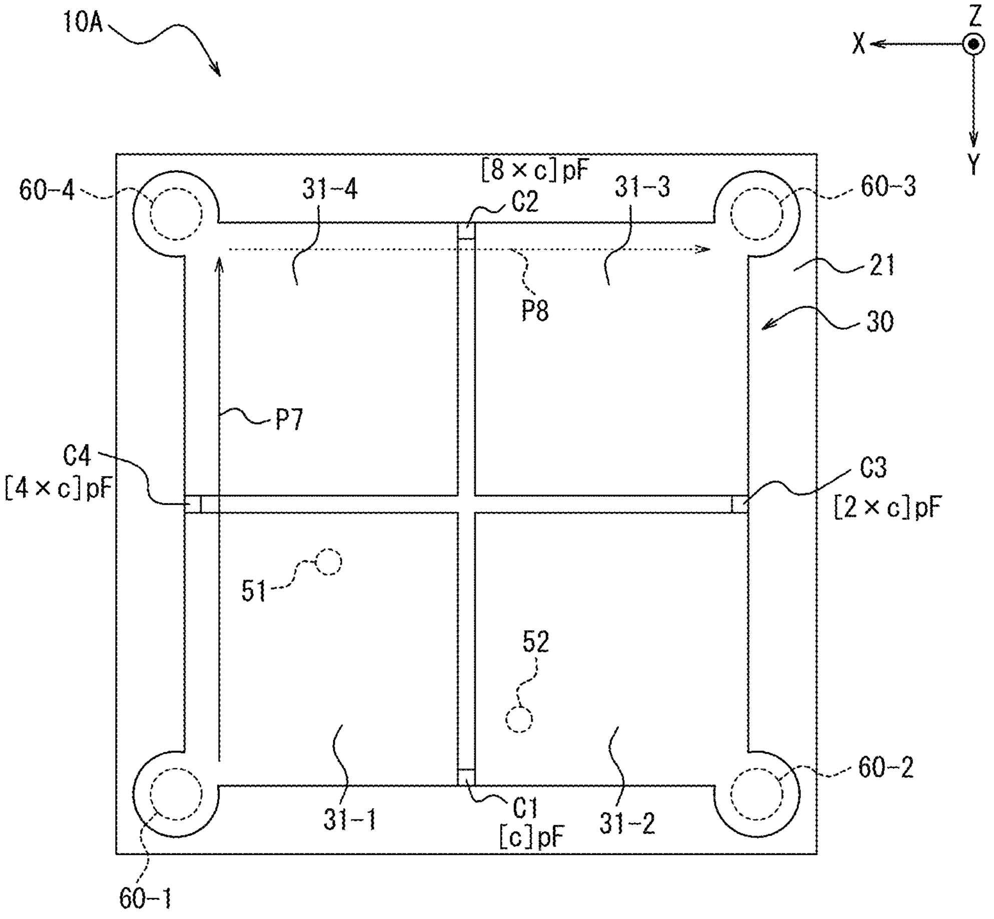
FIG. 8 is a plan view of a resonant structure according to an embodiment.

FIG. 8 is a plan view of a resonant structure 10A according to an embodiment. The explanation below focuses on the differences between the resonant structure 10A and the resonant structure 10 illustrated in FIG. 1.

Unlike the resonant structure 10 illustrated in FIG. 1, at least a portion of the capacitance elements C1 to C4 have a different capacitance from each other in the resonant structure 10A illustrated in FIG. 8. The capacitance may increase in the order of the capacitance element C1, the capacitance element C3, the capacitance element C4, and the capacitance element C5.

For example, the capacitance of the capacitance element C1 is set to capacitance c [pF]. The capacitance of the capacitance element C3 is set to twice the capacitance c (2×c [pF]). The capacitance of the capacitance element C4 is set to four times the capacitance c (4×c [pF]). The capacitance of the capacitance element C2 is set to eight times the capacitance c (8×c [pF]).

First Example of Resonant State

The resonant structure 10A resonates at a first frequency f5 along a first path P7. The first path P7 appears in the same or similar manner as the first path P3 illustrated in FIG. 6. Since the capacitance of the capacitance element C4 is greater than the capacitance of the capacitance element C3, however, the first path P7 appears farther in the positive direction of the X-axis than the first path P3 illustrated in FIG. 6. The resonant structure 10A exhibits an artificial magnetic conductor character relative to electromagnetic waves, at the first frequency f5 and polarized in the Y-direction, incident from the outside onto the upper surface 21 of the substrate 20 on which the conducting portion 30 is located.

The resonant structure 10A resonates at a second frequency f6 along a second path P8. The second path P8 appears in the same or similar manner as the second path P6 illustrated in FIG. 6. Since the capacitance of the capacitance element C2 is greater than the capacitance of the capacitance element C1, however, the second path P8 appears farther in the negative direction of the Y-axis than the second path P6 illustrated in FIG. 6. The resonant structure 10A exhibits an artificial magnetic conductor character relative to electromagnetic waves, at the second frequency f6 and polarized in the X-direction, incident from the outside onto the upper surface 21 of the substrate 20 on which the conducting portion 30 is located.

As described above with reference to FIG. 5, the resonant structure 10A is symmetrically configured. In the resonant structure 10A with this symmetrical configuration, the length of the first path P7 and the length of the second path P8 can be equivalent. The first frequency f5 and the second frequency f6 can be equivalent when the length of the first path P7 and the length of the second path P8 are equivalent.

The resonant structure 10A is configured so that the first path P7 along the Y-direction and the second path P8 along the X-direction are orthogonal in the XY plane. By the first path P7 and the second path P8 being orthogonal in the XY plane in the resonant structure 10A, the electric field of electromagnetic waves of the first frequency f5 emitted from the first path P7 and the electric field of electromagnetic waves of the second frequency f6 emitted from the second path P8 are orthogonal.

Second Example of Resonant State

Figure 9:
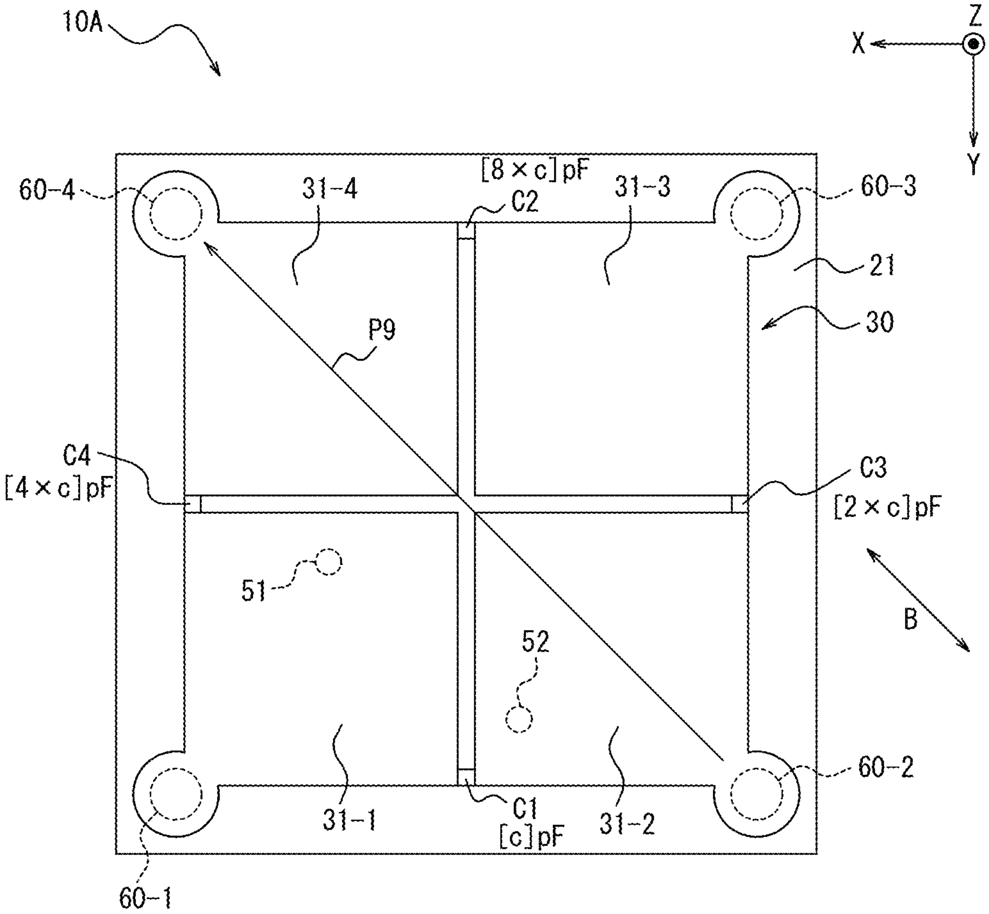
FIG. 9 illustrates a second example of a resonant state in the resonant structure illustrated in FIG. 8.

FIG. 9 illustrates a second example of a resonant state in the resonant structure 10A illustrated in FIG. 8.

The resonant structure 10A resonates at a first frequency f7 along a first path P9. The first path P9 appears in the same or similar manner as the second path P2 illustrated in FIG. 5. The resonant structure 10A exhibits an artificial magnetic conductor character relative to electromagnetic waves, at the first frequency f7 and polarized in the B-direction, incident from the outside onto the upper surface 21 of the substrate 20 on which the conducting portion 30 is located.

In the capacitance elements C1, C4 aligned in the B-direction in the resonant structure 10A illustrated in FIG. 9, the capacitance of the capacitance element C4 is four times the capacitance of the capacitance element C1. In the capacitance elements C2, C3 aligned in the B-direction in the resonant structure 10A illustrated in FIG. 9, the capacitance of the capacitance element C2 is four times the capacitance of the capacitance element C3. The capacitance of the capacitance elements C1 to C4 in the resonant structure 10A illustrated in FIG. 9 increases from the connecting conductor 60-2 towards the connecting conductor 60-4.

Other Example of Resonant Structure

Figure 10:
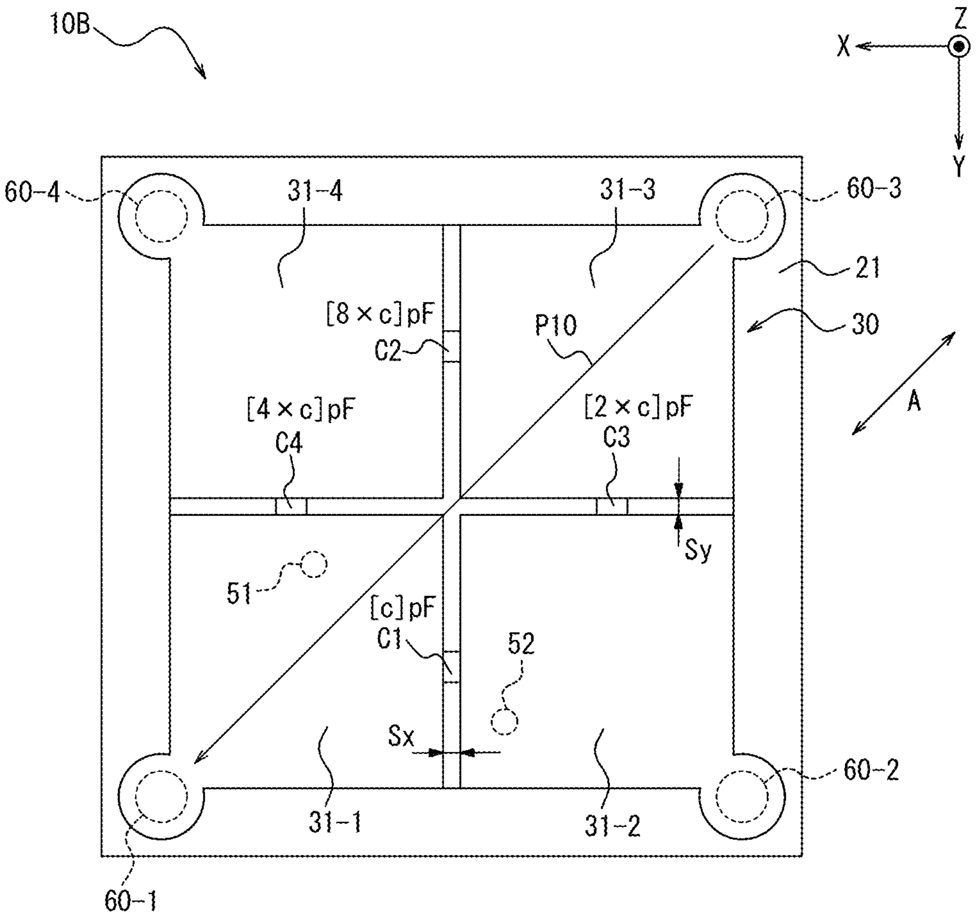
FIG. 10 is a plan view of a resonant structure according to an embodiment.

FIG. 10 is a plan view of a resonant structure 10B according to an embodiment. The explanation below focuses on the differences between the resonant structure 10B and the resonant structure 10 illustrated in FIG. 1.

The resonant structure 10B includes capacitance elements C1 to C4. The capacitance element C1 is located at a position in the Y-direction that is approximately ¼ the length of the gap Sx from the end of the gap Sx on the negative side of the Y-axis. The capacitance element C2 is located at a position in the Y-direction that is approximately ¼ the length of the gap Sx from the end of the gap Sx on the positive side of the Y-axis. The capacitance element C3 is located at a position in the X-direction that is approximately ¼ the length of the gap Sy from the end of the gap Sy on the negative side of the X-axis. The capacitance element C4 is located at a position in the X-direction that is approximately ¼ the length of the gap Sy from the end of the gap Sy on the positive side of the X-axis.

At least a portion of the capacitance elements C1 to C4 have a different capacitance from each other in the resonant structure 10B. The capacitance may increase in the order of the capacitance element C1, the capacitance element C3, the capacitance element C4, and the capacitance element C5.

For example, the capacitance of the capacitance element C1 is set to capacitance c [pF]. The capacitance of the capacitance element C3 is set to twice the capacitance c of the capacitance element C1 (2×c [pF]). The capacitance of the capacitance element C4 is set to four times the capacitance c of the capacitance element C1 (4×c [pF]). The capacitance of the capacitance element C2 is set to eight times the capacitance c of the capacitance element C1 (8×c [pF]).

First Example of Resonant State

The resonant structure 10B resonates at a first frequency f8 along a first path P10. The first path P10 appears in the same or similar manner as the first path P1 illustrated in FIG. 5. The resonant structure 10B exhibits an artificial magnetic conductor character relative to electromagnetic waves, at the first frequency f8 and polarized in the A-direction, incident from the outside onto the upper surface 21 of the substrate 20 on which the conducting portion 30 is located.

In the capacitance elements C1, C3 aligned in the A-direction in the resonant structure 10B illustrated in FIG. 10, the capacitance of the capacitance element C3 is twice the capacitance of the capacitance element C1.

In the capacitance elements C2, C4 aligned in the A-direction in the resonant structure 10B illustrated in FIG. 10, the capacitance of the capacitance element C2 is twice the capacitance of the capacitance element C4. The capacitance of the capacitance elements C1 to C4 in the resonant structure 10B illustrated in FIG. 10 increases from the connecting conductor 60-1 towards the connecting conductor 60-3. Between the connecting conductor 60-1 and the connecting conductor 60-3 in the resonant structure 10B illustrated in FIG. 10, the capacitance element C1 and the capacitance element C3 are aligned in the A-direction, and the capacitance element C2 and the capacitance element C4 are aligned in the A-direction.

Other Example of Resonant Structure

Figure 11:
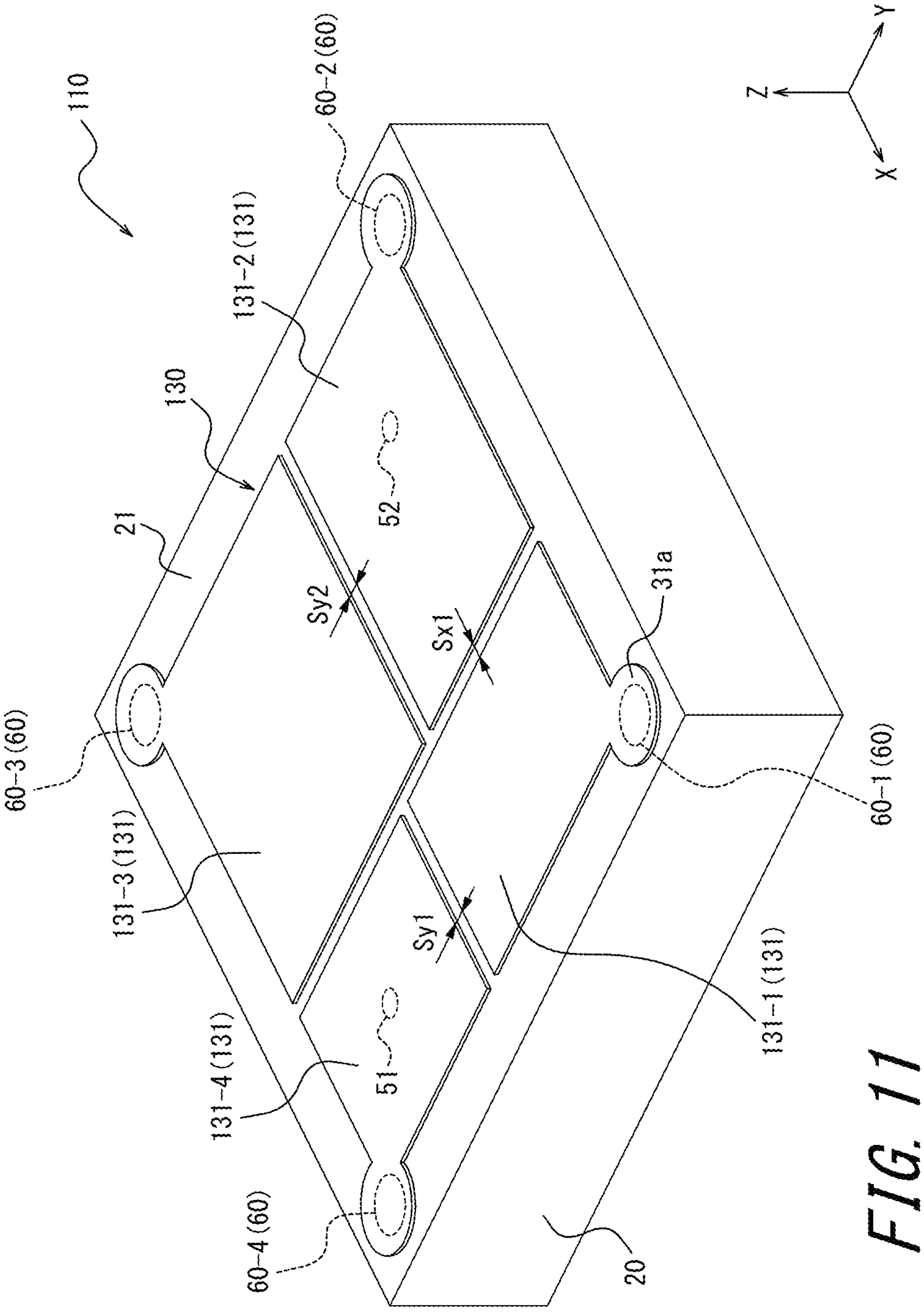
FIG. 11 is a perspective view of a resonant structure according to an embodiment.
Figure 12:
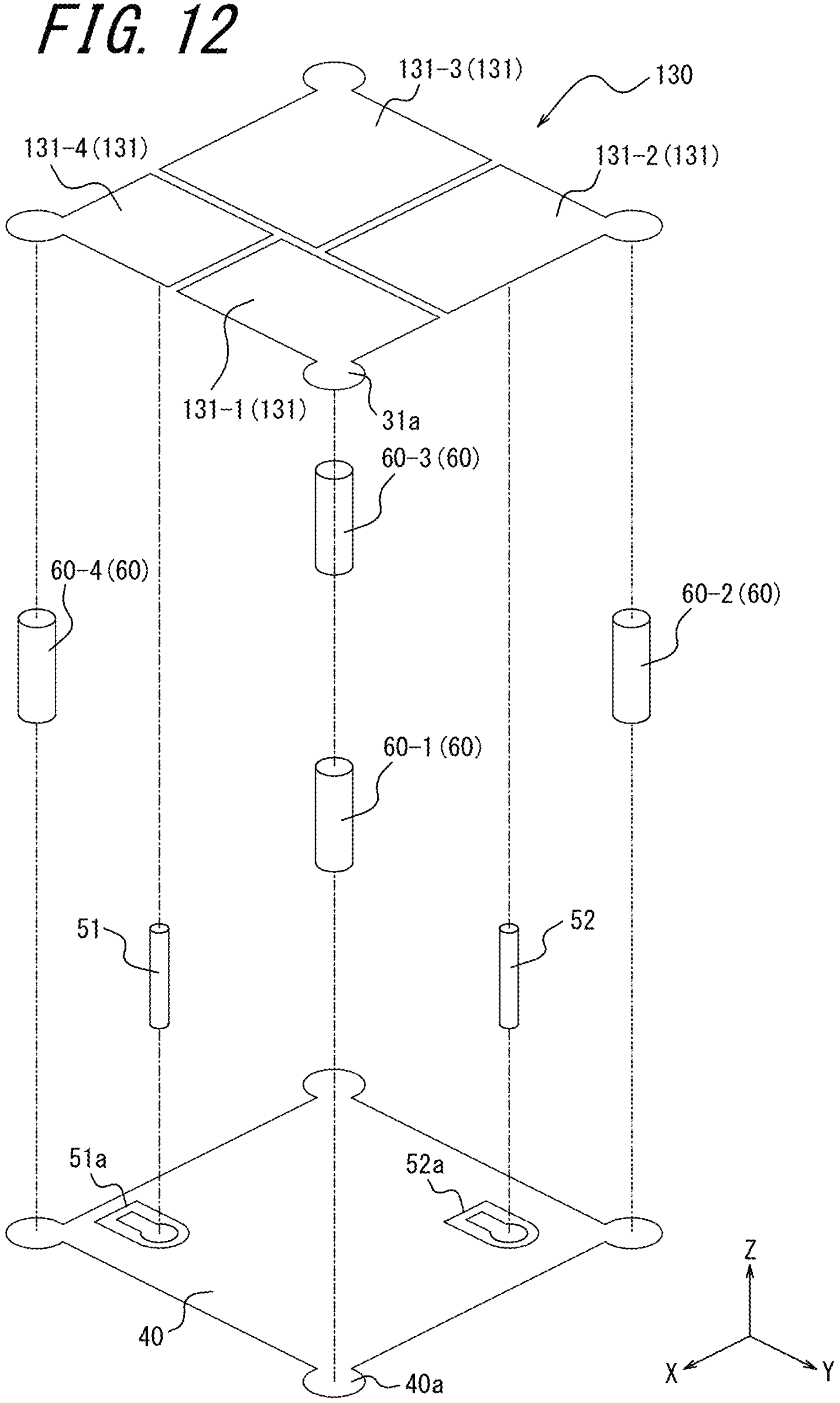
FIG. 12 is an exploded perspective view of a portion of the resonant structure illustrated in FIG. 11.

FIG. 11 is a perspective view of a resonant structure 110 according to an embodiment. FIG. 12 is an exploded perspective view of a portion of the resonant structure 110 illustrated in FIG. 11.

The resonant structure 110 resonates at one or a plurality of resonance frequencies. As illustrated in FIG. 11 and FIG. 12, the resonant structure 110 includes a substrate 20, a conducting portion 130, a ground conductor 40, and connecting conductors 60. The resonant structure 110 may include at least one of a first feeder 51 and a second feeder 52.

The conducting portion 130 illustrated in FIG. 11 is configured to function as a portion of a resonator. The conducting portion 130 extends along the XY plane. The conducting portion 130 has a substantially square shape that includes two sides substantially parallel to the X-direction and two sides substantially parallel to the Y-direction. The conducting portion 130 is located on the upper surface 21 of the substrate 20. The resonant structure 110 exhibits an artificial magnetic conductor character relative to a predetermined frequency incident from the outside onto an upper surface 21 of the substrate 20 on which the conducting portion 130 is located.

The conducting portion 130 includes a gap Sx1, a gap Sy1, and a gap Sy2, as illustrated in FIG. 11. The gap Sx1 extends in the Y-direction. The gap Sx1 is located in the X-direction at a position dividing the conducting portion 130 into a section on the side of the connecting conductors 60-2, 60-3 and a section on the side of the connecting conductors 60-1, 60-4 at a 4.0:2.4 ratio. The gap Sy1 extends in the X-direction. The gap Sy1 is located in the 2.4/(4.0+2.4) section of the conducting portion 130, divided by the gap Sx1, in the Y-direction at a position dividing the 2.4/(4.0+2.4) section into a section on the side of the connecting conductor 60-4 and a section on the side of the connecting conductor 60-1 at a 2.8:3.6 ratio. The gap Sy2 extends in the X-direction. The gap Sy2 is located in the 4.0/(4.0+2.4) section of the conducting portion 130, divided by the gap Sx1, in the Y-direction at a position dividing the 4.0/(4.0+2.4) section into a section on the side of the connecting conductor 60-3 and a section on the side of the connecting conductor 60-2 in a 3.6:2.8 ratio. The width of the gap Sx1, the width of the gap Sy1, and the width of the gap Sy2 may be appropriately adjusted in accordance with the desired resonance frequency of the resonant structure 110. The ratios of the sections into which the conducting portion 130 is divided by the gap Sx1, the gap Sy1, and the gap Sy2 may be appropriately adjusted in accordance with the desired resonance frequency of the resonant structure 110.

The conducting portion 130 includes first conductors 131-1, 131-2, 131-3, 131-4, as illustrated in FIG. 11. The first conductors 131-1 to 131-4 are collectively indicated as the "first conductors 131" when no particular distinction is made therebetween. The number of first conductors 131 included in the conducting portion 130 is not limited to four. The conducting portion 130 may include any number of first conductors 131.

The first conductors 131 may be flat conductors. Each of the first conductors 131-1 to 131-4 may be rectangles with different areas. Among the four first conductors 131, the area increases in the order of the first conductor 131-4, the first conductor 131-1, the first conductor 131-2, and the first conductor 131-3. Each of the first conductors 131-1 to 131-4 is connected to a different one of the connecting conductors 60-1 to 60-4, as illustrated in FIG. 12.

As illustrated in FIG. 11, the first conductors 131-1 to 131-4 extend along the XY plane. The first conductor 131-1 and the first conductor 131-2 are aligned in the X-direction. The first conductor 131-3 and the first conductor 131-4 are aligned in the X-direction. The first conductor 131-1 and the first conductor 131-4 are aligned in the Y-direction. The first conductor 131-2 and the first conductor 131-3 are aligned in the Y-direction. The first conductor 131-1 and the first conductor 131-3 are aligned in a direction inclined 45 degrees relative to the positive direction of the X-axis. The first conductor 131-2 and the first conductor 131-4 are aligned in a direction inclined 135 degrees relative to the positive direction of the X-axis.

By inclusion of a gap between one first conductor 131 and another first conductor 131, the one first conductor 131 includes a portion configured to connect capacitively to the other first conductor 131. The first conductor 131-1 and the first conductor 131-2, for example, have the gap Sx1 therebetween and can therefore be configured to connect capacitively. The first conductor 131-3 and the first conductor 131-4, for example, have the gap Sx1 therebetween and can therefore be configured to connect capacitively. The first conductor 131-1 and the first conductor 131-4, for example, have the gap Sy1 therebetween and can therefore be configured to connect capacitively. The first conductor 131-2 and the first conductor 131-3, for example, have the gap Sy2 therebetween and can therefore be configured to connect capacitively. The first conductor 131-1 and the first conductor 131-3, for example, have the gap Sx1 therebetween and can therefore be configured to connect capacitively. The first conductor 131-2 and the first conductor 131-4, for example, can be configured to connect capacitively via the gap Sx1 and the gap Sy1 between these conductors and the first conductor 131-1.

The remaining configuration of the first conductors 131 is the same as or similar to that of the first conductors 31 illustrated in FIG. 1.

The resonant structure 110 may include the capacitance elements C1, C2 illustrated in FIG. 1 in the gap Sx1 illustrated in FIG. 11. The resonant structure 110 may include the capacitance element C4 illustrated in FIG. 1 in the gap Sy1 illustrated in FIG. 11. The resonant structure 110 may include the capacitance element C3 illustrated in FIG. 1 in the gap Sy2.

The first feeder 51 illustrated in FIG. 12 is configured to connect electromagnetically to the first conductor 131-4. When the resonant structure 110 is used as an antenna, the first feeder 51 is configured to supply power to the conducting portion 130 through the first conductor 131-4. When the resonant structure 110 is used as an antenna or a filter, the first feeder 51 is configured to supply power from the conducting portion 130 through the first conductor 131-4 to an external device or the like.

The second feeder 52 illustrated in FIG. 12 is configured to connect electromagnetically to the first conductor 131-2. When the resonant structure 110 is used as an antenna, the second feeder 52 is configured to supply power to the conducting portion 130 through the first conductor 131-2. When the resonant structure 110 is used as an antenna or a filter, the second feeder 52 is configured to supply power from the conducting portion 130 through the first conductor 131-2 to an external device or the like.

Example of Resonant State

Figure 13:
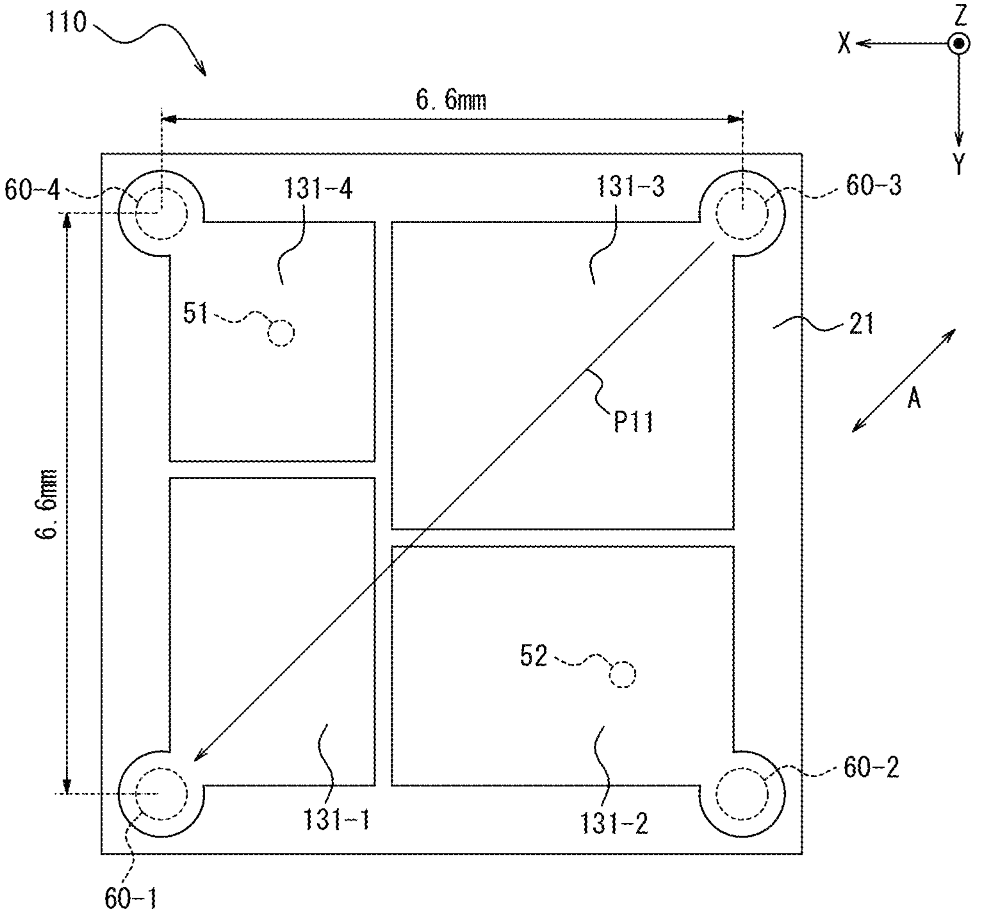
FIG. 13 illustrates an example of a resonant state in the resonant structure illustrated in FIG. 11.

FIG. 13 illustrates an example of a resonant state in the resonant structure 110 illustrated in FIG. 11.

The resonant structure 110 resonates at a first frequency f9 along a first path P11. The first path P11 is an apparent current path. The first path P11 that is an apparent current path appears as the result of a current path traversing the connecting conductors 60-1, 60-2 of a first connecting pair and a current path traversing the connecting conductors 60-1, 60-4 of a second connecting pair, for example. The current path traversing the connecting conductors 60-1, 60-2 of the first connecting pair includes the ground conductor 40, the first conductors 131-1, 131-2, and the connecting conductors 60-1, 60-2 of the first connecting pair. The current path traversing the connecting conductors 60-1, 60-4 of the second connecting pair includes the ground conductor 40, the first conductors 131-1, 131-4, and the connecting conductors 60-1, 60-4 of the first connecting pair. When the resonant structure 10 resonates at the first frequency f9, current can flow in the XY plane, for example, from the connecting conductor 60-1 towards the connecting conductor 60-2 and from the connecting conductor 60-1 towards the connecting conductor 60-4 over these current paths. Each of the currents flowing between the connecting conductors 60 induces electromagnetic waves. The electromagnetic waves induced by these currents combine and are emitted. Consequently, the combined electromagnetic waves appear to be induced by high-frequency current flowing along the first path P11.

The first path P11 that is an apparent current path appears as the result of a current path traversing the connecting conductors 60-2, 60-3 of the first connecting pair and a current path traversing the connecting conductors 60-3, 60-4 of the second connecting pair, for example. The current path traversing the connecting conductors 60-2, 60-3 of the first connecting pair includes the ground conductor 40, the first conductors 131-1, 131-2, and the connecting conductors 60-2, 60-3 of the first connecting pair. The current path traversing the connecting conductors 60-3, 60-4 of the second connecting pair includes the ground conductor 40, the first conductors 131-3, 131-4, and the connecting conductors 60-3, 60-4 of the second connecting pair. When the resonant structure 110 resonates at the first frequency f9, current can flow in the XY plane, for example, from the connecting conductor 60-3 towards the connecting conductor 60-2 and from the connecting conductor 60-3 towards the connecting conductor 60-4 over these current paths. Each of the currents flowing between the connecting conductors 60 induces electromagnetic waves. The electromagnetic waves induced by these currents combine and are emitted. Consequently, the combined electromagnetic waves appear to be induced by high-frequency current flowing along the first path P11.

The resonant structure 110 exhibits an artificial magnetic conductor character relative to electromagnetic waves, at the first frequency f9 and polarized along the first path P11, incident from the outside onto the upper surface 21 of the substrate 20 on which the conducting portion 30 is located.

In the resonant structure 110, the first path P11 cuts across the first conductor 131-3 in the XY plane. The first conductor 131-3 has a greater area than the other first conductors 131-1, 131-2, 131-4. In the resonant structure 110, current concentrates in the first conductor 131-3 with a large area and is excited. By the current concentrating in the first conductor 131-3 with a large area and being excited, the first frequency f9 can belong to a wide frequency band.

The resonant structure 110 can be a filter that removes frequencies other than the wide band to which the first frequency f9 belongs. The resonant structure 110 as a filter supplies power corresponding to electromagnetic waves of the wide band to which the first frequency f9 belongs to an external device or the like over the first path P11 via the first feeder 51 and the second feeder 52.

The resonant structure 110 can be an antenna capable of emitting electromagnetic waves of the wide band to which the first frequency f9 belongs. The resonant structure 110 as an antenna supplies power from the first feeder 51 and the second feeder 52 to the conducting portion 130. The resonant structure 110 as an antenna can emit electromagnetic waves that are polarized along the A-direction.

<Simulation Results>

Figure 14:
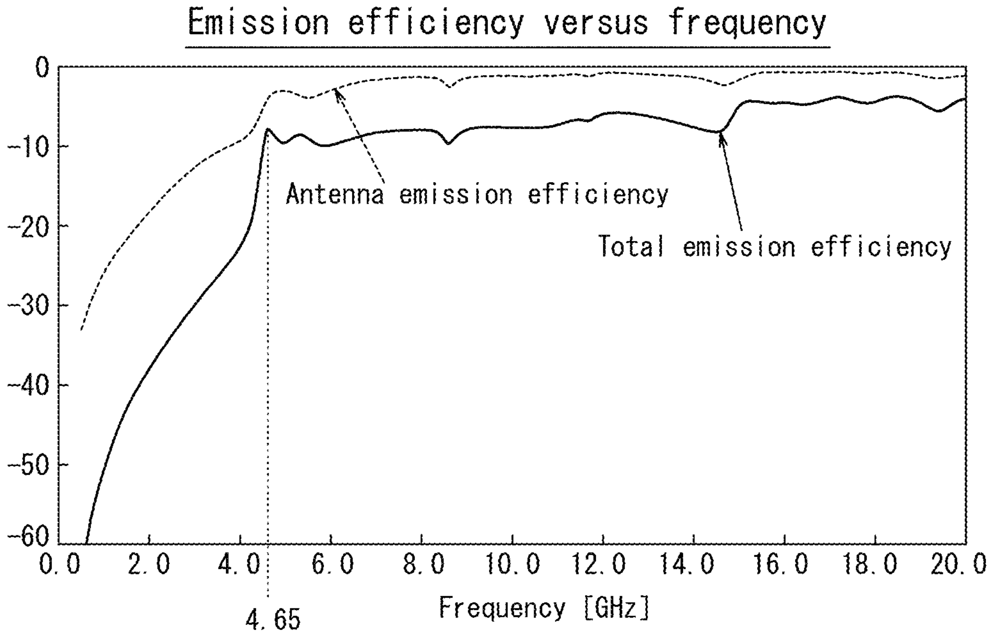
FIG. 14 is a graph illustrating emission efficiency versus frequency of the resonant structure illustrated in FIG. 11.

FIG. 14 is a graph illustrating emission efficiency versus frequency of the resonant structure 110 illustrated in FIG. 11. The data in FIG. 14 were obtained by simulation. The resonant structure 110 having the conducting portion 130 with a size of 6.6 mm×6.6 mm illustrated in FIG. 13 was used in the simulation. The resonant structure 110 was placed on a metal plate in the simulation. The ground conductor 40 of the resonant structure 110 was placed facing the metal plate in the simulation. The metal plate measured 100 mm×100 mm in the XY plane. The resonant structure 110 was placed in the central region of the metal plate.

The solid line in FIG. 14 indicates the total emission efficiency relative to the frequency. The dashed line in FIG. 14 indicates the antenna emission efficiency.

The resonant structure 110 enters a resonant state at the frequency where the total emission efficiency in FIG. 14 exhibits a peak. The frequency where the total emission efficiency exhibits a peak indicates the resonance frequency of the resonant structure 110. The resonance frequency in the simulation is 4.65 GHz. The frequency 4.65 GHz corresponds to the above-described first frequency f9.

As illustrated in FIG. 14, the total emission efficiency maintains the peak value (approximately −10 [dB]) in a range from 4.65 GHz to at least 20 GHz. The antenna emission efficiency maintains a high value of approximately −2.5 [dB] in a range from 4.65 GHz to at least 20 GHz. The resonant structure 110 can emit over a wide band from 4.65 GHz to at least 20 GHz.

Example of Resonant Structure

Figure 15:
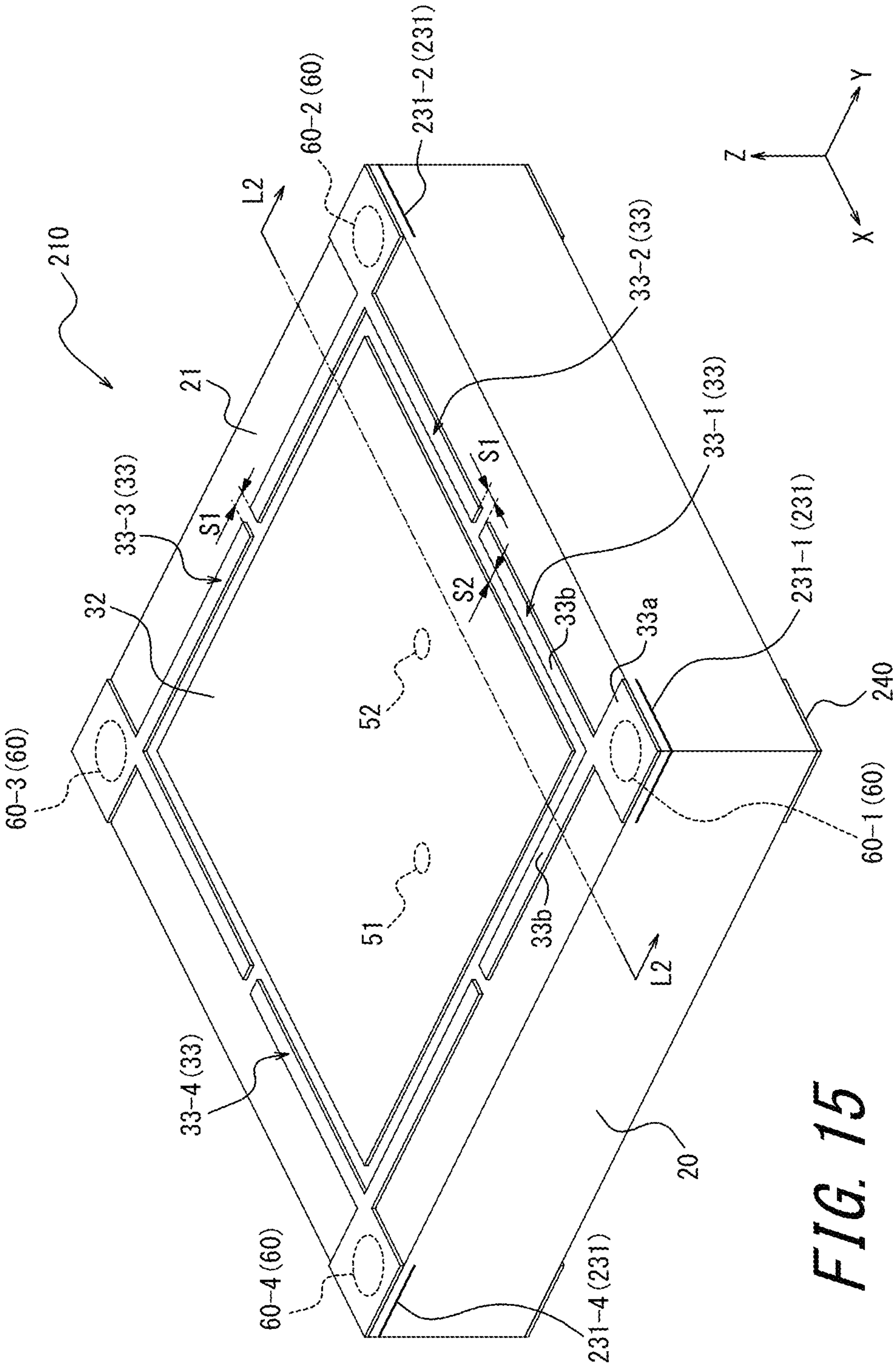
FIG. 15 is a perspective view of a resonant structure according to an embodiment.
Figure 16:
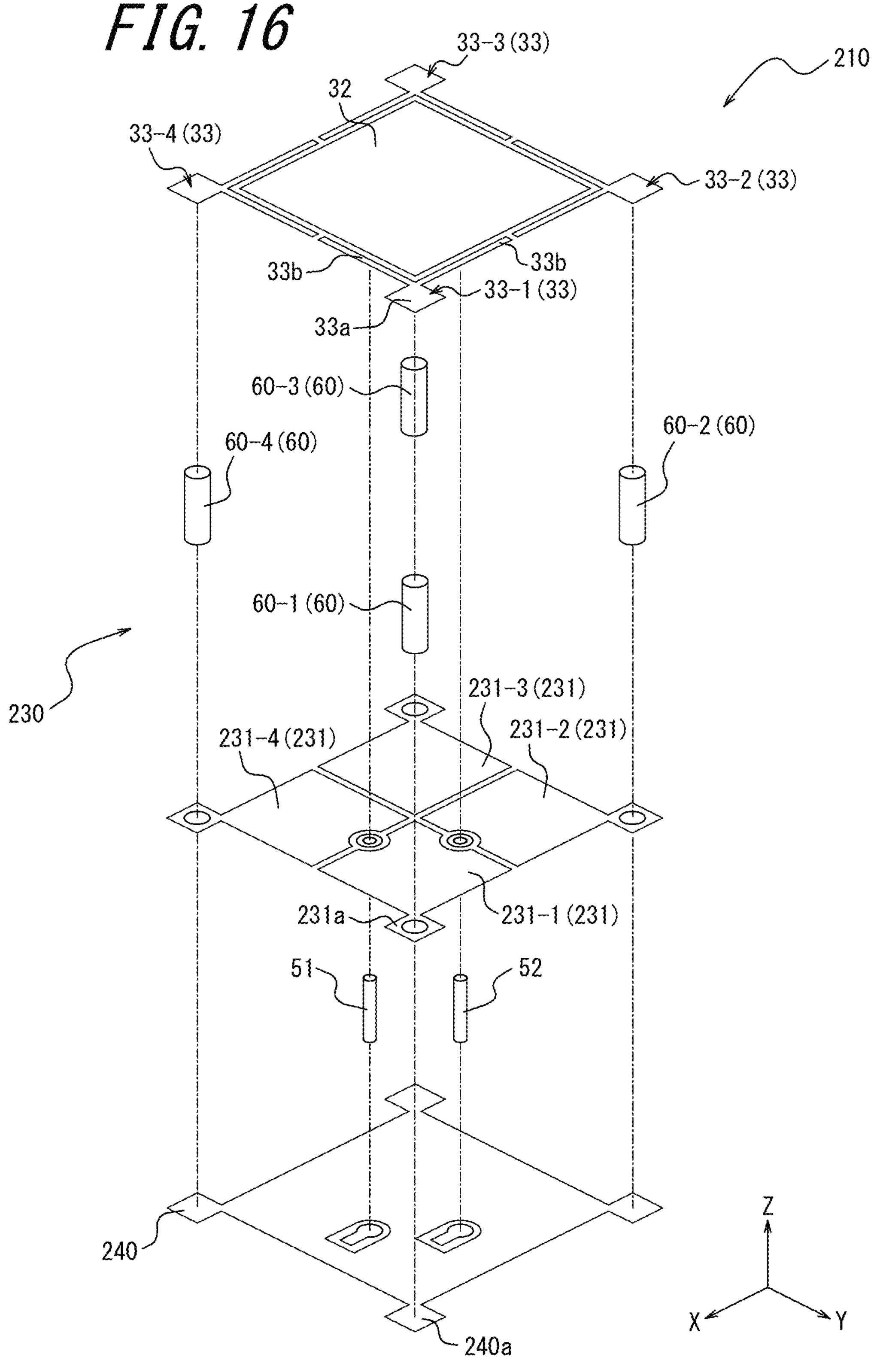
FIG. 16 is an exploded perspective view of a portion of the resonant structure illustrated in FIG. 15.
Figure 17:
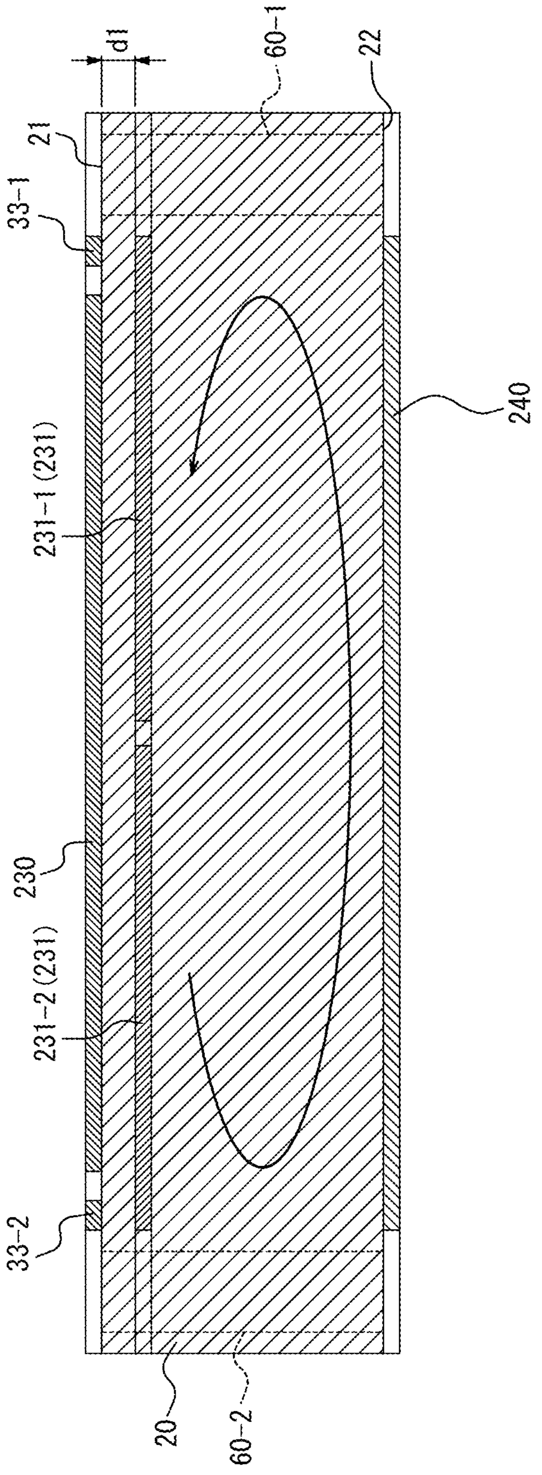
FIG. 17 is a cross-section of the resonant structure along the L2-L2 line illustrated in FIG. 15.

FIG. 15 is a perspective view of a resonant structure 210 according to an embodiment. FIG. 16 is an exploded perspective view of a portion of the resonant structure 210 illustrated in FIG. 15. FIG. 17 is a cross-section of the resonant structure 210 along the L2-L2 line illustrated in FIG. 15.

The resonant structure 210 resonates at one or a plurality of resonance frequencies. As illustrated in FIG. 15 and FIG. 16, the resonant structure 210 includes a substrate 20, a conducting portion 230, a ground conductor 240, and connecting conductors 60-1, 60-2, 60-3, 60-4. The resonant structure 210 may include at least one of a first feeder 51 and a second feeder 52.

The conducting portion 230 illustrated in FIG. 16 is configured to function as a portion of a resonator. The conducting portion 230 extends along the XY plane. The conducting portion 230 is located on an upper surface 21 of the substrate 20, as illustrated in FIG. 17. The resonant structure 210 exhibits an artificial magnetic conductor character relative to electromagnetic waves of a predetermined frequency incident from the outside onto the upper surface 21 of the substrate 20 on which the conducting portion 230 is located.

As illustrated in FIG. 16, the conducting portion 230 includes first conductors 231-1, 231-2, 231-3, 231-4, at least one second conductor 32, and third conductors 33-1, 33-2, 33-3, 33-4.

The first conductors 231-1 to 231-4 are collectively indicated as the "first conductors 231" when no particular distinction is made therebetween. The number of first conductors 231 included in the conducting portion 230 is not limited to four. The conducting portion 230 may include any number of first conductors 231. The third conductors 33-1 to 33-4 are collectively indicated as the "third conductors 33" when no particular distinction is made therebetween.

The second conductor 32 illustrated in FIG. 15 may be a flat conductor. The second conductor 32 is not connected to the connecting conductors 60. The second conductor 32 extends along the XY plane. As illustrated in FIG. 15, the second conductor 32 has a substantially square shape that includes two sides substantially parallel to the X-direction and two sides substantially parallel to the Y-direction. The second conductor 32 may, however, have any shape. The second conductor 32 is located on the upper surface 21 of the substrate 20, as illustrated in FIG. 17. The second conductor 32 may, however, be located inside the substrate 20. When located inside the substrate 20, the second conductor 32 may be located farther in the negative direction of the Z-axis than the first conductors 231.

The third conductors 33 illustrated in FIG. 15 may be flat conductors. The third conductors 33 illustrated in FIG. 17 are located on the upper surface 21 of the substrate 20. The third conductors 33-1 to 33-4 illustrated in FIG. 15 are located on the outside of the second conductor 32 in the XY plane.

Each third conductor 33 illustrated in FIG. 15 includes a connector 33*a* and two supports 33*b*. The connecting conductors 60 are connected to the connectors 33*a*. However, the third conductors 33 need not include the connectors 33*a*. A portion of the plurality of third conductors 33 may include the connector 33*a*, and another portion may be configured without the connector 33*a*. The supports 33*b* extend along the sides of the second conductor 32. The third conductors 33 need not include the supports 33*b*.

Among the supports 33*b* included in different third conductors 33, a gap S1 is located between two supports 33*b* adjacent in the X-direction. Among the supports 33*b* included in different third conductors 33, a gap S1 is located between two supports 33*b* adjacent in the Y-direction. The resonant structure 210 may include capacitance elements in the gaps S1. A gap S2 is located between the supports 33*b* included in the third conductors 33 and the second conductor 32. The resonant structure 210 may include capacitance elements in the gap S2.

The first conductors 231 illustrated in FIG. 16 have the same substantially square shape. Each square first conductor 231 includes a connector 231*a* at one of the four corners. The connecting conductors 60 are connected to the connectors 231*a*. However, the first conductors 231 need not include the connectors 231*a*. A portion of the plurality of first conductors 231 may include the connector 231*a*, and another portion may be configured without the connector 231*a*. The connectors 231*a* illustrated in FIG. 1 are quadrangular. The connectors 231*a* are not limited to being quadrangular, however, and may have any shape. Each of the first conductors 231-1 to 231-4 is connected to a different one of the connecting conductors 60-1 to 60-4.

The first conductors 231 are located inside the substrate 20, as illustrated in FIG. 17. The first conductors 231 are, for example, at a distance of d1 from the second conductor 32. Each of the first conductors 231-1 to 231-4 can be configured to connect capacitively via the second conductor 32. The distance d1 illustrated in FIG. 17 may be appropriately adjusted in accordance with the desired resonance frequency of the resonant structure 210. The remaining configuration of the first conductors 231 is the same as or similar to that of the first conductors 31 illustrated in FIG. 1.

The square ground conductor 240 illustrated in FIG. 16 includes a connector 240*a* at each of the four corners. The connecting conductors 60 are connected to the connectors 240*a*. The connectors 240*a* illustrated in FIG. 16 are quadrangular. The connectors 240*a* are not limited to being quadrangular, however, and may have any shape. The ground conductor 240 may have any shape in accordance with the shape of the conducting portion 230. The remaining configuration of the ground conductor 240 illustrated in FIG. 16 is the same as or similar to that of the ground conductor 40 illustrated in FIG. 1.

The first feeder 51 illustrated in FIG. 16 is configured to connect electromagnetically at a position shifted in the X-direction from the central region of the second conductor 32. The first feeder 51 transmits electromagnetic waves only in the X-direction and only receives the X-direction component of electromagnetic waves. When the resonant structure 210 is used as an antenna, the first feeder 51 is configured to supply power to the conducting portion 230 through the second conductor 32. When the resonant structure 210 is used as an antenna or a filter, the first feeder 51 is configured to supply power from the conducting portion 230 through the second conductor 32 to the outside.

The second feeder 52 illustrated in FIG. 16 is configured to connect electromagnetically at a position shifted in the Y-direction from the central region of the second conductor 32. The second feeder 52 transmits electromagnetic waves only in the Y-direction and only receives the Y-direction component of electromagnetic waves. When the resonant structure 210 is used as an antenna, the second feeder 52 is configured to supply power to the conducting portion 230 through the second conductor 32. When the resonant structure 210 is used as an antenna or a filter, the second feeder 52 is configured to supply power from the conducting portion 30 through the second conductor 32 to the outside.

The connecting conductors 60 illustrated in FIG. 17 extend from the ground conductor 240 towards the conducting portion 230. The connecting conductors 60-1 to 60-4 are each connected to the ground conductor 240, one of the first conductors 231-1 to 231-4, and one of the third conductors 33-1 to 33-4.

First Example of Resonant State

Figure 18:
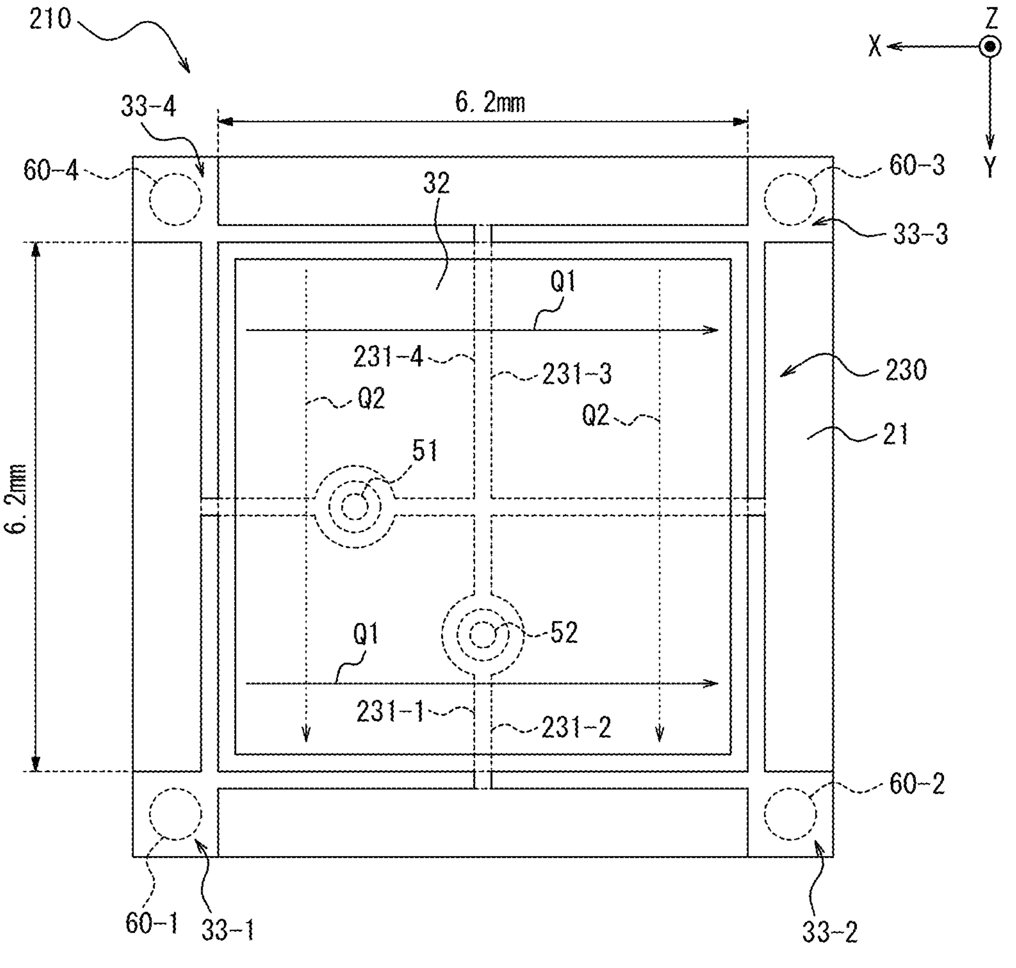
FIG. 18 illustrates a first example of a resonant state in the resonant structure illustrated in FIG. 15.

FIG. 18 illustrates a first example of a resonant state in the resonant structure 210 illustrated in FIG. 15.

The connecting conductor 60-1 and the connecting conductor 60-4 can be considered one set. The connecting conductor 60-2 and the connecting conductor 60-3 can be considered one set. The set of the connecting conductors 60-1, 60-4 and the set of the connecting conductors 60-2, 60-3 become a first connecting pair aligned along the X-direction as the first direction. The set of the connecting conductors 60-1, 60-4 and the set of the connecting conductors 60-2, 60-3 become the first connecting pair aligned along the X-direction in which a set of the first conductors 231-1, 231-4 and a set of the first conductors 231-2, 231-3 are aligned in a square grid extending in the X-direction and the Y-direction.

The resonant structure 210 resonates at a first frequency g1 along a first path Q1. The first path Q1 is a portion of the current path traversing the set of the connecting conductors 60-1, 60-4 and the set of the connecting conductors 60-2, 60-3 of the first connecting pair. This current path includes the ground conductor 240, the set of the first conductors 231-1, 231-4, the set of the first conductors 231-2, 231-3, and the set of the connecting conductors 60-1, 60-4 and set of the connecting conductors 60-2, 60-3 of the first connecting pair. The current path including the first path Q1 is indicated by arrows in FIG. 18. The set of the connecting conductors 60-1, 60-4 and the set of the connecting conductors 60-2, 60-3 are configured to function as a pair of electric walls when the resonant structure 210 resonates at the first frequency g1 along the first path Q1. The set of the connecting conductors 60-1, 60-2 and the set of the connecting conductors 60-3, 60-4 are configured to function as a pair of magnetic walls, from the perspective of current flowing over the current path that includes the first path Q1, when the resonant structure 210 resonates at the first frequency g1 along the first path Q1. By the set of connecting conductors 60-1, 60-4 and the set of connecting conductors 60-2, 60-3 functioning as a pair of electric walls and the set of connecting conductors 60-1, 60-2 and the set of connecting conductors 60-3, 60-4 functioning as a pair of magnetic walls, the resonant structure 210 exhibits an artificial magnetic conductor character relative to electromagnetic waves, at the first frequency g1 and polarized along the first path Q1, incident from the outside onto the upper surface 21 of the substrate 20 on which the conducting portion 230 is located.

The connecting conductor 60-1 and the connecting conductor 60-2 can be considered one set. The connecting conductor 60-3 and the connecting conductor 60-4 can be considered one set. The set of the connecting conductors 60-1, 60-2 and the set of the connecting conductors 60-3, 60-4 become a second connecting pair aligned along the Y-direction as the second direction. The set of the connecting conductors 60-1, 60-2 and the set of the connecting conductors 60-3, 60-4 become the second connecting pair aligned along the Y-direction, in which a set of the first conductors 231-1, 231-2 and a set of the first conductors 231-3, 231-4 are aligned in a square grid extending in the X-direction and the Y-direction.

The resonant structure 210 resonates at a second frequency g2 along a second path Q2. The second path Q2 is a portion of the current path traversing the set of the connecting conductors 60-1, 60-2 and the set of the connecting conductors 60-3, 60-4 of the second connecting pair. This current path includes the ground conductor 240, the set of the first conductors 231-1, 231-2, the set of the first conductors 231-3, 231-4, and the set of the connecting conductors 60-1, 60-2 and set of the connecting conductors 60-3, 60-4 of the second connecting pair. The set of the connecting conductors 60-1, 60-2 and the set of the connecting conductors 60-3, 60-4 are configured to function as a pair of electric walls when the resonant structure 210 resonates at the second frequency g2 along the second path Q2. The set of the connecting conductors 60-2, 60-3 and the set of the connecting conductors 60-1, 60-4 are configured to function as a pair of magnetic walls, from the perspective of current flowing over the current path that includes the second path Q2, when the resonant structure 210 resonates at the second frequency g2 along the second path Q2. By the set of connecting conductors 60-1, 60-2 and the set of connecting conductors 60-3, 60-4 functioning as a pair of electric walls and the set of connecting conductors 60-2, 60-3 and the set of connecting conductors 60-1, 60-4 functioning as a pair of magnetic walls, the resonant structure 210 exhibits an artificial magnetic conductor character relative to electromagnetic waves, at the second frequency g2 and polarized along the second path Q2, incident from the outside onto the upper surface 21 of the substrate 20 on which the conducting portion 230 is located.

The resonant structure 210 is symmetrical in the XY plane about a line connecting the center points of two sides, substantially parallel to the X-direction, of the substantially square conducting portion 230, as described above. The resonant structure 210 is symmetrical in the XY plane about a line connecting the center points of two sides, substantially parallel to the Y-direction, of the substantially square conducting portion 230, as described above. In the resonant structure 210 with this symmetrical configuration, the length of the first path Q1 and the length of the second path Q2 can be equivalent. The first frequency g1 and the second frequency g2 can therefore be equivalent.

The resonant structure 210 can be a filter that removes frequencies other than the first frequency g1 (which equals the second frequency g2). When the resonant structure 210 as a filter includes the first feeder 51, then the resonant structure 210 can supply power corresponding to electromagnetic waves of the first frequency g1 to an external device or the like via the first path Q1 and the first feeder 51. When the resonant structure 210 as a filter includes the second feeder 52, then the resonant structure 210 can supply power corresponding to electromagnetic waves of the second frequency g2 to an external device or the like via the second path Q2 and the second feeder 52.

In the resonant structure 210, the first path Q1 along the X-direction and the second path Q2 along the Y-direction are orthogonal in the XY plane. Since the first path Q1 and the second path Q2 are orthogonal in the XY plane in the resonant structure 210, the electric field of electromagnetic waves of the first frequency g1 emitted from the first path Q1 and the electric field of electromagnetic waves of the second frequency g2 emitted from the second path Q2 are orthogonal. Accordingly, the resonant structure 210 can be an antenna capable of emitting two electromagnetic waves with orthogonal electric fields.

The resonant structure 210 as an antenna is configured to supply power from the first feeder 51 to the conducting portion 30 when emitting electromagnetic waves of the first frequency g1. The first feeder 51 is configured to induce current in the first path Q1 along the X-direction as the first direction. The resonant structure 210 as an antenna is configured to supply power from the second feeder 52 to the conducting portion 30 when emitting electromagnetic waves of the second frequency g2. The second feeder 52 is configured to induce current in the second path Q2 along the Y-direction as the second direction.

<Simulation Results>

Figure 19:
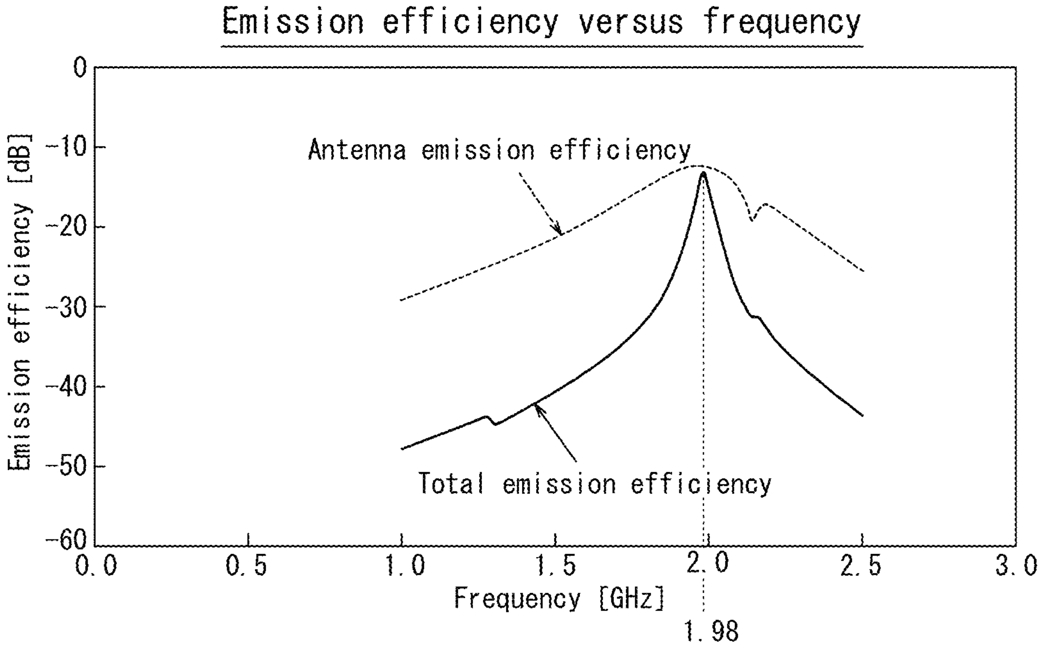
FIG. 19 is a graph illustrating a first example of emission efficiency versus frequency of the resonant structure illustrated in FIG. 15.

FIG. 19 is a graph illustrating a first example of emission efficiency versus frequency of the resonant structure 210 illustrated in FIG. 15. The data in FIG. 19 were obtained by simulation. The resonant structure 210 having the conducting portion 230 with a size of 6.2 mm×6.2 mm illustrated in FIG. 18 was used in the simulation. The ground conductor 40 of the resonant structure 210 was placed facing the metal plate in the simulation. The metal plate measured 100 mm×100 mm in the XY plane. The resonant structure 210 was placed in the central region of the metal plate. In the simulation, a resonant structure 210 not including capacitance elements C1 to C4 such as the ones illustrated in FIG. 18 was used.

The solid line in FIG. 19 indicates the total emission efficiency relative to the frequency. The dashed line in FIG. 19 indicates the antenna emission efficiency.

The resonant structure 210 enters a resonant state at the frequency where the total emission efficiency in FIG. 19 exhibits a peak. The resonance frequency in the simulation is 1.98 GHz. The antenna emission efficiency exhibits a peak when the frequency is 1.98 GHz. When the frequency is 1.98 GHz, the resonant structure 210 can emit electromagnetic waves as an antenna. The frequency 1.98 GHz corresponds to the above-described first frequency g1 and second frequency g2.

Other Example of Resonant Structure

Figure 20:
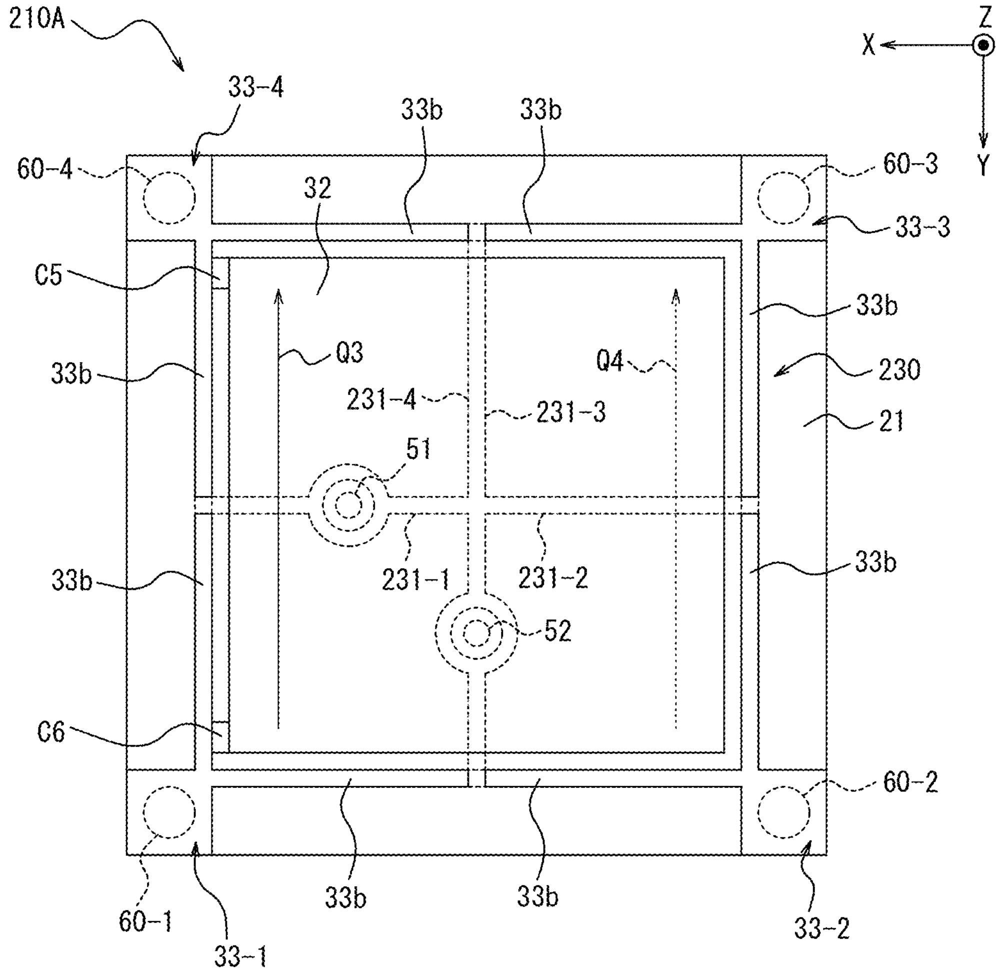
FIG. 20 is a plan view of a resonant structure according to an embodiment.

FIG. 20 is a plan view of a resonant structure 210A according to an embodiment. The explanation below focuses on the differences between the resonant structure 210A and the resonant structure 210 illustrated in FIG. 15.

The resonant structure 210A includes capacitance elements C5, C6. The capacitance elements C5, C6 may be chip capacitors or the like. The capacitance of the capacitance elements C5, C6 is the same.

The capacitance element C5 is located near the corner facing the third conductor 33-4 among the four corners of the second conductor 32. The capacitance element C5 is located between a side of the second conductor 32 substantially parallel to the Y-direction and the support 33*b*, of the third conductor 33-4, that lies along the Y-direction.

The capacitance element C6 is located near the corner facing the third conductor 33-1 among the four corners of the second conductor 32. The capacitance element C6 is located between a side of the second conductor 32 substantially parallel to the Y-direction and the support 33*b*, of the third conductor 33-1, that lies along the Y-direction.

First Example of Resonant State

The resonant structure 210A resonates at a first frequency g3 along a first path Q3. The first path Q3 is a portion of the current path traversing the connecting conductors 60-1, 60-4 of the first connecting pair. This current path includes the ground conductor 240, the first conductors 231-1, 231-4, and the connecting conductors 60-1, 60-4 of the first connecting pair. In the same or similar manner as the second path Q2 illustrated in FIG. 18, the resonant structure 210A exhibits an artificial magnetic conductor character relative to electromagnetic waves, at the first frequency g3 and polarized in the Y-direction, incident from the outside onto an upper surface 21 of a substrate 20 on which the conducting portion 230 is located.

The resonant structure 210A resonates at a second frequency g4 along a second path Q4. The second path Q4 is a portion of the current path traversing the connecting conductors 60-2, 60-3 of the second connecting pair. This current path includes the ground conductor 240, the first conductors 231-2, 231-3, and the connecting conductors 60-2, 60-3 of the second connecting pair. In the same or similar manner as the second path Q2 illustrated in FIG. 18, the resonant structure 210A exhibits an artificial magnetic conductor character relative to electromagnetic waves, at the second frequency g4 and polarized in the Y-direction, incident from the outside onto the upper surface 21 of the substrate 20 on which the conducting portion 230 is located.

In the resonant structure 210A, the capacitance element C5 and the capacitance element C6 are located near the first path Q3. The first frequency g3 in the first path Q3 can be lower than the second frequency g4 in the second path Q4. The first frequency g3 and the second frequency g4 differ in the resonant structure 210A. The capacitance of the capacitance elements C5, C6 may be appropriately adjusted so that the first frequency g3 and the second frequency g4 belong to the same frequency band. The capacitance of the capacitance elements C5, C6 may be appropriately adjusted so that the first frequency g3 and the second frequency g4 belong to different frequency bands.

Second Example of Resonant State

Figure 21:
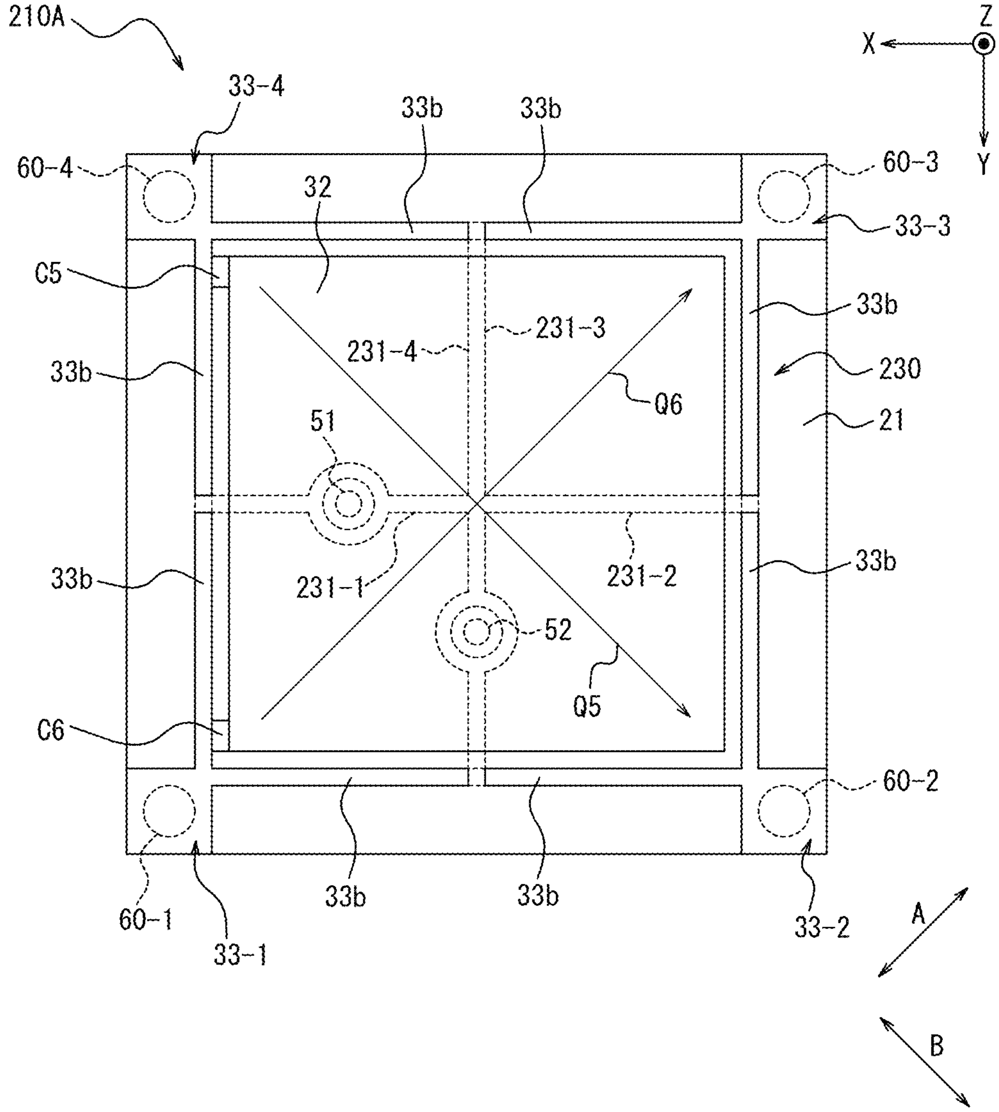
FIG. 21 illustrates a second example of a resonant state in the resonant structure illustrated in FIG. 20.

FIG. 21 illustrates a second example of a resonant state in the resonant structure illustrated in FIG. 20.

The resonant structure 210A resonates at a first frequency g5 along a first path Q5. The first path Q5 is an apparent current path in the same or similar manner as the second path P2 illustrated in FIG. 5. The resonant structure 210A exhibits an artificial magnetic conductor character relative to electromagnetic waves, at the first frequency g5 and polarized in the B-direction, incident from the outside onto the upper surface 21 of the substrate 20 on which the conducting portion 230 is located.

The resonant structure 210A resonates at a second frequency g6 along a second path Q6. The second path Q6 is an apparent current path in the same or similar manner as the first path P1 illustrated in FIG. 5. The resonant structure 210A exhibits an artificial magnetic conductor character relative to electromagnetic waves, at the second frequency g6 and polarized in the A-direction, incident from the outside onto the upper surface 21 of the substrate 20 on which the conducting portion 230 is located.

The resonant structure 210A is symmetrical about a line connecting the center points of two sides, substantially parallel to the Y-direction, of the substantially square conducting portion 230. In the resonant structure 210A configured symmetrically in such a way, the first path Q5 and the second path Q6 can be configured symmetrically. The first frequency g5 and the second frequency g6 can become equivalent as a result of the symmetrical configuration of the first path Q5 and the second path Q6.

Other Example of Resonant Structure

Figure 22:
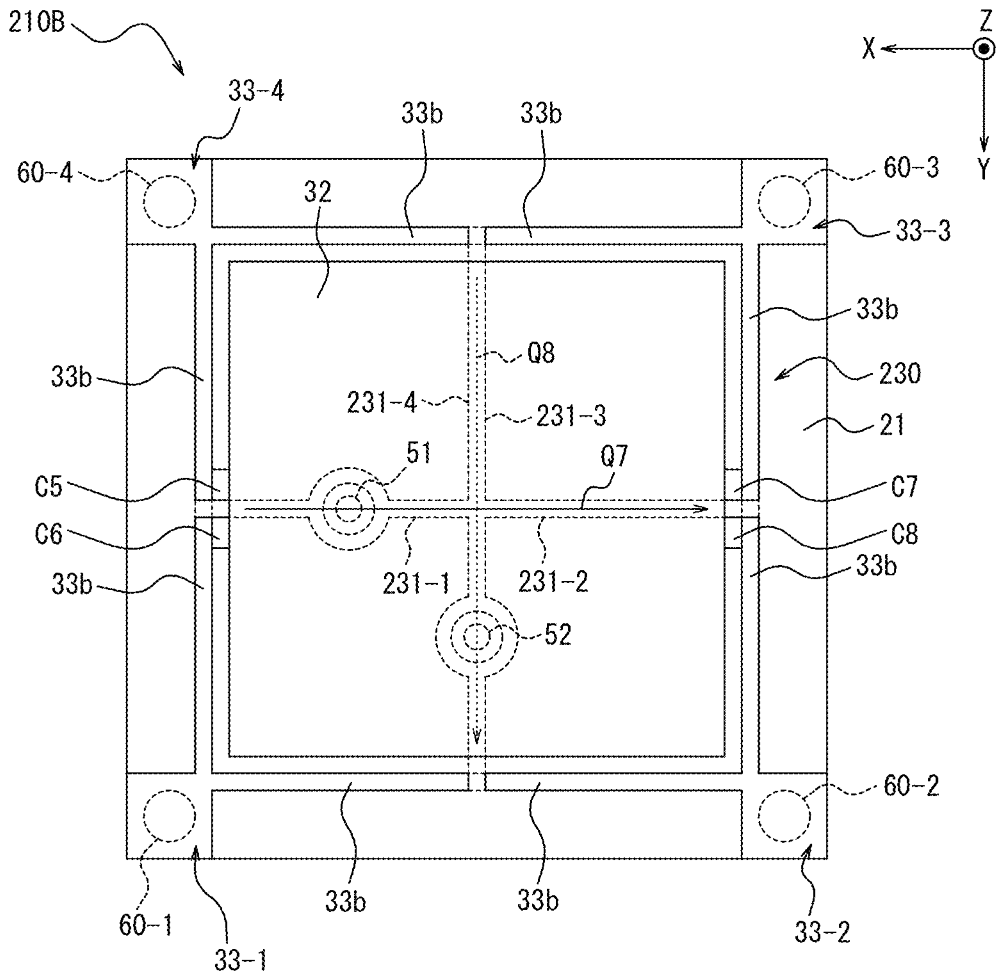
FIG. 22 is a plan view of a resonant structure according to an embodiment.

FIG. 22 is a plan view of a resonant structure 210B according to an embodiment. The explanation below focuses on the differences between the resonant structure 210B and the resonant structure 210 illustrated in FIG. 15.

The resonant structure 210B includes capacitance elements C5, C6, C7, C8. The capacitance elements C5 to C8 may be chip capacitors or the like. The capacitance of each capacitance element C5 to C8 is the same.

Of the two sides of the second conductor 32 substantially parallel to the Y-direction, the capacitance elements C5, C6 are located in the central region of the side farther in the positive direction of the X-axis. The capacitance element C5 is located between the second conductor 32 and the support 33*b*, of the third conductor 33-4, that lies along the Y-direction. The capacitance element C6 is located between the second conductor 32 and the support 33*b*, of the third conductor 33-1, that lies along the Y-direction.

Of the two sides of the second conductor 32 substantially parallel to the Y-direction, the capacitance elements C7, C8 are located in the central region of the side farther in the negative direction of the X-axis. The capacitance element C7 is located between the second conductor 32 and the support 33*b*, of the third conductor 33-3, that lies along the Y-direction. The capacitance element C8 is located between the second conductor 32 and the support 33*b*, of the third conductor 33-2, that lies along the Y-direction.

Example of Resonant State

The resonant structure 210B resonates at a first frequency g7 along a first path Q7. In the same or similar manner as the first path Q1 illustrated in FIG. 18, the first path Q7 is a portion of the current path traversing a set of the connecting conductors 60-1, 60-4 and a set of the connecting conductors 60-2, 60-3 of the first connecting pair. The resonant structure 210B exhibits an artificial magnetic conductor character relative to electromagnetic waves, at the first frequency g7 and polarized in the X-direction, incident from the outside onto the upper surface 21 of the substrate 20 on which the conducting portion 230 is located.

The resonant structure 210B resonates at a second frequency g8 along a second path Q8. In the same or similar manner as the second path Q2 illustrated in FIG. 18, the second path Q8 is a portion of the current path traversing a set of the connecting conductors 60-1, 60-2 and a set of the connecting conductors 60-3, 60-4 of the second connecting pair. The resonant structure 210B exhibits an artificial magnetic conductor character relative to electromagnetic waves, at the first frequency g8 and polarized in the Y-direction, incident from the outside onto the upper surface 21 of the substrate 20 on which the conducting portion 230 is located.

In the resonant structure 210B, the capacitance elements C5 to C8 are located near the first path Q7. The first frequency g9 in the first path Q7 is lower than the second frequency g8 in the second path Q8. The first frequency g7 and the second frequency g8 differ in the resonant structure 210B. The capacitance of the capacitance elements C5 to C8 may be appropriately adjusted so that the first frequency g7 and the second frequency g8 belong to the same frequency band. The capacitance of the capacitance elements C5 to C8 may be appropriately adjusted so that the first frequency g7 and the second frequency g8 belong to different frequency bands.

Other Example of Resonant Structure

Figure 23:
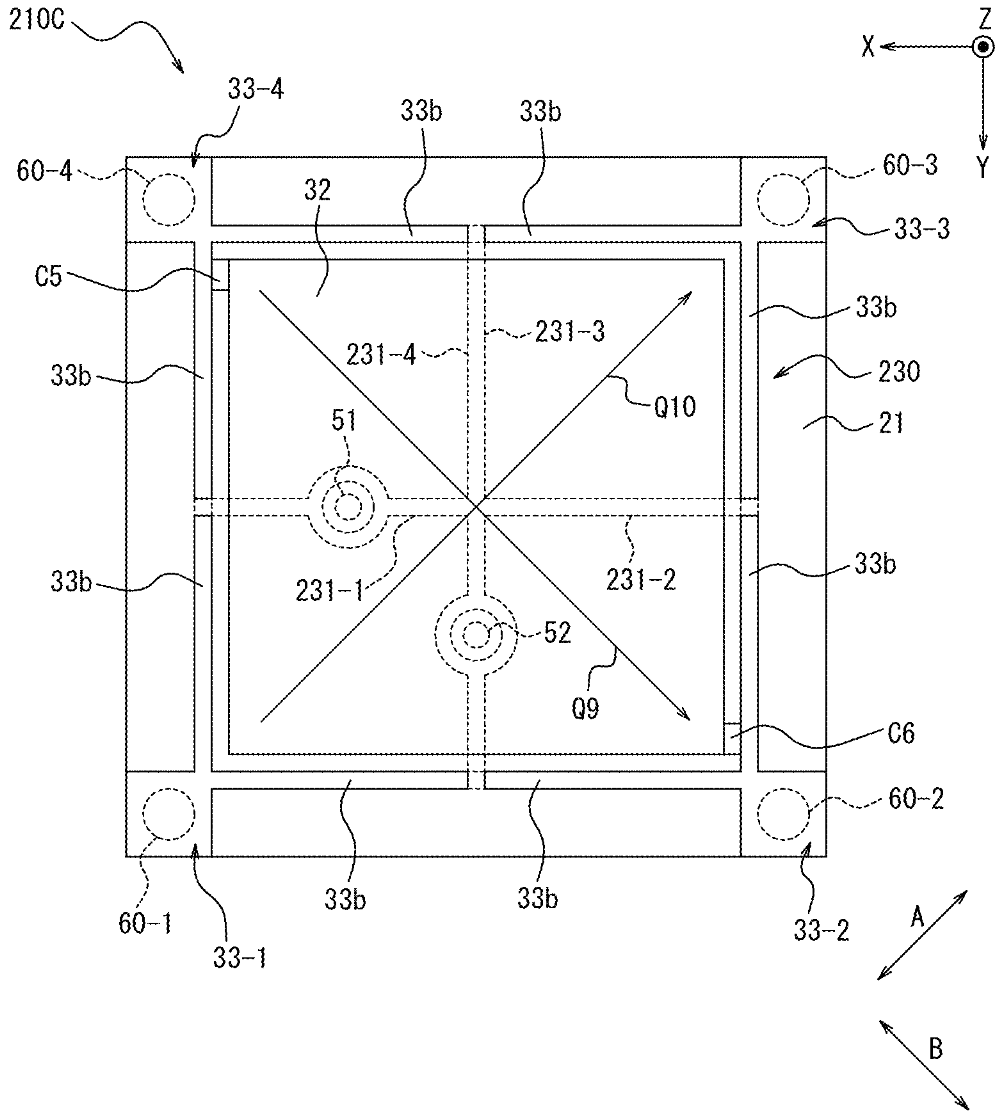
FIG. 23 is a plan view of a resonant structure according to an embodiment.

FIG. 23 is a plan view of a resonant structure 210C according to an embodiment. The explanation below focuses on the differences between the resonant structure 210C and the resonant structure 210 illustrated in FIG. 15.

The resonant structure 210C includes capacitance elements C5, C6. The capacitance elements C5, C6 may be chip capacitors or the like. The capacitance of the capacitance elements C5, C6 is the same.

The capacitance element C5 is located near the corner facing the third conductor 33-4 among the four corners of the second conductor 32. The capacitance element C5 is located between a side of the second conductor 32 substantially parallel to the Y-direction and the support 33*b*, of the third conductor 33-4, that lies along the Y-direction.

The capacitance element C6 is located near the corner facing the third conductor 33-2 among the four corners of the second conductor 32. The capacitance element C6 is located between a side of the second conductor 32 substantially parallel to the Y-direction and the support 33*b*, of the third conductor 33-2, that lies along the Y-direction.

Example of Resonant State

The resonant structure 210C resonates at a first frequency g9 along a first path Q9. The first path Q9 is an apparent current path in the same or similar manner as the second path P2 illustrated in FIG. 5. The resonant structure 210C exhibits an artificial magnetic conductor character relative to electromagnetic waves, at the first frequency g9 and polarized in the B-direction, incident from the outside onto the upper surface 21 of the substrate 20 on which the conducting portion 230 is located.

The resonant structure 210C resonates at a second frequency g10 along a second path Q10. The second path Q10 is an apparent current path in the same or similar manner as the first path P1 illustrated in FIG. 5. The resonant structure 210C exhibits an artificial magnetic conductor character relative to electromagnetic waves, at the second frequency g10 and polarized in the A-direction, incident from the outside onto the upper surface 21 of the substrate 20 on which the conducting portion 230 is located.

In the resonant structure 210C, the capacitance elements C5, C6 are located near the first path Q9. The first frequency g9 in the first path Q9 can be lower than the second frequency g10 in the second path Q10. The first frequency g9 and the second frequency g10 differ in the resonant structure 210C. The capacitance of the capacitance elements C5, C6 may be appropriately adjusted so that the first frequency g9 and the second frequency g10 belong to the same frequency band. The capacitance of the capacitance elements C5, C6 may be appropriately adjusted so that the first frequency g9 and the second frequency g10 belong to different frequency bands.

Other Example of Resonant Structure

Figure 24:
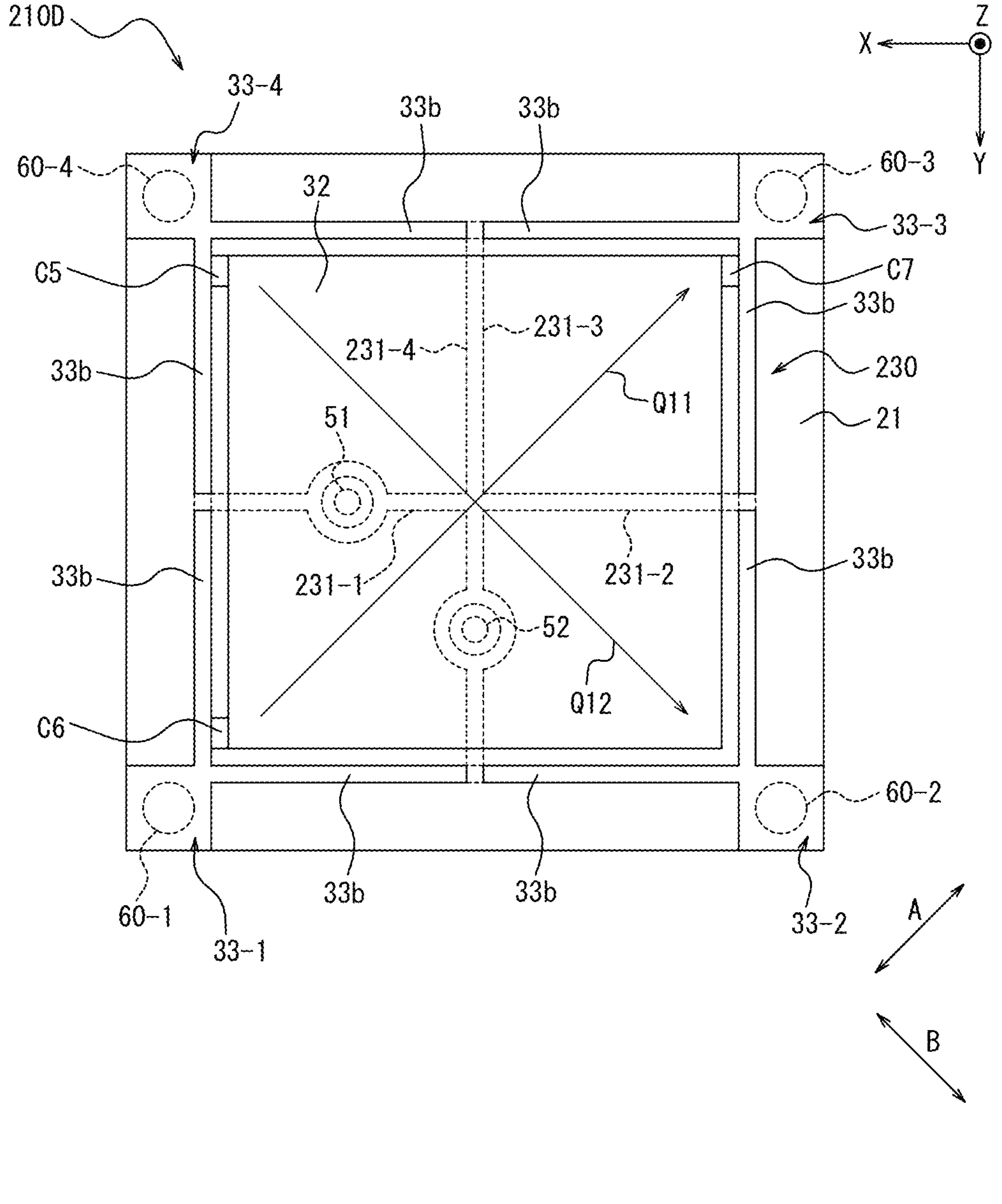
FIG. 24 is a plan view of a resonant structure according to an embodiment.

FIG. 24 is a plan view of a resonant structure 210D according to an embodiment. The explanation below focuses on the differences between the resonant structure 210D and the resonant structure 210 illustrated in FIG. 15.

The resonant structure 210D includes capacitance elements C5 to C7. The capacitance elements C5, C6 are located at the same or similar positions as the capacitance elements C5, C6 illustrated in FIG. 20.

The capacitance element C7 is located near the corner facing the third conductor 33-3 among the four corners of the second conductor 32. The capacitance element C7 is located between a side of the second conductor 32 substantially parallel to the Y-direction and the support 33*b*, of the third conductor 33-3, that lies along the Y-direction.

First Example of Resonant State

The resonant structure 210D resonates at a first frequency g11 along a first path Q11. The first path Q11 is an apparent current path in the same or similar manner as the first path P1 illustrated in FIG. 5. The resonant structure 210D exhibits an artificial magnetic conductor character relative to electromagnetic waves, at the first frequency g9 and polarized in the A-direction, incident from the outside onto the upper surface 21 of the substrate 20 on which the conducting portion 230 is located.

The resonant structure 210D resonates at a second frequency g12 along a second path Q12. The second path Q12 is an apparent current path in the same or similar manner as the second path P2 illustrated in FIG. 5. The resonant structure 210D exhibits an artificial magnetic conductor character relative to electromagnetic waves, at the second frequency g12 and polarized in the B-direction, incident from the outside onto the upper surface 21 of the substrate 20 on which the conducting portion 230 is located.

In the resonant structure 210D, only the one capacitance element C5 is located near the second path Q12, whereas the two capacitance elements C6, C7 are located near the first path Q11. The first frequency g11 in the first path Q11 is lower than the second frequency g12 in the second path Q12. The first frequency g11 and the second frequency g12 differ in the resonant structure 210D. The capacitance of the capacitance elements C5 to C7 may be appropriately adjusted so that the first frequency g11 and the second frequency g12 belong to the same frequency band. The capacitance of the capacitance elements C5 to C7 may be appropriately adjusted so that the first frequency g11 and the second frequency g12 belong to different frequency bands.

Second Example of Resonant State

Figure 25:
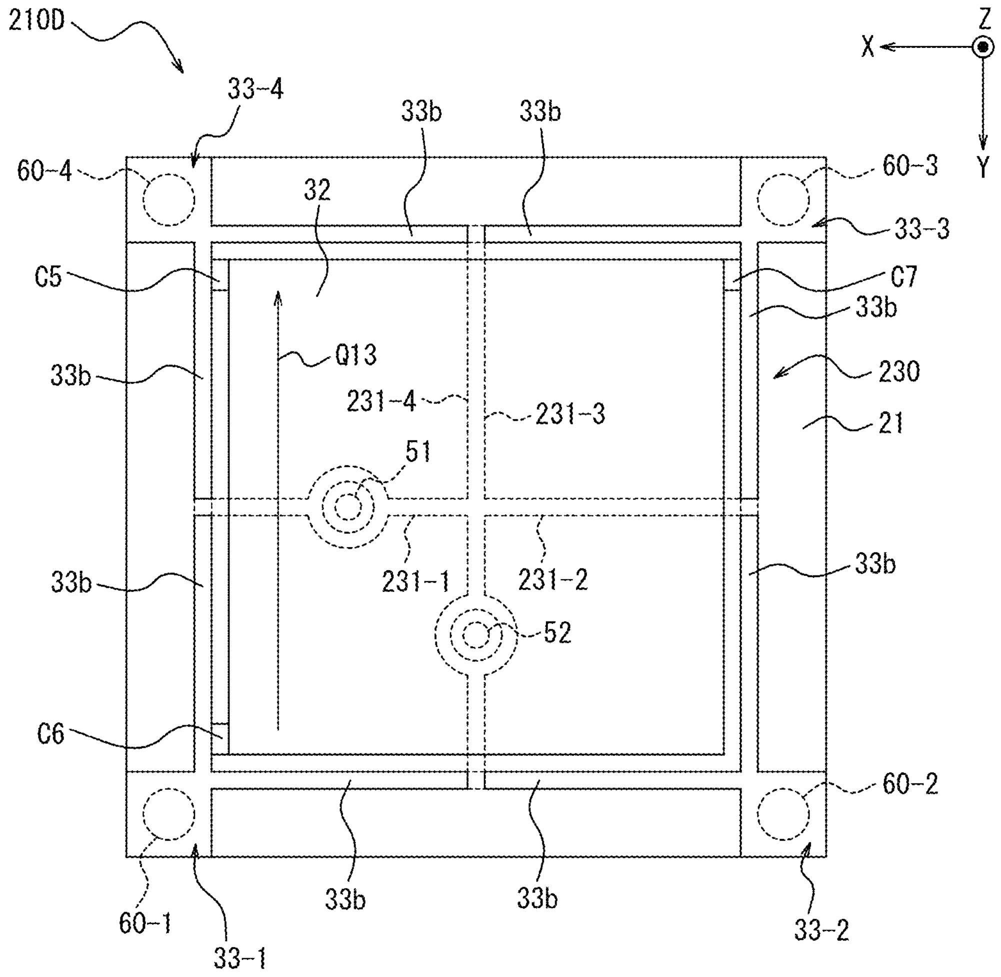
FIG. 25 illustrates a second example of a resonant state in the resonant structure illustrated in FIG. 24.

FIG. 25 illustrates a second example of a resonant state in the resonant structure 210D illustrated in FIG. 24.

The resonant structure 210D resonates at a first frequency g13 along a first path Q13. The first path Q13 is a portion of the current path traversing the connecting conductors 60-1, 60-4 of the first connecting pair. The resonant structure 210D exhibits an artificial magnetic conductor character relative to electromagnetic waves, at the first frequency g13 and polarized in the Y-direction, incident from the outside onto the upper surface 21 of the substrate 20 on which the conducting portion 230 is located.

Other Example of Resonant Structure

Figure 26:
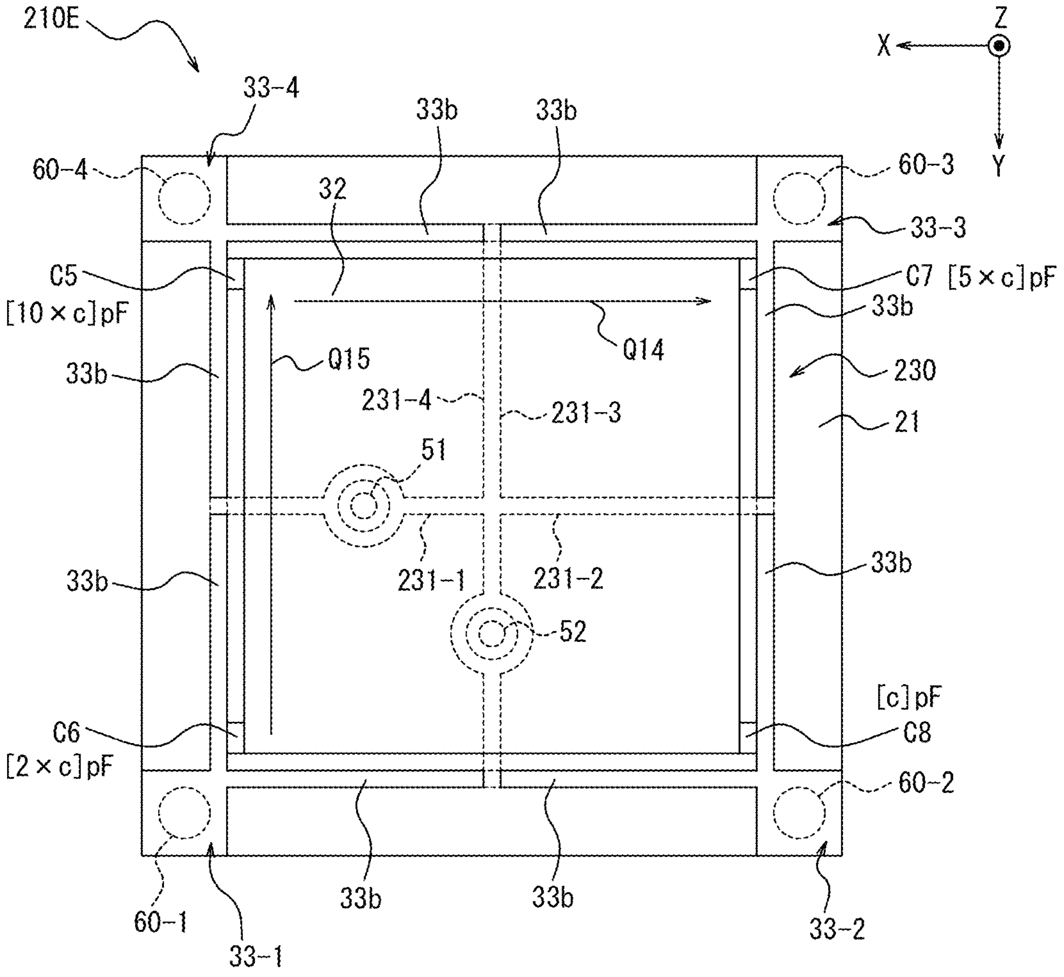
FIG. 26 is a plan view of a resonant structure according to an embodiment.

FIG. 26 is a plan view of a resonant structure 210E according to an embodiment. The explanation below focuses on the differences between the resonant structure 210E and the resonant structure 210 illustrated in FIG. 15.

The resonant structure 210E includes capacitance elements C5 to C8. The capacitance elements C5 to C7 are located at the same or similar positions as the capacitance elements C5 to C7 illustrated in FIG. 25.

The capacitance element C8 is located near the corner facing the third conductor 33-2 among the four corners of the second conductor 32. The capacitance element C8 is located between a side of the second conductor 32 substantially parallel to the Y-direction and the support 33*b*, of the third conductor 33-2, that lies along the Y-direction.

The capacitances of the capacitance elements C5 to C8 differ from each other. The capacitance may increase in the order of the capacitance element C8, the capacitance element C6, the capacitance element C7, and the capacitance element C5.

For example, the capacitance of the capacitance element C8 is set to capacitance c [pF]. The capacitance of the capacitance element C6 is set to twice times the capacitance c (2×c [pF]). The capacitance of the capacitance element C7 is set to five times the capacitance c (5×c [pF]). The capacitance of the capacitance element C5 is set to ten times the capacitance c (10×c [pF]).

First Example of Resonant State

The resonant structure 210E resonates at a first frequency g14 along a first path Q14. The first path Q14 is a portion of the current path traversing the connecting conductors 60-3, 60-4 of the first connecting pair. The resonant structure 210E exhibits an artificial magnetic conductor character relative to electromagnetic waves, at the second frequency g14 and polarized in the X-direction, incident from the outside onto the upper surface 21 of the substrate 20 on which the conducting portion 230 is located.

The resonant structure 210E resonates at a second frequency g15 along a second path Q15. The second path Q15 is a portion of the current path traversing the connecting conductors 60-1, 60-4 of the second connecting pair. The resonant structure 210E exhibits an artificial magnetic conductor character relative to electromagnetic waves, at the first frequency g15 and polarized in the Y-direction, incident from the outside onto the upper surface 21 of the substrate 20 on which the conducting portion 230 is located.

In the resonant structure 210E, the capacitance elements C5, C7 are located near the first path Q14, and the capacitance elements C5, C6 are located near the second path Q15. The total capacitance (15×c [pF]) of the capacitors C5, C7 located near the first path Q14 is greater than the total capacitance (12×c [pF]) of the capacitors C5, C6 located near the second path Q15. The first frequency g14 in the first path Q14 can be lower than the second frequency g15 in the second path Q15. The first frequency g14 and the second frequency g15 differ in the resonant structure 210E. The capacitance of the capacitance elements C5 to C8 may be appropriately adjusted so that the first frequency g14 and the second frequency g15 belong to the same frequency band. The capacitance of the capacitance elements C5 to C8 may be appropriately adjusted so that the first frequency g14 and the second frequency g15 belong to different frequency bands.

Second Example of Resonant State

Figure 27:
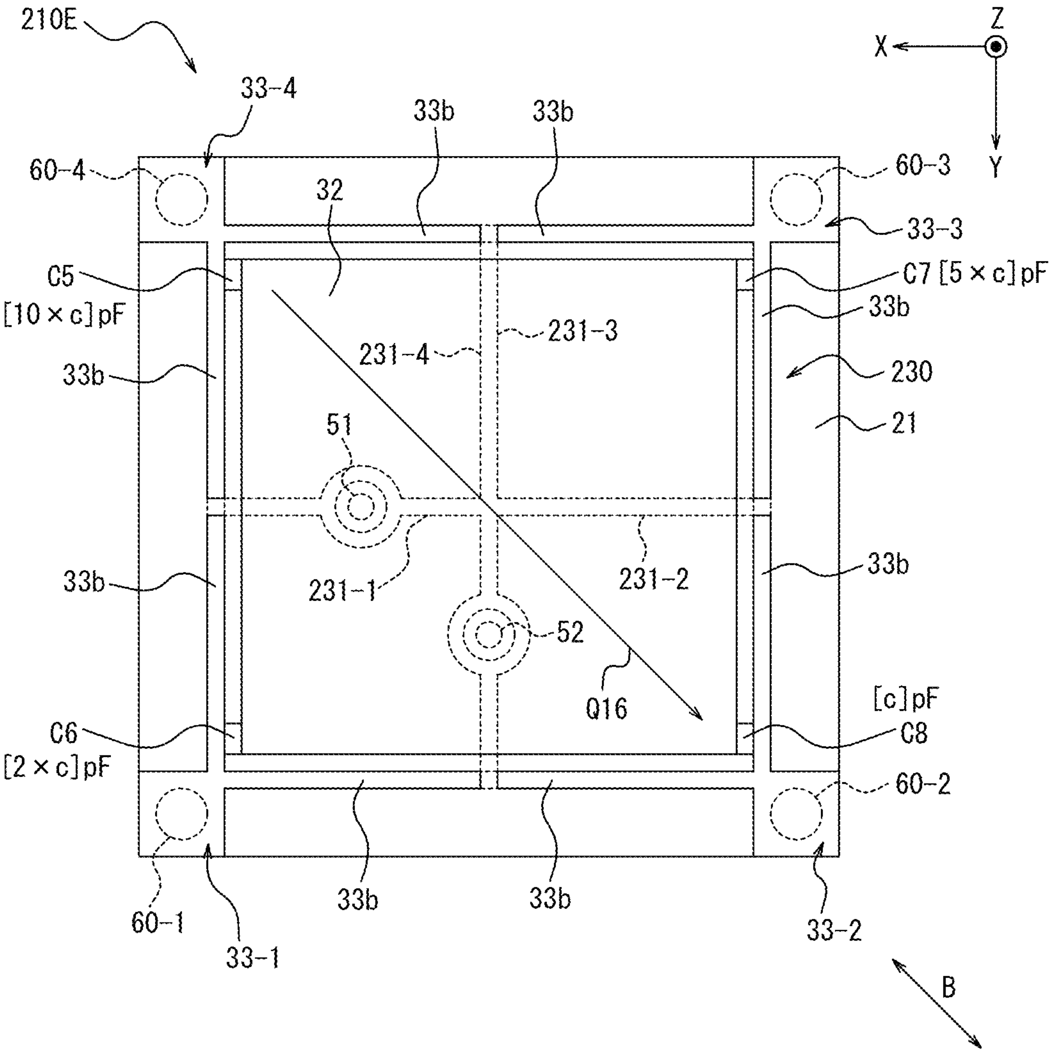
FIG. 27 illustrates a second example of a resonant state in the resonant structure illustrated in FIG. 26.

FIG. 27 illustrates a second example of a resonant state in the resonant structure 210E illustrated in FIG. 26.

The resonant structure 210E resonates at a first frequency g16 along a first path Q16. The first path Q16 is an apparent current path in the same or similar manner as the second path P2 illustrated in FIG. 5. The resonant structure 210E exhibits an artificial magnetic conductor character relative to electromagnetic waves, at the second frequency g15 and polarized in the B-direction, incident from the outside onto the upper surface 21 of the substrate 20 on which the conducting portion 230 is located.

Other Example of Resonant Structure

Figure 28:
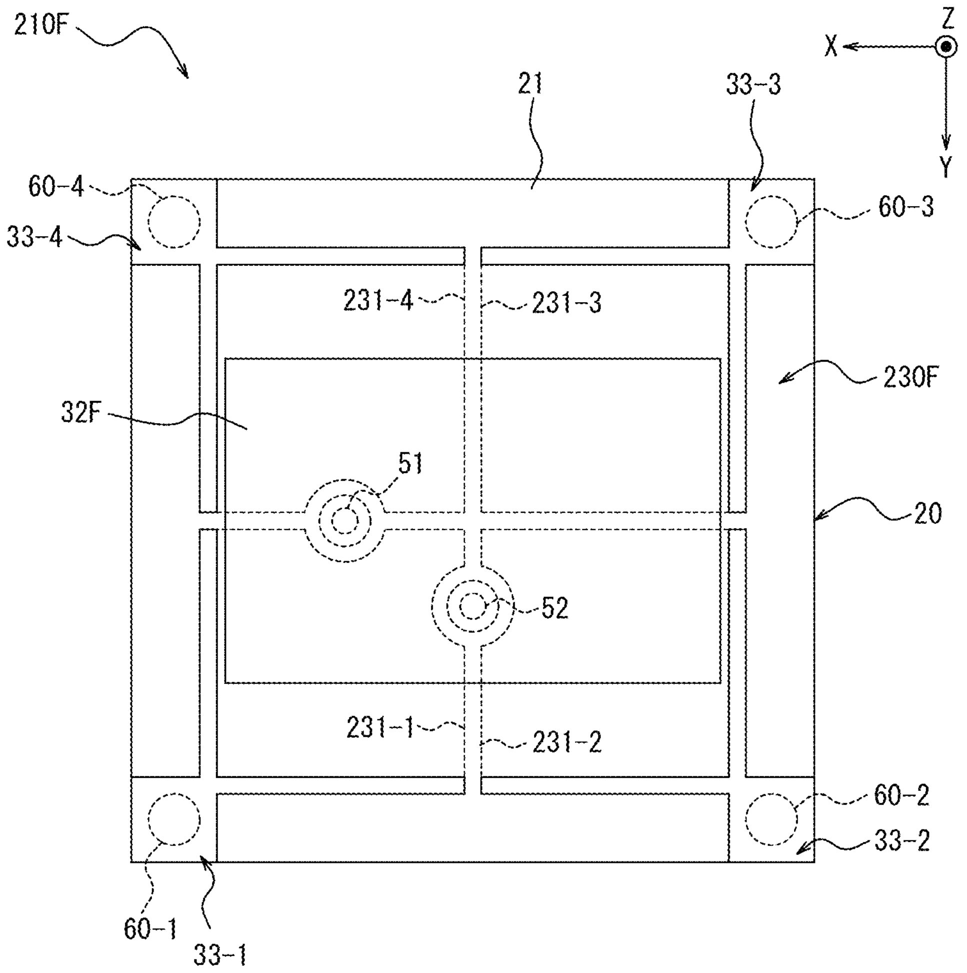
FIG. 28 is a plan view of a resonant structure according to an embodiment.

FIG. 28 is a plan view of a resonant structure 210F according to an embodiment. The explanation below focuses on the differences between the resonant structure 210F and the resonant structure 210 illustrated in FIG. 15.

The resonant structure 210F includes a conducting portion 230F. The conducting portion 230F includes a second conductor 32F. The second conductor 32F is substantially rectangular. The second conductor 32F is located near the central region of the conducting portion 230F in the Y-direction. The short sides of the second conductor 32F may be aligned in the Y-direction. The long sides of the second conductor 32F may be aligned in the X-direction. The ratio between the length of the short sides of the second conductor 32F and the length of the long sides of the second conductor 32F may be approximately 2:3. The length of the long sides of the second conductor 32F may be equivalent to the length of one side of the second conductor 32 illustrated in FIG. 15.

Other Example of Resonant Structure

Figure 29:
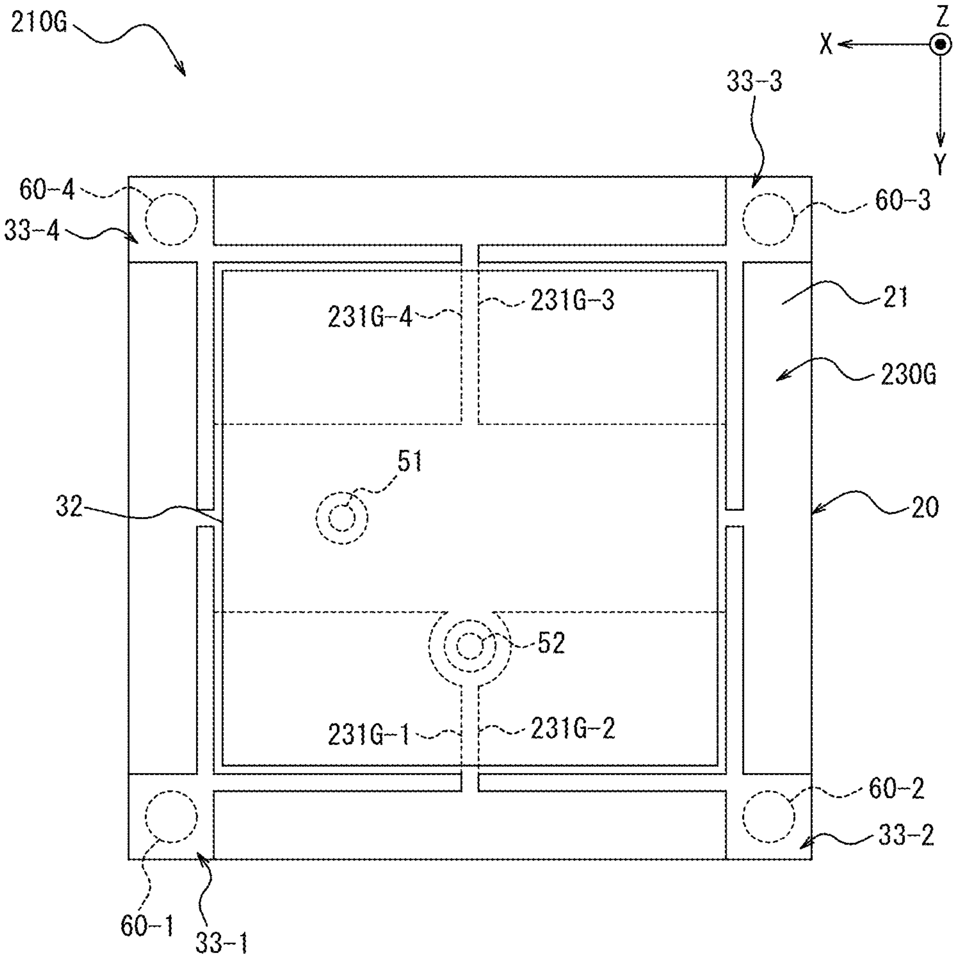
FIG. 29 is a plan view of a resonant structure according to an embodiment.

FIG. 29 is a plan view of a resonant structure 210G according to an embodiment. The explanation below focuses on the differences between the resonant structure 210G and the resonant structure 210 illustrated in FIG. 15.

The resonant structure 210G includes a conducting portion 230G. The conducting portion 230G includes a first conductor 231G-1, a first conductor 231G-2, a first conductor 231G-3, and a first conductor 231G-4. The first conductors 231G-1 to 231G-4 are collectively indicated as the "first conductors 231G" when no particular distinction is made therebetween.

The first conductor 231G is substantially rectangular. The length of the short sides of the first conductors 231G is approximately ⅓ the length of one side of the substantially square conducting portion 230G. The length of the long sides of the first conductors 231G is equivalent to the length of one side of the first conductor 231 illustrated in FIG. 15. The long sides of the first conductor 231G may be aligned in the X-direction. The short sides of the first conductor 231G may be aligned in the Y-direction.

Other Example of Resonant Structure

Figure 30:
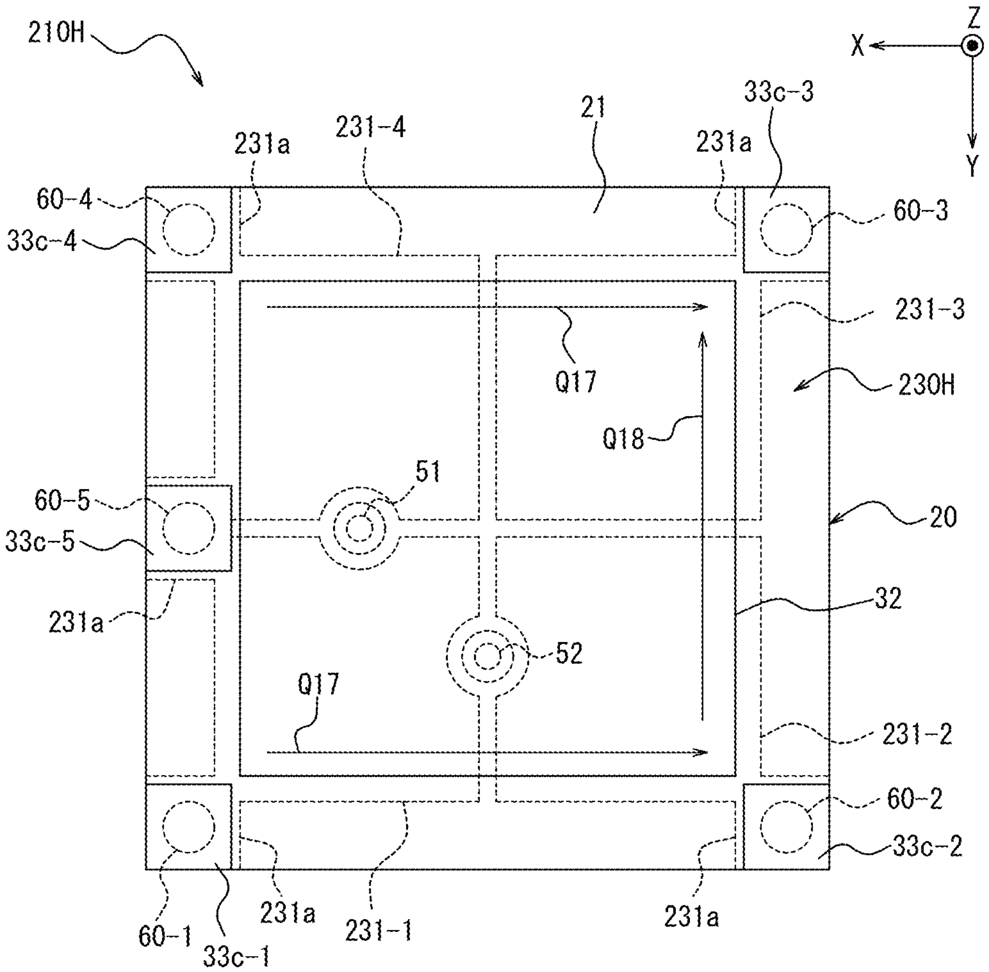
FIG. 30 is a plan view of a resonant structure according to an embodiment.

FIG. 30 is a plan view of a resonant structure 210H according to an embodiment. The explanation below focuses on the differences between the resonant structure 210H and the resonant structure 210 illustrated in FIG. 15. The positions of the connectors 231*a* illustrated in FIG. 16 are indicated by dashed lines in FIG. 30.

In addition to the connecting conductors 60-1 to 60-4, the resonant structure 210H includes a connecting conductor 60-5. The resonant structure 210H includes a conducting portion 230H. The conducting portion 230H includes third conductors 33*c*-1, 33*c*-2, 33*c*-3, 33*c*-4, 33*c*-5. The third conductors 33*c*-1 to 33*c*-5 are collectively indicated as the "third conductors 33*c*" when no particular distinction is made therebetween.

The third conductors 33*c* may be configured in the same or similar manner as the connectors 33*a* illustrated in FIG. 15. Each of the third conductors 33*c*-1 to 33*c*-5 is connected to a different one of the connecting conductors 60-1 to 60-5. The third conductors 33*c*-1 to 33*c*-5 can overlap the connecting conductors 60-1 to 60-5 in the Z-direction.

The connecting conductor 60-5 is located between the connecting conductor 60-1 and the connecting conductor 60-4 in the Y-direction. The connector 231*a* illustrated in FIG. 16 is located farther in the negative direction of the Z-axis than the third conductor 33*c*-5. The connector 231*a* located farther in the negative direction of the Z-axis than the third conductor 33*c*-5 connects the connecting conductor 60-5 to the first conductor 231-1 and the first conductor 231-4. The first conductor 231-1 is connected to the connecting conductor 60-5 in addition to the connecting conductor 60-1. The first conductor 231-4 is connected to the connecting conductor 60-5 in addition to the connecting conductor 60-4.

Example of Resonant State

The resonant structure 210H resonates at a first frequency g17 along a first path Q17. The first path Q17 appears in the same or similar manner as the first path Q1 illustrated in FIG. 18. The resonant structure 210H exhibits an artificial magnetic conductor character relative to electromagnetic waves, at the first frequency g17 and polarized in the X-direction, incident from the outside onto the upper surface 21 of the substrate 20 on which the conducting portion 230 is located.

The resonant structure 210H resonates at a second frequency g18 along a second path Q18. The second path Q18 appears in the same or similar manner as the second path Q2 illustrated in FIG. 18. Unlike the second path Q2 illustrated in FIG. 18, however, the second path Q18 only appears on the negative X-direction side due to the presence of the connecting conductor 60-5. The resonant structure 210H exhibits an artificial magnetic conductor character relative to electromagnetic waves, at the second frequency g18 and polarized in the Y-direction, incident from the outside onto the upper surface 21 of the substrate 20 on which the conducting portion 230 is located.

Other Example of Resonant Structure

Figure 31:
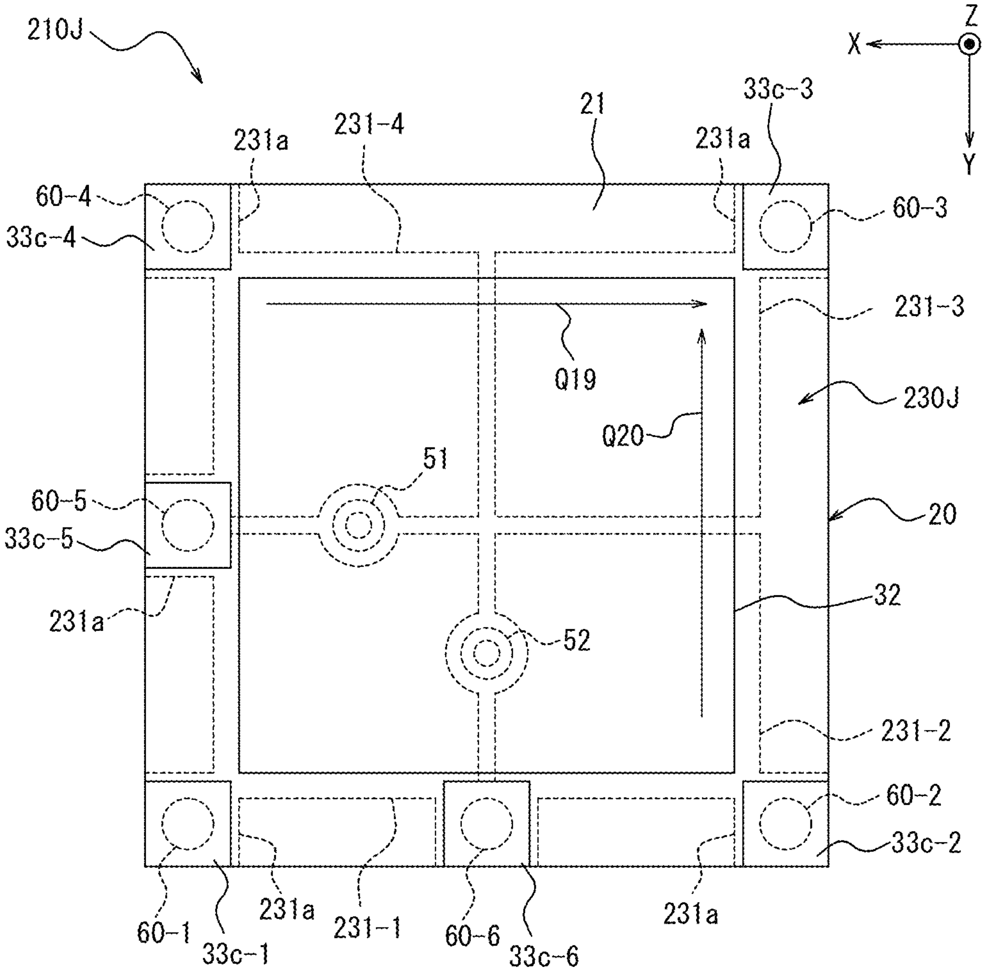
FIG. 31 is a plan view of a resonant structure according to an embodiment.

FIG. 31 is a plan view of a resonant structure 210J according to an embodiment. The explanation below focuses on the differences between the resonant structure 210J and the resonant structure 210 illustrated in FIG. 15. The positions of the connectors 231*a* illustrated in FIG. 16 are indicated by dashed lines in FIG. 31.

In addition to the connecting conductors 60-1 to 60-4, the resonant structure 210J includes connecting conductors 60-5, 60-6. The resonant structure 210J includes a conducting portion 230J. The conducting portion 230J includes third conductors 33*c*-1, 33*c*-2, 33*c*-3, 33*c*-4, 33*c*-5, and 33*c*-6. The third conductors 33*c*-1 to 33*c*-6 can overlap the connecting conductors 60-1 to 60-6 in the Z-direction. The configuration of the third conductors 33-5 and the connecting conductor 60-5 is the same as or similar to the configuration illustrated in FIG. 30.

The connecting conductor 60-6 is located between the connecting conductor 60-1 and the connecting conductor 60-2 in the X-direction. The connector 231*a* illustrated in FIG. 16 is located farther in the negative direction of the Z-axis than the third conductor 33*c*-6. The connector 231*a* located farther in the negative direction of the Z-axis than the third conductor 33*c*-6 connects the connecting conductor 60-6 to the first conductor 231-1 and the first conductor 231-2. The first conductor 231-1 is connected to the connecting conductor 60-6 in addition to the connecting conductor 60-1 and the connecting conductor 60-5. The first conductor 231-2 is connected to the connecting conductor 60-6 in addition to the connecting conductor 60-2.

Example of Resonant State

The resonant structure 210J resonates at a first frequency g19 along a first path Q19. The first path Q19 appears in the same or similar manner as the first path Q1 illustrated in FIG. 18. Unlike the first path Q1 illustrated in FIG. 18, however, the first path Q19 only appears on the negative Y-direction side due to the presence of the connecting conductor 60-6. The resonant structure 210J exhibits an artificial magnetic conductor character relative to electromagnetic waves, at the first frequency g19 and polarized in the X-direction, incident from the outside onto the upper surface 21 of the substrate 20 on which the conducting portion 230 is located.

The resonant structure 210J resonates at a second frequency g20 along a second path Q20. The second path Q20 appears in the same or similar manner as the second path Q2 illustrated in FIG. 18. Unlike the second path Q2 illustrated in FIG. 18, however, the second path Q20 only appears on the negative X-direction side due to the presence of the connecting conductor 60-5. The resonant structure 210J exhibits an artificial magnetic conductor character relative to electromagnetic waves, at the second frequency g20 and polarized in the Y-direction, incident from the outside onto the upper surface 21 of the substrate 20 on which the conducting portion 230 is located.

The resonant structure 210J is configured symmetrically in the same or similar manner as the resonant structure 210 illustrated in FIG. 15. In the resonant structure 210J with this symmetrical configuration, the length of the first path Q19 and the length of the second path Q20 can be equivalent. The first frequency g19 and the second frequency g20 can be equivalent when the length of the first path Q19 and the length of the second path Q20 are equivalent.

Other Example of Resonant Structure

Figure 32:
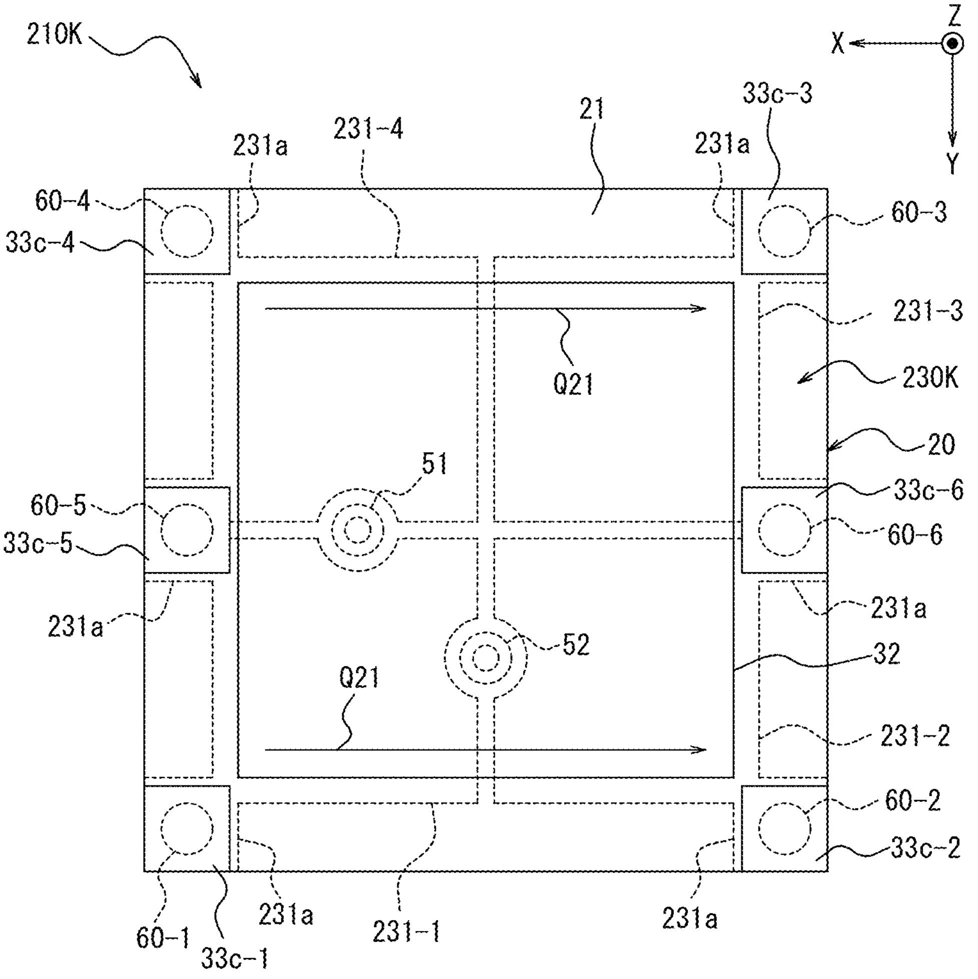
FIG. 32 is a plan view of a resonant structure according to an embodiment.

FIG. 32 is a plan view of a resonant structure 210K according to an embodiment. The explanation below focuses on the differences between the resonant structure 210K and the resonant structure 210 illustrated in FIG. 15. The positions of the connectors 231*a* illustrated in FIG. 16 are indicated by dashed lines in FIG. 32.

In addition to the connecting conductors 60-1 to 60-4, the resonant structure 210K includes connecting conductors 60-5, 60-6. The resonant structure 210K includes a conducting portion 230K. The conducting portion 230K includes third conductors 33*c*-1, 33*c*-2, 33*c*-3, 33*c*-4, 33*c*-5, and 33*c*-6.

The third conductors 33*c*-1 to 33*c*-6 can overlap the connecting conductors 60-1 to 60-6 in the Z-direction. The configuration of the third conductor 33-5 and the connecting conductor 60-5 is the same as or similar to the configuration illustrated in FIG. 30.

The connecting conductor 60-6 is located between the connecting conductor 60-2 and the connecting conductor 60-3 in the Y-direction. The connectors 231*a* illustrated in FIG. 16 are located farther in the negative direction of the Z-axis than the third conductor 33*c*-6. The connector 231*a* located farther in the negative direction of the Z-axis than the third conductor 33*c*-6 connects the connecting conductor 60-6 to the first conductor 231-2 and the first conductor 231-3. The first conductor 231-3 is connected to the connecting conductor 60-6 in addition to the connecting conductor 60-2. The first conductor 231-1 is connected to the connecting conductor 60-6 in addition to the connecting conductor 60-3.

First Example of Resonant State

The resonant structure 210K resonates at a first frequency g21 along a first path Q21. The first path Q21 appears in the same or similar manner as the first path P1 illustrated in FIG. 18. The resonant structure 210K exhibits an artificial magnetic conductor character relative to electromagnetic waves, at the first frequency g21 and polarized in the X-direction, incident from the outside onto the upper surface 21 of the substrate 20 on which the conducting portion 230 is located. The second path Q2 illustrated in FIG. 18 does not appear due to the presence of the connecting conductors 60-5, 60-6.

Other Example of Resonant Structure

Figure 33:
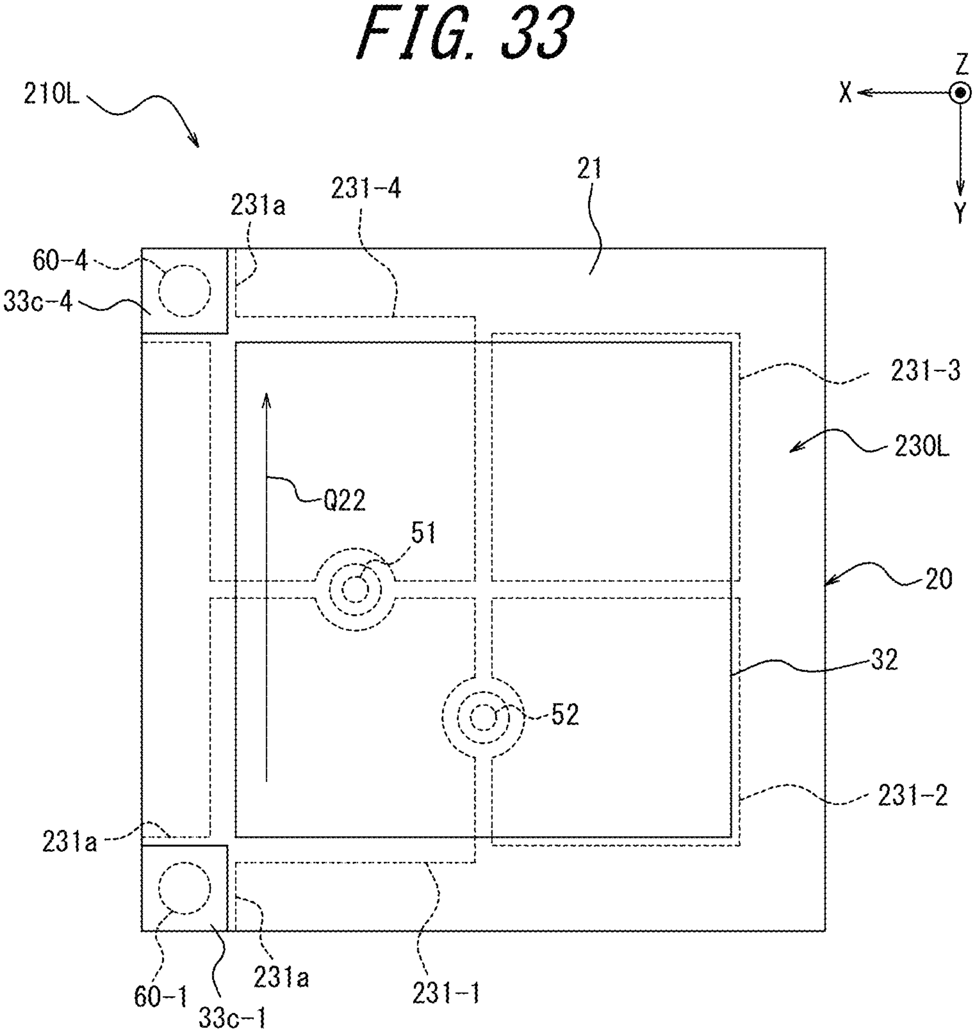
FIG. 33 is a plan view of a resonant structure according to an embodiment.

FIG. 33 is a plan view of a resonant structure 210L according to an embodiment. The explanation below focuses on the differences between the resonant structure 210L and the resonant structure 210 illustrated in FIG. 15. The positions of the connectors 231*a* illustrated in FIG. 16 are indicated by dashed lines in FIG. 33.

Unlike the resonant structure 210 illustrated in FIG. 15, the resonant structure 210L does not include the connecting conductors 60-2, 60-3. The first conductor 231-2 is not connected to the connecting conductors 60. The first conductor 231-3 is not connected to the connecting conductors 60. The resonant structure 210L includes a conducting portion 230L. Unlike the resonant structure 230 illustrated in FIG. 16, the conducting portion 230L does not include the connectors 231*a* located farther in the negative direction of the Z-axis than the connecting conductors 60-2, 60-3 of FIG. 16.

The resonant structure 210L resonates at a first frequency g22 along a first path Q22. The first path Q22 is a portion of the current path traversing the connecting conductors 60-1, 60-4 of the first connecting pair. The resonant structure 210L exhibits an artificial magnetic conductor character relative to electromagnetic waves, at the first frequency g22 and polarized in the Y-direction, incident from the outside onto the upper surface 21 of the substrate 20 on which the conducting portion 230L is located.

Other Example of Resonant Structure

Figure 34:
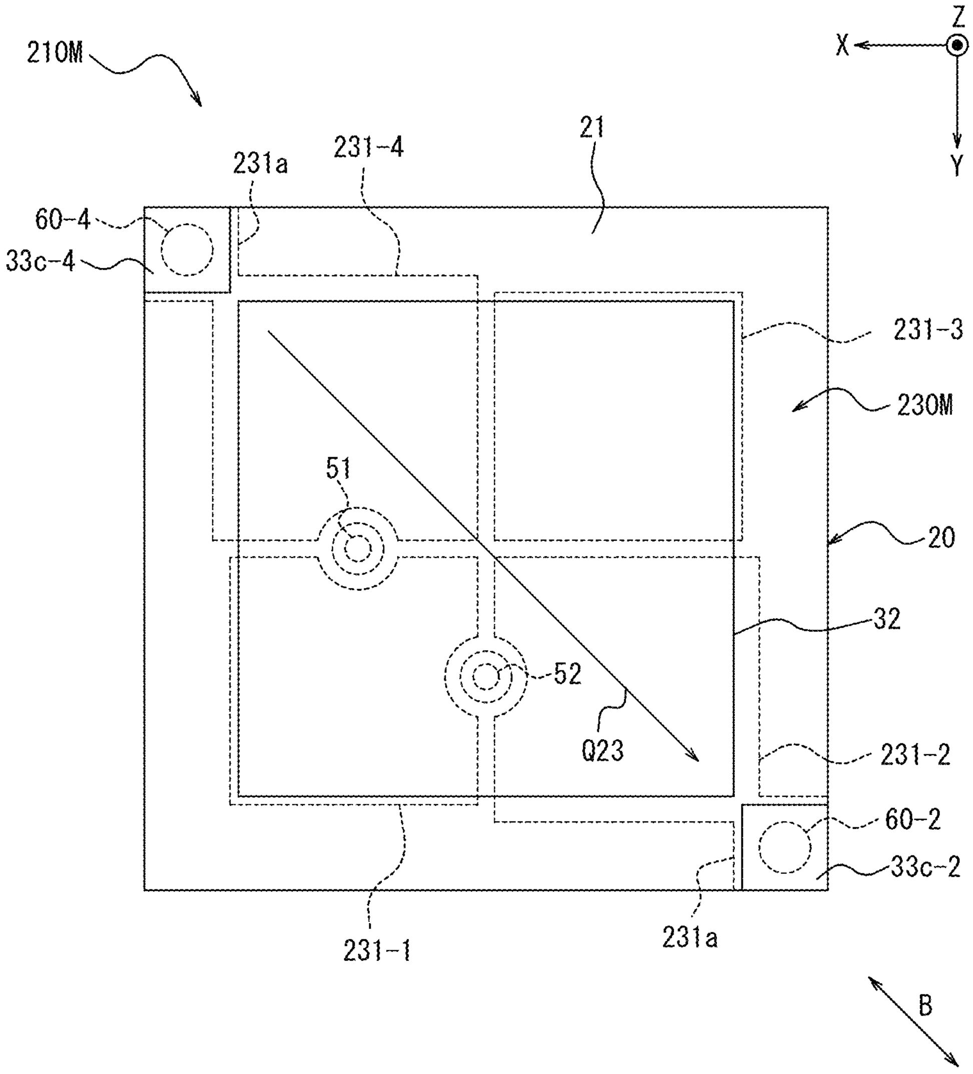
FIG. 34 is a plan view of a resonant structure according to an embodiment.

FIG. 34 is a plan view of a resonant structure 210M according to an embodiment. The explanation below focuses on the differences between the resonant structure 210M and the resonant structure 210 illustrated in FIG. 15. The positions of the connectors 231*a* illustrated in FIG. 16 are indicated by dashed lines in FIG. 34.

Unlike the resonant structure 210 illustrated in FIG. 15, the resonant structure 210M does not include the connecting conductors 60-1, 60-3. The first conductor 231-1 is not connected to the connecting conductors 60. The first conductor 231-3 is not connected to the connecting conductors 60. The resonant structure 210M includes a conducting portion 230M. Unlike the resonant structure 230 illustrated in FIG. 16, the conducting portion 230M does not include the connectors 231*a* located farther in the negative direction of the Z-axis than the connecting conductors 60-1, 60-3 of FIG. 16.

Example of Resonant State

The resonant structure 210M resonates at a first frequency g23 along a first path Q23. The first path Q23 is a portion of the current path traversing the connecting conductors 60-2, 60-4 of the first connecting pair. The resonant structure 210M exhibits an artificial magnetic conductor character relative to electromagnetic waves, at the first frequency g23 and polarized in the B-direction, incident from the outside onto the upper surface 21 of the substrate 20 on which the conducting portion 230M is located.

Other Example of Resonant Structure

Figure 35:
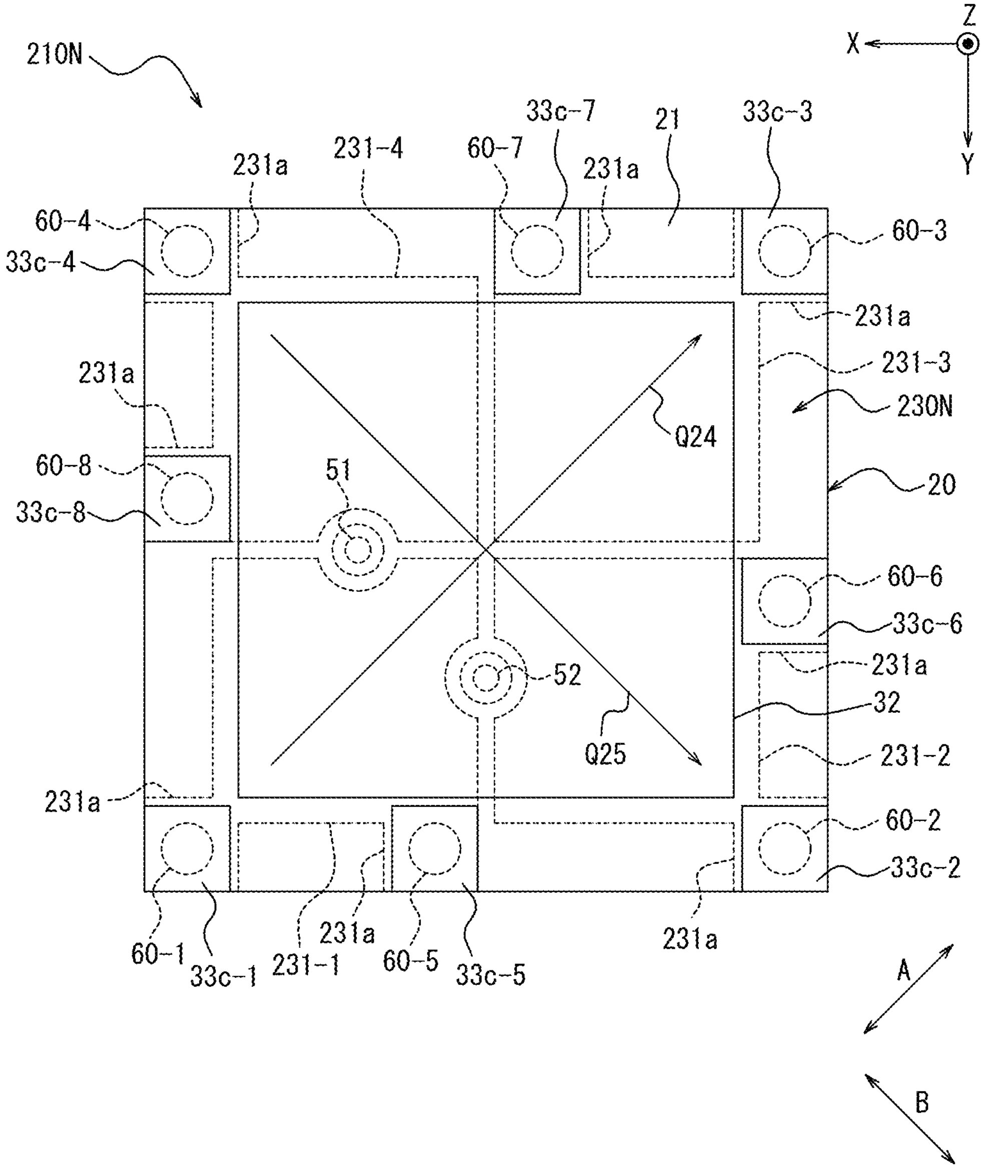
FIG. 35 is a plan view of a resonant structure according to an embodiment.

FIG. 35 is a plan view of a resonant structure 210N according to an embodiment. The explanation below focuses on the differences between the resonant structure 210N and the resonant structure 210 illustrated in FIG. 15. The positions of the connectors 231*a* illustrated in FIG. 16 are indicated by dashed lines in FIG. 35.

In addition to the connecting conductors 60-1 to 60-4, the resonant structure 210N includes connecting conductors 60-5, 60-6, 60-7, 60-8. The resonant structure 210N includes a conducting portion 230N. The conducting portion 230N includes third conductors 33*c*-1, 33*c*-2, 33*c*-3, 33*c*-4, 33*c*-5, 33*c*-6, 33*c*-7, 33*c*-8. Each of the third conductors 33*c*-1 to 33*c*-8 is connected to a different one of the connecting conductors 60-1 to 60-8. The third conductors 33*c*-1 to 33*c*-8 can overlap the connecting conductors 60-1 to 60-8 in the Z-direction.

The connecting conductor 60-5 is located between the connecting conductor 60-1 and the connecting conductor 60-2 in the X-direction. The connector 231*a* illustrated in FIG. 16 is located farther in the negative direction of the Z-axis than the third conductor 33*c*-5. The connector 231*a* located farther in the negative direction of the Z-axis than the third conductor 33*c*-5 connects the connecting conductor 60-5 to the first conductor 231-1. The first conductor 231-1 is connected to the connecting conductor 60-5 in addition to the connecting conductor 60-1.

The connecting conductor 60-6 is located between the connecting conductor 60-2 and the connecting conductor 60-3 in the Y-direction. The connector 231*a* illustrated in FIG. 16 is located farther in the negative direction of the Z-axis than the third conductor 33*c*-6. The connector 231*a* located farther in the negative direction of the Z-axis than the third conductor 33*c*-6 connects the connecting conductor 60-6 to the first conductor 231-2. The first conductor 231-2 is connected to the connecting conductor 60-6 in addition to the connecting conductor 60-2.

The connecting conductor 60-7 is located between the connecting conductor 60-3 and the connecting conductor 60-4 in the X-direction. The connector 231*a* illustrated in FIG. 16 is located farther in the negative direction of the Z-axis than the third conductor 33*c*-7. The connector 231*a* located farther in the negative direction of the Z-axis than the third conductor 33*c*-7 connects the connecting conductor 60-7 to the first conductor 231-3. The first conductor 231-3 is connected to the connecting conductor 60-7 in addition to the connecting conductor 60-3.

The connecting conductor 60-8 is located between the connecting conductor 60-1 and the connecting conductor 60-4 in the Y-direction. The connector 231*a* illustrated in FIG. 16 is located farther in the negative direction of the Z-axis than the third conductor 33*c*-8. The connector 231*a* located farther in the negative direction of the Z-axis than the third conductor 33*c*-8 connects the connecting conductor 60-8 to the first conductor 231-4. The first conductor 231-4 is connected to the connecting conductor 60-8 in addition to the connecting conductor 60-4.

Example of Resonant State

The resonant structure 210N resonates at a first frequency g24 along a first path Q24. The first path Q24 is an apparent current path in the same or similar manner as the first path P1 illustrated in FIG. 5. The resonant structure 210N exhibits an artificial magnetic conductor character relative to electromagnetic waves, at the first frequency g24 and polarized in the A-direction, incident from the outside onto the upper surface 21 of the substrate 20 on which the conducting portion 230N is located.

The resonant structure 210N resonates at a second frequency g25 along a second path Q25. The second path Q25 is an apparent current path in the same or similar manner as the second path P2 illustrated in FIG. 5. The resonant structure 210N exhibits an artificial magnetic conductor character relative to electromagnetic waves, at the second frequency g25 and polarized in the B-direction, incident from the outside onto the upper surface 21 of the substrate 20 on which the conducting portion 230N is located.

The resonant structure 210N is configured symmetrically in the same or similar manner as the resonant structure 210 illustrated in FIG. 15. In the resonant structure 210N with this symmetrical configuration, the length of the first path Q24 and the length of the second path Q25 can be equivalent. The first frequency g24 and the second frequency g25 can be equivalent when the length of the first path Q24 and the length of the second path Q25 are equivalent.

Other Example of Resonant Structure

Figure 36:
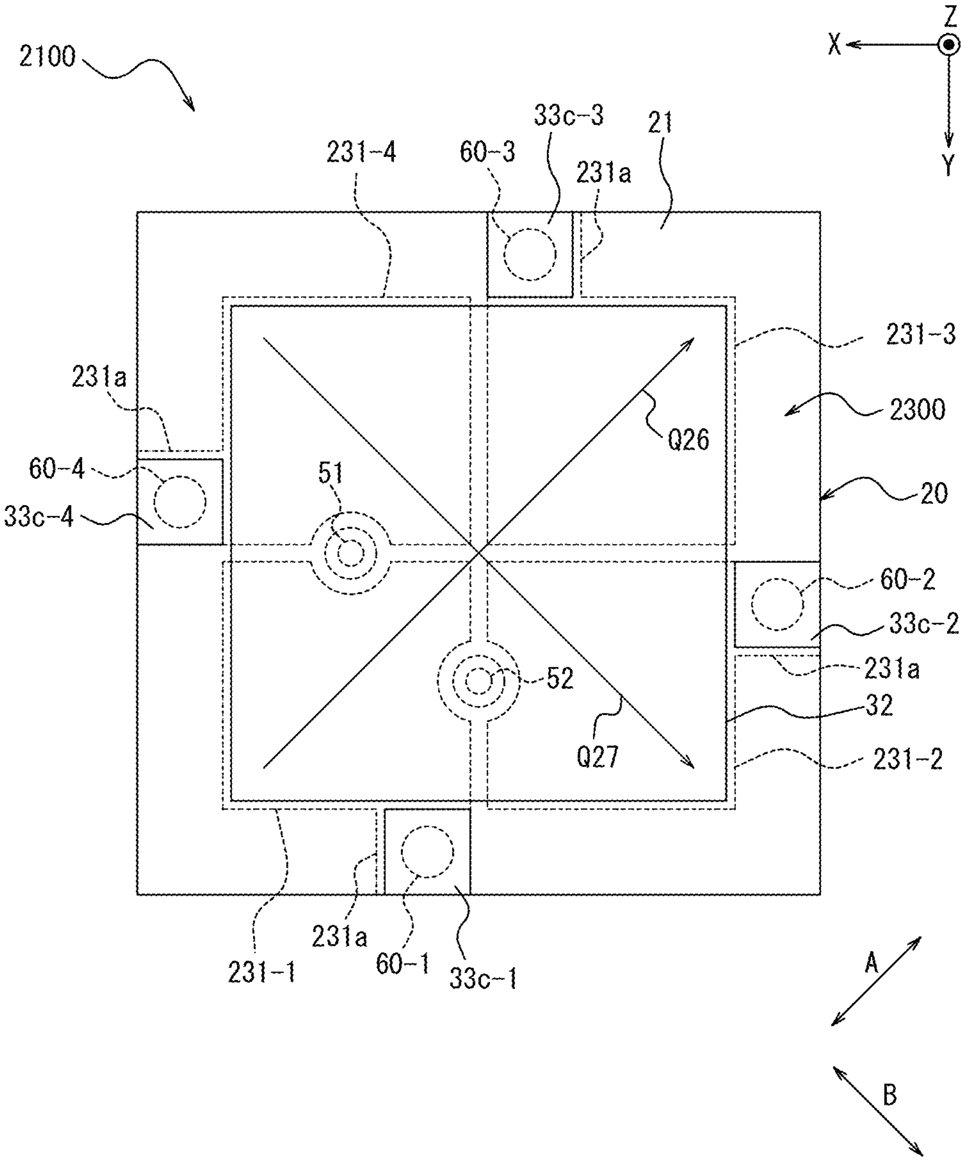
FIG. 36 is a plan view of a resonant structure according to an embodiment.

FIG. 36 is a plan view of a resonant structure 210O according to an embodiment. The explanation below focuses on the differences between the resonant structure 210O and the resonant structure 210 illustrated in FIG. 15. The positions of the connectors 231*a* illustrated in FIG. 16 are indicated by dashed lines in FIG. 36.

The resonant structure 210O includes a conducting portion 230O. The conducting portion 230O includes third conductors 33*c*-1, 33*c*-2, 33*c*-3, and 33*c*-4. Each of the third conductors 33*c*-1 to 33*c*-4 is connected to a different one of the connecting conductors 60-1 to 60-4. The third conductors 33*c*-1 to 33*c*-4 can overlap the connecting conductors 60-1 to 60-4 in the Z-direction.

Of the two corners of the first conductor 231-1 that are farther in the positive direction of the Y-axis, the connecting conductor 60-1 is located near the corner that is farther in the negative direction of the X-axis. Of the two corners of the first conductor 231-2 that are farther in the negative direction of the X-axis, the connecting conductor 60-2 is located near the corner that is farther in the negative direction of the Y-axis. Of the two corners of the first conductor 231-3 that are farther in the negative direction of the Y-axis, the connecting conductor 60-3 is located near the corner that is farther in the positive direction of the X-axis. Of the two corners of the first conductor 231-4 that are farther in the positive direction of the X-axis, the connecting conductor 60-4 is located near the corner that is farther in the positive direction of the Y-axis.

Example of Resonant State

The resonant structure 210O resonates at a first frequency g26 along a first path Q26. The resonant structure 210O exhibits an artificial magnetic conductor character relative to electromagnetic waves, at the first frequency g26 and polarized in the A-direction, incident from the outside onto the upper surface 21 of the substrate 20 on which the conducting portion 230O is located.

The resonant structure 210O resonates at a second frequency g27 along a second path Q27. The resonant structure 210O exhibits an artificial magnetic conductor character relative to electromagnetic waves, at the second frequency g27 and polarized in the B-direction, incident from the outside onto the upper surface 21 of the substrate 20 on which the conducting portion 230O is located.

Other Example of Resonant Structure

Figure 37:
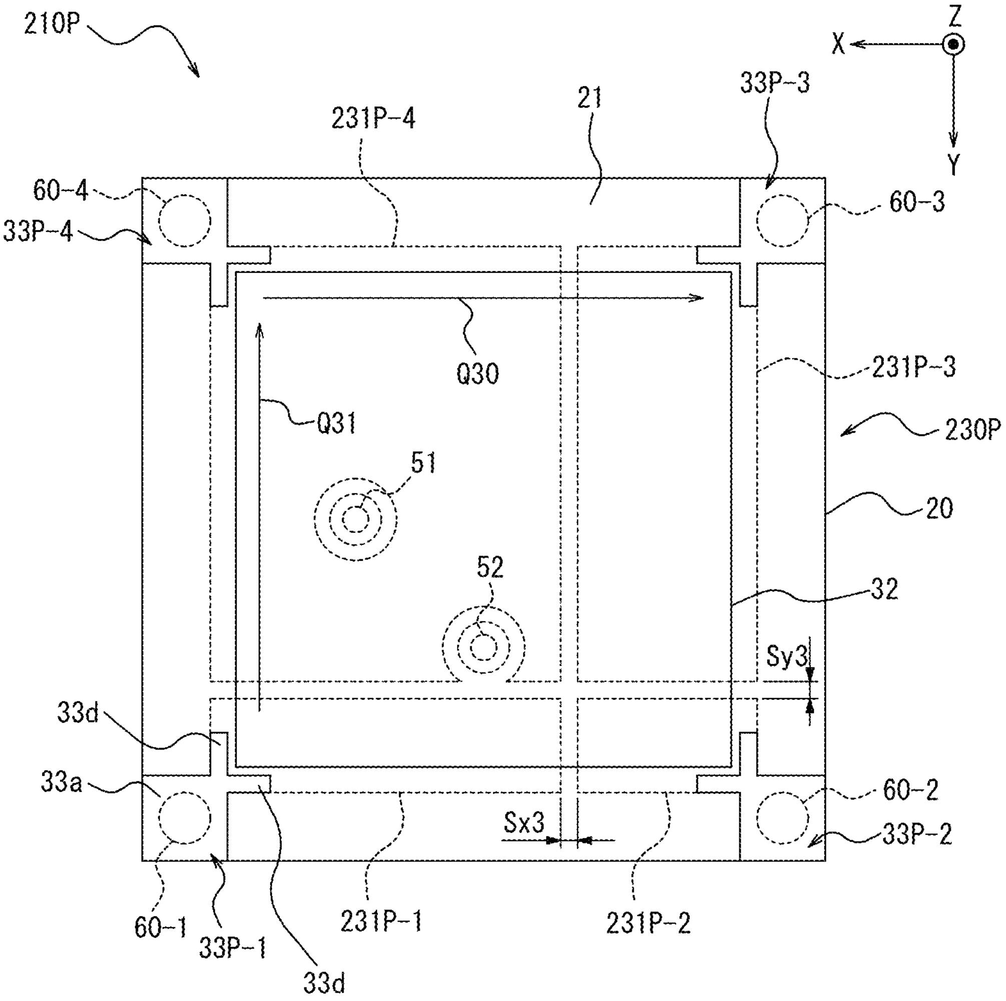
FIG. 37 is a plan view of a resonant structure according to an embodiment.

FIG. 37 is a plan view of a resonant structure 210P according to an embodiment. The explanation below focuses on the differences between the resonant structure 210P and the resonant structure 210 illustrated in FIG. 15.

The resonant structure 210P includes a conducting portion 230P. The conducting portion 230P includes a first conductor 231P-1, a first conductor 231P-2, a first conductor 231P-3, a first conductor 231P-4, a second conductor 32, and third conductors 33P-1, 33P-1, 33P-1, 33P-4. The first conductor 231P-1 to 231P-4 are collectively indicated as the "first conductors 231P" when no particular distinction is made therebetween. The third conductor 33P-1 to 33P-4 are collectively indicated as the "third conductors 33P" when no particular distinction is made therebetween.

The first conductor 231P is substantially rectangular. The ratio between the length of the sides of the first conductor 231P-1 substantially parallel to the X-direction and the length of the sides of the first conductor 231P-2 substantially parallel to the X-direction is approximately 2:1. The ratio between the length of the sides of the first conductor 231P-2 substantially parallel to the Y-direction and the length of the sides of the first conductor 231P-3 substantially parallel to the Y-direction is approximately 1:6.

A gap Sx3 is located between the first conductor 231P-1 and the first conductor 231P-2. The gap Sx3 extends in the Y-direction. A gap Sy3 is located between the first conductor 231P-2 and the first conductor 231P-3. The gap Sy3 extends in the X-direction.

Each third conductor 33P includes the connector 33*a* illustrated in FIG. 15 and two supports 33*d*. The length of the supports 33*d* is less than the length of the supports 33*b* illustrated in FIG. 15. The remaining configuration of the supports 33*d* is the same as or similar to that of the above-described supports 33*b* illustrated in FIG. 15.

First Example of Resonant State

The resonant structure 210P resonates at a first frequency g30 along a first path Q30. The first path Q30 is a portion of the current path traversing the connecting conductors 60-3, 60-4 of the first connecting pair. The resonant structure 210P exhibits an artificial magnetic conductor character relative to electromagnetic waves, at the first frequency g30 and polarized in the X-direction, incident from the outside onto the upper surface 21 of the substrate 20 on which the conducting portion 230P is located.

The resonant structure 210P resonates at a second frequency g31 along a second path Q31. The second path Q31 is a portion of the current path traversing the connecting conductors 60-1, 60-4 of the second connecting pair. The resonant structure 210P exhibits an artificial magnetic conductor character relative to electromagnetic waves, at the second frequency g31 and polarized in the Y-direction, incident from the outside onto the upper surface 21 of the substrate 20 on which the conducting portion 230P is located.

Each of the first conductors 231P-1 to 231P-4 has a different area in the resonant structure 210P. Since each of the first conductors 231P-1 to 231P-4 has a different area, the first frequency g30 in the first path Q30 and the second frequency g31 in the second path Q31 may differ. The first frequency g30 and the second frequency g31 differ in the resonant structure 210P. The width and position of the gaps Sx3, Sy3 may be appropriately adjusted so that the first frequency g30 and the second frequency g31 belong to the same frequency band. The width and position of the gaps Sx3, Sy3 may be appropriately adjusted so that the first frequency g30 and the second frequency g31 belong to different bands.

Second Example of Resonant State

Figure 38:
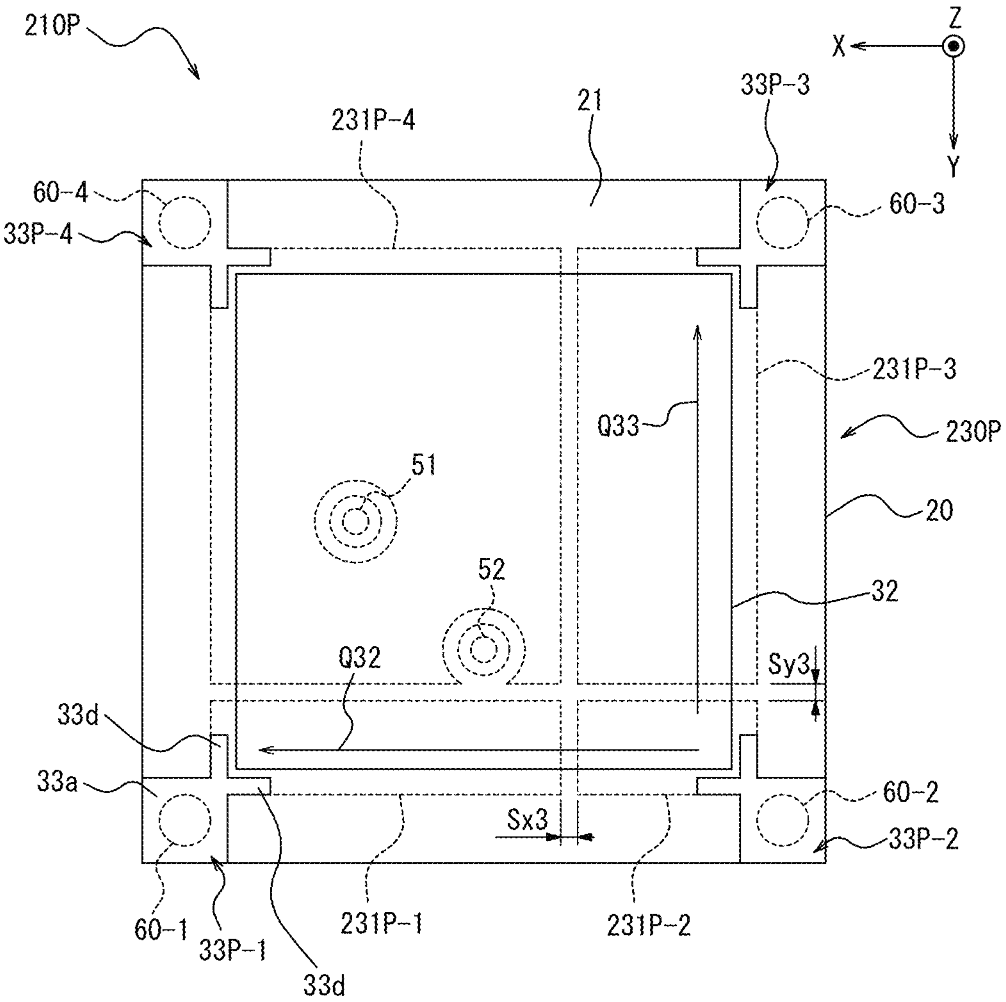
FIG. 38 illustrates a second example of a resonant state in the resonant structure illustrated in FIG. 37.

FIG. 38 illustrates a second example of a resonant state in the resonant structure 210P illustrated in FIG. 37.

The resonant structure 210P resonates at a first frequency g32 along a first path Q32. The first path Q32 is a portion of the current path traversing the connecting conductors 60-1, 60-2 of the first connecting pair. The resonant structure 210P exhibits an artificial magnetic conductor character relative to electromagnetic waves, at the first frequency g32 and polarized in the X-direction, incident from the outside onto the upper surface 21 of the substrate 20 on which the conducting portion 230P is located.

The resonant structure 210P resonates at a second frequency g33 along a second path Q33. The second path Q33 is a portion of the current path traversing the connecting conductors 60-2, 60-3 of the second connecting pair. The resonant structure 210P exhibits an artificial magnetic conductor character relative to electromagnetic waves, at the second frequency g33 and polarized in the Y-direction, incident from the outside onto the upper surface 21 of the substrate 20 on which the conducting portion 230P is located.

Other Example of Resonant Structure

Figure 39:
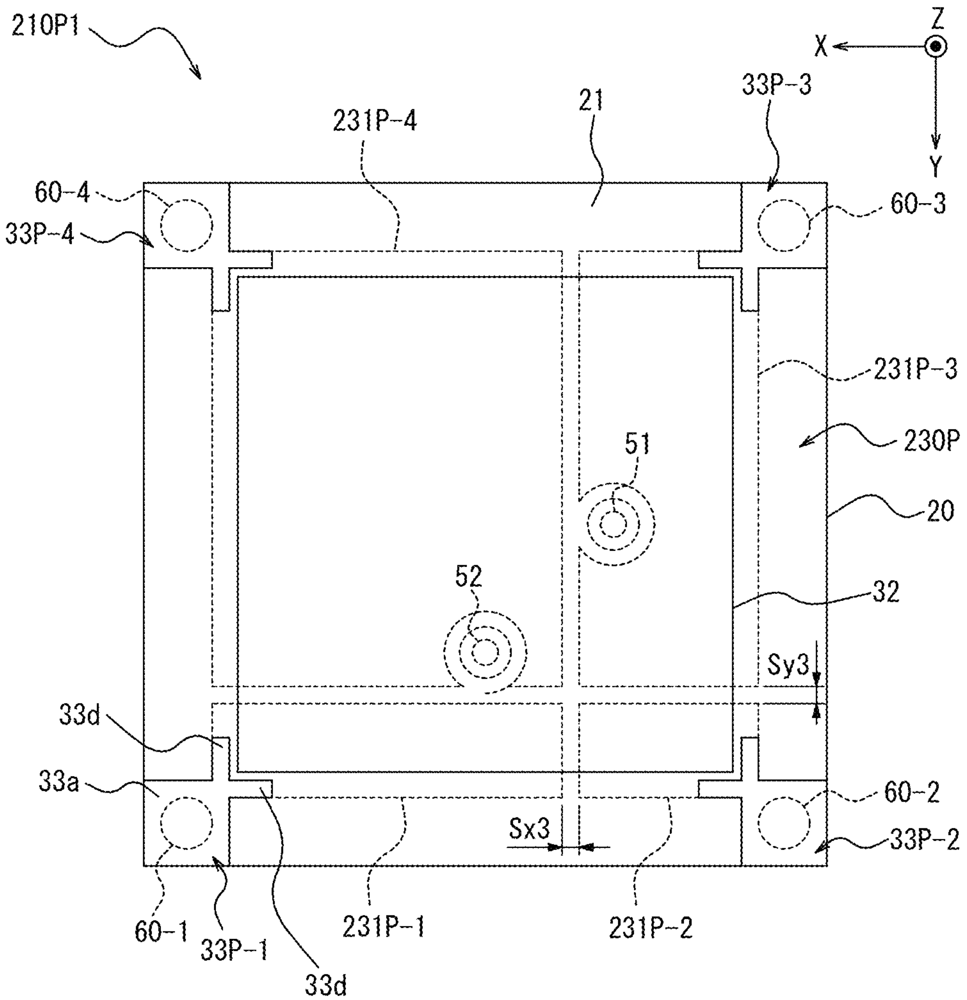
FIG. 39 is a plan view of a resonant structure according to an embodiment.

FIG. 39 is a plan view of a resonant structure 210P1 according to an embodiment. The explanation below focuses on the differences between the resonant structure 210P1 and the resonant structure 210P illustrated in FIG. 37.

In the resonant structure 210P1, the first feeder 51 overlaps the first conductor 231P-3 in the XY plane. In the resonant structure 210P1, the second feeder 52 overlaps the first conductor 231P-4 in the XY plane. The resonant structure 210P1 can resonate in the same or similar manner as the resonant structure 210P illustrated in FIG. 37.

Other Example of Resonant Structure

Figure 40:
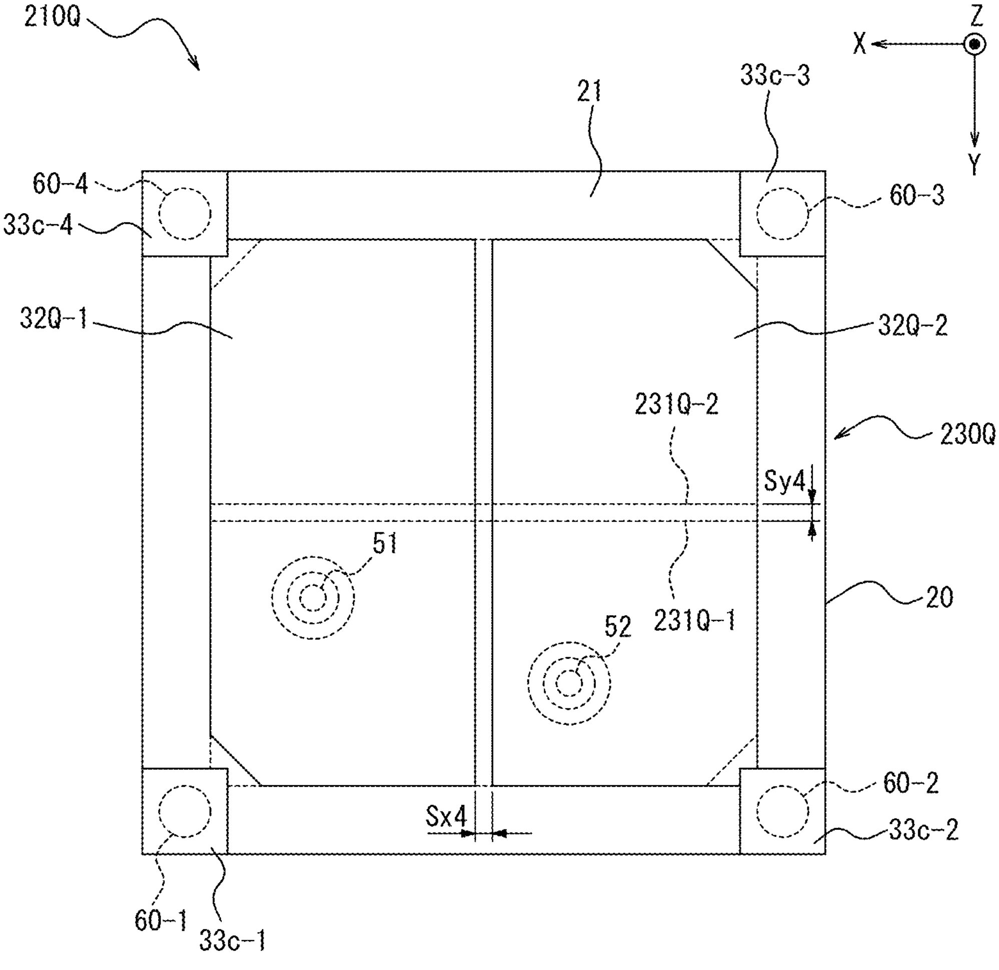
FIG. 40 is a plan view of a resonant structure according to an embodiment.

FIG. 40 is a plan view of a resonant structure 210Q according to an embodiment. The explanation below focuses on the differences between the resonant structure 210Q and the resonant structure 210 illustrated in FIG. 15.

The resonant structure 210Q includes a conducting portion 230Q. The conducting portion 230Q includes first conductors 231Q-1, 231Q-2, second conductors 32Q-1, 32Q-2, a third conductor 33*c*-1, a third conductor 33*c*-2, a third conductor 33*c*-3, and a fourth conductor 33*c*-4.

The conducting portion 230 includes a gap Sx4 and a gap Sy4. The gap Sx4 extends in the Y-direction. The gap Sx4 is located between the second conductor 32Q-1 and the second conductor 32Q-2. The gap Sy4 extends in the X-direction. The gap Sy4 is located between the first conductor 231Q-1 and the first conductor 231Q-2. The width of the gap Sx4 and the width of the gap Sy4 may be appropriately adjusted in accordance with the desired resonance frequency of the resonant structure 210Q.

The first conductor 231Q-1 is substantially rectangular. The first conductor 231Q-1 is located farther in the positive direction of the Y-axis in the conducting portion 230Q. The first conductor 231Q-1 includes a cutout section at the corner opposite the connecting conductor 60-2. The first conductor 231Q-1 is not connected to the connecting conductor 60-2. The first conductor 231Q-1 is connected to the connecting conductor 60-1.

The first conductor 231Q-2 is substantially rectangular. The first conductor 231Q-2 is located farther in the negative direction of the Y-axis in the conducting portion 230Q. The first conductor 231Q-2 includes a cutout section at the corner opposite the connecting conductor 60-4. The first conductor 231Q-2 is not connected to the connecting conductor 60-4. The first conductor 231Q-2 is connected to the connecting conductor 60-3.

The second conductor 32Q-1 is substantially rectangular. The second conductor 32Q-1 is located farther in the positive direction of the X-axis in the conducting portion 230Q. The second conductor 32Q-1 includes a cutout section at the corner opposite the connecting conductor 60-1. The second conductor 32Q-1 is not connected to the connecting conductor 60-1. The second conductor 32Q-1 is connected to the connecting conductor 60-4 via the third conductor 33*c*-4.

The second conductor 32Q-2 is substantially rectangular. The second conductor 32Q-2 is located farther in the negative direction of the X-axis in the conducting portion 230Q. The second conductor 32Q-2 includes a cutout section at the corner opposite the connecting conductor 60-3. The second conductor 32Q-2 is not connected to the connecting conductor 60-3. The second conductor 32Q-2 is connected to the connecting conductor 60-2 via the third conductor 33*c*-2.

Other Example of Resonant Structure

Figure 41:
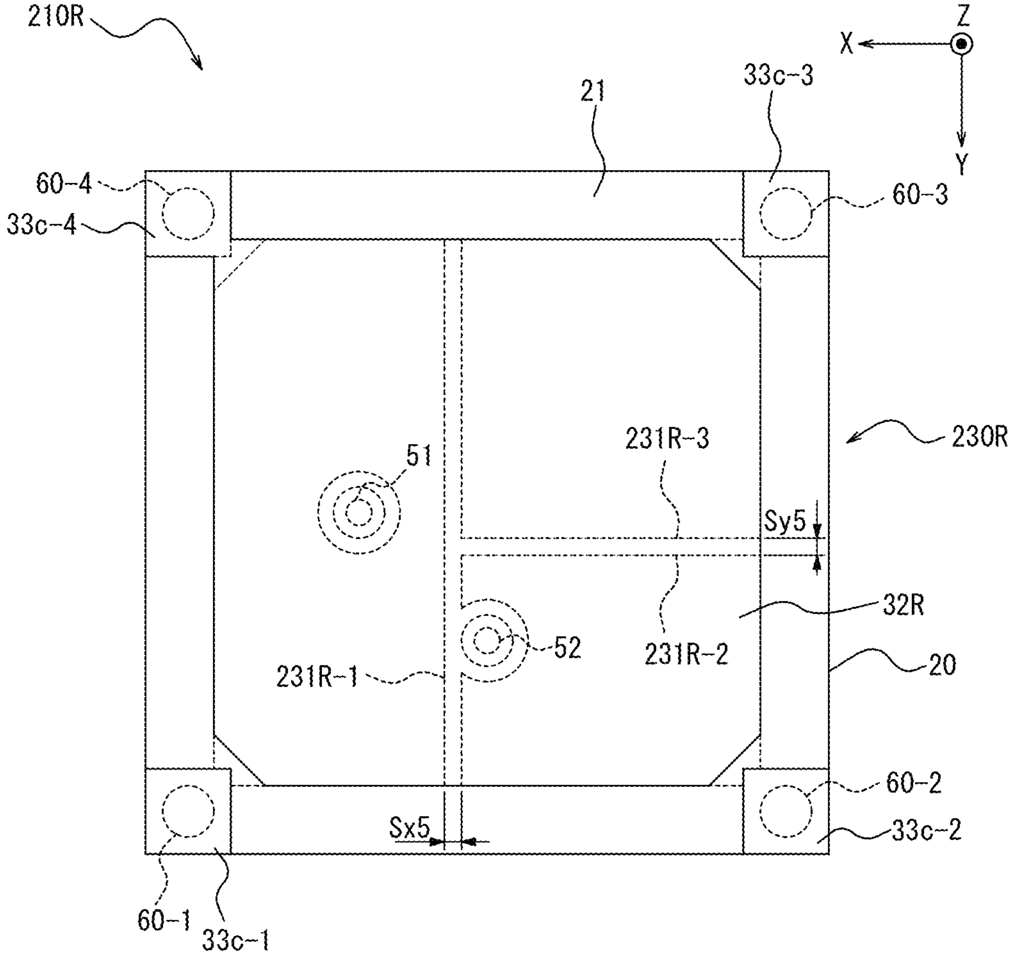
FIG. 41 is a plan view of a resonant structure according to an embodiment.

FIG. 41 is a plan view of a resonant structure 210R according to an embodiment. The explanation below focuses on the differences between the resonant structure 210R and the resonant structure 210 illustrated in FIG. 15.

The resonant structure 210R includes a conducting portion 230R. The conducting portion 230R includes first conductors 231R-1, 231R-2, 231R-3, a second conductor 32R, and a third conductor 33*c*-1, third conductor 33*c*-2, third conductor 33*c*-3, and third conductor 33*c*-4.

The first conductor 231R-1 is substantially rectangular. The first conductor 231R-1 includes a cutout section at the corner opposite the connecting conductor 60-4. The first conductor 231R-1 is not connected to the connecting conductor 60-4. The first conductor 231R-1 is connected to the connecting conductor 60-1.

The first conductors 231R-2, 231R-3 are substantially rectangular. The first conductor 231R-2 is connected to the connecting conductor 60-2. The first conductor 231R-3 is connected to the connecting conductor 60-3.

The ratio between the length of the sides of the first conductor 231R-1 substantially parallel to the X-direction and the length of the sides of the first conductor 231R-2 substantially parallel to the X-direction is approximately 3:4. The ratio between the length of the sides of the first conductor 231R-2 substantially parallel to the Y-direction and the length of the sides of the first conductor 231R-3 substantially parallel to the Y-direction is approximately 3:4.

A gap Sx5 separates the first conductor 231R-1 from the first conductor 231R-2 and the first conductor 231R-3. The gap Sx5 extends in the Y-direction. A gap Sy5 is located between the first conductor 231R-2 and the first conductor 231R-3. The gap Sy5 extends in the X-direction. The gap Sy5 extends from the side of the conducting portion 230R farther in the negative direction of the X-axis to the gap Sx5. The width of the gap Sx5 and the width of the gap Sy5 may be appropriately adjusted in accordance with the desired resonance frequency of the resonant structure 210R.

The second conductor 32R is substantially square. The second conductor 32R includes cutout sections at the corners opposite each of the connecting conductors 60-1 to 60-3. The second conductor 32R is connected neither to the third conductors 33*c*-1 to 33*c*-3 nor to the connecting conductors 60-1 to 60-3. The second conductor 32R is connected to the connecting conductor 60-4 via the third conductor 33*c*-4.

Other Example of Resonant Structure

Figure 42:
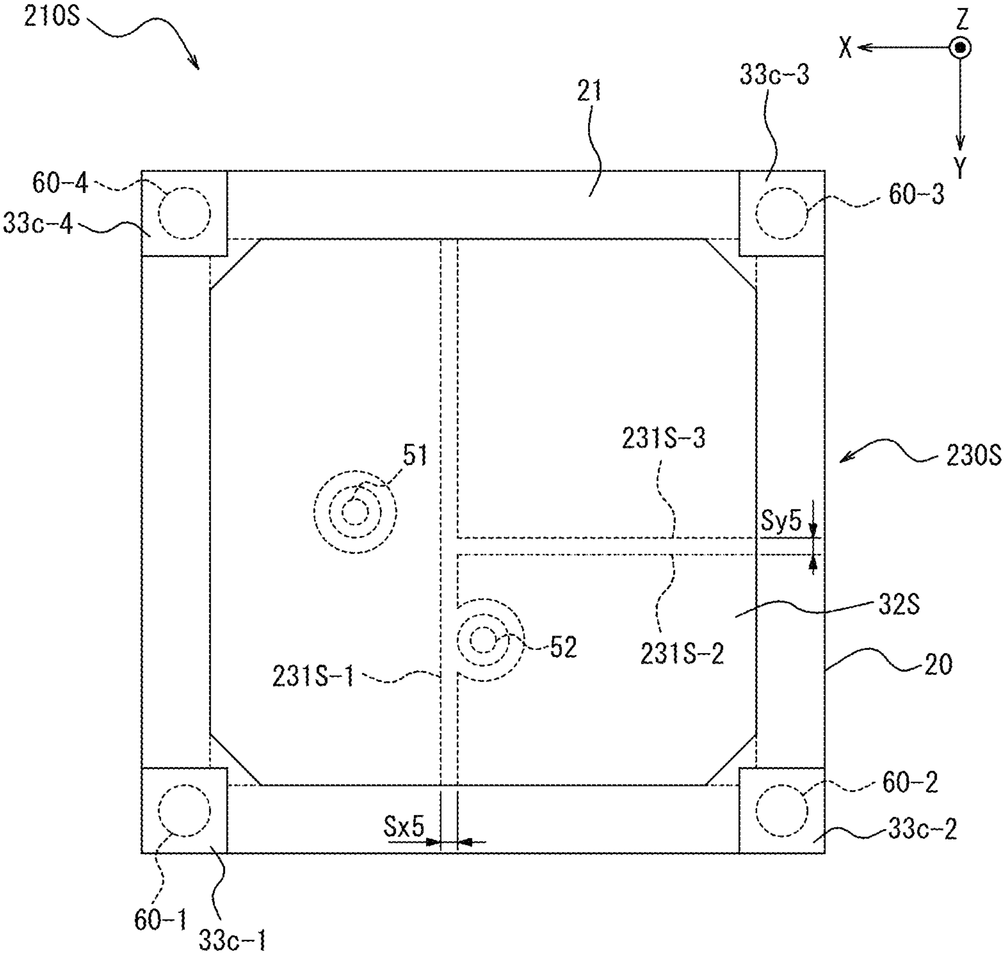
FIG. 42 is a plan view of a resonant structure according to an embodiment.

FIG. 42 is a plan view of a resonant structure 210S according to an embodiment. The explanation below focuses on the differences between the resonant structure 210S and the resonant structure 210 illustrated in FIG. 15.

The resonant structure 210S includes a conducting portion 230S. The conducting portion 230S includes first conductors 231S-1, 231S-2, 231S-3, a second conductor 32S, and third conductors 33*c*-1, 33*c*-2, 33*c*-3, 33*c*-4.

The first conductors 231S-1 to 231S-3 are the same as the first conductors 231R-1 to 231R-3 illustrated in FIG. 41.

The second conductor 32S is substantially square. The second conductor 32S includes cutout sections at the corners opposite each of the connecting conductors 60-1 to 60-4. The second conductor 32S is connected neither to the third conductors 33*c*-1 to 33*c*-4 nor to the connecting conductors 60-1 to 60-4.

Other Example of Resonant Structure

Figure 43:
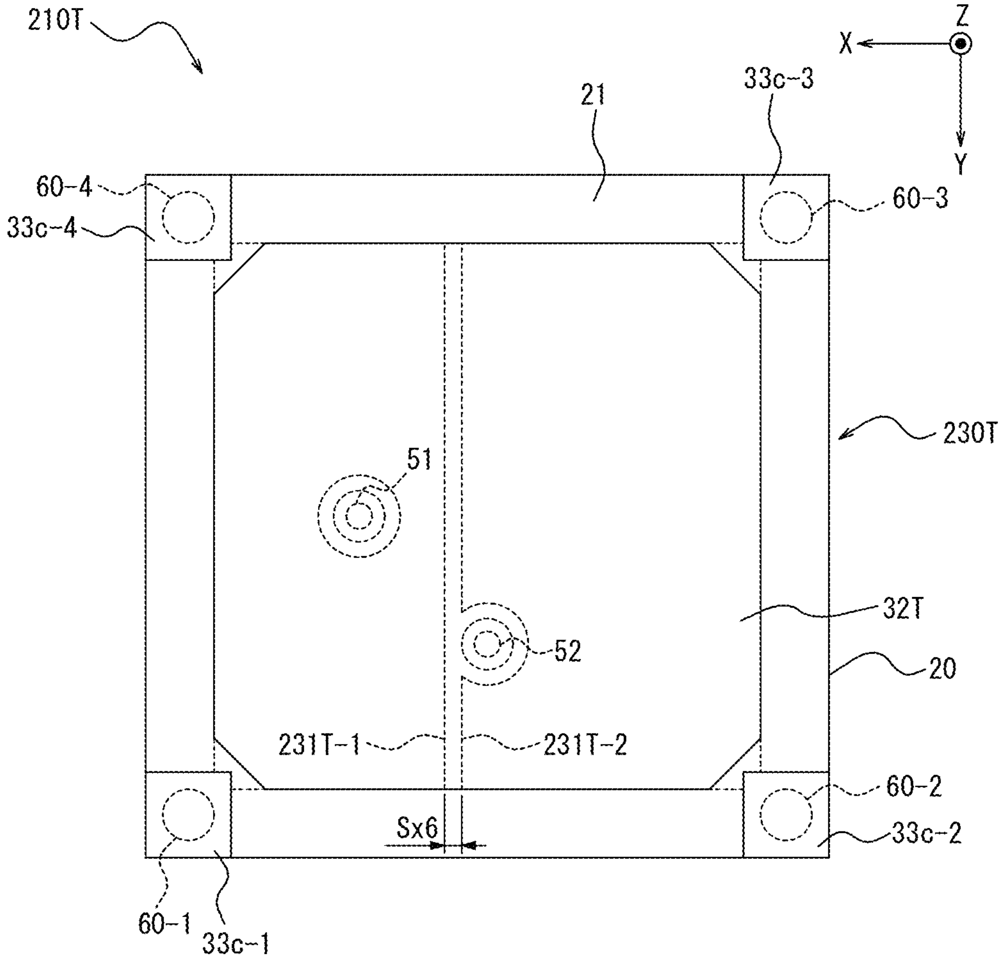
FIG. 43 is a plan view of a resonant structure according to an embodiment.

FIG. 43 is a plan view of a resonant structure 210T according to an embodiment. The explanation below focuses on the differences between the resonant structure 210T and the resonant structure 210 illustrated in FIG. 15.

The resonant structure 210T includes a conducting portion 320T. The conducting portion 320T includes first conductors 231T-1, 231T-2, a second conductor 32T, and third conductors 33*c*-1, 33*c*-2, 33*c*-3, 33*c*-4.

The first conductors 231T-1, 231T-2 are substantially rectangular. The ratio between the length of the sides of the first conductor 231T-1 substantially parallel to the X-direction and the length of the sides of the first conductor 231T-2 substantially parallel to the X-direction is approximately 3:4.

The first conductor 231T-1 is connected to the connecting conductors 60-1, 60-4. The first conductor 231T-2 is connected to the connecting conductors 60-2, 60-3.

A gap Sx6 is located between the first conductor 231T-1 and the first conductor 231T-2. The gap Sx6 extends in the Y-direction. The width and position of the gap Sx6 may be appropriately adjusted in accordance with the desired resonance frequency of the resonant structure 210T.

The second conductor 32T is the same as the second conductor 32S illustrated in FIG. 42. The second conductor 32T is not connected to the connecting conductors 60-1 to 60-4.

Other Example of Resonant Structure

Figure 44:
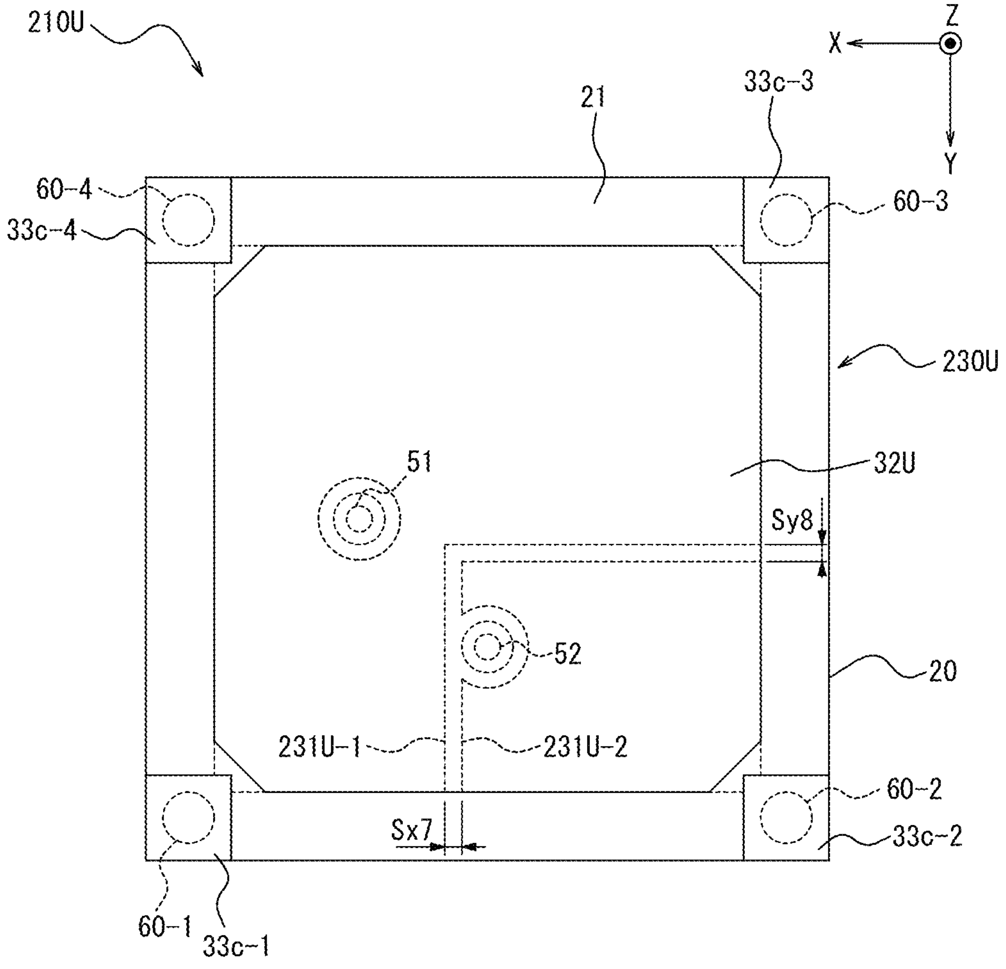
FIG. 44 is a plan view of a resonant structure according to an embodiment.

FIG. 44 is a plan view of a resonant structure 210U according to an embodiment. The explanation below focuses on the differences between the resonant structure 210U and the resonant structure 210 illustrated in FIG. 15.

The resonant structure 210U includes a conducting portion 230U. The conducting portion 230U includes first conductors 231U-1, 231U-2, a second conductor 32U, and third conductors 33*c*-1, 33*c*-2, 33*c*-3, 33*c*-4.

The first conductor 231U-1 is L-shaped. The first conductor 231U-2 is rectangular. The ratio between the length of the side of the first conductor 231U-1 farther in the negative direction of the Y-axis and the length of the side of the first conductor 231U-2 farther in the negative direction of the Y-axis is approximately 3:4. The ratio between the length of the side of the first conductor 231U-1 farther in the negative direction of the X-axis and the length of the side of the first conductor 231U-2 farther in the negative direction of the X-axis is approximately 4:3.

A gap Sx7 and a gap Sx8 are located between the first conductor 231U-1 and the first conductor 231U-2. The gap Sx7 extends in the Y-direction. The gap Sx8 extends in the X-direction. The width and position of the gap Sx7 and the width and position of the gap Sx8 may be appropriately adjusted in accordance with the desired resonance frequency of the resonant structure 210U.

The second conductor 32U is the same as the second conductor 32S illustrated in FIG. 42. The second conductor 32U is not connected to the connecting conductors 60-1 to 60-4.

Example of Resonant Structure

Figure 45:
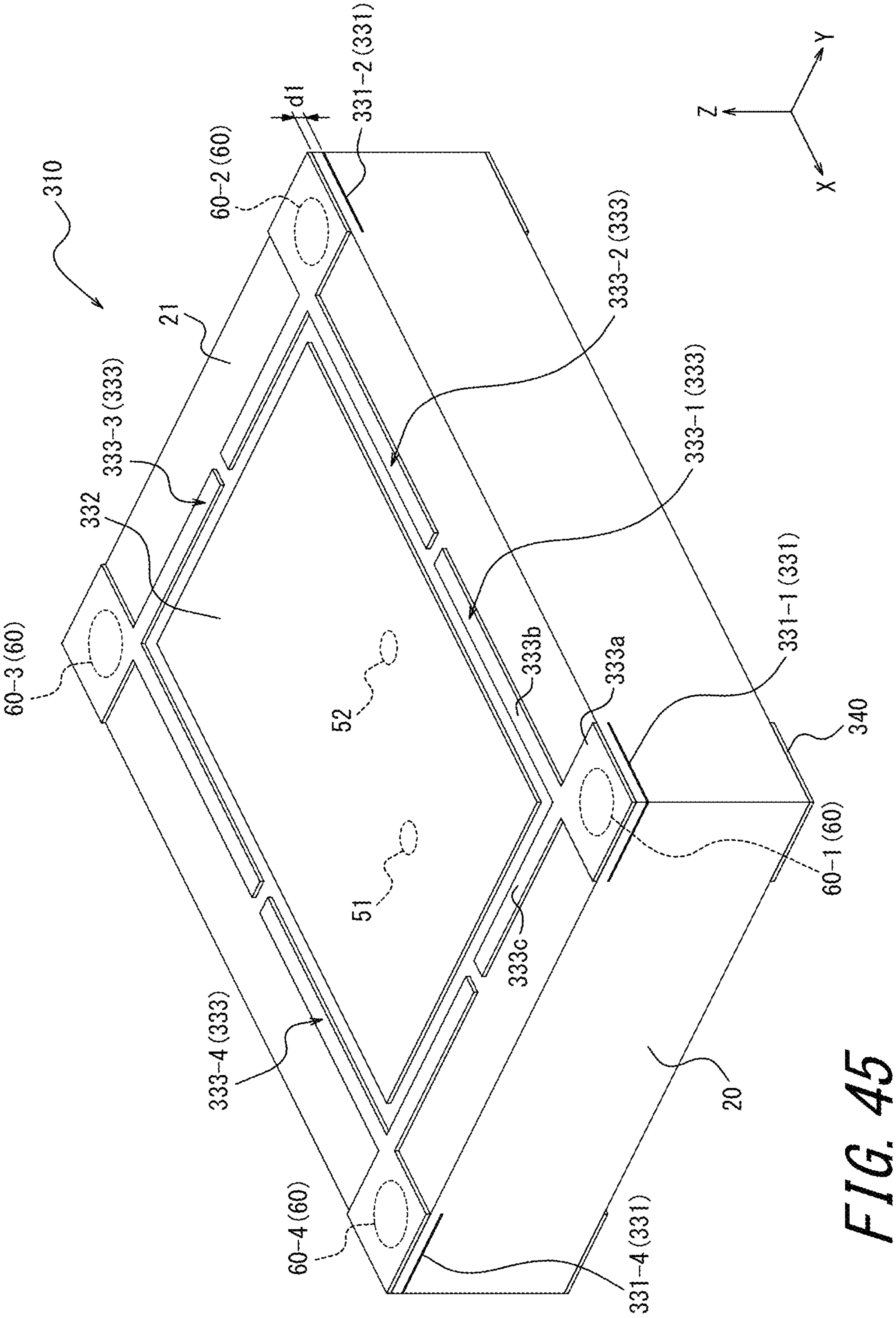
FIG. 45 is a perspective view of a resonant structure according to an embodiment.
Figure 46:
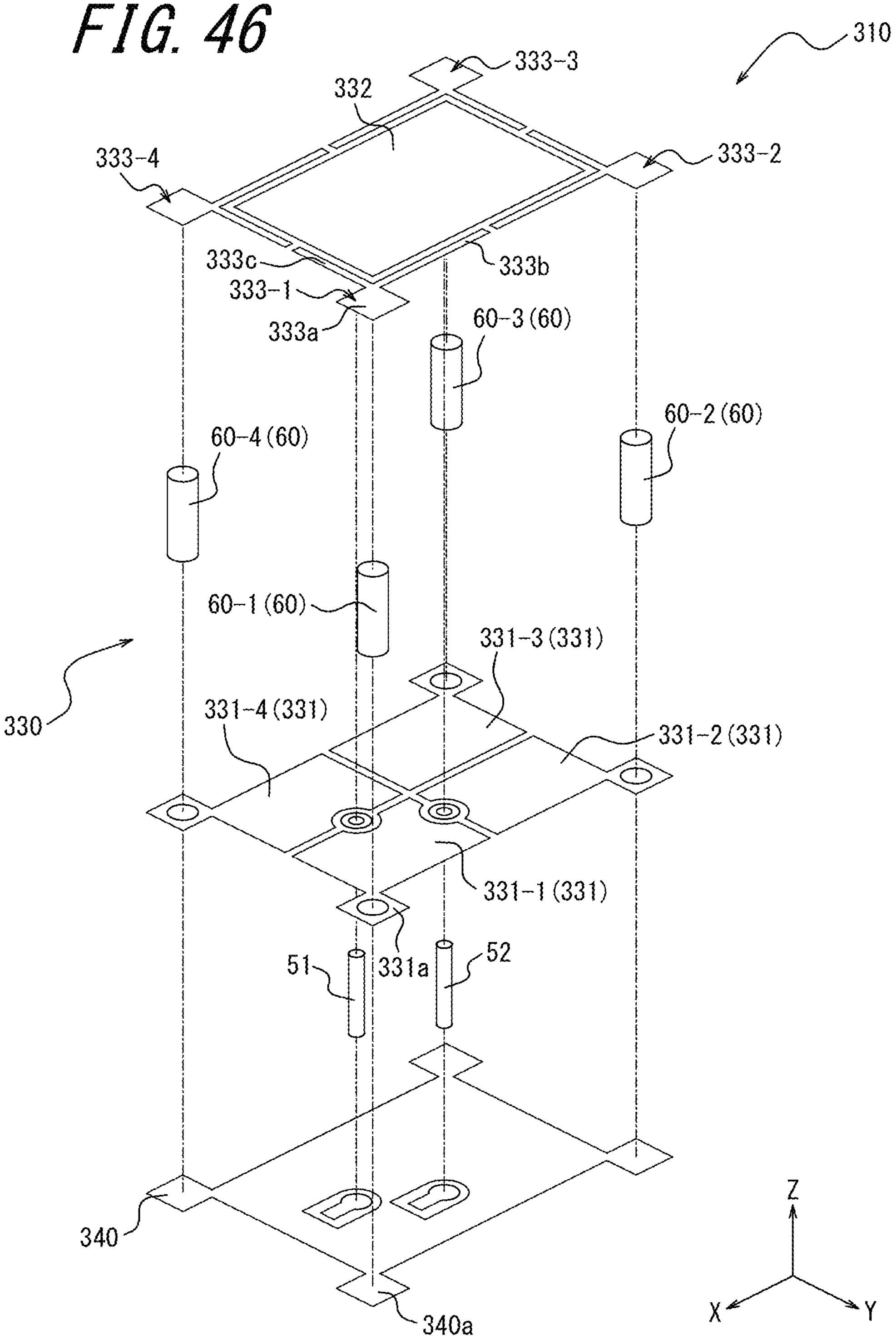
FIG. 46 is an exploded perspective view of a portion of the resonant structure illustrated in FIG. 45.

FIG. 45 is a perspective view of a resonant structure 310 according to an embodiment. FIG. 46 is an exploded perspective view of a portion of the resonant structure 310 illustrated in FIG. 45.

The resonant structure 310 resonates at one or a plurality of resonance frequencies. As illustrated in FIG. 45 and FIG. 46, the resonant structure 310 includes a substrate 20, a conducting portion 330, a ground conductor 340, and connecting conductors 60. The resonant structure 310 may include at least one of a first feeder 51 and a second feeder 52.

The conducting portion 330 illustrated in FIG. 46 is configured to function as a portion of a resonator. The conducting portion 330 extends along the XY plane. The conducting portion 330 has different lengths along the X-direction as a first direction and along the Y-direction as a second direction. The conducting portion 330 has a substantially rectangular shape with long sides substantially parallel to the X-direction and short sides substantially parallel to the Y-direction. The conducting portion 330 is located on an upper surface 21 of the substrate 20, as illustrated in FIG. 45. The resonant structure 310 exhibits an artificial magnetic conductor character relative to electromagnetic waves of a predetermined frequency incident from the outside onto the upper surface 21 of the substrate 20 on which the conducting portion 330 is located.

As illustrated in FIG. 46, the conducting portion 330 includes a first conductor 331-1, a first conductor 331-2, a first conductor 331-3, a first conductor 331-4, at least one second conductor 332, and third conductors 333-1, 333-2, 333-3, 333-4.

The first conductors 331-1 to 331-4 are collectively indicated as the "first conductors 331" when no particular distinction is made therebetween. The number of first conductors 331 included in the conducting portion 330 is not limited to four. The conducting portion 330 may include any number of first conductors 331. The third conductors 333-1 to 333-4 are collectively indicated as the "third conductors 333" when no particular distinction is made therebetween.

The first conductors 331 illustrated in FIG. 46 have the same substantially rectangular shape. The first conductors 331 have a substantially rectangular shape with long sides parallel to the X-direction and short sides parallel to the Y-direction. Each rectangular first conductor 331 includes a connector 331*a* at one of the four corners. The connecting conductors 60 are connected to the connectors 331*a*. However, the first conductors 331 need not include the connectors 331*a*. A portion of the plurality of first conductors 331 may include the connector 331*a*, and another portion may be configured without the connector 331*a*. The connectors 331*a* illustrated in FIG. 46 are quadrangular. The connectors 331*a* are not limited to being quadrangular, however, and may have any shape. Each of the first conductors 331-1 to 331-4 is connected to a different one of the connecting conductors 60-1 to 60-4. Each of the first conductors 331-1 to 331-4 is configured to connect capacitively via the second conductor 332. The remaining configuration of the first conductors 331 is the same as or similar to that of the first conductors 231 illustrated in FIG. 15 and the first conductors 31 illustrated in FIG. 1.

The first conductors 331 illustrated in FIG. 46 are aligned in a rectangular grid extending in the X-direction and Y-direction. For example, the first conductor 331-1 and the first conductor 331-2 are aligned in the X-direction of the rectangular grid extending in the X-direction and Y-direction.

For example, the first conductor 331-3 and the first conductor 331-4 are aligned in the X-direction of the rectangular grid extending in the X-direction and Y-direction. The first conductor 331-1 and the first conductor 331-4 are aligned in the Y-direction of the rectangular grid extending in the X-direction and Y-direction. The first conductor 331-2 and the first conductor 331-3 are aligned in the Y-direction of the rectangular grid extending in the X-direction and Y-direction. The first conductor 331-1 and the first conductor 331-3 are aligned in a third diagonal direction of the rectangular grid extending in the X-direction and Y-direction. The third diagonal direction is a direction along a diagonal line of the rectangular grid. The first conductor 331-2 and the first conductor 331-4 are aligned in a fourth diagonal direction of the rectangular grid extending in the X-direction and Y-direction. The fourth diagonal direction is a direction along a different diagonal line of the rectangular grid than the diagonal line corresponding to the third diagonal direction. The third diagonal direction and the fourth diagonal direction can depend on the ratio between the long sides and short sides of the rectangular grid.

The second conductor 332 illustrated in FIG. 45 is not connected to the connecting conductors 60. As illustrated in FIG. 45, the second conductor 332 has a substantially rectangular shape with long sides parallel to the X-direction and short sides parallel to the Y-direction. The remaining configuration of the second conductor 332 is the same as or similar to that of the second conductor 32 illustrated in FIG. 15.

The third conductors 333-1 to 333-4 illustrated in FIG. 45 are located on the outside of the corners of the second conductor 332 in the XY plane. Each third conductor 333 illustrated in FIG. 45 includes a connector 333*a*, a support 333*b*, and a support 333*c*. The support 333*b* extends from the connector 333*a* along the long sides of the rectangular second conductor 332. The support 333*c* extends from the connector 333*a* along the short sides of the rectangular second conductor 332. The remaining configuration of the third conductors 333 is the same as or similar to that of the third conductors 33 illustrated in FIG. 15.

The ground conductor 340 illustrated in FIG. 46 has a substantially rectangular shape corresponding to the shape of the conducting portion 330. The rectangular ground conductor 340 includes a connector 340*a* at each of the four corners. The connecting conductors 60 are connected to the connectors 340*a*. The connectors 340*a* illustrated in FIG. 46 are quadrangular. The connectors 340*a* are not limited to being quadrangular, however, and may have any shape. The remaining configuration of the ground conductor 340 is the same as or similar to that of the ground conductor 240 illustrated in FIG. 15 and the ground conductor 40 illustrated in FIG. 1.

The first feeder 51 illustrated in FIG. 46 is configured to connect electromagnetically at a position shifted in the X-direction from the central region of the second conductor 332. The first feeder 51 transmits electromagnetic waves only in the X-direction and only receives the X-direction component of electromagnetic waves. When the resonant structure 310 is used as an antenna, the first feeder 51 is configured to supply power to the conducting portion 330 through the second conductor 332. When the resonant structure 310 is used as an antenna or a filter, the first feeder 51 is configured to supply power from the conducting portion 330 through the second conductor 332 to an external device or the like.

The second feeder 52 illustrated in FIG. 46 is configured to connect electromagnetically at a position shifted in the Y-direction from the central region of the second conductor 332. The second feeder 52 transmits electromagnetic waves only in the Y-direction and only receives the Y-direction component of electromagnetic waves. When the resonant structure 310 is used as an antenna, the second feeder 52 is configured to supply power to the conducting portion 330 through the second conductor 332. When the resonant structure 310 is used as an antenna or a filter, the second feeder 52 is configured to supply power from the conducting portion 330 through the second conductor 332 to an external device or the like.

The connecting conductors 60 illustrated in FIG. 46 extend from the ground conductor 340 towards the conducting portion 330. The connecting conductors 60-1 to 60-4 are each connected to the ground conductor 340, one of the first conductors 331-1 to 331-4, and one of the third conductors 333-1 to 333-4.

Example of Resonant State

Figure 47:
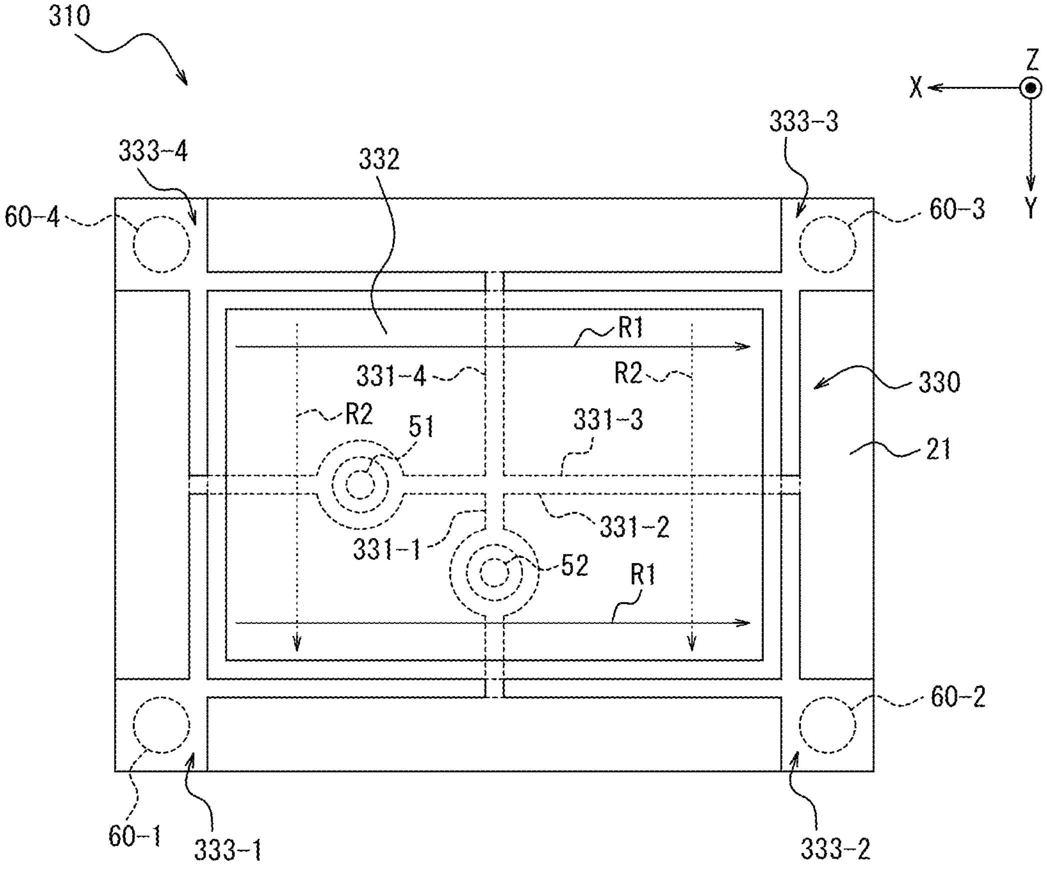
FIG. 47 illustrates an example of a resonant state of the resonant structure illustrated in FIG. 45.

FIG. 47 illustrates an example of a resonant state in the resonant structure 310 illustrated in FIG. 45.

The connecting conductor 60-1 and the connecting conductor 60-4 can become one set. The connecting conductor 60-2 and the connecting conductor 60-3 can become one set. The connecting conductor 60-1 and the connecting conductor 60-2 can become one set. The connecting conductor 60-3 and the connecting conductor 60-4 can become one set.

The set of the connecting conductors 60-1, 60-4 and the set of the connecting conductors 60-2, 60-3 become a first connecting pair aligned along the X-direction as the first direction. The set of the connecting conductors 60-1, 60-4 and the set of the connecting conductors 60-2, 60-3 become a first connecting pair aligned along the X-direction of the rectangular grid in which the first conductors 331 are aligned.

The resonant structure 310 resonates at a first frequency h1 along a first path R1. The first path R1 is a portion of the current path traversing the set of the connecting conductors 60-1, 60-4 and the set of the connecting conductors 60-2, 60-3 of the first connecting pair. This current path includes the ground conductor 340, the first conductors 331-1, 331-4, the first conductors 331-2, 331-3, and the set of the connecting conductors 60-1, 60-4 and set of the connecting conductors 60-2, 60-3 of the first connecting pair. The set of the connecting conductors 60-1, 60-4 and the set of the connecting conductors 60-2, 60-3 are configured to function as a pair of electric walls when the resonant structure 310 resonates at the first frequency h1 along the first path R1. The set of the connecting conductors 60-1, 60-2 and the set of the connecting conductors 60-3, 60-4 are configured to function as a pair of magnetic walls, from the perspective of current flowing over the current path that includes the first path R1, when the resonant structure 310 resonates at the first frequency h1 along the first path R1. By the set of connecting conductors 60-1, 60-4 and the set of connecting conductors 60-2, 60-3 functioning as a pair of electric walls and the set of connecting conductors 60-1, 60-2 and the set of connecting conductors 60-3, 60-4 functioning as a pair of magnetic walls, the resonant structure 310 exhibits an artificial magnetic conductor character relative to electromagnetic waves, at the first frequency h1 and polarized along the first path R1, incident from the outside onto the upper surface 21 of the substrate 20 on which the conducting portion 330 is located.

The set of the connecting conductors 60-1, 60-2 and the set of the connecting conductors 60-3, 60-4 become a second connecting pair aligned along the Y-direction as the second direction. The set of the connecting conductors 60-1, 60-2 and the set of the connecting conductors 60-3, 60-4 become a second connecting pair aligned along the Y-direction of the rectangular grid in which the first conductors 331 are aligned.

The resonant structure 310 resonates at a second frequency h2 along a second path R2. The second path R2 is a portion of the current path traversing the set of the connecting conductors 60-1, 60-2 and the set of the connecting conductors 60-3, 60-4 of the second connecting pair. This current path includes the ground conductor 340, the first conductors 331-1, 332-2, the first conductors 331-3, 331-4, and the set of the connecting conductors 60-1, 60-2 and set of the connecting conductors 60-3, 60-4 of the second connecting pair. The set of the connecting conductors 60-1, 60-2 and the set of the connecting conductors 60-3, 60-4 are configured to function as a pair of electric walls when the resonant structure 310 resonates at the second frequency h2 along the second path R2. The set of the connecting conductors 60-1, 60-4 and the set of the connecting conductors 60-2, 60-3 are configured to function as a pair of magnetic walls, from the perspective of current flowing over the current path that includes the second path R2, when the resonant structure 310 resonates at the second frequency h2 along the second path R2. By the set of connecting conductors 60-1, 60-2 and the set of connecting conductors 60-3, 60-4 functioning as a pair of electric walls and the set of connecting conductors 60-1, 60-4 and the set of connecting conductors 60-2, 60-3 functioning as a pair of magnetic walls, the resonant structure 310 exhibits an artificial magnetic conductor character relative to electromagnetic waves, at the second frequency h2, incident from the outside onto the upper surface 21 of the substrate 20 on which the conducting portion 330 is located.

In the resonant structure 310, the length of the rectangular conducting portion 330 along the X-direction as the first direction and the length of the conducting portion 330 along the Y-direction as the second direction differ. Since the length of the conducting portion 330 along the X-direction and the length of the conducting portion 330 along the Y-direction differ, the length of the first path R1 and the length of the second path R2 differ. As a result of the length of the first path R1 and the length of the second path R2 differing, the first frequency h1 and the second frequency h2 differ. For example, when the length of the conducting portion 330 along the X-direction is greater than the length of the conducting portion 330 along the Y-direction, then the length of the first path R1 is greater than the length of the second path R2, as illustrated in FIG. 47. The first frequency h1 is therefore less than the second frequency h2.

The length of the conducting portion 330 along the X-direction as the first direction and the length of the conducting portion 330 along the Y-direction as the second direction in the resonant structure 310 may be appropriately adjusted in accordance with the desired resonance frequency of the resonant structure 310.

For example, the length of the conducting portion 330 along the X-direction and the length of the conducting portion 330 along the Y-direction may be appropriately adjusted so that the first frequency h1 and the second frequency h2 belong to the same frequency band. As the difference between the length of the conducting portion 330 along the X-direction and the length of the conducting portion 330 along the Y-direction is smaller, the difference between the first frequency h1 and the second frequency h2 decreases.

For example, the length of the conducting portion 330 along the X-direction and the length of the conducting portion 330 along the Y-direction may be appropriately adjusted so that the first frequency h1 and the second frequency h2 belong to different frequency bands. As the difference between the length of the conducting portion 330 along the X-direction and the length of the conducting portion 330 along the Y-direction is larger, the difference between the first frequency h1 and the second frequency h2 increases.

The resonant structure 310 can be a filter that removes frequencies other than the first frequency h1 and the second frequency h2. The resonant structure 310 can be a filter that removes frequencies other than two different frequencies.

When the resonant structure 310 as a filter includes the first feeder 51, then the resonant structure 310 can supply power corresponding to electromagnetic waves of the first frequency h1 to an external device or the like over the first path R1 via the first feeder 51. When the resonant structure 310 as a filter includes the second feeder 52, then the resonant structure 310 can supply power corresponding to electromagnetic waves of the second frequency h2 to an external device or the like over the second path R2 via the second feeder 52.

The resonant structure 310 can be an antenna that emits electromagnetic waves of the first frequency h1 and the second frequency h2. The resonant structure 310 can be a dual-frequency antenna. A dual-frequency antenna is an antenna that emits electromagnetic waves of two different frequencies.

The resonant structure 310 as a dual-frequency antenna is configured to supply power from the first feeder 51 to the conducting portion 330 when emitting electromagnetic waves of the first frequency h1. The first feeder 51 is configured to induce current in the first path R1 along the X-direction as the first direction. The resonant structure 310 as a dual-frequency antenna is configured to supply power from the second feeder 52 to the conducting portion 330 when emitting electromagnetic waves of the second frequency h2. The second feeder 52 is configured to induce current in the second path R2 along the Y-direction as the second direction.

<Simulation Results>

Figure 48:
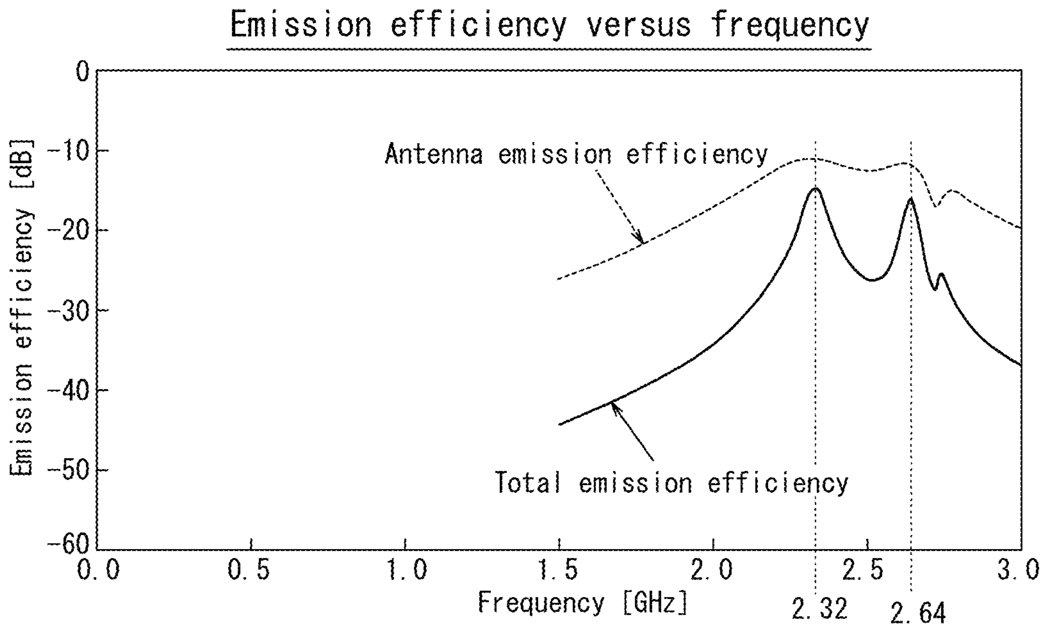
FIG. 48 is a graph illustrating a first example of emission efficiency versus frequency of the resonant structure illustrated in FIG. 45.
Figure 49:
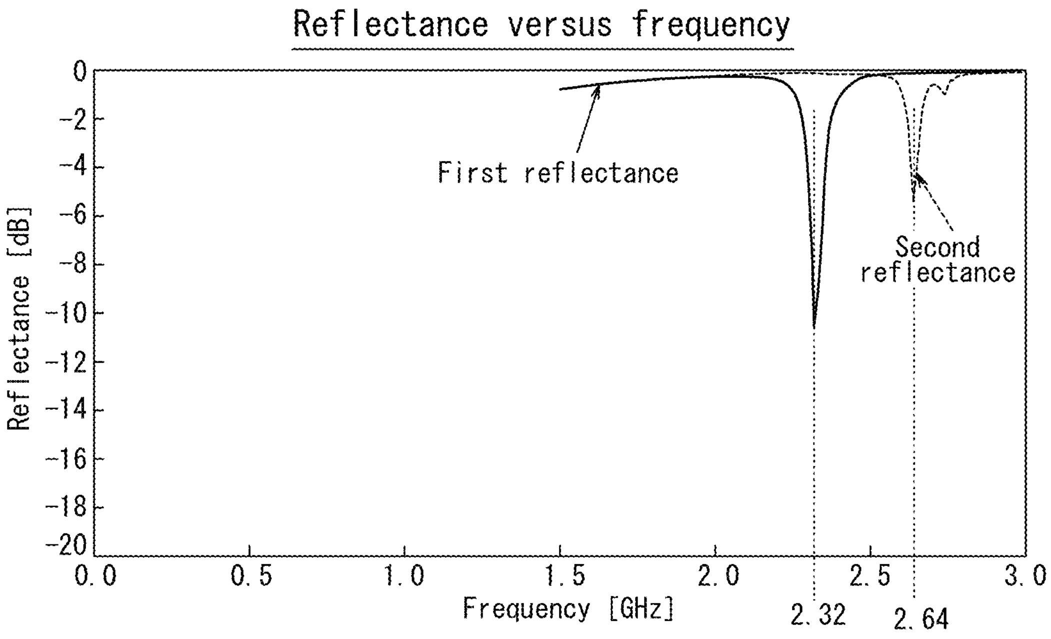
FIG. 49 is a graph illustrating an example of reflectance versus frequency of the resonant structure illustrated in FIG. 45.

FIG. 48 is a graph illustrating an example of emission efficiency versus frequency of the resonant structure 310 illustrated in FIG. 45. FIG. 49 is a graph illustrating an example of reflectance versus frequency of the resonant structure 310 illustrated in FIG. 45. The data illustrated in FIG. 48 and FIG. 49 were obtained by simulation. The resonant structure 310 having the conducting portion 330 with a size of 4.2 mm×6.2 mm illustrated in FIG. 47 was used in the simulation. The ground conductor 340 of the resonant structure 310 was placed facing the metal plate in the simulation. The metal plate measured 100 mm×100 mm in the XY plane. The resonant structure 310 was placed in the central region of the metal plate.

The solid line in FIG. 48 indicates the total emission efficiency relative to the frequency. The dashed line in FIG. 48 indicates the antenna emission efficiency relative to the frequency.

The resonant structure 310 enters a resonant state at the frequencies where the total emission efficiency in FIG. 48 exhibits peaks. The resonance frequencies in the simulation are 2.32 GHz and 2.64 GHz. The antenna emission efficiency exhibits a peak when the frequency is 2.32 GHz and 2.64 GHz. When the frequency is 2.32 GHz and 2.64 GHz, the resonant structure 310 can emit electromagnetic waves as an antenna. The frequency 2.32 GHz corresponds to the above-described first frequency h1. The frequency 2.64 GHz corresponds to the above-described second frequency h2.

The solid line in FIG. 49 indicates a first reflectance. The first reflectance is the ratio of the power that is not emitted from the conducting portion 330, but rather reflected back from the conducting portion 330 to the first feeder 51, among the power supplied from the first feeder 51 to the conducting portion 330. The dashed line in FIG. 49 indicates a second reflectance. The second reflectance is the ratio of the power that is not emitted from the conducting portion 330, but rather reflected from the conducting portion 330 back to the second feeder 52, among the power supplied from the second feeder 52 to the conducting portion 330.

As illustrated in FIG. 49, the first reflectance exhibits a local minimum when the frequency is 2.32 GHz. The local minimum of the first reflectance at 2.32 GHz indicates that 2.32 GHz electromagnetic waves are emitted by power from the first feeder 51. The frequency 2.32 GHz corresponds to the above-described first frequency h1.

As illustrated in FIG. 49, the second reflectance exhibits a local minimum when the frequency is 2.64 GHz. The local minimum of the second reflectance at 2.64 GHz indicates that 2.64 GHz electromagnetic waves are emitted by power from the second feeder 52. The frequency 2.64 GHz corresponds to the above-described second frequency h2.

Example of Resonant Structure

Figure 50:
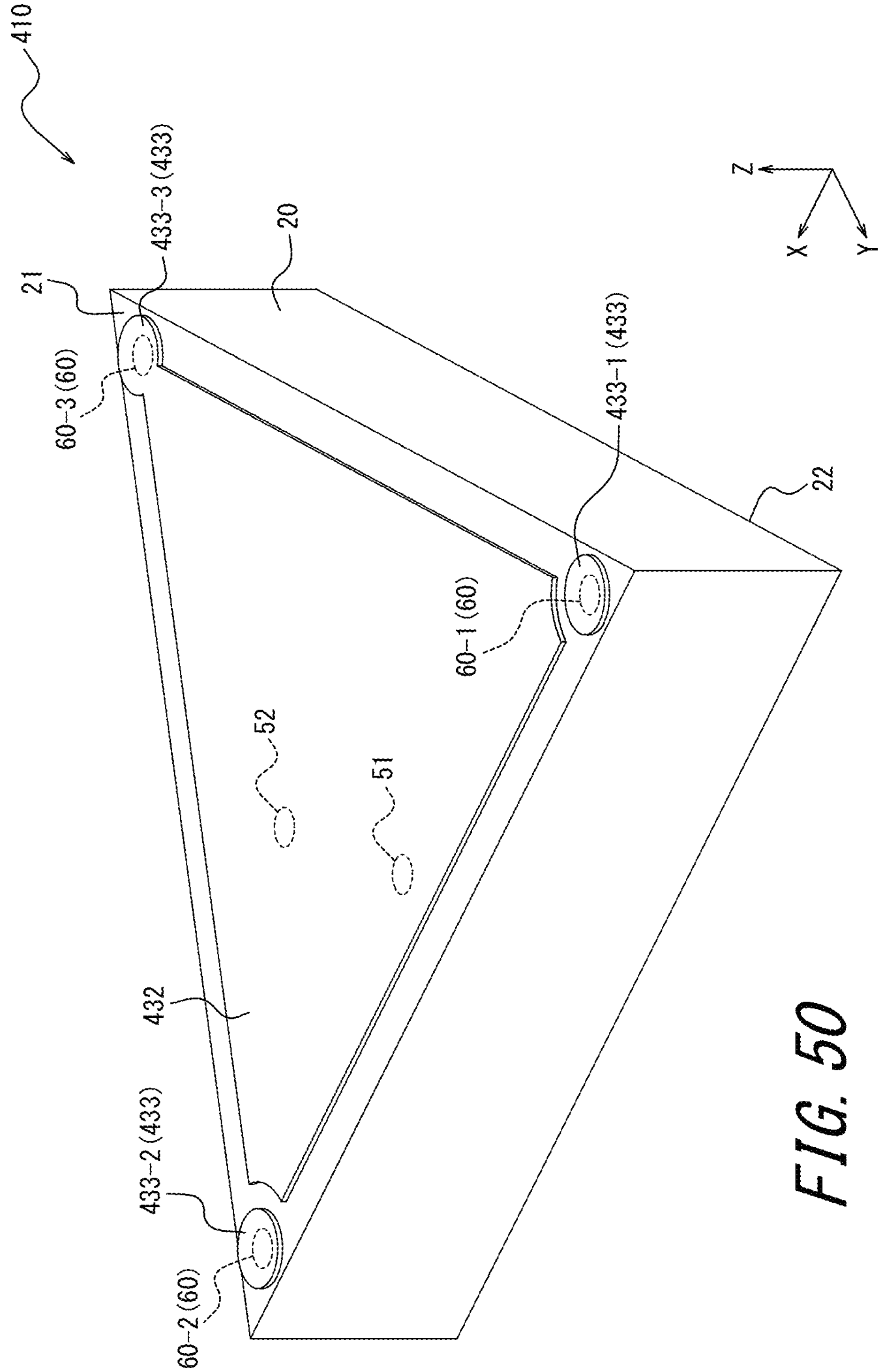
FIG. 50 is a perspective view of a resonant structure according to an embodiment.
Figure 51:
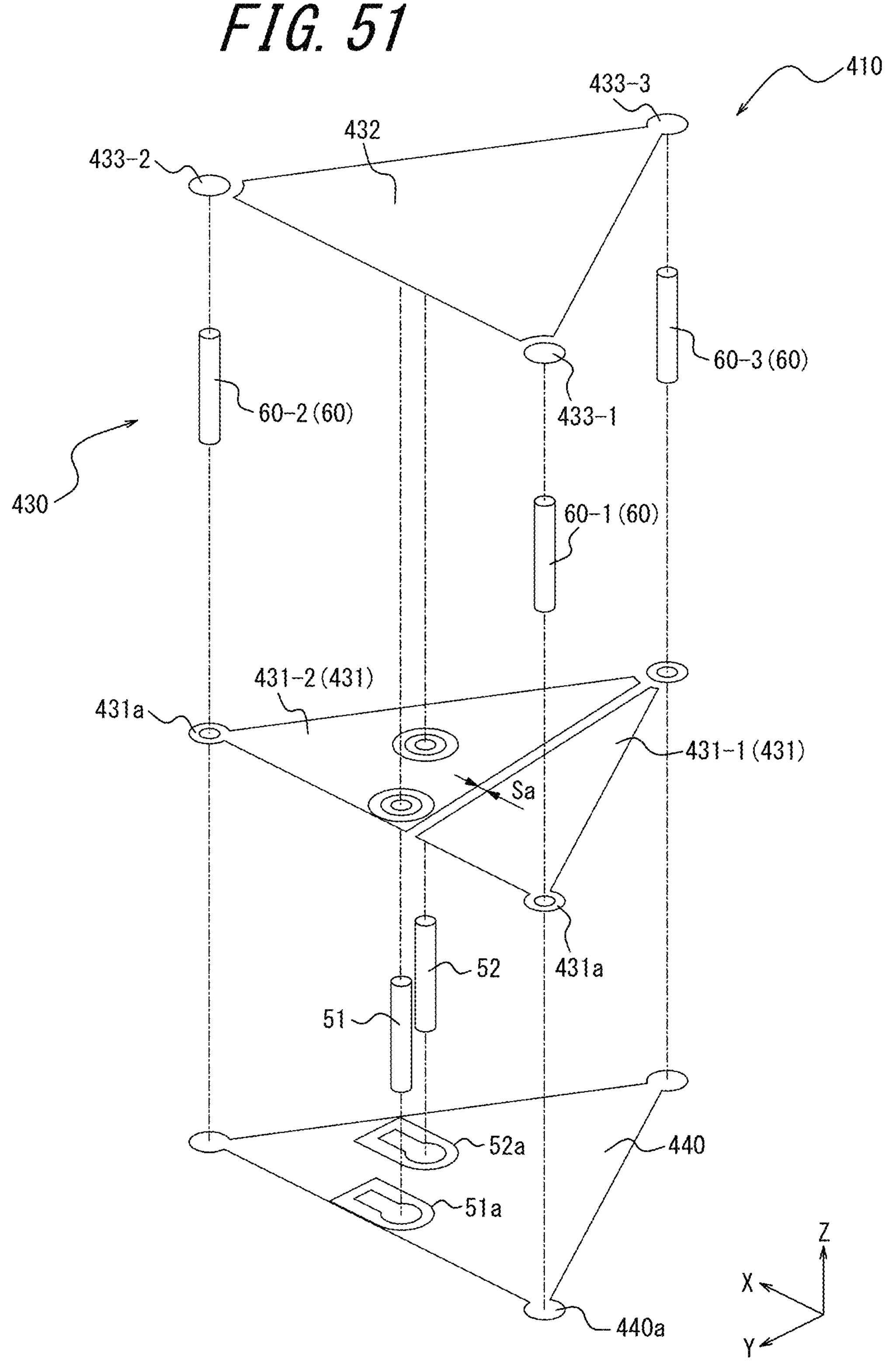
FIG. 51 is an exploded perspective view of a portion of the resonant structure illustrated in FIG. 50.

FIG. 50 is a perspective view of a resonant structure 410 according to an embodiment. FIG. 51 is an exploded perspective view of a portion of the resonant structure 410 illustrated in FIG. 50.

The resonant structure 410 resonates at one or a plurality of resonance frequencies. As illustrated in FIG. 50 and FIG. 51, the resonant structure 410 includes a substrate 20, a conducting portion 430, a ground conductor 440, and connecting conductors 60-1, 60-2, 60-3. The resonant structure 410 may include at least one of a first feeder 51 and a second feeder 52.

The conducting portion 430 illustrated in FIG. 51 is configured to function as a portion of a resonator. The conducting portion 430 extends along the XY plane. The conducting portion 430 is positioned on an upper surface 21 of the substrate 20, as illustrated in FIG. 50. The resonant structure 410 exhibits an artificial magnetic conductor character relative to electromagnetic waves of a predetermined frequency incident from the outside onto the upper surface 21 of the substrate 20 on which the conducting portion 430 is located.

As illustrated in FIG. 51, the conducting portion 430 is substantially an equilateral triangle. As illustrated in FIG. 51, the conducting portion 430 includes first conductors 431-1, 431-2, at least one second conductor 432, and third conductors 433-1, 433-2, 433-3.

The first conductors 431-1, 431-2 are collectively indicated as the "first conductors 431" when no particular distinction is made therebetween. The third conductors 433-1 to 433-3 are collectively indicated as the "third conductors 433" when no particular distinction is made therebetween.

The first conductors 431-1, 431-2 illustrated in FIG. 51 are substantially triangular. The triangular first conductor 431-1 includes a connector 431*a*, to which the connecting conductor 60-1 connects, at one of the three corners. The first conductor 431-1 is connected to the connecting conductor 60-1. The triangular first conductor 431-2 includes a connector 431*a*, to which the connecting conductor 60-2 connects, at one of the three corners. The first conductor 431-2 is connected to the connecting conductor 60-2. The connectors 431*a* illustrated in FIG. 51 are circular. The connectors 431*a* are not limited to being circular, however, and may have any shape.

The ratio between the length of the base, substantially parallel to the X-direction, of the first conductor 431-1 to the length of the base, substantially parallel to the X-direction, of the first conductor 431-2 in FIG. 51 is approximately 3:2. A gap Sa is located between the first conductor 431-1 and the first conductor 431-2. The gap Sa extends from between the base, substantially parallel to the X-direction, of the first conductor 431-2 and the base, substantially parallel to the X-direction, of the first conductor 431-2 in the direction towards the connecting conductor 60-3. The width and position of the gap Sa may be appropriately adjusted in accordance with the desired resonance frequency of the resonant structure 410.

The first conductors 431 are located inside the substrate 20. The distance between the first conductors 431 and the second conductor 432 may be approximately the distance d1 illustrated in FIG. 17. The first conductor 431-1 and the first conductor 431-2 can be configured to connect capacitively via the second conductor 432. The remaining configuration of the first conductors 431 is the same as or similar to that of the first conductors 31 illustrated in FIG. 1 and the first conductors 231 illustrated in FIG. 16.

The second conductor 432 illustrated in FIG. 51 is substantially an equilateral triangle that includes a base substantially parallel to the X-direction. The second conductor 432 may, however, have any shape corresponding to the overall shape of the resonant structure 410. The second conductor 432 is located on the upper surface 21 of the substrate 20, as illustrated in FIG. 50. The second conductor 432 is connected to the connecting conductor 60-3 via the third conductor 433-3.

The third conductors 433 illustrated in FIG. 50 are located on the upper surface 21 of the substrate 20. Each of the third conductors 433-1 to 433-3 is connected to a different one of the connecting conductors 60-1 to 60-3. The third conductors 433 illustrated in FIG. 50 are circular. The third conductors 433 may, however, have any shape.

The third conductors 433-1, 433-2 illustrated in FIG. 50 are located on the outside of the two corners at the ends of the side, along the X-direction, of the second conductor 432 that is substantially an equilateral triangle. The third conductors 433-1, 433-2 are not connected to the second conductor 432.

The third conductor 433-3 illustrated in FIG. 50 is located on the outside of the corner located farther in the negative direction of the Y-axis among the three corners of the second conductor 432 that is substantially an equilateral triangle. The third conductor 433-3 is connected to the second conductor 432.

The ground conductor 440 illustrated in FIG. 51 is substantially an equilateral triangle. The triangular ground conductor 440 includes a connector 440*a* at each of the three corners. The connecting conductors 60 are connected to the connectors 440*a*. The connectors 440*a* illustrated in FIG. 51 are circular. The connectors 440*a* are not limited to being circular, however, and may have any shape. The ground conductor 440 may have any shape in accordance with the shape of the conducting portion 430. The remaining configuration of the ground conductor 440 illustrated in FIG. 51 is the same as or similar to that of the ground conductor 240 illustrated in FIG. 16.

The first feeder 51 illustrated in FIG. 51 is configured to connect electromagnetically to the second conductor 432. When the resonant structure 410 is used as an antenna, the first feeder 51 is configured to supply power to the conducting portion 430 through the second conductor 432. When the resonant structure 410 is used as an antenna or a filter, the first feeder 51 is configured to supply power from the conducting portion 430 through the second conductor 432 to the outside.

The second feeder 52 illustrated in FIG. 51 is configured to connect electromagnetically to the second conductor 432 at a different position than the first feeder 51. When the resonant structure 410 is used as an antenna, the second feeder 52 is configured to supply power to the conducting portion 430 through the second conductor 432. When the resonant structure 410 is used as an antenna or a filter, the second feeder 52 is configured to supply power from the conducting portion 430 through the second conductor 432 to the outside.

The connecting conductors 60 illustrated in FIG. 51 extend from the ground conductor 440 towards the conducting portion 430. The connecting conductor 60-1 is connected to the first conductor 431-1, the third conductor 433-1, and the ground conductor 440. The connecting conductor 60-2 is connected to the first conductor 431-2, the third conductor 433-2, and the ground conductor 440. The connecting conductor 60-3 is connected to the third conductor 433-3 and the ground conductor 440.

First Example of Resonant State

Figure 52:
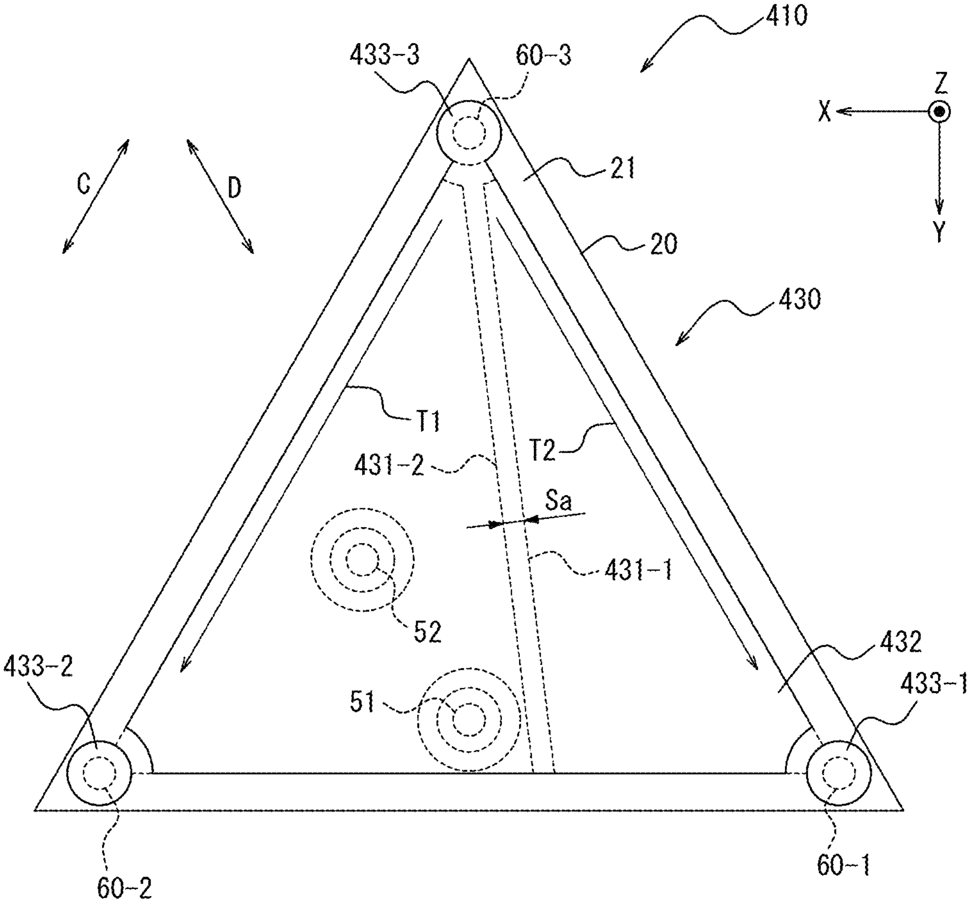
FIG. 52 illustrates a first example of a resonant state in the resonant structure illustrated in FIG. 50.

FIG. 52 illustrates a first example of a resonant state in the resonant structure 410 illustrated in FIG. 50. The C direction and the D direction are directions included in the XY plane.

The C direction is a direction inclined 60 degrees in the positive direction of the Y-axis from the positive direction of the X-axis. The C direction is the direction along one side, farther in the positive direction of the X-axis, of the conducting portion 430 that is substantially an equilateral triangle.

The D direction is a direction inclined 120 degrees in the positive direction of the Y-axis from the positive direction of the X-axis. The D direction is the direction along one side, farther in the negative direction of the X-axis, of the conducting portion 430 that is substantially an equilateral triangle.

The connecting conductor 60-2 and the connecting conductor 60-3 become a first connecting pair aligned along the C-direction as the first direction. The connecting conductor 60-1 and the connecting conductor 60-3 become a second connecting pair aligned along the D-direction as the second direction.

The resonant structure 410 resonates at a first frequency k1 along a path substantially parallel to the Y-direction. The path substantially parallel to the Y-direction appears as a result of a first path T1 and a second path T2. The first path T1 is a portion of the current path traversing the connecting conductors 60-2, 60-3 of the first connecting pair. A current path including the first path T1 in a portion thereof includes the ground conductor 440, the first conductor 431-2, the second conductor 432, and the connecting conductors 60-2, 60-3 of the first connecting pair. The second path T2 is a portion of the current path traversing the connecting conductors 60-1, 60-3 of the second connecting pair. A current path including the second path T2 in a portion thereof includes the ground conductor 440, the first conductor 432-1, the second conductor 432, and the connecting conductors 60-1, 60-3 of the second connecting pair.

When the resonant structure 410 resonates at the first frequency k1, current can flow from the connecting conductor 60-3 towards the connecting conductor 60-2 over the first path T1 and from the connecting conductor 60-2 towards the connecting conductor 60-1 over the second path T2. Each of the currents flowing between the connecting conductors 60 induces electromagnetic waves. The electromagnetic waves induced by these currents combine and are emitted. Consequently, the combined electromagnetic waves are substantially parallel to the Y-direction.

The resonant structure 410 exhibits an artificial magnetic conductor character relative to electromagnetic waves, at the first frequency k1 and polarized in the Y-direction, incident from the outside onto the upper surface 21 of the substrate 20 on which the conducting portion 430 is located.

Second Example of Resonant State

Figure 53:
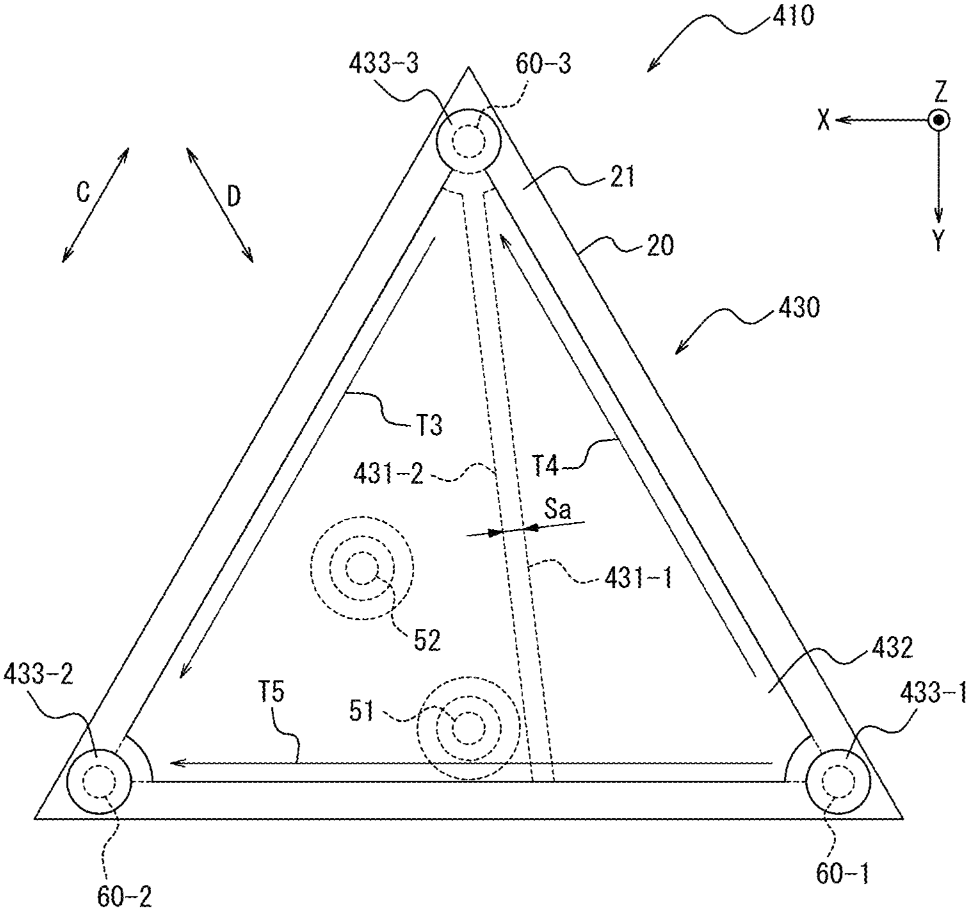
FIG. 53 illustrates a second example of a resonant state in the resonant structure illustrated in FIG. 50.

FIG. 53 illustrates a second example of a resonant state in the resonant structure 410 illustrated in FIG. 50.

The connecting conductor 60-2 and the connecting conductor 60-3 become a first connecting pair aligned along the C-direction as the first direction. The connecting conductor 60-1 and the connecting conductor 60-3 become a second connecting pair aligned along the D-direction as the second direction. The connecting conductor 60-1 and the connecting conductor 60-2 become a third connecting pair aligned along the X-direction as the third direction.

The resonant structure 410 resonates at the first frequency k1 along a path substantially parallel to the X-direction. The path substantially parallel to the X-direction appears as a result of a first path T3, a second path T4, and a third path T5. The first path T3 is a path in the same or similar manner as the first path T1 illustrated in FIG. 51. The second path T4 is a path in the same or similar manner as the second path T2 illustrated in FIG. 51. The third path T5 is a portion of the current path traversing the connecting conductors 60-1, 60-2 of the third connecting pair. A current path including the third path T5 in a portion thereof includes the ground conductor 440, the first conductors 432-1, 432-2, and the second conductor 432.

When the resonant structure 410 resonates at a first frequency k2, current can flow from the connecting conductor 60-3 towards the connecting conductor 60-2 over the first path T3. Current can flow from the connecting conductor 60-3 towards the connecting conductor 60-1 over the second path T4. Current can flow from the connecting conductor 60-1 towards the connecting conductor 60-2 over the third path T5. Each of the currents flowing between the connecting conductors 60 induces electromagnetic waves. The electromagnetic waves induced by these currents combine and are emitted. Consequently, the combined electromagnetic waves are substantially parallel to the X-direction.

The resonant structure 410 exhibits an artificial magnetic conductor character relative to electromagnetic waves, at the first frequency k2 and polarized in the X-direction, incident from the outside onto the upper surface 21 of the substrate 20 on which the conducting portion 430 is located.

Other Example of Resonant Structure

Figure 54:
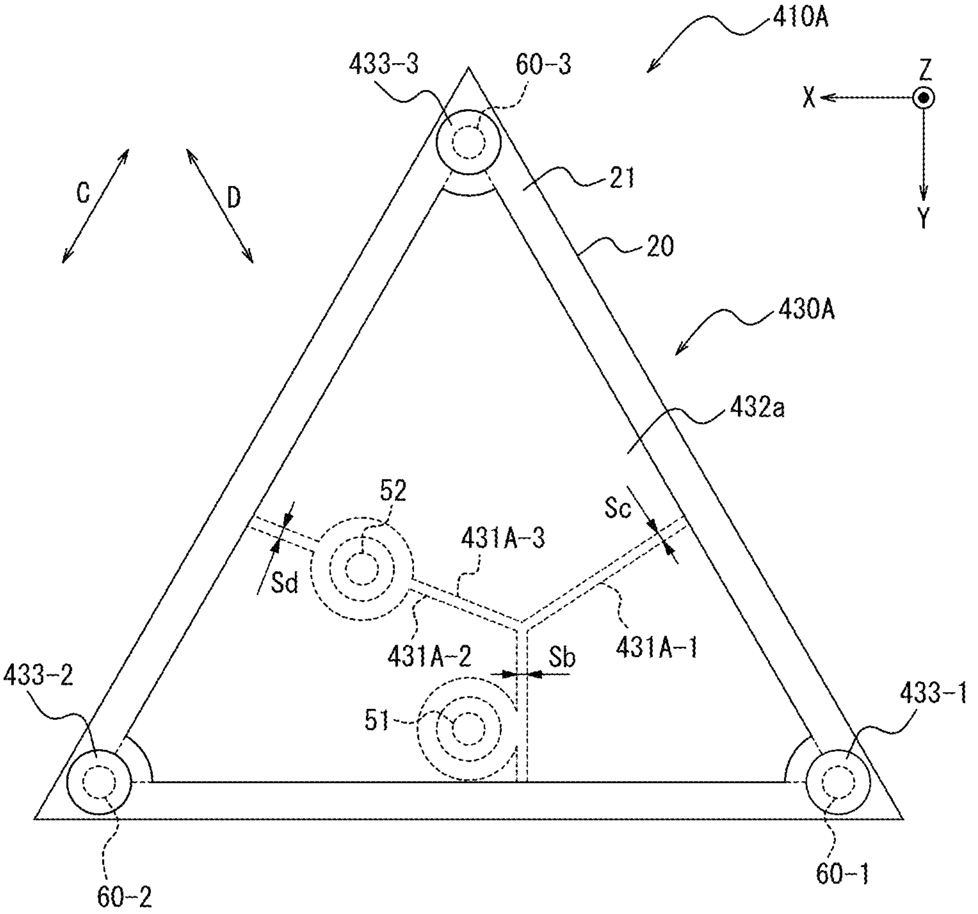
FIG. 54 is a plan view of a resonant structure according to an embodiment.
Figure 55:
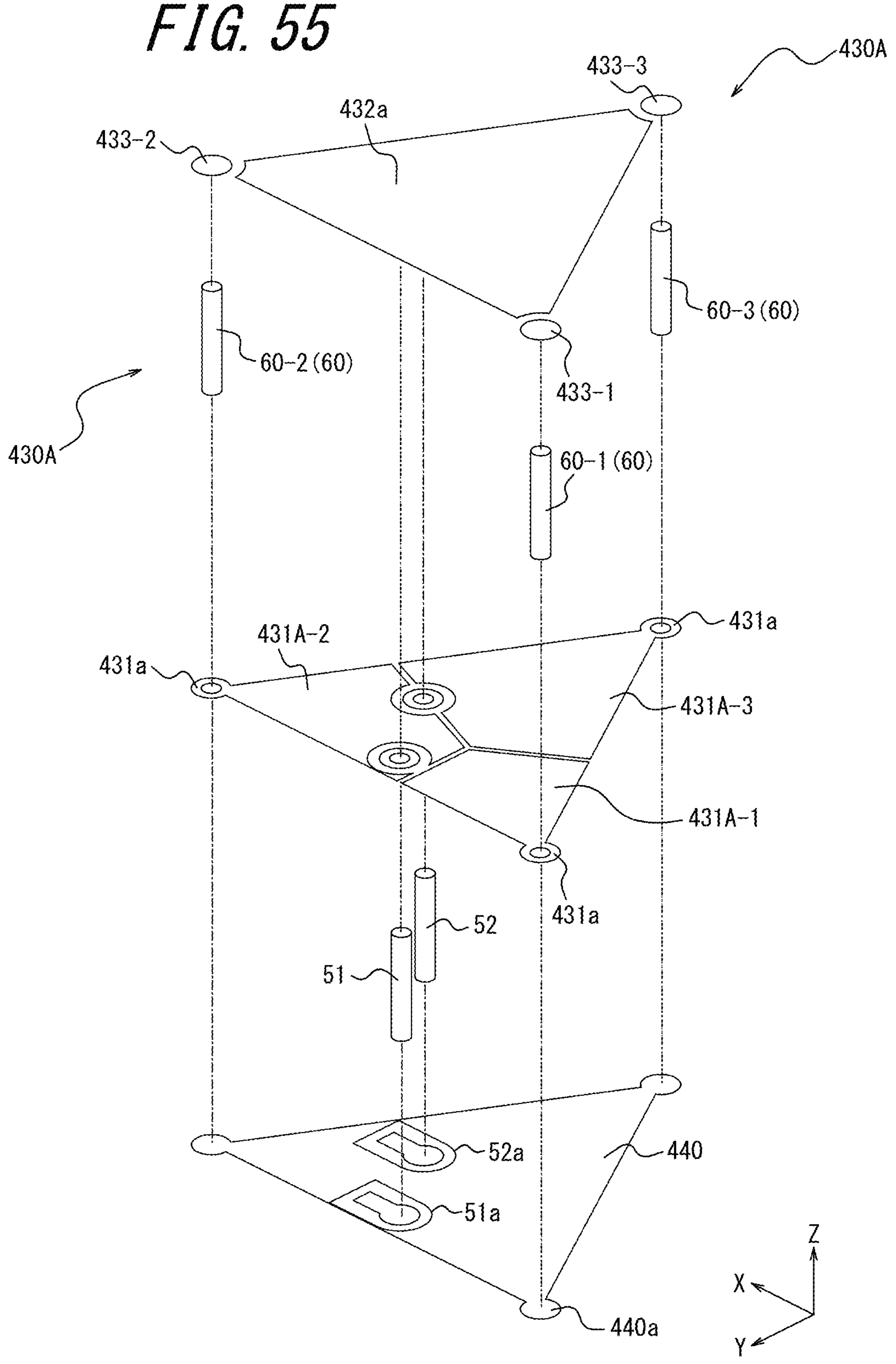
FIG. 55 is an exploded perspective view of a portion of the resonant structure illustrated in FIG. 54.

FIG. 54 is a plan view of a resonant structure 410A according to an embodiment. FIG. 55 is an exploded perspective view of a portion of the resonant structure 410A illustrated in FIG. 54. The explanation below focuses on the differences between the resonant structure 410A and the resonant structure 410 illustrated in FIG. 50.

The resonant structure 410A includes a conducting portion 430A. The conducting portion 430A includes first conductors 431A-1, 431A-2, 431A-3, a second conductor 432*a*, and third conductors 433-1, 433-2, 433-3. The first conductors 431A-1, 431A-2, 431A-3 are collectively indicated as the "first conductors 431A" when no particular distinction is made therebetween.

The first conductors 431A-1 to 431A-3 illustrated in FIG. 55 are substantially quadrangular. The quadrangular first conductor 431A-1 includes a connector 431*a*, to which the connecting conductor 60-1 connects, at one of the four corners. The first conductor 431A-1 is connected to the connecting conductor 60-1. The first conductor 431A-2 includes a connector 431*a* to which the connecting conductor 60-2 connects. The first conductor 431A-2 is connected to the connecting conductor 60-2. The first conductor 431A-3 includes a connector 431*a* to which the connecting conductor 60-3 connects. The first conductor 431A-3 is connected to the connecting conductor 60-3.

The ratio between the length of the side of the first conductor 431A-1 substantially parallel to the X-direction and the length of the side of the first conductor 431A-2 substantially parallel to the X-direction in FIG. 54 is approximately 2:3. A gap Sb is located between the first conductor 431A-1 and the first conductor 431A-2. The gap Sb is substantially parallel to the Y-direction. The gap Sb extends from between the side of the first conductor 431A-1 substantially parallel to the X-direction and the side of the first conductor 431A-2 substantially parallel to the X-direction until intersecting a gap Sd.

The ratio between the length of the side of the first conductor 431A-1 substantially parallel to the D-direction and the length of the side of the first conductor 431A-3 substantially parallel to the D-direction in FIG. 54 is approximately 2:3. A gap Sc is located between the first conductor 431A-1 and the first conductor 431A-3. The gap Sc extends from between the side of the first conductor 431A-1 substantially parallel to the D-direction and the side of the first conductor 431A-3 substantially parallel to the D-direction until intersecting the gap Sd.

The ratio between the length of the side of the first conductor 431A-2 substantially parallel to the C-direction and the length of the side of the first conductor 431A-3 substantially parallel to the C-direction in FIG. 54 is approximately 2:3. The gap Sd is located between the first conductor 431A-2 and the first conductor 431A-3. The gap Sd extends from between the side of the first conductor 431A-2 substantially parallel to the C-direction and the side of the first conductor 431A-3 substantially parallel to the C-direction, cuts across the second feeder 52, and extends until intersecting the gap Sb.

The width and position of the gaps Sb, Sc, Sd may be appropriately adjusted in accordance with the desired resonance frequency of the resonant structure 410A.

The second conductor 432*a* illustrated in FIG. 54 is substantially a equilateral triangle. The second conductor 432*a* is not connected to the third conductor 433. The second conductor 432*a* is not connected to the connecting conductors 60.

Other Example of Resonant Structure

Figure 56:
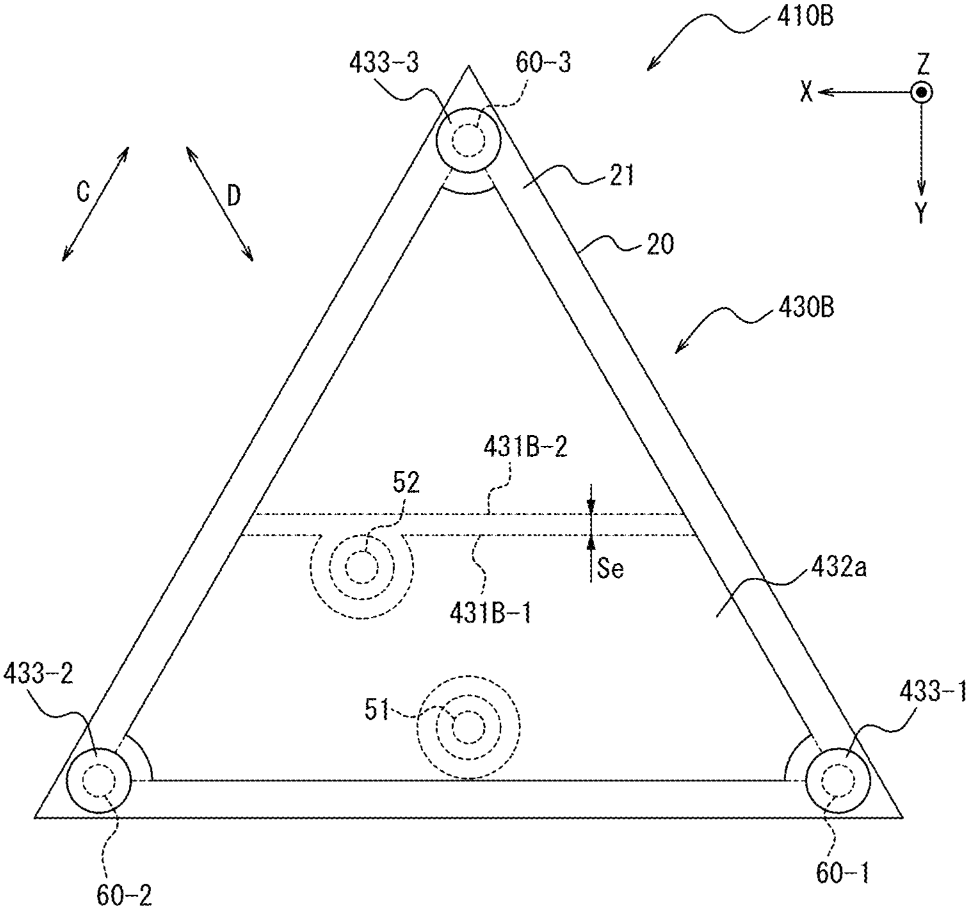
FIG. 56 is a plan view of a resonant structure according to an embodiment.

FIG. 56 is a plan view of a resonant structure 410B according to an embodiment. The explanation below focuses on the differences between the resonant structure 410B and the resonant structure 410 illustrated in FIG. 50.

The resonant structure 410B includes a conducting portion 430B. The conducting portion 430B includes first conductors 431B-1, 431B-2, a second conductor 432*a*, and third conductors 433-1, 433-2, 433-3. The first conductors 431B-1, 431B-2 are collectively indicated as the "first conductors 431B" when no particular distinction is made therebetween.

The first conductor 431B-1 is substantially trapezoidal. The first conductor 431B-1 includes a connector 431*a* that connects to the connecting conductor 60-1 and a connector 431*a* that connects to the connecting conductor 60-2, in the same or similar manner as the first conductor 431A-1 illustrated in FIG. 55. The first conductor 431B-1 is connected to the connecting conductors 60-1, 60-2.

The first conductor 431B-2 is substantially triangular. The first conductor 431B-2 includes a connector 431*a* that connects to the connecting conductor 60-3 in the same or similar manner as the first conductor 431A-3 illustrated in FIG. 55. The first conductor 431B-2 is connected to the connecting conductor 60-3.

The ratio between the length of the side of the first conductor 431B-1 substantially parallel to the C-direction and the length of the side of the first conductor 431B-2 substantially parallel to the C-direction is approximately 2:3. The ratio between the length of the side of the first conductor 431B-1 substantially parallel to the D-direction and the length of the side of the first conductor 431B-2 substantially parallel to the D-direction is approximately 2:3. The gap Se is located between the first conductor 431B-1 and the first conductor 431B-2. The gap Se extends from a location between the side of the first conductor 431B-1 substantially parallel to the C-direction and the side of the first conductor 431B-2 substantially parallel to the C-direction to a location between the side of the first conductor 431B-1 substantially parallel to the D-direction and the side of the first conductor 431B-2 substantially parallel to the D-direction. The width and position of the gap Se may be appropriately adjusted in accordance with the desired resonance frequency of the resonant structure 410B.

The resonant structure 410B resonates at the first frequency k1 along the first path T1 illustrated in FIG. 52. The resonant structure 410B resonates at the first frequency k1 along the second path T2 illustrated in FIG. 52. The resonant structure 410B can be a filter that removes frequencies other than the first frequency k1 in the same or similar manner as the resonant structure 410 illustrated in FIG. 50. The resonant structure 410B can be an antenna that emits electromagnetic waves of the first frequency k1 in the same or similar manner as the resonant structure 410 illustrated in FIG. 50.

Other Example of Resonant Structure

Figure 57:
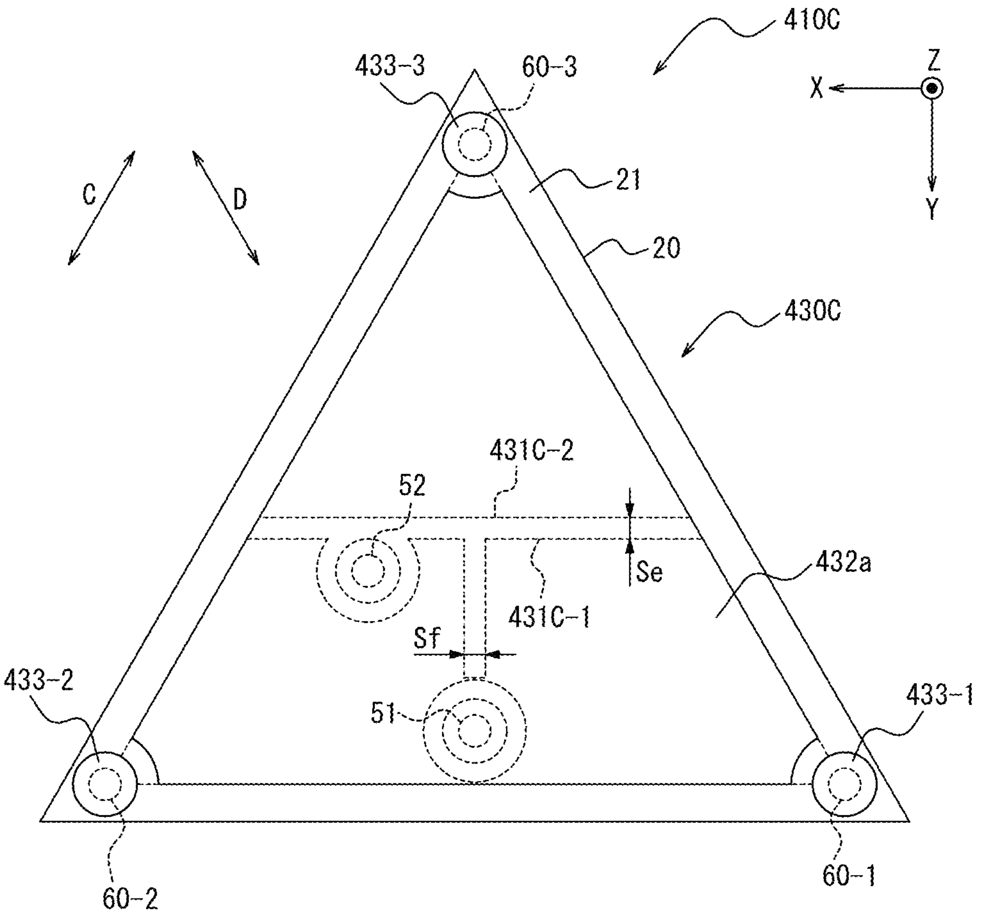
FIG. 57 is a plan view of a resonant structure according to an embodiment.

FIG. 57 is a plan view of a resonant structure 410C according to an embodiment. The explanation below focuses on the differences between the resonant structure 410C and the resonant structure 410 illustrated in FIG. 50.

The resonant structure 410C includes a conducting portion 430C. The conducting portion 430C includes first conductors 431C-1, 431C-2, a second conductor 432*a*, and third conductors 433-1, 433-2, 433-3. The first conductors 431C-1, 431C-2 are collectively indicated as the "first conductors 431C" when no particular distinction is made therebetween.

The first conductor 431C-1 is substantially trapezoidal. The first conductor 431C-1 includes a connector 431*a* that connects to the connecting conductor 60-1 and a connector 431*a* that connects to the connecting conductor 60-2, in the same or similar manner as the first conductor 431A-1 illustrated in FIG. 55. The first conductor 431C-1 is connected to the connecting conductors 60-1, 60-2.

The first conductor 431C-2 is substantially triangular. The first conductor 431C-2 includes a connector 431*a* that connects to the connecting conductor 60-3 in the same or similar manner as the first conductor 431A-3 illustrated in FIG. 55. The first conductor 431C-2 is connected to the connecting conductor 60-3.

The ratio between the length of the side of the first conductor 431C-1 substantially parallel to the C-direction and the length of the side of the first conductor 431C-2 substantially parallel to the C-direction is approximately 2:3. The ratio between the length of the side of the first conductor 431C-1 substantially parallel to the D-direction and the length of the side of the first conductor 431C-2 substantially parallel to the D-direction is approximately 2:3. The gap Se is located between the first conductor 431B-1 and the first conductor 431B-2 in the same or similar manner as the configuration illustrated in FIG. 56. The first conductor 431C-1 includes a gap Sf. The gap Sf extends from near the center of the gap Se, which extends along the X-direction, to near the first feeder 51. The width and position of the gaps Se, Sf may be appropriately adjusted in accordance with the desired resonance frequency of the resonant structure 410C.

Other Example of Resonant Structure

Figure 58:
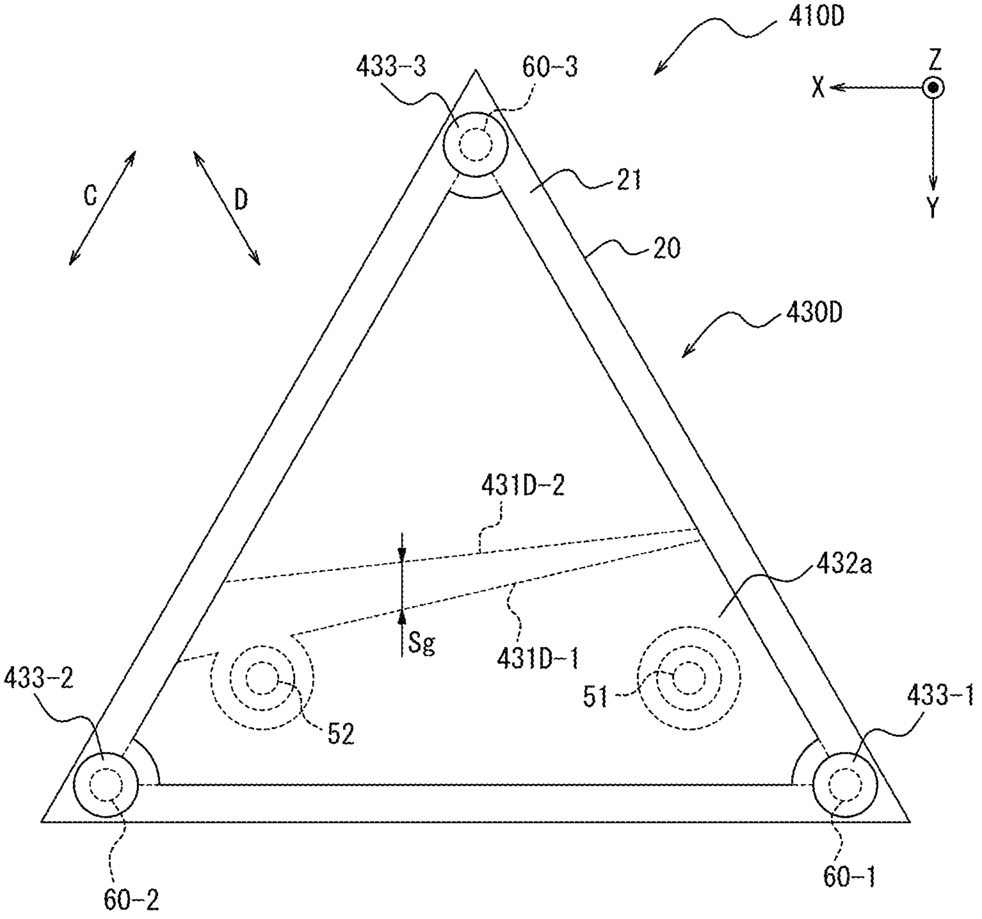
FIG. 58 is a plan view of a resonant structure according to an embodiment.

FIG. 58 is a plan view of a resonant structure 410D according to an embodiment. The explanation below focuses on the differences between the resonant structure 410D and the resonant structure 410 illustrated in FIG. 50.

The resonant structure 410D includes a conducting portion 430D. The conducting portion 430D includes first conductors 431D-1, 431D-2, at least one second conductor

432a, and third conductors 433-1, 433-2, 433-3. The first conductors 431D-1, 431D-2 are collectively indicated as the "first conductors 431D" when no particular distinction is made therebetween.

The first conductor 431D-1 is substantially quadrangular. The first conductor 431D-1 includes a connector 431a that connects to the connecting conductor 60-1 and a connector 431a that connects to the connecting conductor 60-2 in the same or similar manner as the first conductor 431A-1 illustrated in FIG. 55. The first conductor 431D-1 is connected to the connecting conductors 60-1, 60-2.

The first conductor 431D-2 is substantially triangular. The first conductor 431D-2 includes a connector 431a that connects to the connecting conductor 60-3 in the same or similar manner as the first conductor 431A-3 illustrated in FIG. 55. The first conductor 431D-2 is connected to the connecting conductor 60-3.

The ratio between the length of the side of the first conductor 431D-1 substantially parallel to the C-direction and the length of the side of the first conductor 431D-2 substantially parallel to the C-direction is approximately 2:7. The gap Sg is located between the first conductor 431D-1 and the first conductor 431D-2. The ratio between the length of the side of the first conductor 431D-1 substantially parallel to the D-direction and the length of the side of the first conductor 431D-2 substantially parallel to the D-direction is approximately 2:3. The gap Sg extends from a location between the side of the first conductor 431D-1 substantially parallel to the D-direction and the side of the first conductor 431D-2 substantially parallel to the D-direction to a location between the side of the first conductor 431D-1 substantially parallel to the C-direction and the side of the first conductor 431D-2 substantially parallel to the C-direction. The width of the gap Sg gradually increases from the side of the conducting portion 430 substantially parallel to the D-direction towards the side of the conducting portion substantially parallel to the C-direction. The configuration of the gap Sg may be appropriately adjusted in accordance with the desired resonance frequency of the resonant structure 410D.

Other Example of Resonant Structure

Figure 59:
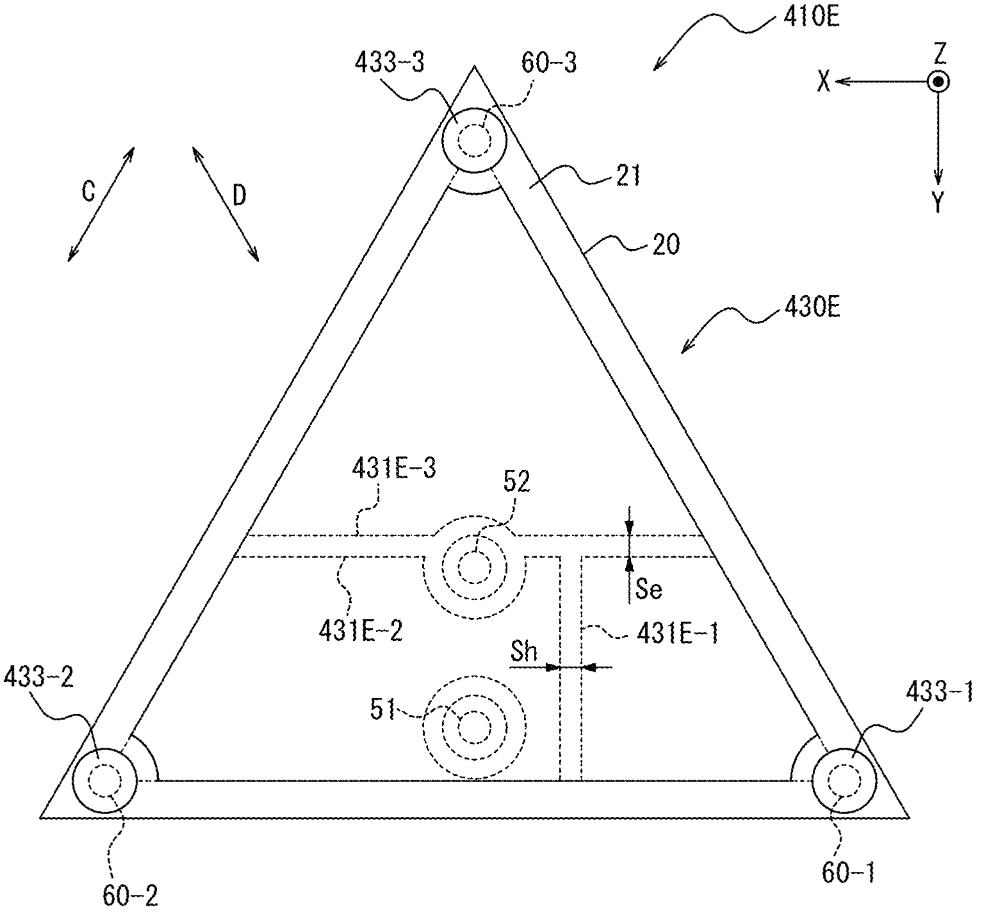
FIG. 59 is a plan view of a resonant structure according to an embodiment.

FIG. 59 is a plan view of a resonant structure 410E according to an embodiment. The explanation below focuses on the differences between the resonant structure 410E and the resonant structure 410 illustrated in FIG. 50.

The resonant structure 410E includes a conducting portion 430E. The conducting portion 430E includes first conductors 431E-1, 431E-2, 431E-3, a second conductor 432a, and third conductors 433-1, 433-2, 433-3. The first conductors 431E-1 to 431E-3 are collectively indicated as the "first conductors 431E" when no particular distinction is made therebetween.

The first conductor 431E-1 is substantially trapezoidal. The first conductor 431E-1 includes a connector 431a that connects to the connecting conductor 60-1 in the same or similar manner as the first conductor 431A-1 illustrated in FIG. 55, described above. The first conductor 431E-1 is connected to the connecting conductor 60-1.

The first conductor 431E-2 is substantially trapezoidal. The first conductor 431E-2 includes a connector 431a that connects to the connecting conductor 60-2 in the same or similar manner as the first conductor 431A-2 illustrated in FIG. 55. The first conductor 431E-1 is connected to the connecting conductor 60-2.

The first conductor 431E-3 is substantially triangular. The first conductor 431E-3 includes a connector 431a that connects to the connecting conductor 60-3 in the same or similar manner as the first conductor 431A-3 illustrated in FIG. 55. The first conductor 431E-3 is connected to the connecting conductor 60-3.

The ratio between the length of the side of the first conductor 431E-1 substantially parallel to the C-direction and the length of the side of the first conductor 431E-2 substantially parallel to the C-direction is approximately 3.5:6.5. The ratio between the length of the side of the first conductor 431E-1 substantially parallel to the D-direction and the length of the side of the first conductor 431E-2 substantially parallel to the D-direction is approximately 3.5:6.5. The gap Se is located between the first conductors 431E-1, 431E-2 and the first conductor 431E-3 in the same or similar manner as the configuration illustrated in FIG. 56. A gap Sh is located between the first conductor 431E-1 and the first conductor 431E-2. The gap Sh extends in the Y-direction. The gap Sh is located at a position that divides the side of the conducting portion 430E substantially parallel to the X-direction into sections at approximately a 4.5:2 ratio. Along the side of the conducting portion 430E substantially parallel to the X-direction, the ratio of the length of the side of the first conductor 431E-1 substantially parallel to the X-direction and the length of the side of the first conductor 431E-2 substantially parallel to the X-direction included in the side of the conducting portion 430E substantially parallel to the X-direction is approximately 4.5:2. The gap Sh extends from the base, substantially parallel to the X-direction, of the conducting portion 430E until reaching the gap Se.

Example of Resonant Structure

Figure 60:
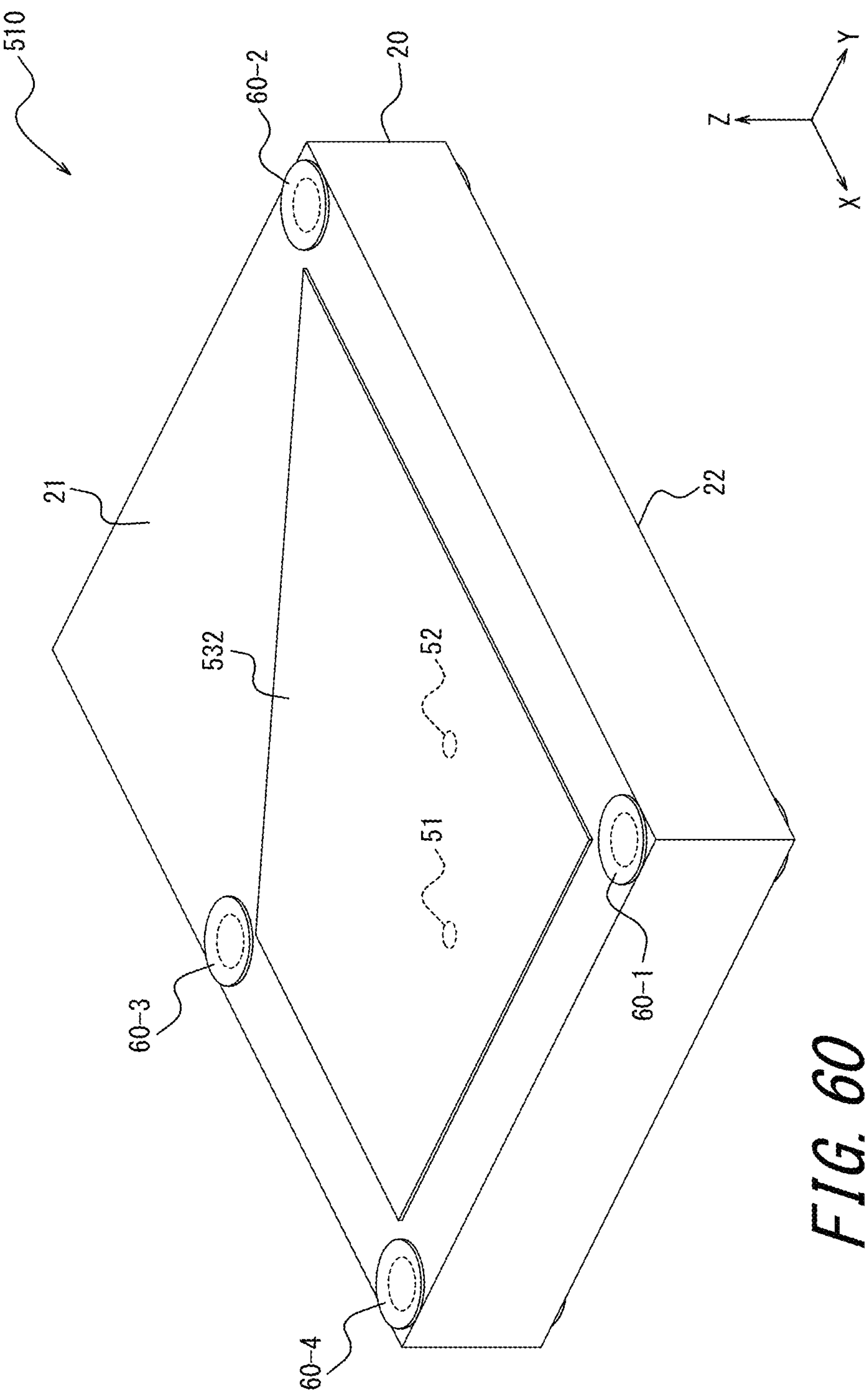
FIG. 60 is a perspective view of a resonant structure according to an embodiment.
Figure 61:
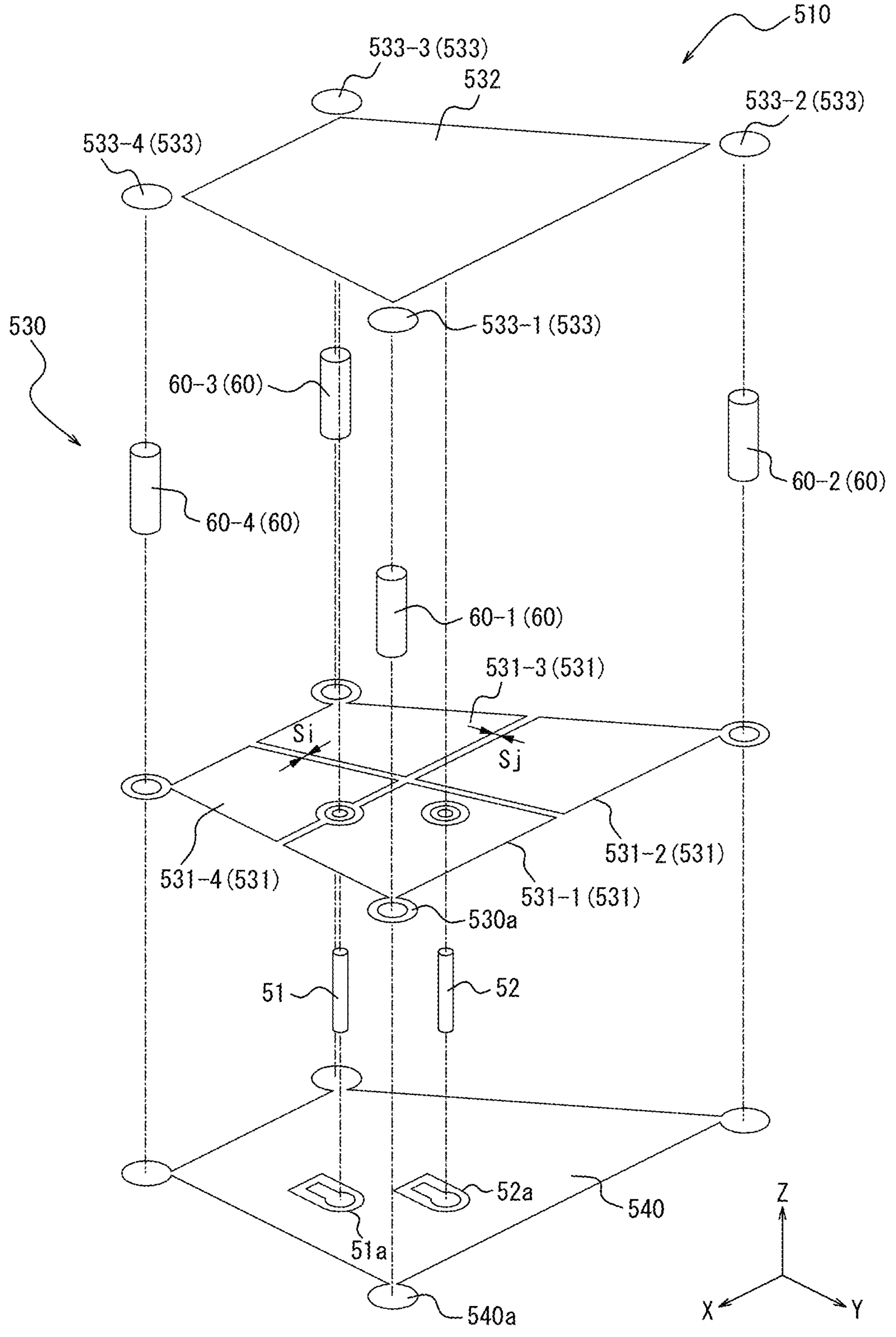
FIG. 61 is an exploded perspective view of a portion of the resonant structure illustrated in FIG. 60.

FIG. 60 is a perspective view of a resonant structure 510 according to an embodiment. FIG. 61 is an exploded perspective view of a portion of the resonant structure 510 illustrated in FIG. 60.

The resonant structure 510 resonates at one or a plurality of resonance frequencies. As illustrated in FIG. 60 and FIG. 61, the resonant structure 510 includes a substrate 20, a conducting portion 530, a ground conductor 540, and connecting conductors 60-1, 60-2, 60-3, 60-4. The resonant structure 510 may include at least one of a first feeder 51 and a second feeder 52.

The conducting portion 530 illustrated in FIG. 61 is configured to function as a portion of a resonator. The conducting portion 530 extends along the XY plane. The conducting portion 530 is positioned on an upper surface 21 of the substrate 20, as illustrated in FIG. 60. The resonant structure 510 exhibits an artificial magnetic conductor character relative to electromagnetic waves of a predetermined frequency incident from the outside onto the upper surface 21 of the substrate 20 on which the conducting portion 530 is located.

As illustrated in FIG. 61, the conducting portion 530 is substantially trapezoidal. The substantially trapezoidal conducting portion 530 includes two sides substantially parallel to the X-direction. Of the two sides substantially parallel to the X-direction, the side located farther in the negative direction of the Y-axis is also referred to as the "upper base." Of the two sides substantially parallel to the X-direction, the side located farther in the positive direction of the Y-axis is also referred to as the "lower base." The ratio between the length of the upper base and the length of the lower base of the conducting portion 530 may be approximately 1:2. The substantially trapezoidal conducting portion 530 includes two sides located between the upper base and the lower base. Of the two sides located between the upper base and the lower base, the side located farther in the negative direction of the X-axis is also referred to as the "hypotenuse."

As illustrated in FIG. 61, the conducting portion 530 includes first conductors 531-1, 531-2, 531-3, 531-4, at least one second conductor 532, and third conductors 533-1, 533-2, 533-3, 533-4.

The first conductors 531-1 to 531-4 are collectively indicated as the "first conductors 531" when no particular distinction is made therebetween. The third conductors 533-1 to 533-4 are collectively indicated as the "third conductors 533" when no particular distinction is made therebetween.

The first conductors 531-1 to 531-4 illustrated in FIG. 61 are substantially trapezoidal. The trapezoidal first conductor 531-1 includes a connector 531*a*, to which the connecting conductor 60-1 connects, at one of the four corners. The trapezoidal first conductor 531-2 includes a connector 531*a*, to which the connecting conductor 60-2 connects, at one of the four corners. The trapezoidal first conductor 531-3 includes a connector 531*a*, to which the connecting conductor 60-3 connects, at one of the four corners. The trapezoidal first conductor 531-4 includes a connector 531*a*, to which the connecting conductor 60-4 connects, at one of the four corners. The connectors 531*a* illustrated in FIG. 61 are circular. The connectors 531*a* are not limited to being circular, however, and may have any shape. Each of the first conductors 531-1 to 531-4 is connected to a different one of the connecting conductors 60-1 to 60-4.

A gap Si is located between the first conductors 531-1, 531-4 and the first conductors 531-2, 531-3. The gap Si extends from the lower base towards the upper base of the substantially trapezoidal conducting portion 530. The gap Si is located at a position that divides the lower base, farther in the negative direction of the Y-axis, of the substantially trapezoidal conducting portion 530 into sections at a 1:1 ratio. The gap Si is located at a position that divides the upper base, farther in the positive direction of the Y-axis, of the substantially trapezoidal conducting portion 530 into sections at a 1:1 ratio. The width and position of the gap Si may be appropriately adjusted in accordance with the desired resonance frequency of the resonant structure 510.

A gap Sj is located between the first conductors 531-1, 531-2 and the first conductors 531-3, 531-4. The gap Sj extends in a direction substantially parallel to the X-direction. The gap Sj is located in the Y-direction at a position that divides the upper base, farther in the positive direction of the Y-axis, of the substantially trapezoidal conducting portion 320 into sections at a 1:1 ratio. The width and position of the gap Sj may be appropriately adjusted in accordance with the desired resonance frequency of the resonant structure 510.

The remaining configuration of the first conductors 531 illustrated in FIG. 61 is the same as or similar to that of the first conductors 231 illustrated in FIG. 16.

The second conductor 532 illustrated in FIG. 60 is substantially trapezoidal. The ratio between the upper base and the lower base of the substantially trapezoidal second conducting portion 532 may be approximately 1:2. The second conductor 532 is not connected to the connecting conductors 60-1 to 60-4. The remaining configuration of the second conductor 532 illustrated in FIG. 60 is the same as or similar to that of the second conductor 32 illustrated in FIG. 15.

Each of the first conductors 533-1 to 533-4 is connected to a different one of the connecting conductors 60-1 to 60-4. The third conductors 533 illustrated in FIG. 60 are circular. The third conductors 533 may, however, have any shape. The remaining configuration of the third conductors 533 is the same as or similar to that of the third conductors 33 illustrated in FIG. 15.

The ground conductor 540 illustrated in FIG. 61 is substantially trapezoidal. The trapezoidal ground conductor 540 includes a connector 540*a* at each of the four corners. The connecting conductors 60 are connected to the connectors 540*a*. The connectors 540*a* illustrated in FIG. 51 are circular. The connectors 540*a* are not limited to being circular, however, and may have any shape. The ground conductor 540 may have any shape in accordance with the shape of the conducting portion 530. The remaining configuration of the ground conductor 540 illustrated in FIG. 61 is the same as or similar to that of the ground conductor 240 illustrated in FIG. 16.

The first feeder 51 illustrated in FIG. 61 is configured to connect electromagnetically to the second conductor 532. When the resonant structure 510 is used as an antenna, the first feeder 51 is configured to supply power to the conducting portion 530 through the second conductor 532. When the resonant structure 510 is used as an antenna or a filter, the first feeder 51 is configured to supply power from the conducting portion 530 through the second conductor 532 to the outside.

The second feeder 52 illustrated in FIG. 61 is configured to connect electromagnetically to the second conductor 532 at a different position than the first feeder 51. When the resonant structure 510 is used as an antenna, the second feeder 52 is configured to supply power to the conducting portion 530 through the second conductor 532. When the resonant structure 510 is used as an antenna or a filter, the second feeder 52 is configured to supply power from the conducting portion 530 through the second conductor 532 to the outside.

The connecting conductors 60 illustrated in FIG. 61 extend from the ground conductor 540 towards the conducting portion 530. The connecting conductors 60-1 to 60-4 are each connected to the ground conductor 640 and one of the first conductors 531-1 to 531-4.

Example of Resonant State

Figure 62:
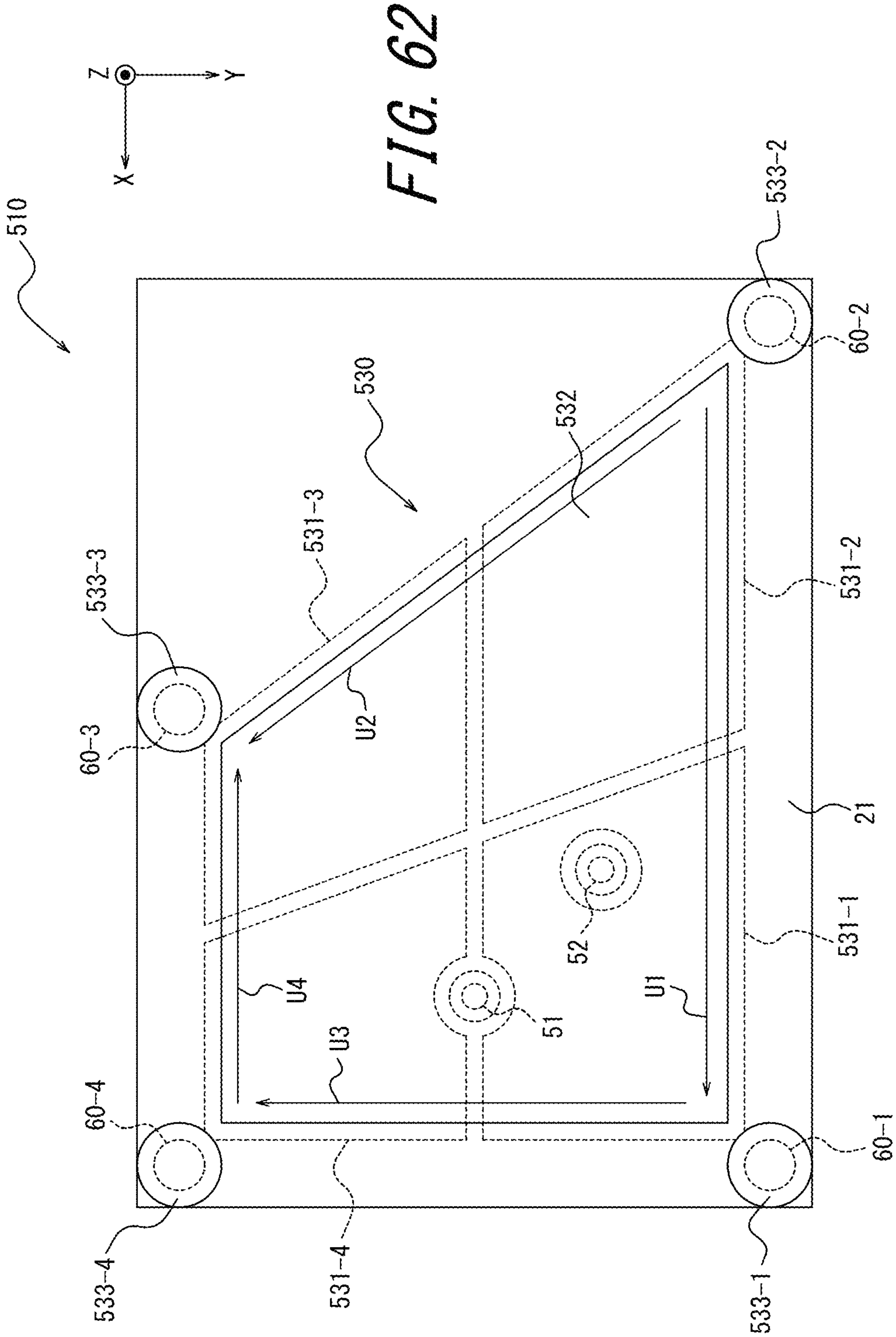
FIG. 62 illustrates an example of a resonant state in the resonant structure illustrated in FIG. 60.

FIG. 62 illustrates a first example of a resonant state in the resonant structure 510 illustrated in FIG. 60.

The connecting conductor 60-1 and the connecting conductor 60-2 become a first connecting pair aligned along the lower base, substantially parallel to the X-direction, of the substantially trapezoidal conducting portion 530.

The connecting conductor 60-2 and the connecting conductor 60-3 become a second connecting pair aligned along the hypotenuse, which is farther in the negative direction of the X-axis, of the substantially trapezoidal conducting portion 530.

The connecting conductor 60-3 and the connecting conductor 60-4 become a third connecting pair aligned along the upper base, substantially parallel to the X-direction, of the substantially trapezoidal conducting portion 530.

The connecting conductor 60-1 and the connecting conductor 60-4 become a fourth connecting pair aligned along the side of the substantially trapezoidal conducting portion 530 farther in the positive direction of the X-axis.

The resonant structure 510 resonates at a first frequency u1 along a first path U1. The first path U1 is a portion of the current path traversing the connecting conductors 60-1, 60-2 of the first connecting pair. The current path traversing the connecting conductors 60-1, 60-2 of the first connecting pair includes the ground conductor 540, the first conductors 531-1, 531-2, the second conductor 532, and the connecting conductors 60-1, 60-2 of the first connecting pair. The resonant structure 510 exhibits an artificial magnetic conductor character relative to electromagnetic waves, at the first frequency u1 and polarized along the first path U1, incident from the outside onto the upper surface 21 of the substrate 20 on which the conducting portion 530 is located.

The resonant structure 510 resonates at a second frequency u2 along a second path U2. The second path U2 is a portion of the current path traversing the connecting conductors 60-2, 60-3 of the second connecting pair. The current path traversing the connecting conductors 60-2, 60-3 of the second connecting pair includes the ground conductor 540, the first conductors 531-2, 531-3, the second conductor 532, and the connecting conductors 60-2, 60-3 of the second connecting pair. The resonant structure 510 exhibits an artificial magnetic conductor character relative to electromagnetic waves, at the second frequency u2 and polarized along the second path U2, incident from the outside onto the upper surface 21 of the substrate 20 on which the conducting portion 530 is located.

The resonant structure 510 resonates at a third frequency u3 along a third path U3. The third path U3 is a portion of the current path traversing the connecting conductors 60-3, 60-4 of the third connecting pair. The current path traversing the connecting conductors 60-3, 60-4 of the third connecting pair includes the ground conductor 540, the first conductors 531-3, 531-4, the second conductor 532, and the connecting conductors 60-3, 60-3 of the third connecting pair. The resonant structure 510 exhibits an artificial magnetic conductor character relative to electromagnetic waves, at the third frequency u3 and polarized along the third path U3, incident from the outside onto the upper surface 21 of the substrate 20 on which the conducting portion 530 is located.

The resonant structure 510 resonates at a fourth frequency u4 along a fourth path U4. The fourth path U4 is a portion of the current path traversing the connecting conductors 60-1, 60-4 of the fourth connecting pair. The current path traversing the connecting conductors 60-1, 60-4 of the fourth connecting pair includes the ground conductor 540, the first conductors 531-1, 531-4, the second conductor 532, and the connecting conductors 60-1, 60-4 of the fourth connecting pair. The resonant structure 510 exhibits an artificial magnetic conductor character relative to electromagnetic waves, at the fourth frequency u4 and polarized along the fourth path U4, incident from the outside onto the upper surface 21 of the substrate 20 on which the conducting portion 530 is located.

In the resonant structure 510, the length of the side (lower base) of the substantially trapezoidal conducting portion 320 farther in the positive Y-direction and the length of the side (hypotenuse) of the substantially trapezoidal conducting portion 320 farther in the negative direction of the X-axis can be close values. The length of the first path U1 along the lower base of the conducting portion 320 and the length of the second path U2 along the side of the conducting portion farther in the positive direction of the X-axis can be close values.

In the resonant structure 510, the length of the first path U1, the second path U2, the third path U3, and the fourth path U4 can be shorter in this order. Accordingly, the first frequency u1, the second frequency u2, the third frequency u3, and the fourth frequency u4 can increase in this order.

The resonant structure 510 can resonate along the third path U3 as a result of a power supply from the first feeder 51 to the conducting portion 530. The resonant structure 510 can resonate along the fourth path U4 as a result of a power supply from the second feeder 52 to the conducting portion 530.

Other Example of Resonant Structure

Figure 63:
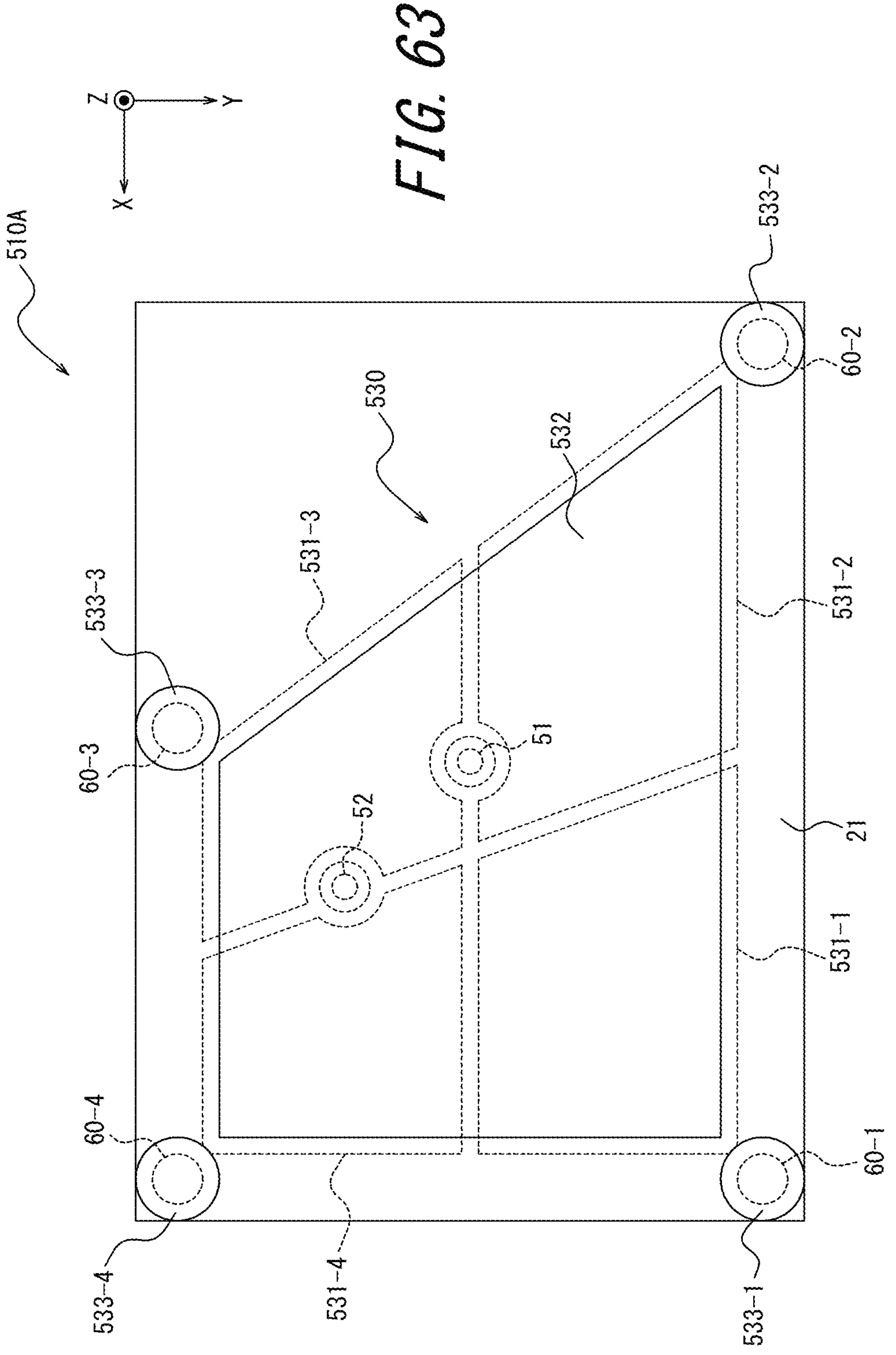
FIG. 63 is a plan view of a resonant structure according to an embodiment.

FIG. 63 is a perspective view of a resonant structure 510A according to an embodiment. The explanation below focuses on the differences between the resonant structure 510A and the resonant structure 510 illustrated in FIG. 61.

In the resonant structure 510A, the first feeder 51 is located between the first conductor 531-2 and the first conductor 531-3 in the XY plane. In the resonant structure 510A, the second feeder 52 is located between the first conductor 531-3 and the first conductor 531-4 in the XY plane.

Example of Resonant Structure

Figure 64:
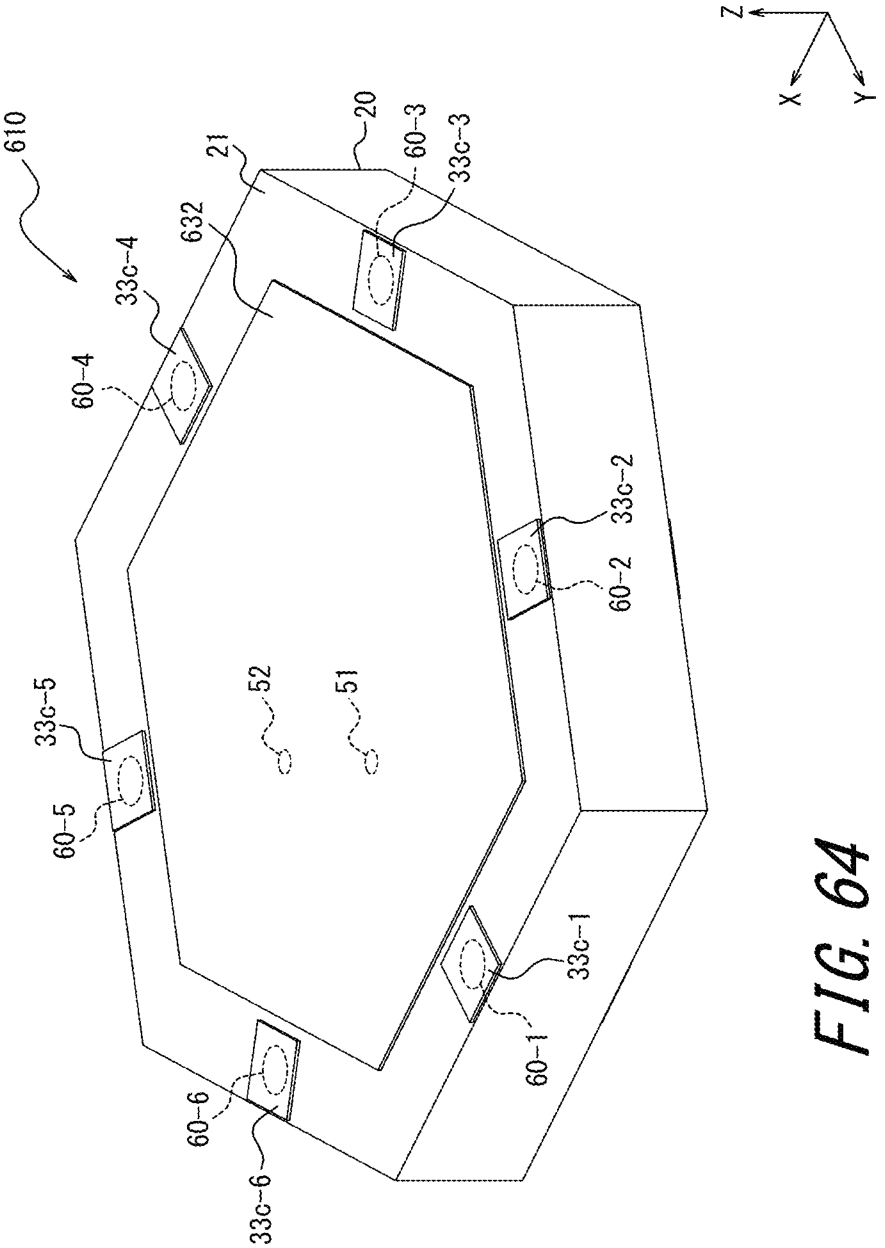
FIG. 64 is a plan view of a resonant structure according to an embodiment.
Figure 65:
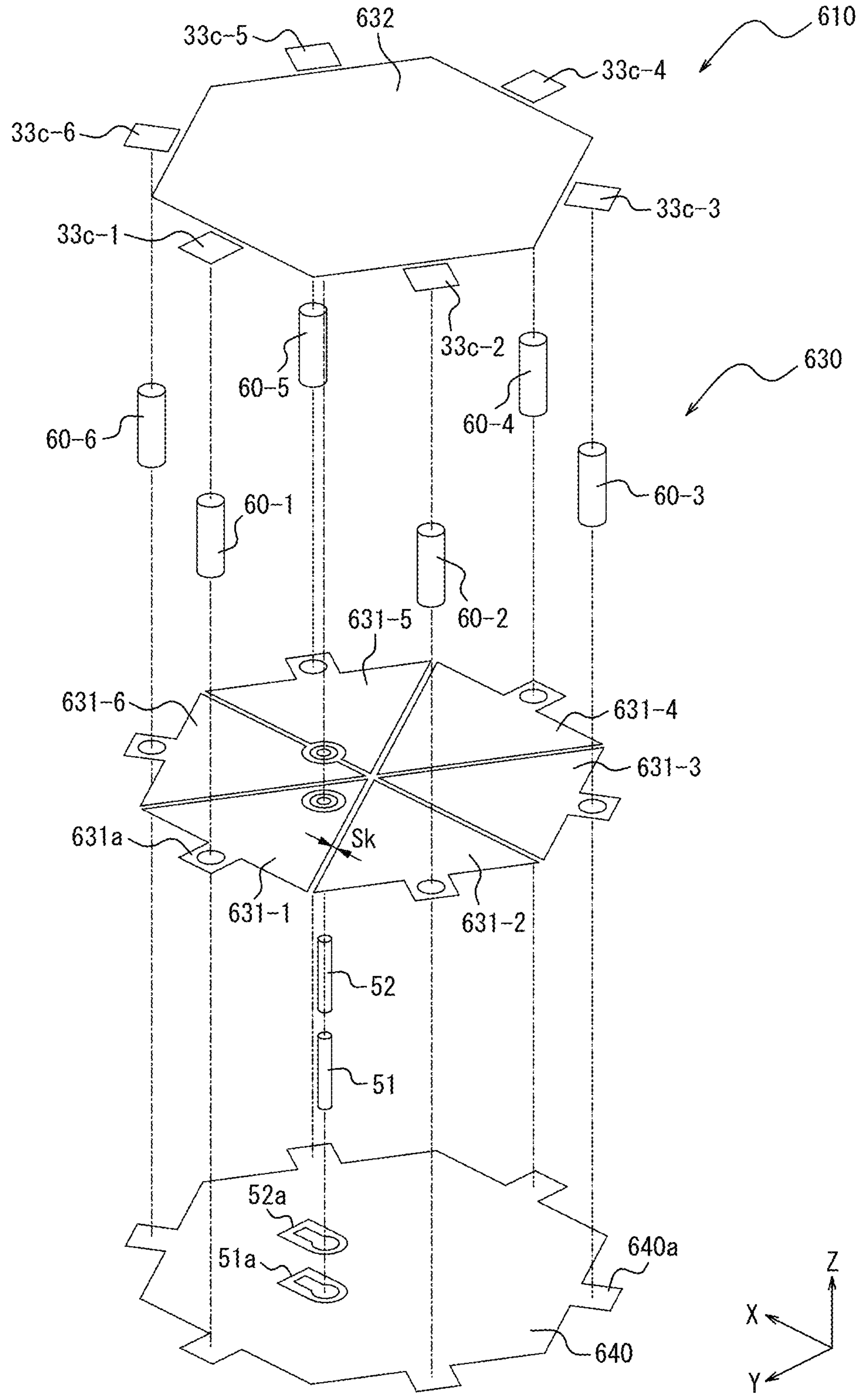
FIG. 65 is an exploded perspective view of a portion of the resonant structure illustrated in FIG. 64.

FIG. 64 is a perspective view of a resonant structure 610 according to an embodiment. FIG. 65 is an exploded perspective view of a portion of the resonant structure 610 illustrated in FIG. 64.

The resonant structure 610 resonates at one or a plurality of resonance frequencies. As illustrated in FIG. 64 and FIG. 65, the resonant structure 610 includes a substrate 20, a conducting portion 630, a ground conductor 640, and connecting conductors 60-1, 60-2, 60-3, 60-4, 60-5, 60-6. The resonant structure 610 may include at least one of a first feeder 51 and a second feeder 52.

The conducting portion 630 illustrated in FIG. 65 is configured to function as a portion of a resonator. The conducting portion 630 extends along the XY plane. The conducting portion 630 is located on the upper surface 21 of the substrate 20. The resonant structure 610 exhibits an artificial magnetic conductor character relative to electromagnetic waves of a predetermined frequency incident from the outside onto the upper surface 21 of the substrate 20 on which the conducting portion 630 is located.

As illustrated in FIG. 65, the conducting portion 630 is substantially a regular hexagon. As illustrated in FIG. 65, the conducting portion 630 includes first conductors 631-1, 631-2, 631-3, 631-4, 631-5, 631-6, at least one second conductor 632, and third conductors **33*c*-1, 33*c*-2, 33*c*-3, 33*c*-4, 33*c*-5, 33*c*-6. The first conductors 631-1 to 631-6 are collectively indicated as the "first conductors 631**" when no particular distinction is made therebetween.

The first conductors 631 illustrated in FIG. 65 are substantially an isosceles triangle. The base of each first conductor 631 that is an isosceles triangle forms one side of the conducting portion 630 that is a regular hexagon. Each of the first conductors 631-1 to 631-6 includes a connector **631*a*. Each of the connectors 631*a* of the first conductors 631-1 to 631-6 is connected to a different one of the connecting conductors 60-1 to 60-6. The connectors 631*a* illustrated in FIG. 65 are quadrangular. The connectors 631*a*** are not limited to being quadrangular, however, and may have any shape.

A gap Sk is located between adjacent first conductors 631. The width and position of the gap Sk may be appropriately adjusted in accordance with the desired resonance frequency of the resonant structure 610.

The remaining configuration of the first conductor 631 illustrated in FIG. 65 is the same as or similar to that of the first conductor 231 illustrated in FIG. 16.

The second conductor 632 illustrated in FIG. 64 is substantially a regular hexagon. The second conductor 632 is not connected to the connecting conductors 60-1 to 60-6. The remaining configuration of the second conductor 632 illustrated in FIG. 64 is the same as or similar to that of the second conductor 32 illustrated in FIG. 15.

Each of the third conductors 33*c*-1 to 33*c*-6 is connected to a different one of the connecting conductors 60-1 to 60-6.

The ground conductor 640 illustrated in FIG. 65 is substantially a regular hexagon. The ground conductor 640 includes a connector 640*a* on each of the six sides. The connecting conductors 60 are connected to the connectors 640*a*. The connectors 640*a* illustrated in FIG. 65 are quadrangular. The connectors 640*a* are not limited to being quadrangular, however, and may have any shape. The ground conductor 640 may have any shape in accordance with the shape of the conducting portion 630. The remaining configuration of the ground conductor 640 illustrated in FIG. 65 is the same as or similar to that of the ground conductor 240 illustrated in FIG. 16.

The first feeder 51 illustrated in FIG. 65 is configured to connect electromagnetically to the second conductor 632. When the resonant structure 610 is used as an antenna, the first feeder 51 is configured to supply power to the conducting portion 630 through the second conductor 632. When the resonant structure 610 is used as an antenna or a filter, the first feeder 51 is configured to supply power from the conducting portion 630 through the second conductor 632 to the outside.

The second feeder 52 illustrated in FIG. 65 is configured to connect electromagnetically to the second conductor 632 at a different position than the first feeder 51. When the resonant structure 610 is used as an antenna, the second feeder 52 is configured to supply power to the conducting portion 630 through the second conductor 632. When the resonant structure 610 is used as an antenna or a filter, the second feeder 52 is configured to supply power from the conducting portion 630 through the second conductor 632 to the outside.

The connecting conductors 60 illustrated in FIG. 61 extend from the ground conductor 640 towards the conducting portion 630. The connecting conductors 60-1 to 60-6 are each connected to the ground conductor 640 and one of the first conductors 631-1 to 631-6.

Example of Resonant State

Figure 66:
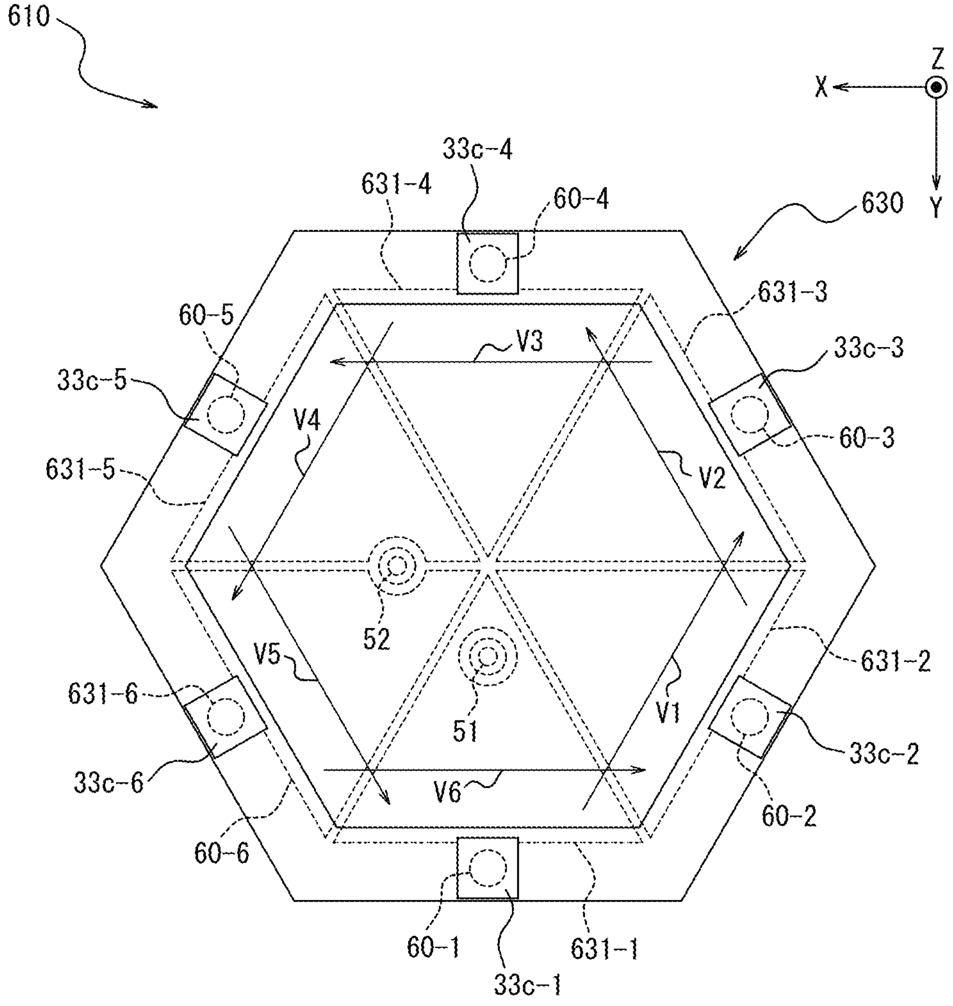
FIG. 66 illustrates an example of a resonant state in the resonant structure illustrated in FIG. 64.

FIG. 66 illustrates an example of a resonant state in the resonant structure 610 illustrated in FIG. 64. The first path V1, the second path V2, the third path V3, the fourth path V4, the fifth path V5, and the sixth path V6 illustrated in FIG. 66 are paths at different times.

The resonant structure 610 resonates at a first frequency v1 along a first path V1. The resonant structure 610 resonates at a second frequency v2 along a second path V2. The resonant structure 610 resonates at a third frequency v3 along a third path V3. The resonant structure 610 resonates at a fourth frequency v4 along a fourth path V4. The resonant structure 610 resonates at a fifth frequency v5 along a fifth path V5. The resonant structure 610 resonates at a sixth frequency v6 along a sixth path V6.

The conducting portion 630 in the resonant structure 610 is substantially a regular hexagon. Each of the first path V1 to the sixth path V6 extends along a side of the conducting portion 630 that is substantially a regular hexagon. The lengths of the first path V1 to the sixth path V6 can be equivalent. When the lengths of the first path V1 to the sixth path V6 are equivalent, the first frequency v1 to the sixth frequency v6 can be equivalent.

In an example of resonance of the resonant structure 610, current flows from the connecting conductor 60-1 through each connecting conductor towards the connecting conductor 60-4 located diagonally across. Each of the currents flowing between the connecting conductors 60 induces electromagnetic waves. The electromagnetic waves induced by these currents combine and are emitted. Consequently, the combined electromagnetic waves appear to be induced by high-frequency current flowing in a direction connecting two diagonally opposite connecting conductors as an apparent current path.

The resonant structure 610 exhibits an artificial magnetic conductor character relative to electromagnetic waves, at the first frequency v1 and polarized along each of the first path V1 through the sixth path V6, incident from the outside onto the upper surface 21 of the substrate 20 on which the conducting portion 630 is located.

Example of Resonant Structure

Figure 67:
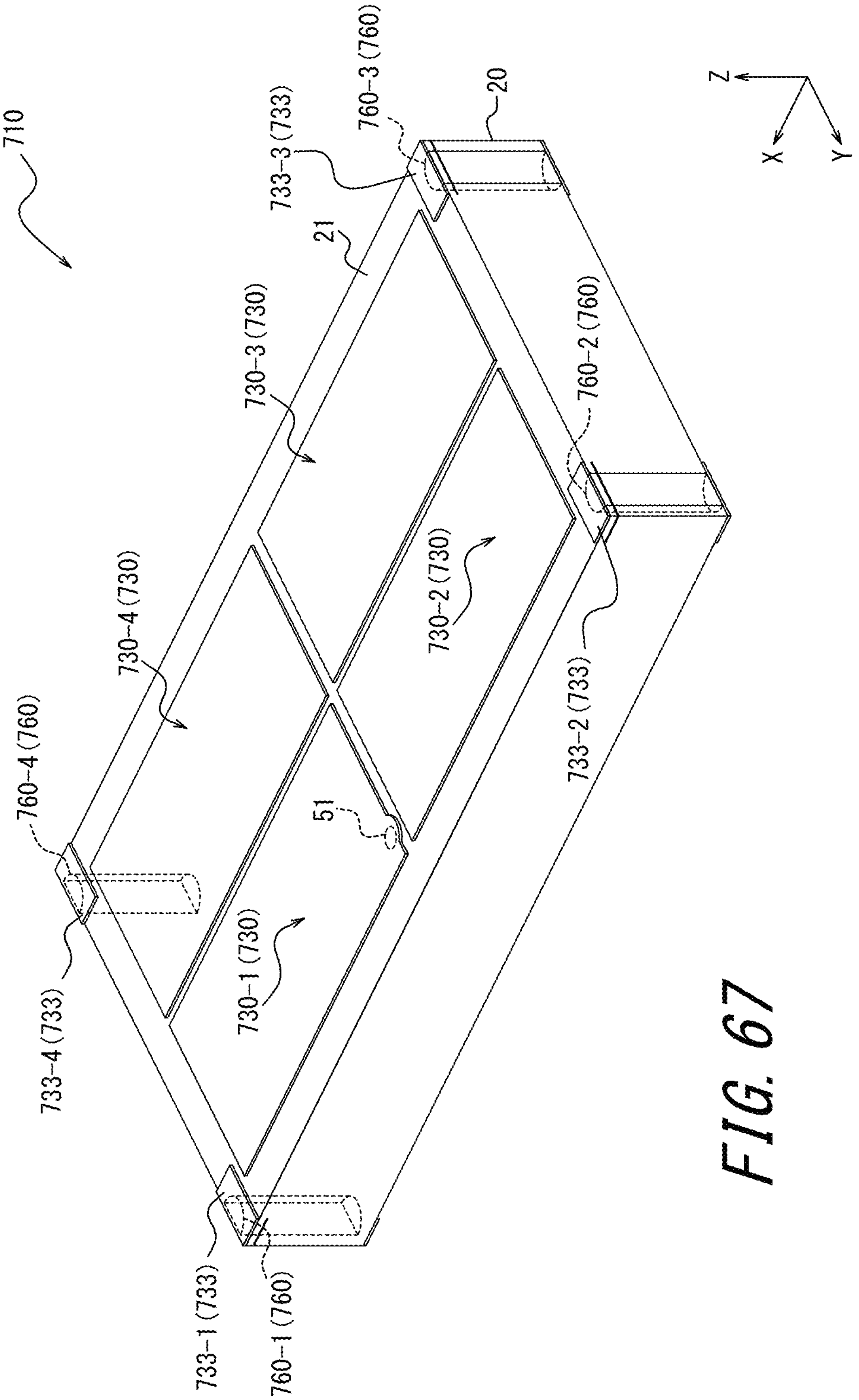
FIG. 67 is a perspective view of a resonant structure according to an embodiment.
Figure 68:
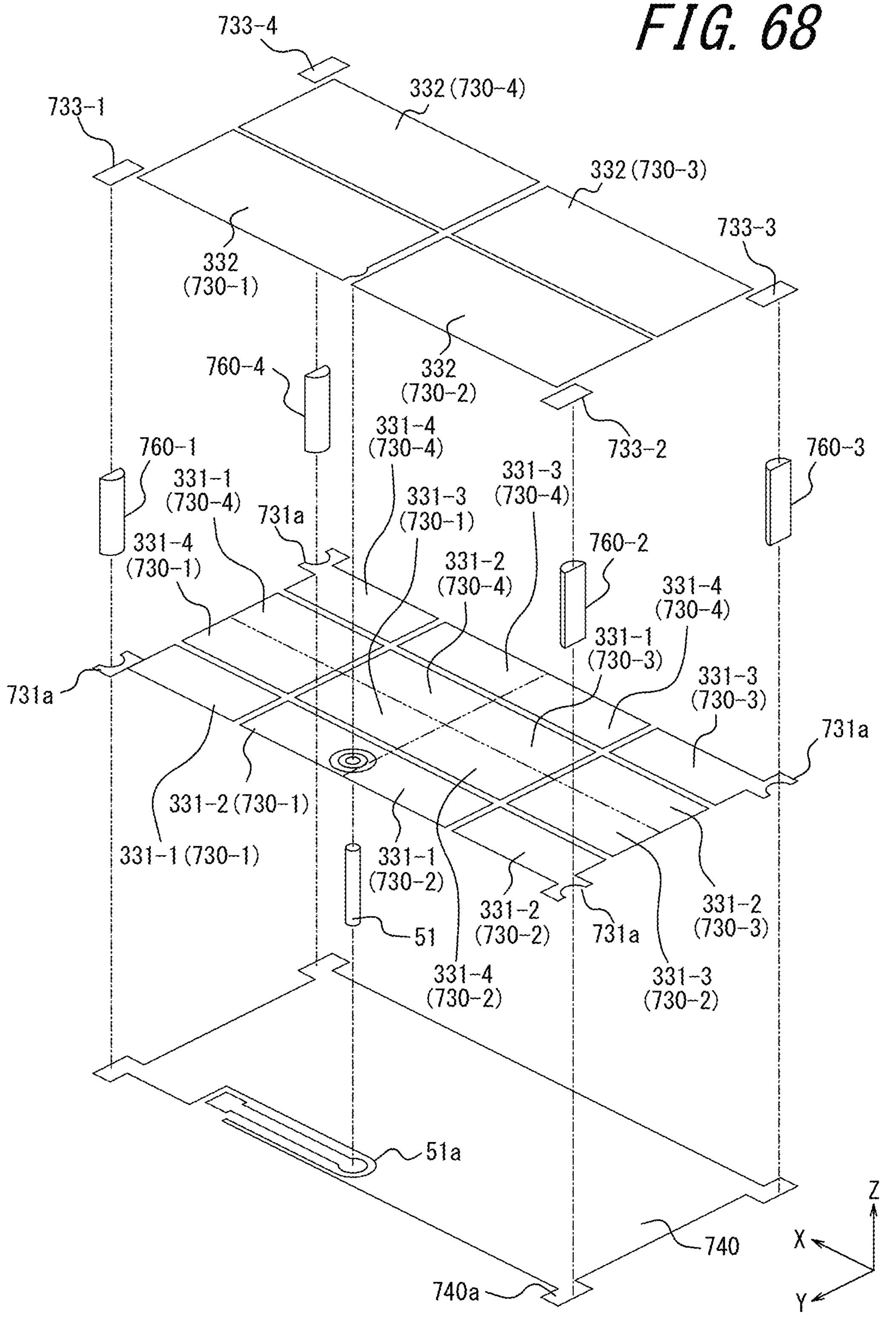
FIG. 68 is an exploded perspective view of a portion of the resonant structure illustrated in FIG. 67.
Figure 69:
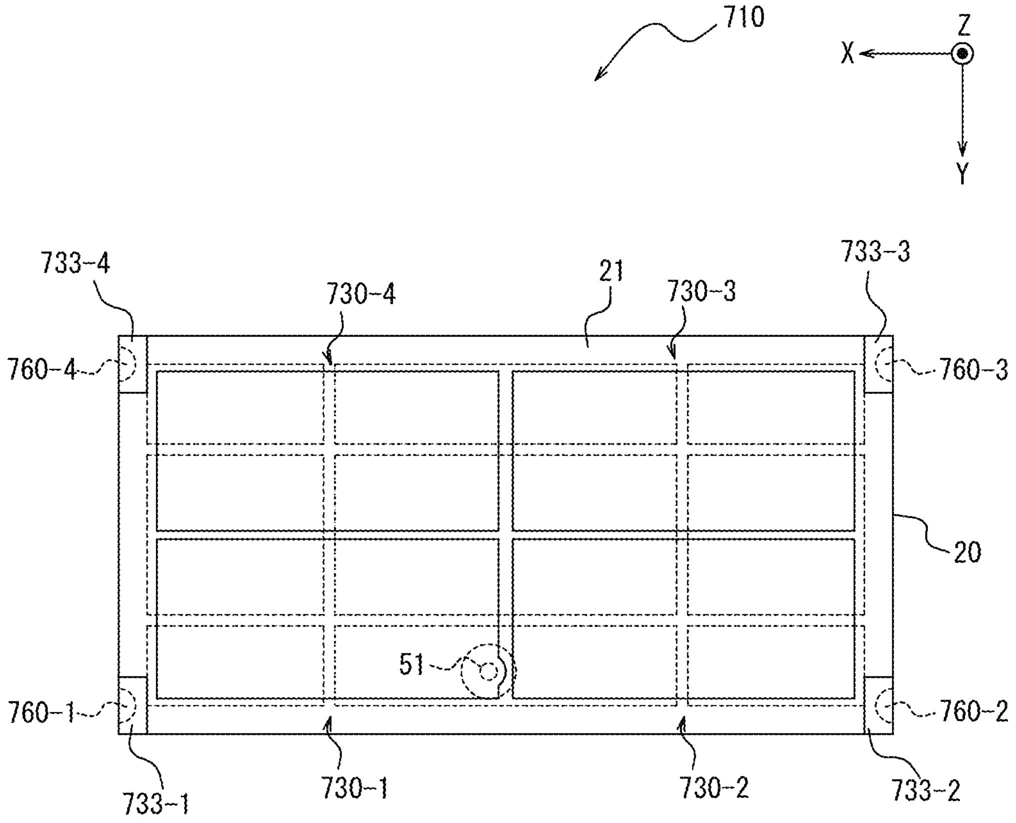
FIG. 69 is a plan view of the resonant structure illustrated in FIG. 67.

FIG. 67 is a perspective view of a resonant structure 710 according to an embodiment. FIG. 68 is an exploded perspective view of a portion of the resonant structure 710 illustrated in FIG. 67. FIG. 69 is a plan view of the resonant structure 710 illustrated in FIG. 67.

The resonant structure 710 resonates at one or a plurality of resonance frequencies. The resonant structure 710 includes a substrate 20, conducting portions 730-1, 730-2, 730-3, 730-4, connectors 733-1, 733-2, 733-3, 733-4, a ground conductor 740, and connecting conductors 760-1, 760-2, 760-3, 760-4. The resonant structure 710 may include a first feeder 51.

The conducting portions 730-1 to 730-4 are collectively indicated as the "conducting portions 730" when no particular distinction is made therebetween. The number of conducting portions 730 in the resonant structure 710 illustrated in FIG. 67 is not limited to four. The resonant structure 710 may include any number of conducting portions 730.

The connectors 733-1 to 733-4 are collectively indicated as the "connectors 733" when no particular distinction is made therebetween. The connecting conductors 760-1 to 760-4 are collectively indicated as the "connecting conductors 760" when no particular distinction is made therebetween.

The conducting portions 730 are configured to function as a portion of a resonator. The conducting portions 730 can be unit structures. The conducting portions 730 have the same substantially rectangular shape. The conducting portions 730 have a substantially rectangular shape with long sides parallel to the X-direction and short sides parallel to the Y-direction.

The conducting portions 730 illustrated in FIG. 69 are aligned in a rectangular grid extending in the X-direction and Y-direction. For example, the conducting portion 730-1 and the conducting portion 730-2 are aligned in the X-direction of the rectangular grid extending in the X-direction and Y-direction. The conducting portion 730-3 and the conducting portion 730-4 are aligned in the X-direction of the rectangular grid extending in the X-direction and Y-direction. The conducting portion 730-1 and the conducting portion 730-4 are aligned in the Y-direction of the rectangular grid extending in the X-direction and Y-direction. The conducting portion 730-2 and the conducting portion 730-3 are aligned in the Y-direction of the rectangular grid extending in the X-direction and Y-direction. The conducting portion 730-1 and the conducting portion 730-3 are aligned along a third diagonal direction of the rectangular grid extending in the X-direction and Y-direction. The conducting portion 730-2 and the conducting portion 730-4 are aligned along a fourth diagonal direction of the rectangular grid extending in the X-direction and Y-direction.

The conducting portions 730 illustrated in FIG. 68 include the second conductor 332 illustrated in FIG. 46 and the first conductors 331-1 to 331-4. The first conductor 331-1 of the conducting portion 730-1 includes a connector 731*a* that connects to the connecting conductor 760-1. The first conductor 331-2 of the conducting portion 730-2 includes a connector 731*a* that connects to the connecting conductor 760-2. The first conductor 331-3 of the conducting portion 730-3 includes a connector 731*a* that connects to the connecting conductor 760-3. The first conductor 331-4 of the conducting portion 730-4 includes a connector 731*a* that connects to the connecting conductor 760-4. The connectors 731*a* have the shape of the third conductors 33*c* illustrated in FIG. 30, divided in half in the Y-direction.

Adjacent first conductors 331 that are included in different conducting portions 730 can be integrated as one flat conductor. As illustrated in FIG. 68, the first conductor 331-2 of the conducting portion 730-1 and the first conductor 331-1 of the conducting portion 730-2, for example, are integrated as one flat conductor. The first conductor 331-4 of the conducting portion 730-1 and the first conductor 331-1 of the conducting portion 730-4, for example, are integrated as one flat conductor. The first conductor 331-3 of the conducting portion 730-1, the first conductor 331-4 of the conducting portion 730-2, the first conductor 331-1 of the conducting portion 730-3, and the first conductor 331-2 of the conducting portion 730-4, for example, are integrated as one flat conductor. The first conductor 331-3 of the conducting portion 730-2 and the first conductor 331-2 of the conducting portion 730-3, for example, are integrated as one flat conductor. The first conductor 331-4 of the conducting portion 730-3 and the first conductor 331-3 of the conducting portion 730-4, for example, are integrated as one flat conductor.

The connectors 733 illustrated in FIG. 67 are located on the upper surface 21 of the substrate. The connectors 733 have the shape of the third conductors 33*c* illustrated in FIG. 30, divided in half. Each of the connectors 733-1 to 733-4 is connected to a different one of the connecting conductors 760-1 to 760-4.

The ground conductor 740 illustrated in FIG. 68 is substantially rectangular. The rectangular ground conductor 740 includes a connector 740*a* at each of the four corners. The connectors 740*a* have the shape of the connectors 440*a* illustrated in FIG. 46, divided in half in the Y-direction. The remaining configuration of the ground conductor 740 illustrated in FIG. 68 is the same as or similar to that of the ground conductor 240 illustrated in FIG. 16.

The connecting conductors 760 have the shape of the connecting conductors 60 illustrated in FIG. 3, divided in half in the Z-direction. The connecting conductor 760-1 connects the first conductor 331-1 of the conducting portion 730-1 with the ground conductor 740. The connecting conductor 760-2 connects the first conductor 331-2 of the conducting portion 730-2 with the ground conductor 740. The connecting conductor 760-3 connects the first conductor 331-3 of the conducting portion 730-3 with the ground conductor 740. The connecting conductor 760-4 connects the first conductor 331-4 of the conducting portion 730-4 with the ground conductor 740.

The first feeder 51 is configured to connect electromagnetically to the second conductor 332 of the conducting portion 730-1. When the resonant structure 710 is used as an antenna, the first feeder 51 is configured to supply power to the conductor 730 through the second conductor 332 of the conducting portion 730-1. When the resonant structure 710 is used as an antenna or a filter, the first feeder 51 is configured to supply power from the conducting portions 730 through the second conductor 332 of the conducting portion 730-1 to the outside.

Example of Resonant Structure

Figure 70:
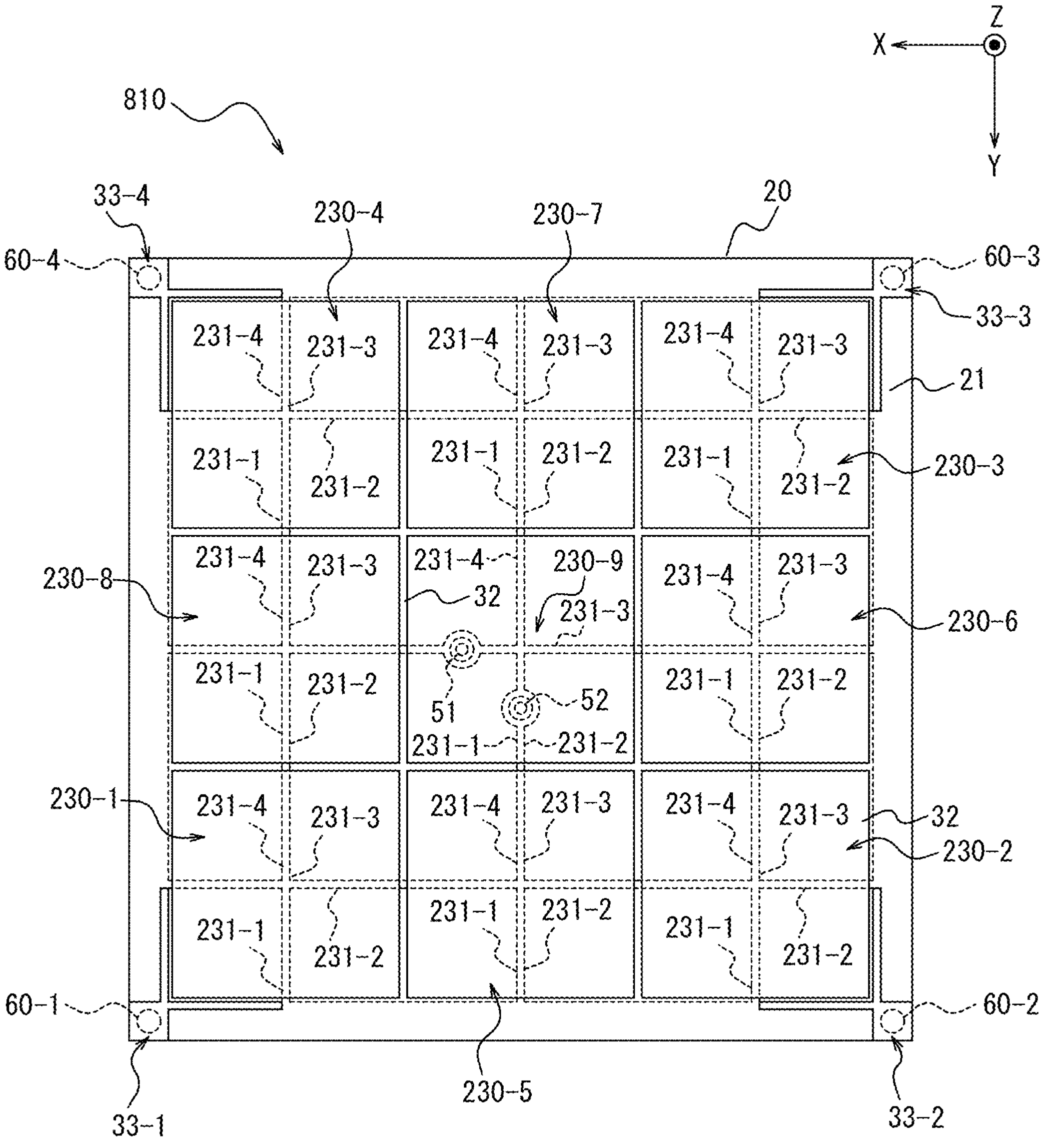
FIG. 70 is a plan view of a resonant structure according to an embodiment.

FIG. 70 is a plan view of a resonant structure 810 according to an embodiment.

The resonant structure 810 resonates at one or a plurality of resonance frequencies. The resonant structure 810 includes a substrate 20, conducting portions 230-1, 230-2, 230-3, 230-4, 230-5, 230-6, 230-7, 230-8, 230-9, and connecting conductors 60-1, 60-2, 60-3, 60-4. The resonant structure 810 includes a ground conductor that is the same as or similar to the ground conductor 240 illustrated in FIG. 16. The ground conductor included in the resonant structure 810, however, has an area corresponding to the area occupied by the conducting portions 230-1 to 230-9 in the XY plane. The resonant structure 810 may include at least one of a first feeder 51 and a second feeder 52.

The conducting portions 230-1 to 230-9 can be the same as or similar to the conducting portions 230 illustrated in FIG. 16. The conducting portions 230 can be unit structures. The conducting portions 230 are aligned in a square grid extending in the X-direction and Y-direction. Among the conducting portions 230 aligned in the square grid, the conducting portions 230-1 to 230-4 at the corners of the square grid include third conductors 33-1 to 33-4.

Adjacent first conductors 231 that are included in different conducting portions 230 can be integrated as a flat conductor. For example, the connection relationship in the conducting portion 230-1 is as follows. The first conductor 231-2 of the conducting portion 230-1 and the first conductor 231-1 of the conducting portion 230-5 are integrated as a flat conductor. The first conductor 231-3 of the conducting portion 230-1, the first conductor 231-4 of the conducting portion 230-5, the first conductor 231-1 of the conducting portion 230-9, and the first conductor 231-2 of the conducting portion 230-8, for example, are integrated as a flat conductor. The first conductor 231-4 of the conducting portion 230-1 and the first conductor 231-1 of the conducting portion 230-8, for example, are integrated as a flat conductor.

The first feeder 51 is configured to connect electromagnetically to the second conductor 32 of the conducting portion 230-9 located in the center of the conducting portions 230 aligned in a square grid. When the resonant structure 810 is used as an antenna, the first feeder 51 is configured to supply power to the conducting portions 230 through the second conductor 32. When the resonant structure 810 is used as an antenna or a filter, the first feeder 51 is configured to supply power from the conducting portions 230 through the second conductor 32 to the outside.

The second feeder 52 is configured to connect electromagnetically to the second conductor 32 of the conducting portion 230-9 located in the center of the conducting portions 230 aligned in a square grid. The second feeder 52 is electromagnetically connected to the second conductor 32 at a different position than the first feeder 51. When the resonant structure 810 is used as an antenna, the second feeder 52 is configured to supply power to the conducting portions 230 through the second conductor 32. When the resonant structure 810 is used as an antenna or a filter, the second feeder 52 is configured to supply power from the conducting portions 230 through the second conductor 32 to the outside.

Other Example of Resonant Structure

Figure 71:
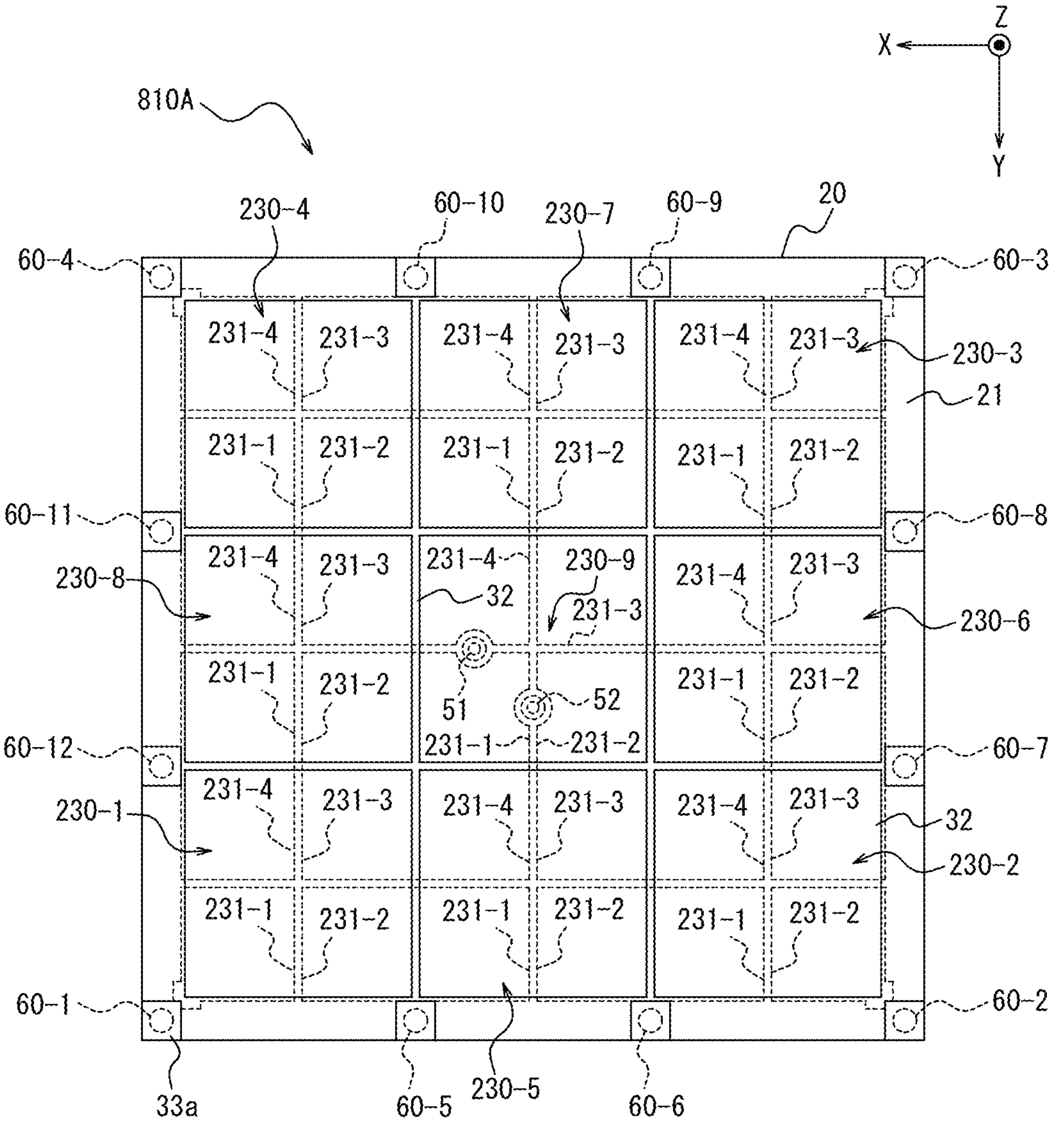
FIG. 71 is a plan view of a resonant structure according to an embodiment.

FIG. 71 is a plan view of a resonant structure 810A according to an embodiment. The explanation below focuses on the differences between the resonant structure 810A and the resonant structure 810 illustrated in FIG. 70.

The resonant structure 810A includes 12 connectors 33*a* and connecting conductors 60-1 to 60-12. Each of the connectors 33*a* is connected to a different one of the connecting conductors 60-1 to 60-12.

The connecting conductors 60-5, 60-6 are located between the connecting conductor 60-1 and the connecting conductor 60-2 in the X-direction. The connecting conductor 60-5 and the connecting conductor 60-6 may be aligned at equal intervals between the connecting conductor 60-1 and the connecting conductor 60-2. The connecting conductor 60-5 is connected to the first conductor 231-2 of the conducting portion 230-1 and the first conductor 231-1 of the conducting portion 230-5. The connecting conductor 60-6 is connected to the first conductor 231-1 of the conducting portion 230-2 and the first conductor 231-2 of the conducting portion 230-5.

The connecting conductors 60-7, 60-8 are located between the connecting conductor 60-2 and the connecting conductor 60-3 in the Y-direction. The connecting conductor 60-7 and the connecting conductor 60-8 may be aligned at equal intervals between the connecting conductor 60-2 and the connecting conductor 60-3. The connecting conductor 60-7 is connected to the first conductor 231-3 of the conducting portion 230-2 and the first conductor 231-2 of the conducting portion 230-6. The connecting conductor 60-8 is connected to the first conductor 231-3 of the conducting portion 230-6 and the first conductor 231-2 of the conducting portion 230-3.

The connecting conductors 60-9, 60-10 are located between the connecting conductor 60-3 and the connecting conductor 60-4 in the X-direction. The connecting conductor 60-9 and the connecting conductor 60-10 may be aligned at equal intervals between the connecting conductor 60-3 and the connecting conductor 60-4. The connecting conductor 60-9 is connected to the first conductor 231-4 of the conducting portion 230-3 and the first conductor 231-3 of the conducting portion 230-7. The connecting conductor 60-10 is connected to the first conductor 231-3 of the conducting portion 230-4 and the first conductor 231-4 of the conducting portion 230-7.

The connecting conductors 60-11, 60-12 are located between the connecting conductor 60-1 and the connecting conductor 60-4 in the Y-direction. The connecting conductor 60-11 and the connecting conductor 60-12 may be aligned at equal intervals between the connecting conductor 60-1 and the connecting conductor 60-4. The connecting conductor 60-11 is connected to the first conductor 231-1 of the conducting portion 230-4 and the first conductor 231-4 of the conducting portion 230-8. The connecting conductor 60-12 is connected to the first conductor 231-4 of the conducting portion 230-1 and the first conductor 231-1 of the conducting portion 230-8.

Other Example of Resonant Structure

Figure 72:
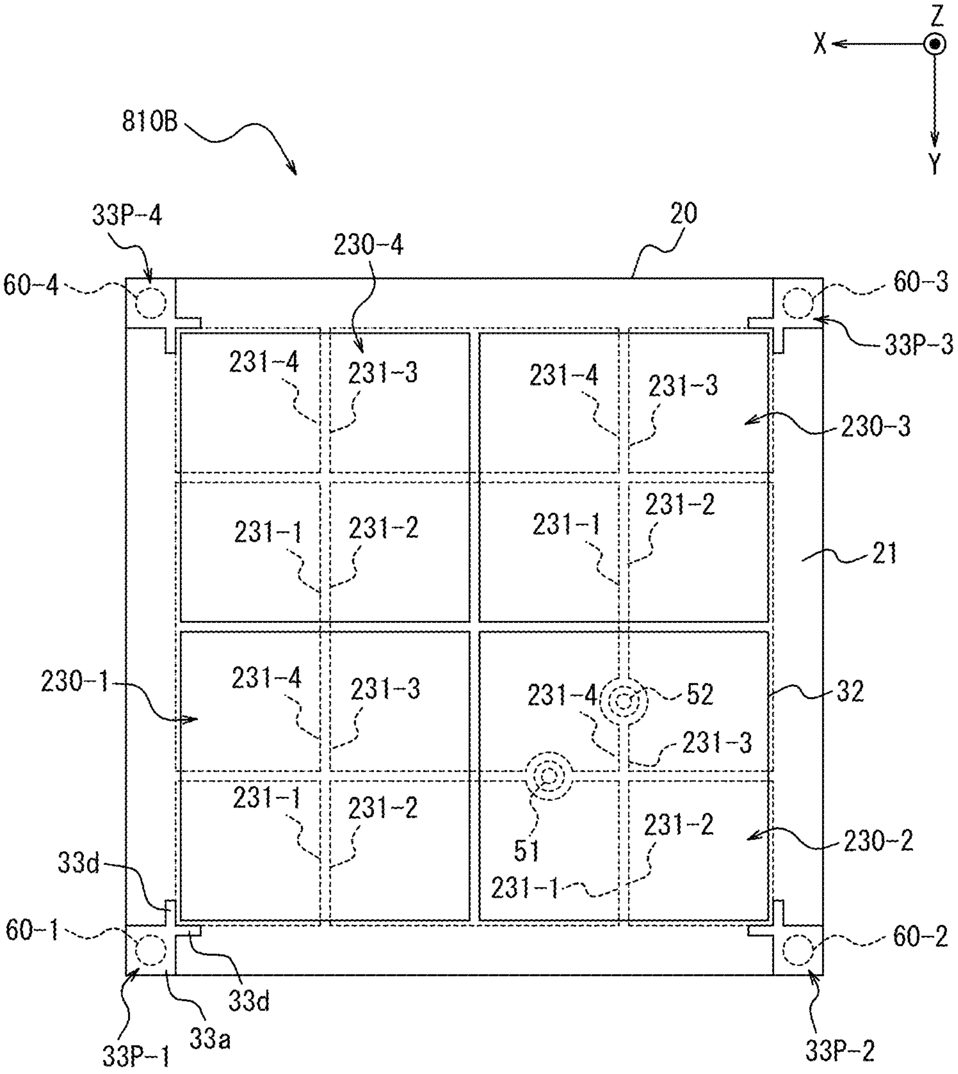
FIG. 72 is a plan view of a resonant structure according to an embodiment.

FIG. 72 is a plan view of a resonant structure 810B according to an embodiment. The explanation below focuses on the differences between the resonant structure 810B and the resonant structure 810 illustrated in FIG. 70.

The resonant structure 810B includes conducting portions 230-1, 230-2, 230-3, 230-4 and connecting conductors 60-1, 60-2, 60-4, 60-4.

The conducting portion 230-1 includes a third conductor 33P-1 that connects to the connecting conductor 60-1. The conducting portion 230-2 includes a third conductor 33P-2 that connects to the connecting conductor 60-2. The conducting portion 230-3 includes a third conductor 33P-3 that connects to the connecting conductor 60-3. The conducting portion 230-4 includes a third conductor 33P-4 that connects to the connecting conductor 60-4. The third conductors 33P-1 to 33P-4 can be the same as those illustrated in FIG. 37.

Adjacent first conductors 231 that are included in different conducting portions 230 can be integrated as a flat conductor. The first conductor 231-2 of the conducting portion 230-1 and the first conductor 231-1 of the conducting portion 230-2, for example, are integrated as a flat conductor. The first conductor 231-3 of the conducting portion 230-1, the first conductor 231-4 of the conducting portion 230-2, the first conductor 231-1 of the conducting portion 230-3, and the first conductor 231-2 of the conducting portion 230-4, for example, are integrated as a flat conductor. The first conductor 231-4 of the conducting portion 230-1 and the first conductor 231-1 of the conducting portion 230-4, for example, are integrated as a flat conductor. The first conductor 231-3 of the conducting portion 230-2 and the first conductor 231-2 of the conducting portion 230-3, for example, are integrated as a flat conductor. The first conductor 231-4 of the conducting portion 230-3 and the first conductor 231-3 of the conducting portion 230-4, for example, are integrated as a flat conductor.

The first feeder 51 is configured to connect electromagnetically to the second conductor 32 of the conducting portion 230-2. The second feeder 52 is configured to connect electromagnetically to the second conductor 32 of the conducting portion 230-2 at a different position than the first feeder 51.

Other Example of Resonant Structure

Figure 73:
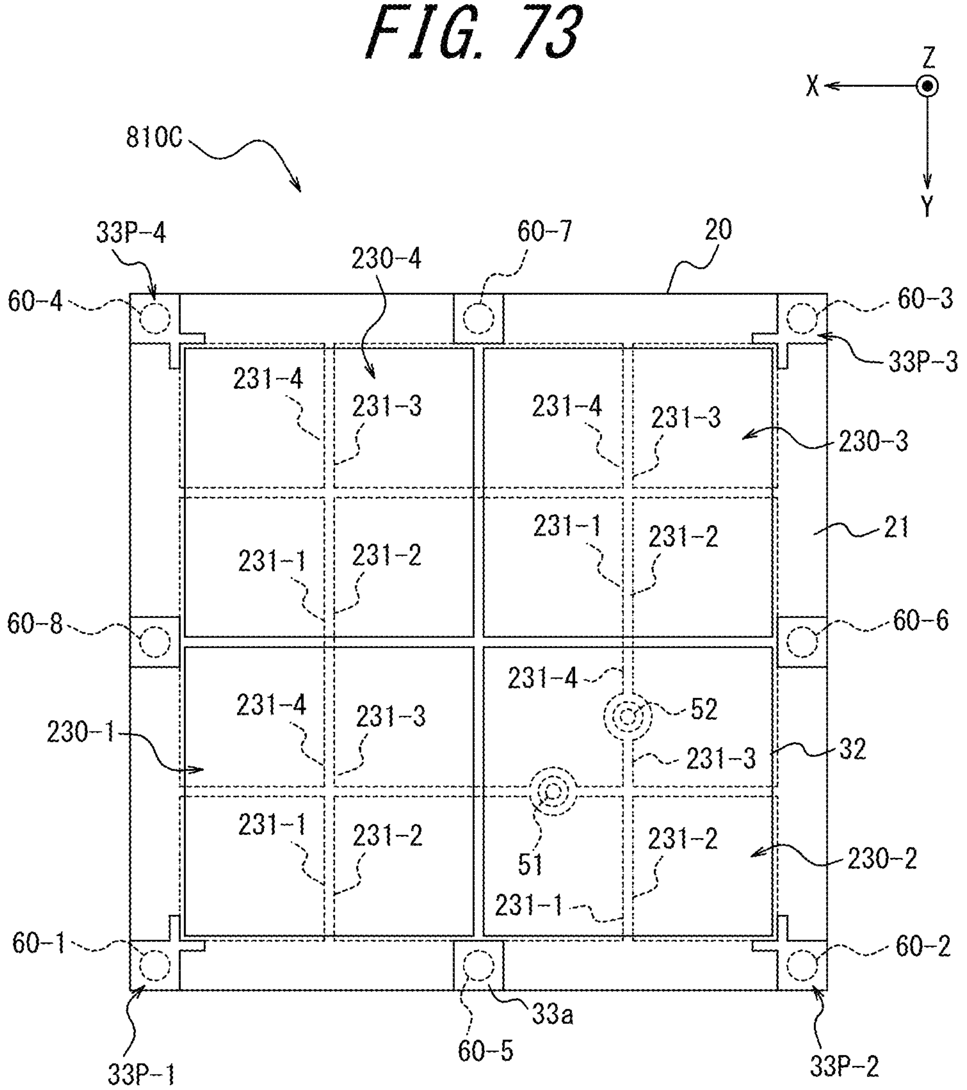
FIG. 73 is a plan view of a resonant structure according to an embodiment.

FIG. 73 is a plan view of a resonant structure 810C according to an embodiment. The explanation below focuses on the differences between the resonant structure 810C and the resonant structure 810B illustrated in FIG. 72.

In addition to the connecting conductors 60-1 to 60-4, the resonant structure 810C includes connecting conductors 60-5 to 60-8. The resonant structure 810 includes four connectors 33*a*. Each of the connectors 33*a* is connected to a different one of the connecting conductors 60-5 to 60-8.

The connecting conductor 60-5 is located between the connecting conductor 60-1 and the connecting conductor 60-2 in the X-direction. The connecting conductor 60-5 may be located in the central region between the connecting conductor 60-1 and the connecting conductor 60-2. The connecting conductor 60-5 is connected to the first conductor 231-2 of the conducting portion 230-1 and the first conductor 231-1 of the conducting portion 230-2.

The connecting conductor 60-6 is located between the connecting conductor 60-2 and the connecting conductor 60-3 in the Y-direction. The connecting conductor 60-6 may be located in the central region between the connecting conductor 60-2 and the connecting conductor 60-3. The connecting conductor 60-6 is connected to the first conductor 231-3 of the conducting portion 230-2 and the first conductor 231-2 of the conducting portion 230-3.

The connecting conductor 60-7 is located between the connecting conductor 60-3 and the connecting conductor 60-4 in the X-direction. The connecting conductor 60-7 may be located in the central region between the connecting conductor 60-3 and the connecting conductor 60-4. The connecting conductor 60-7 is connected to the first conductor 231-4 of the conducting portion 230-3 and the first conductor 231-3 of the conducting portion 230-4.

The connecting conductor 60-8 is located between the connecting conductor 60-1 and the connecting conductor 60-4 in the Y-direction. The connecting conductor 60-8 may be located in the central region between the connecting conductor 60-1 and the connecting conductor 60-4. The connecting conductor 60-8 is connected to the first conductor 231-4 of the conducting portion 230-1 and the first conductor 231-1 of the conducting portion 230-4.

[Wireless Communication Module]

Figure 74:
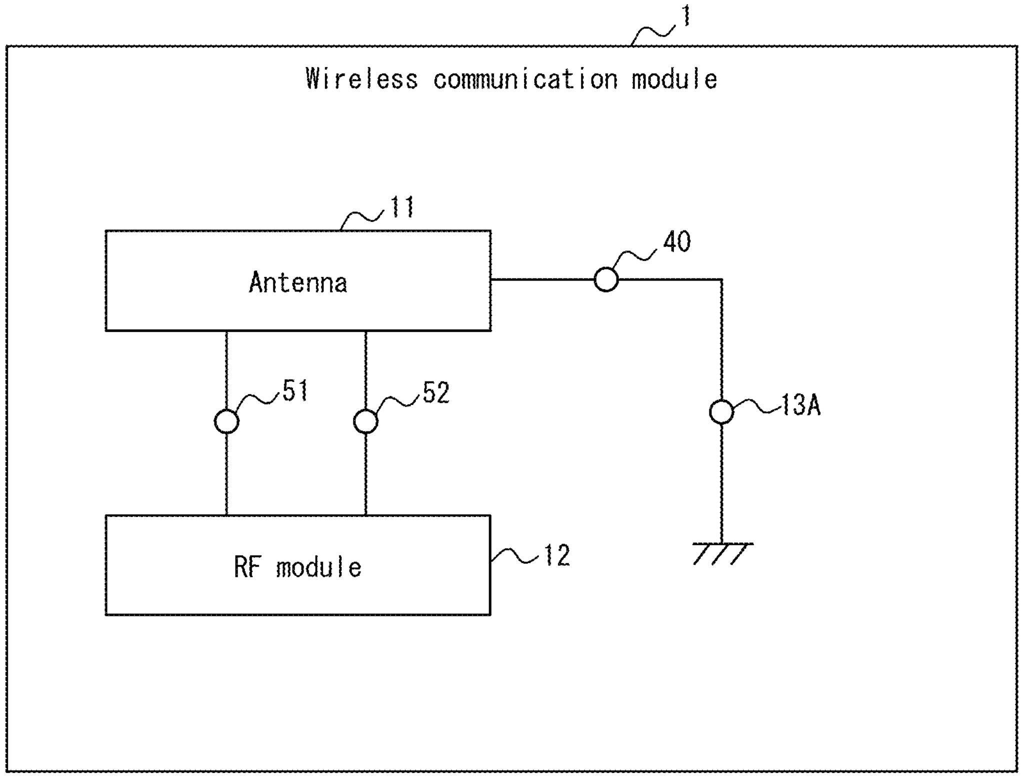
FIG. 74 is a block diagram of a wireless communication module according to an embodiment.
Figure 75:
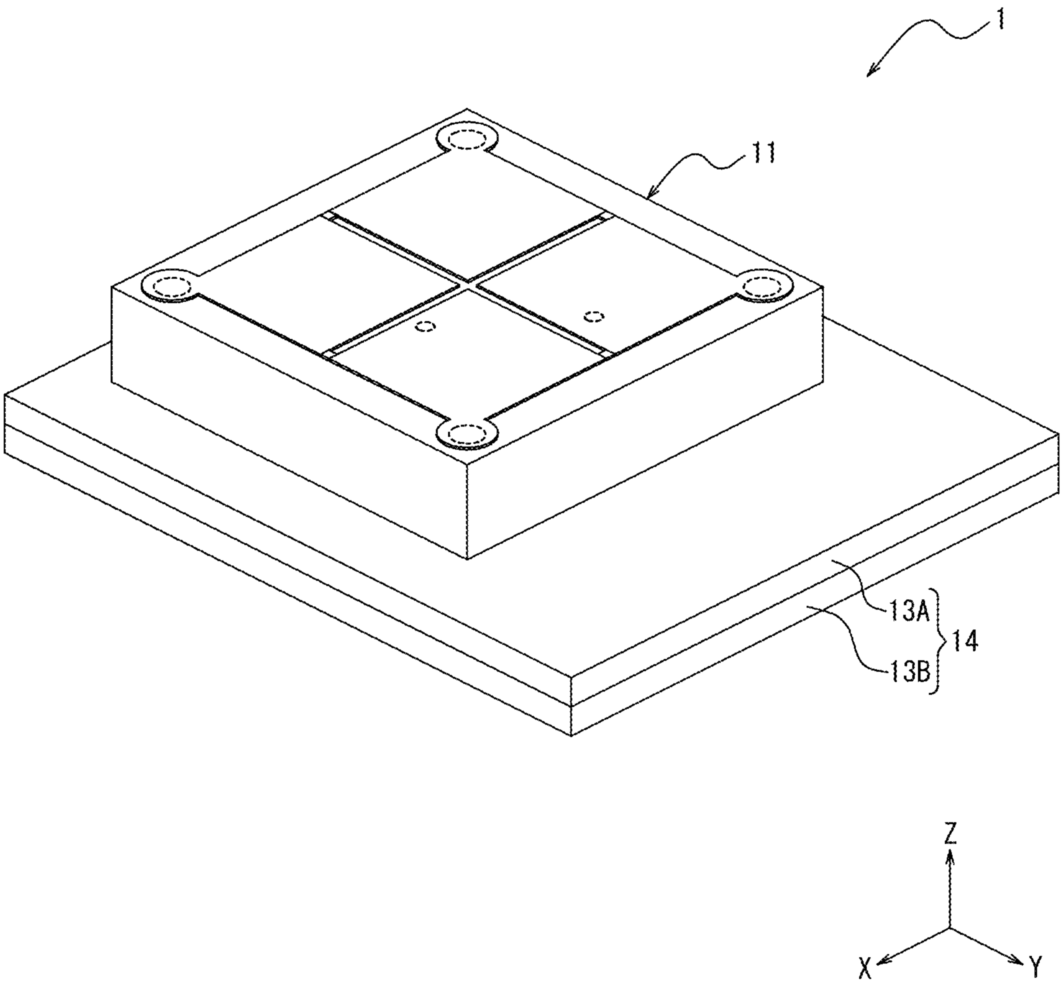
FIG. 75 is a schematic configuration diagram of a wireless communication module 1 illustrated in FIG. 74.

FIG. 74 is a block diagram of a wireless communication module 1 according to an embodiment. FIG. 75 is a schematic configuration diagram of the wireless communication module 1 illustrated in FIG. 74.

The wireless communication module 1 includes an antenna 11, an RF module 12, and a circuit board 14 that includes a ground conductor 13A and an organic substrate 13B.

The antenna 11 includes the resonant structure 10 illustrated in FIG. 1. The antenna 11 may, however, include any of the resonant structures of the present disclosure. The resonant structure 10 included in the antenna 11 includes a first feeder 51 and a second feeder 52.

As illustrated in FIG. 75, the antenna 11 is located on the circuit board 14. The first feeder 51 of the antenna 11 is connected to the RF module 12 illustrated in FIG. 74 via the circuit board 14 illustrated in FIG. 75. The second feeder 52 of the antenna 11 is connected to the RF module 12 illustrated in FIG. 74 via the circuit board 14 illustrated in FIG. 75. The ground conductor 40 of the antenna 11 is configured to connect electromagnetically to the ground conductor 13A included in the circuit board 14.

The resonant structure 10 included in the antenna 11 is not limited to including both the first feeder 51 and the second feeder 52. The resonant structure 10 included in the antenna 11 may include one of the first feeder 51 and the second feeder 52. When the antenna 11 includes one feeder, corresponding changes are made to the structure of the circuit board 14 as appropriate. The RF module 12, for example, may have one connection terminal. The circuit board 14, for example, may have one conducting wire that connects the connection terminal of the RF module 12 and the feeder of the antenna 11.

The ground conductor 13A can include a conductive material. The ground conductor 13A can extend along the XY plane. The ground conductor 13A has a greater area in the XY plane than the ground conductor 40 of the antenna 11. The length of the ground conductor 13A in the Y-direction is greater than the length of the ground conductor 40 of the antenna 11 in the Y-direction. The length of the ground conductor 13A in the X-direction is greater than the length of the ground conductor 40 of the antenna 11 in the X-direction. The antenna 11 can be located in the Y-direction towards an edge from the center of the ground conductor 13A. The center of the antenna 11 can differ from the center of the ground conductor 13A in the XY plane. The center of the antenna 11 can differ from the center of the first conductors 31-1 to 31-4 illustrated in FIG. 1. The location where the first feeder 51 is connected to the first conductor 31-1 illustrated in FIG. 1 can differ from the center of the ground conductor 13A in the XY plane. The location where the second feeder 52 is connected to the first conductor 31-2 illustrated in FIG. 1 can differ from the center of the ground conductor 13A in the XY plane.

In the antenna 11, current loops along a first current path through two connecting conductors 60 that form the first connecting pair illustrated in FIG. 1. In the antenna 11, current loops along a second current path through two connecting conductors 60 that form the second connecting pair illustrated in FIG. 1. By the antenna 11 being located towards an edge in the Y-direction from the center of the ground conductor 13A, the current path flowing through the ground conductor 13A is not targeted. As a result of the current path flowing through the ground conductor 13A not being targeted, the antenna structure that includes the antenna 11 and the ground conductor 13A has a larger polarization component in the X-direction of the emitted waves. The large polarization component in the X-direction of the emitted waves can increase the total emission efficiency of emitted waves.

The antenna 11 can be integrated with the circuit board 14. When the antenna 11 is integrated with the circuit board 14, the ground conductor 40 of the antenna 11 can be integrated with the ground conductor 13A of the circuit board 14.

The RF module 12 can be configured to control the power supplied to the antenna 11. The RF module 12 is configured to modulate a baseband signal and supply the modulated signal to the antenna 11. The RF module 12 can be configured to modulate an electric signal received by the antenna 11 into a baseband signal.

The change in the resonance frequency of the antenna 11 due to the conductor on the circuit board 14 side is small. By including the antenna 11, the wireless communication module 1 can reduce the effect of the outside environment.

[Wireless Communication Device]

Figure 76:
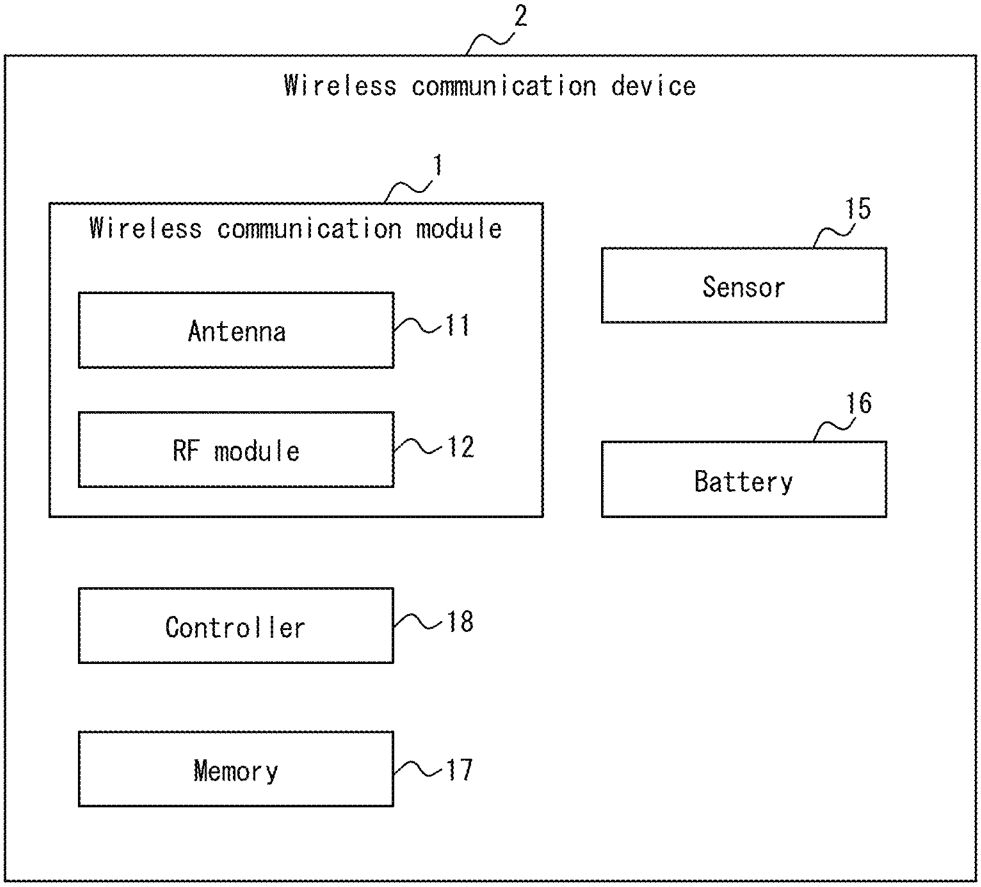
FIG. 76 is a block diagram of a wireless communication device according to an embodiment.
Figure 77:
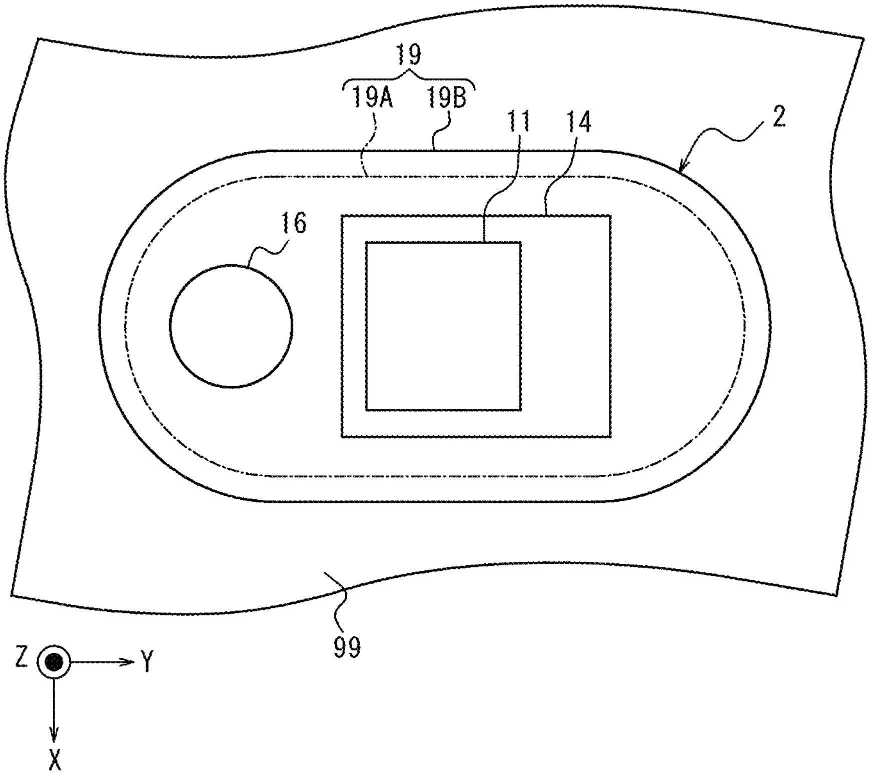
FIG. 77 is a plan view of the wireless communication device illustrated in FIG. 76.
Figure 78:
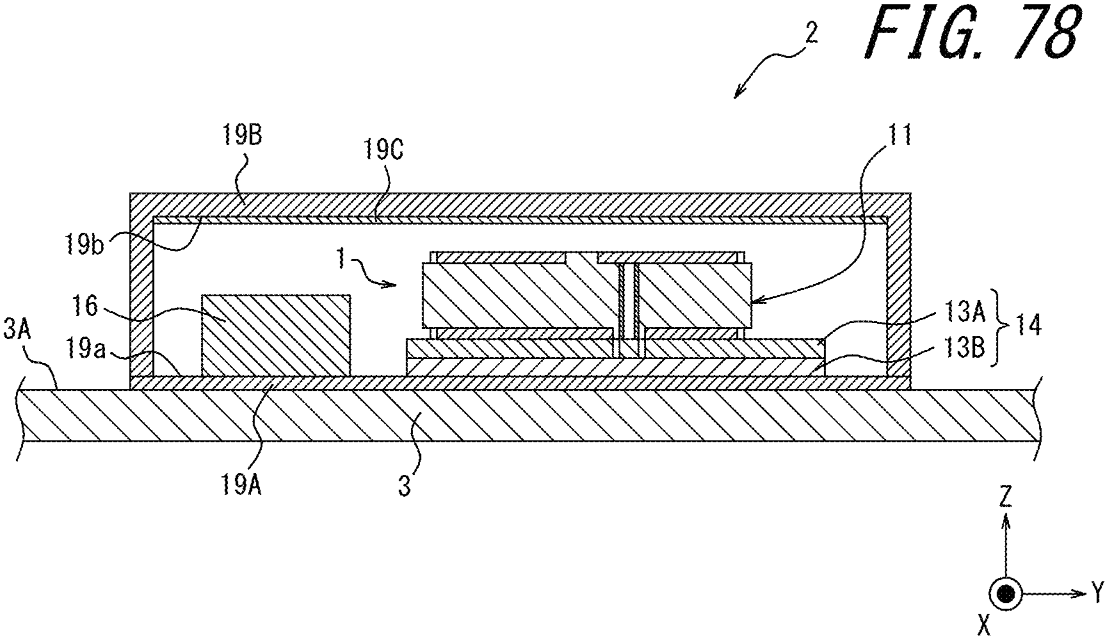
FIG. 78 is a cross-section of the wireless communication device illustrated in FIG. 76.

FIG. 76 is a block diagram of a wireless communication device 2 according to an embodiment. FIG. 77 is a plan view of the wireless communication device 2 illustrated in FIG. 76. FIG. 78 is a cross-section of the wireless communication device 2 illustrated in FIG. 76.

The wireless communication device 2 includes a wireless communication module 1, a sensor 15, a battery 16, a memory 17, a controller 18, and a housing 19.

The sensor 15 may, for example, include a speed sensor, a vibration sensor, an acceleration sensor, a gyro sensor, a rotation angle sensor, an angular velocity sensor, a geomagnetic sensor, a magnetic sensor, a temperature sensor, a humidity sensor, an atmospheric pressure sensor, a light sensor, an illuminance sensor, a UV sensor, a gas sensor, a gas density sensor, an atmospheric sensor, a level sensor, an odor sensor, a pressure sensor, an air pressure sensor, a contact sensor, a wind sensor, an infrared sensor, a human sensor, a displacement sensor, an image sensor, a weight sensor, a smoke sensor, a leak sensor, a vital sensor, a battery level sensor, an ultrasound sensor, a global positioning system (GPS) signal receiver, or the like.

The battery 16 is configured to supply power to the wireless communication module 1. The battery 16 can be configured to supply power to at least one of the sensor 15, the memory 17, and the controller 18. The battery 16 can include at least one of a primary battery and a secondary battery. The negative electrode of the battery 16 is configured to be connected electrically to the ground terminal of the circuit board 14 illustrated in FIG. 75. The negative electrode of the battery 16 is configured to be connected electrically to the ground conductor 40 of the antenna 11.

The memory 17 can, for example, include a semiconductor memory or the like. The memory 17 can be configured to function as a working memory of the controller 18. The memory 17 can be included in the controller 18. The memory 17 stores programs describing the processing for implementing the functions of the wireless communication device 2, information used for processing on the wireless communication device 2, and the like.

The controller 18 can, for example, include a processor. The controller 18 may include one or more processors. The term "processor" may encompass universal processors that execute particular functions by reading particular programs and dedicated processors that are specialized for particular processing. Dedicated processors may include an application specific integrated circuit (ASIC). The processor may include a programmable logic device (PLD). The PLD may include a field-programmable gate array (FPGA). The controller 18 may be either a system-on-a-chip (SoC) or a system in a package (SiP) with one processor or a plurality of processors that work together. The controller 18 may store various information, programs for causing the constituent elements of the wireless communication device 2 to operate, and the like in the memory 17.

The controller 18 is configured to generate a transmission signal for transmission from the wireless communication device 2. The controller 18 may, for example, be configured to acquire measurement data from the sensor 15. The controller 18 may be configured to generate the transmission signal in accordance with the measurement data. The controller 18 can be configured to transmit a baseband signal to the RF module 12 of the wireless communication module 1.

The housing 19 illustrated in FIG. 77 is configured to protect the other devices of the wireless communication device 2. The housing 19 can include a first housing 19A and a second housing 19B.

The first housing 19A illustrated in FIG. 78 can extend in the XY plane. The first housing 19A is configured to support other devices.

The first housing 19A illustrated in FIG. 78 can extend in the XY plane. The first housing 19A is configured to support other devices. The first housing 19A can be configured to support the wireless communication device 2. The wireless communication device 2 is located on the upper surface 19*a* of the first housing 19A. The first housing 19A can be configured to support the battery 16. The battery 16 is located on the upper surface 19*a* of the first housing 19A. The wireless communication module 1 and the battery 16 may be aligned along the X-direction on the upper surface 19*a* of the first housing 19A. The connecting conductors 60, illustrated in FIG. 1, of the antenna 11 are located between the battery 16 and the conducting portion 30, illustrated in FIG. 1, of the antenna 11. The battery 16 is located on the opposite side of the connecting conductors 60 from the perspective of the conducting portion 30, illustrated in FIG. 1, of the antenna 11.

The second housing 19B illustrated in FIG. 78 can cover other devices. The second housing 19B includes a lower surface 19*b* located at the side of the antenna 11 in the negative direction of the Z-axis. The lower surface 19*b* extends along the XY plane. The lower surface 19*b* is not limited to being flat and can be uneven. The second housing 19*b* can include a conductive member 19C. The conductive member 19C is located on at least one of the interior, the outer side, or the inner side of the second housing 19B. The conductive member 19C is located on at least one of the upper surface and the lower surface of the second housing 19B.

The conductive member 19C illustrated in FIG. 78 is opposite the antenna 11. The antenna 11 is configured to be capable of coupling with the conductive member 19C and emitting electromagnetic waves using the conductive member 19C as a secondary radiator. When the antenna 11 and the conductive member 19C are opposite each other, the capacitive coupling between the antenna 11 and the conductive member 19C can increase. When the current direction of the antenna 11 is along the direction in which the conductive member 19C extends, the electromagnetic coupling between the antenna 11 and the conductive member 19C can increase. This coupling can lead to mutual inductance.

Configurations according to the present disclosure are not limited to the above embodiments, and a variety of modifications and changes are possible. For example, the functions and the like included in the various components may be reordered in any logically consistent way. Furthermore, components may be combined into one or divided.

For example, a resonant structure 210X that includes a conducting portion 230X as illustrated in FIG. 79 is possible. The conducting portion 230X is substantially square. The conducting portion 230X includes first conductors 231X-1, 231X-2, second conductors 32X-1, 32X-2, and third conductors 33*c*-1, 33*c*-2.

The first conductors 231X-1, 231X-2 illustrated in FIG. 79 are opposite each other along a diagonal line from the connecting conductor 60-1 towards the connecting conductor 60-3. The first conductors 231X-1, 231X-2 substantially form a square when combined. Each of the first conductors 231X-1, 231X-2 is substantially triangular. Each of the first conductors 231X-1, 231X-2 has a shape resulting from dividing the conducting portion 320X, which is substantially square, equally along a diagonal line from the connecting conductor 60-2 towards the connecting conductor 60-4. The first conductor 231X-1 includes a connector 231*a* that connects to the connecting conductor 60-1. The first conductor 231X-2 includes a connector 231*a* that connects to the connecting conductor 60-3.

The second conductors 32X-1, 32X-2 illustrated in FIG. 79 are opposite each other along a diagonal line from the connecting conductor 60-2 towards the connecting conductor 60-4. The second conductors 32X-1, 32X-2 substantially form a square when combined. Each of the second conductors 32X-1, 32X-2 is substantially triangular. Each of the second conductors 32X-1, 32X-2 has a shape resulting from dividing the conducting portion 320X, which is substantially square, equally along a diagonal line from the connecting conductor 60-1 towards the connecting conductor 60-3. The second conductor 32X-1 includes a connector 33X that connects to the connecting conductor 60-4. The second conductor 32X-2 includes a connector 33X that connects to the connecting conductor 60-2. The second conductor 32X-1 is opposite a portion of the first conductor 231X-1 and a portion of the first conductor 231X-2 in the Z-direction. The second conductor 32X-1 is configured to capacitively couple with a portion of the first conductor 231X-1 and a portion of the first conductor 231X-2. The second conductor 32X-2 is opposite a portion of the first conductor 231X-1 and a portion of the first conductor 231X-2 in the Z-direction. The second conductor 32X-2 is configured to capacitively couple with a portion of the first conductor 231X-1 and a portion of the first conductor 231X-2. Among the four connecting conductors 60, two that extend in the X-direction or the Y-direction are configured to capacitively couple via one of the first conductors 231X and one of the second conductors 32X.

The third conductor 33*c*-1 illustrated in FIG. 79 is connected to the connecting conductor 60-1. The third conductor 33*c*-2 is connected to the connecting conductor 60-3.

The drawings illustrating configurations according to the present disclosure are merely schematic. The dimensional ratios and the like in the drawings do not necessarily match the actual dimensions.

The references to “first”, “second”, “third”, and the like in the present disclosure are examples of identifiers for distinguishing between elements. The numbers attached to elements distinguished by references to “first”, “second”, and the like in the present disclosure may be switched. For example, the identifiers “first” and “second” of the first frequency and the second frequency may be switched. Identifiers are switched simultaneously, and the elements are still distinguished between after identifiers are switched. The identifiers may be removed. Elements from which the identifiers are removed are distinguished by their reference sign. Identifiers in the present disclosure, such as “first”, “second”, and the like, may not be used in isolation as an interpretation of the order of elements, as the basis for the existence of the identifier with a lower number, or as the basis for the existence of the identifier with a higher number.

The invention claimed is:

1. An antenna comprising:

a resonant structure; and a first feeding line;

wherein the resonant structure comprises:

a conducting portion extending in a first plane, and the conducting portion comprising a plurality of first conductors;

a ground conductor separated from the conducting portion in a third direction, the third direction intersecting the first plane, and the ground conductor extending in the first plane;

a first number of connecting conductors extending from the ground conductor toward the conducting portion, the first number being three or more; and a third number of capacitive portions configured to capacitively connect a pair of first conductors of the plurality of first conductors, the pair of first conductors being separated by at least a corresponding gap, the third number being one or more;

wherein at least two conductors of the plurality of first conductors are connected to different connecting conductors;

wherein two connecting conductors of the first number of connecting conductors are part of a first connecting pair aligned in a first direction in the first plane;

wherein two connecting conductors of the first number of connecting conductors are part of a second connecting pair aligned in a second direction in the first plane and intersecting the first direction;

wherein the resonant structure is configured to resonate at a first frequency in a first current path;

wherein the resonant structure is configured to resonate at a second frequency in a second current path;

wherein the first current path comprises the ground conductor, the conducting portion, at least a first capacitive portion of the third number of capacitive portions, and the first connecting pair;

wherein the second current path comprises the ground conductor, the conducting portion, and the second connecting pair; and wherein the first feeding line is configured to electromagnetically connect to the conducting portion.

2. The antenna of claim 1, wherein the first current path further comprises:

a second capacitive portion of the third number of capacitive portions in response to the third number being more than one, and the second current path fails to include the third number of capacitive portions.

3. The antenna of claim 1, wherein the first current path or the second current path further comprises:

a second capacitive portion of the third number of capacitive portions in response to the third number being more than one.

4. The antenna of claim 3, wherein the first current path further comprises a third capacitive portion of the third number of capacitive portions in response to the second current path including the second capacitive portion of the third number of capacitive portions; or the second current path further comprises a third capacitive portion of the third number of capacitive portions in response to the first current path including the second capacitive portion of the third number of capacitive portions.

5. The antenna of claim 1, wherein the third number is one.

6. The antenna of claim 1, at least one of the first conductors of the plurality of first conductors includes a first edge extending in the first direction, a second edge extending in the second direction, and a first connector at a corner of the at least one of the first conductors of the plurality of first conductors, and the first connector is connected to a connecting conductor of the first number of connecting conductors, wherein the corner couples the first edge and the second edge.

7. The antenna of claim 1, wherein a length of the conducting portion in the first direction is different from a length of the conducting portion in the second direction.

8. The antenna of claim 1, further comprising:

a second feeding line configured to be electromagnetically connected to the conducting portion at a different position from where the first feeding line is configured to electromagnetically connect to the conducting portion.

9. A wireless communication module comprising:

an antenna comprising a resonant structure and a first feeding line; and a radio frequency (RF) module configured to be electrically connected to the first feeding line, wherein the resonant structure comprises:

a conducting portion extending in a first plane, and the conducting portion comprising a plurality of first conductors;

a ground conductor extending in the first plane, and being separated from the conducting portion in a third direction, the third direction intersecting the first plane;

a first number of connecting conductors extending from the ground conductor toward the conducting portion, the first number being three or more; and a third number of capacitive portions configured to capacitively connect a pair of first conductors of the plurality of first conductors, the pair of first conductors being separated by at least a corresponding gap, the third number being one or more;

wherein at least two conductors of the plurality of first conductors are connected to different connecting conductors;

wherein two connecting conductors of the first number of connecting conductors are part of a first connecting pair aligned in a first direction in the first plane;

wherein two connecting conductors of the first number of connecting conductors are part of a second connecting pair aligned in a second direction in the first plane and intersecting the first direction;

wherein the resonant structure is configured to resonate at a first frequency in a first current path;

wherein the resonant structure is configured to resonate at a second frequency in a second current path;

wherein the first current path comprises the ground conductor, the conducting portion, at least a first capacitive portion of the third number of capacitive portions, and the first connecting pair;

wherein the second current path comprises the ground conductor, the conducting portion, and the second connecting pair; and wherein the first feeding line is configured to electromagnetically connect to the conducting portion.

10. The antenna of claim 9, wherein the first current path further comprises:

a second capacitive portion of the third number of capacitive portions in response to the third number being more than one, and the second current path fails to include the third number of capacitive portions.

11. The antenna of claim 9, wherein the first current path or the second current path further comprises:

a second capacitive portion of the third number of capacitive portions in response to the third number being more than one.

12. The antenna of claim 11, wherein the first current path further comprises a third capacitive portion of the third number of capacitive portions in response to the second current path including the second capacitive portion of the third number of capacitive portions; or the second current path further comprises a third capacitive portion of the third number of capacitive portions in response to the first current path including the second capacitive portion of the third number of capacitive portions.

13. The antenna of claim 9, wherein the third number is one.

14. The antenna of claim 9, wherein at least one of the first conductors of the plurality of first conductors includes a first edge extending in the first direction, a second edge extending in the second direction, and a first connector at a corner of the at least one of the first conductors of the plurality of first conductors, and the first connector is connected to a connecting conductor of the first number of connecting conductors, wherein the corner couples the first edge and the second edge.

15. A wireless communication device comprising:

a wireless communication module; and a battery configured to supply power to the wireless communication module, wherein the wireless communication module comprising:

an antenna comprising a resonant structure and a first feeding line; and a radio frequency (RF) module configured to be electrically connected to the first feeding line, wherein the resonant structure comprises:

a conducting portion extending in a first plane, and the conducting portion comprising a plurality of first conductors;

a ground conductor extending in the first plane, and being separated from the conducting portion in a third direction, the third direction intersecting the first plane;

a first number of connecting conductors extending from the ground conductor toward the conducting portion, the first number being three or more; and a third number of capacitive portions configured to capacitively connect a pair of first conductors of the plurality of first conductors, the pair of first conductors being separated by at least a corresponding gap, the third number being one or more;

wherein at least two conductors of the plurality of first conductors are connected to different connecting conductors;

wherein two connecting conductors of the first number of connecting conductors are part of a first connecting pair aligned in a first direction in the first plane;

wherein two connecting conductors of the first number of connecting conductors are part of a second connecting pair aligned in a second direction in the first plane and intersecting the first direction;

wherein the resonant structure is configured to resonate at a first frequency in a first current path;

wherein the resonant structure is configured to resonate at a second frequency in a second current path;

wherein the first current path comprises the ground conductor, the conducting portion, at least a first capacitive portion of the third number of capacitive portions, and the first connecting pair;

wherein the second current path comprises the ground conductor, the conducting portion, and the second connecting pair; and wherein the first feeding line is configured to electromagnetically connect to the conducting portion.

16. The antenna of claim 15, wherein the first current path further comprises:

a second capacitive portion of the third number of capacitive portions in response to the third number being more than one, and the second current path fails to include the third number of capacitive portions.

17. The antenna of claim 15, wherein the first current path or the second current path further comprises:

a second capacitive portion of the third number of capacitive portions in response to the third number being more than one.

18. The antenna of claim 17, wherein the first current path further comprises a third capacitive portion of the third number of capacitive portions in response to the second current path including the second capacitive portion of the third number of capacitive portions; or the second current path further comprises a third capacitive portion of the third number of capacitive portions in response to the first current path including the second capacitive portion of the third number of capacitive portions.

19. The antenna of claim 15, wherein the third number is one.

20. The antenna of claim 15, wherein at least one of the first conductors of the plurality of first conductors includes a first edge extending in the first direction, a second edge extending in the second direction, and a first connector at a corner of the at least one of the first conductors of the plurality of first conductors, and the first connector is connected to a connecting conductor of the first number of connecting conductors, wherein the corner couples the first edge and the second edge.

* * * * *